United States Patent Office 3,605,951
Patented Sept. 20, 1971

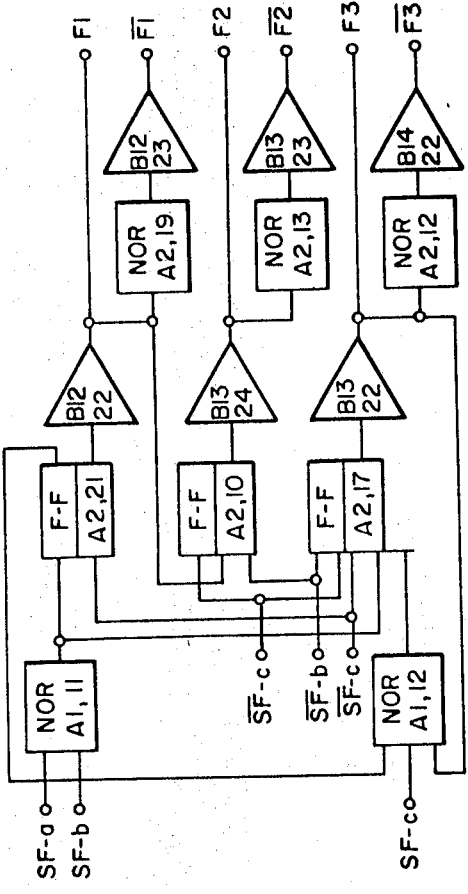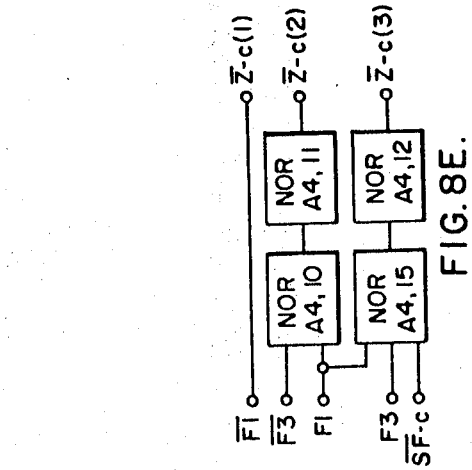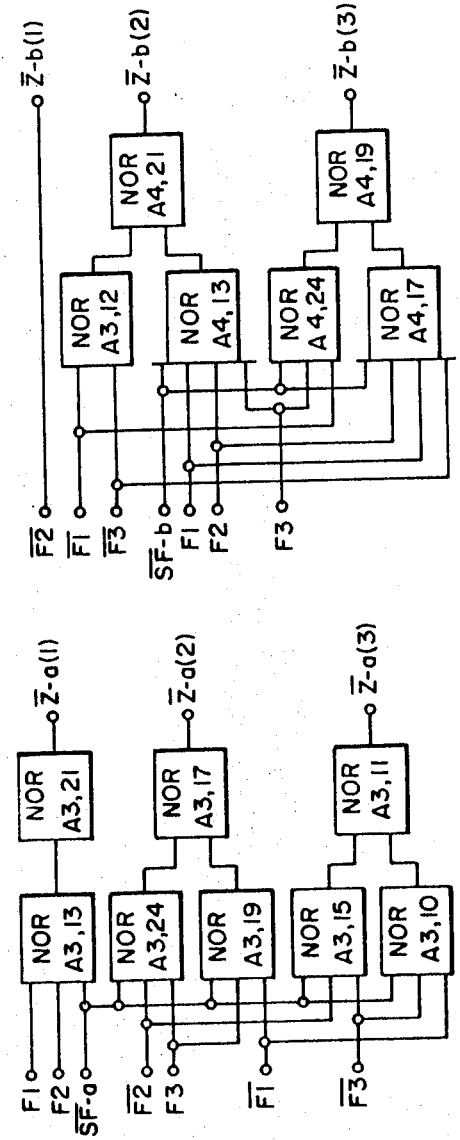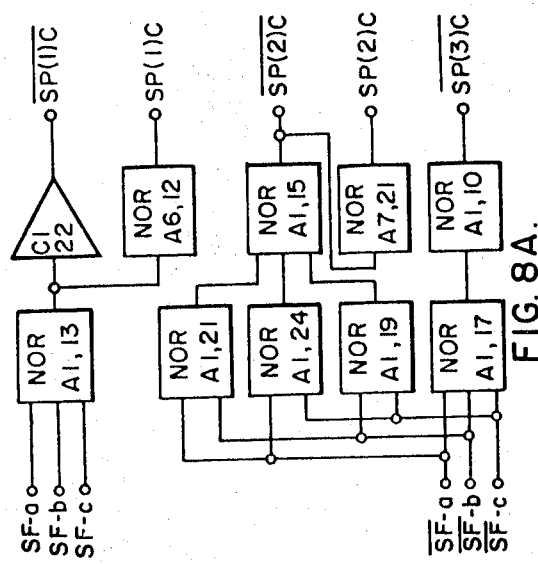

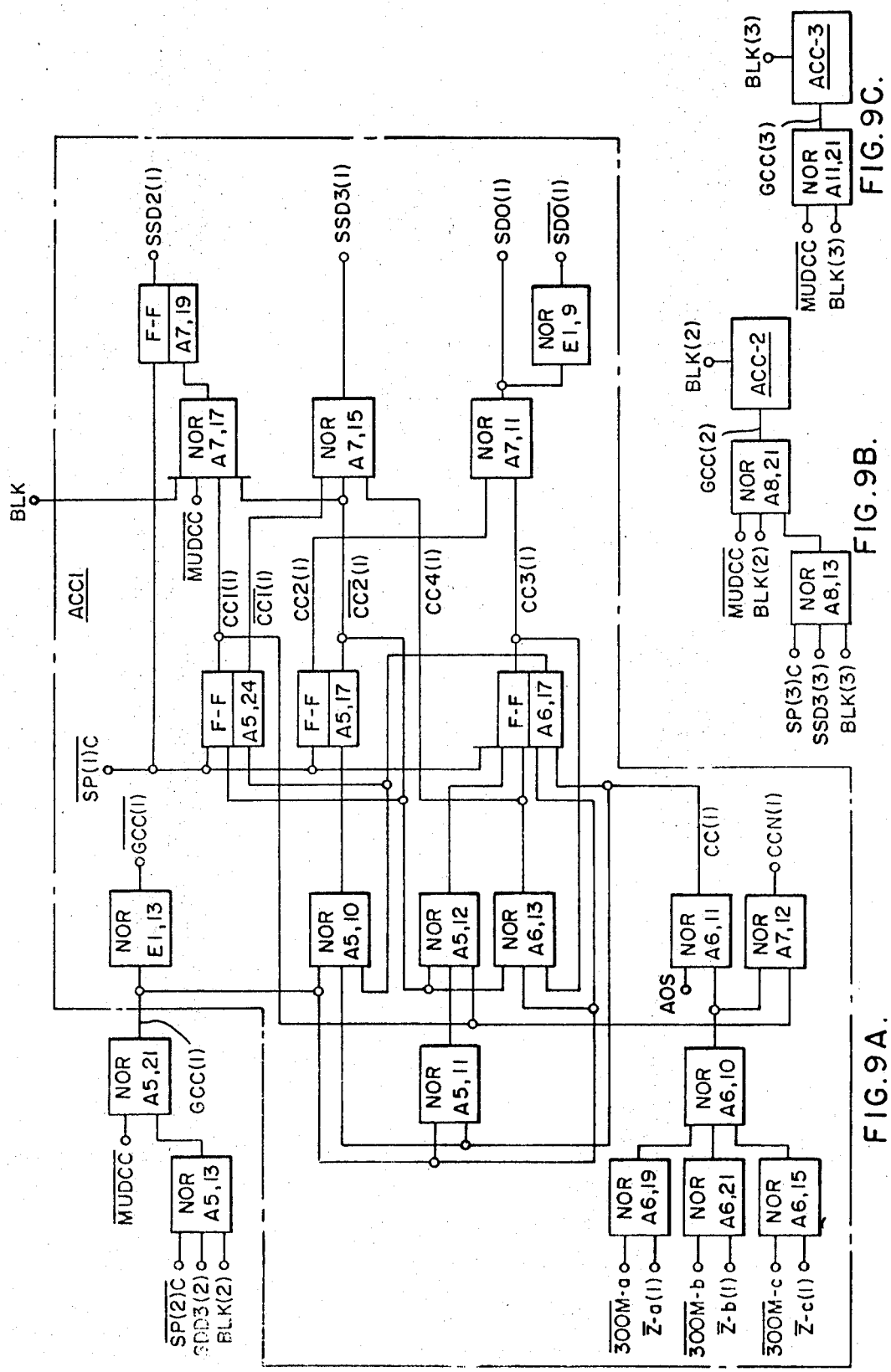

3,605,951
PULSE-SUPERVISED MULTI-VEHICLE
TRANSPORTATION SYSTEM
Andrew F. Kirsch, Edison, N.J., assignor to Westinghouse
Electric Corporation, Pittsburgh, Pa.
Filed Dec. 17, 1968, Ser. No. 784,308
Int. Cl. B66b 1/22
U.S. Cl. 187—29
57 Claims

ABSTRACT OF THE DISCLOSURE

An improved multi-car elevator supervisory system wherein movement of the cars is controlled by pulse driven logic circuits. In addition to the predetermined number of car and first direction corridor calls allocated to cars traveling in the first direction to serve first direction calls, a predetermined number of first direction corridor calls are allocated to cars while traveling in the second direction on assignment to serve first direction calls. Exess corridor calls not allocated to cars serving in the direction of the calls or traveling in the opposite direction to serve in the direction of the calls create a demand for an extra car. Cars traveling in the second direction to serve first direction corridor calls are not assigned to any specific first direction corridor call. They all travel for the farthest first direction demand until one car has passed all the first direction demands except the farthest one at which time it is committed to the farthest demand while the other cars are permitted to see the next farthest demand. If the distance between corridor calls is excessive, a demand for an extra car is created even though less than the predetermined number of calls have been allocated to the assigned cars. Corridor calls registered for more than a predetermined time are given preferred treatment. Since cars on assignment to serve preferred calls bypass nonpreferred calls, the system considers these cars to be approaching the preferred calls regardless of their actual position so that the normal call allocating circuits may be utilized to allocate the bypassed calls to other cars. When no car is located at the lower terminal floor an artificial demand for a car to be sent to the lower terminal is created unless a car is approaching the main floor with less than a predetermined number of calls allocated to it. In the absence of such a car, a car is assigned to serve the artificial demand at the lower terminal; however, it will reverse and serve the lowest actual up corridor call between it and the lower terminal floor should a call be registered. A down traveling car will bypass all remaining down corridor calls after making a predetermined number of stops with passengers on board. Such a car will not be considered in the allocation of calls to cars serving down corridor calls.

CROSS-REFERENCES TO RELATED
APPLICATIONS

The application of Andrew F. Kirsch, Ser. No. 606,239 filed on Dec. 30, 1966, entitled "Pulse-Supervised Transportation System" now Pat. No. 3,519,106 and assigned to the same assignee, describes in detail certain features of the solid state pulse supervised elevator control system which are also necessary to complete the detailed description of the supervisory system which is the subject of this invention. In order to avoid duplication and limit the complexity of this application, the application of Andrew F. Kirsch, Ser. No. 606,239 filed on Dec. 30, 1966 is hereby incorporated by reference into this application and will henceforth be referred to as "incorporated application."

In addition, the application of Andrew F. Kirsch, Henry C. Savino and Gary D. Frey entitled "Pulse-Supervised Multi-Vehicle Transportation System" filed concurrently herewith and assigned to the same assignee having Ser. No. 806,761 deals with related inventions applied to a similar supervisory system.

BACKGROUND OF THE INVENTION

Field of the invention

This invention relates to supervisory control of transportation systems employing several vehicles. Although aspects of the invention are applicable to various vehicular systems such as those providing horizontal transportation, it is particularly suitable for vertical transporation systems and will be described as applied to an elevator system.

Description of the prior art

The joint application of Kirsch, Savino and Frey mentioned above and filed concurrently herewith discloses a pulse supervised multi-car elevator system wherein a predetermined number of car and corridor calls are allocated to the closest car behind the corridor call serving in the direction of the corridor calls. Excess calls in front of a car are referred back to trailing cars serving in the same direction. Calls not allocated to cars serving in the direction of corridor calls create a demand for an extra car to be assigned.

U.S. Pat. No. 3,256,958 describes an elevator supervisory system wherein an artificial demand is created at the lower terminal floor when no car is located there, none is traveling in the down direction and the demand for down traveling cars is not heavy. No demand for an additional car is created if a car is traveling in the down direction on the assumption that that car will reach the lower terminal floor shortly.

The system described in the last mentioned patent gives preference for the assignment of available cars to zones in which calls have been registered for a period of time in excess of a predetermined interval. According to that invention one car is irrevocably assigned to serve corridor calls in the direction of the timed-out corridor call in the zone in which such call is registered. Only one car can be assigned to serve calls in the direction of the timed-out call in the associated zone regardless of the number of corridor calls registered therein.

Designers of prior art elevator supervisory systems have devoted a great deal of attention to reducing the length of time that a prospective passenger must wait for a car. The prior art systems, however, do not consider the length of time that a passenger spends in transit once he has boarded a car. Since a passenger is primarily interested in arriving at his destination as quickly as possible, the transit time in addition to the waiting time should be considered in designing the elevator supervisory system.

It is therefore a first object of this invention to provide an improved multi-car elevator supervisory system.

It is a second object of the invention to provide a transportation system such as that defined in the preceding object in which improved means are provided for allocating calls to be served by the vehicles.

It is a third object of the invention to provide a supervisory control for a multi-vehicle transportation system with improved assignment of vehicles traveling in one direction to serve calls in the opposite direction.

It is a fourth object of the invention to provide an improved supervisory control for a multi-vehicle transportation system with improved service to the lower terminal floor.

It is a fifth object of the invention to provide an improved supervisory control for a multi-vehicle transportation system with improved service to calls registered for more than a predetermined time.

It is yet another object of the invention to provide an improved supervisory control for a multi-vehicle transportation system which takes into account not only the time that a perspective passenger spends waiting for a car but also the time that a passenger spends in transit.

Other objects of the invention will be apparent from the following description taken in conjunction with the accompanying drawings.

SUMMARY OF THE INVENTION

According to the system described in the concurrently filed Kirsch et al. application mentioned above, a demand for an extra car to serve landing calls in a first direction will be created if there are more first direction calls than the cars already traveling in the first direction can serve or are in position to serve. An available car will be assigned to proceed to the floor at which the first direction corridor call which created the demand for an extra car is located. According to this invention, if the available car which is assigned to the demand must travel in the second direction in order to reach the first direction call which created the demand, a predetermined number of first direction calls can be allocated to this car while it is still traveling in the second direction. If more first direction calls are registered than can be handled by the cars traveling in the first direction to serve first direction calls and by the car traveling in the second direction to serve first direction calls, then another demand for an extra car will be created. This demand for an extra car can be created even if less than the predetermined number of calls are allocated to the car traveling in the second direction, if the distance between the calls allocated to this car is excessive. Under such circumstances, another demand will be created and another car will be assigned to help out. Optionally, a demand will not be created even though the calls allocated to the car traveling in the second direction to serve the first direction call are an excessive distance apart if another car serving in the first direction is within a predetermined number of floors from the remote call.

It is within the scope of this invention to provide that any number of cars may be traveling in the second direction to serve first direction corridor calls at any one time. However, the embodiment of the invention described in detail provides for two such cars. Also the number of calls allocated to each of these cars could be any number although the embodiment disclosed provides for the allocation of two calls per car.

Cars assigned to travel in the second direction to serve first direction corridor calls are not specifically assigned to reverse at any particular first direction corridor call. Initially, all such cars will travel for the farthest first direction demand in the second direction until one of the cars so assigned has passed all the first direction demands except the farthest, at which time it will be committed to that farthest demand. The other cars will continue traveling in the second direction for the next farthest demand in the second direction. Each time the traffic situation becomes such that a car has passed all the demands except the farthest one to which a car traveling in the second direction has not been committed, that car will become committed to that demand and the trailing cars will all look to the next farthest demand.

While the cars are traveling in the second direction on assignment to first direction calls, the first direction landing calls which created the demands remain identified so that the cars may reverse at the proper floors. To illustrate, consider two cars traveling up to serve two down demands. When the higher of the two cars traveling up is no longer in position to stop for the lower demand, the lower car will be allowed to "see" the lower demand and thus reverse at that landing while the higher car continues up to the higher down demand. Such general assignment of the cars allows for greater flexibility and adjustment to changing traffic conditions. For instance, in the illustration just given, if the higher down demand was created first and then the lower down demand, but the second car assigned to travel in the up direction to serve down demands was above the first car it would be more expedient to have the first car take the lower demand and the second car take the higher demand rather than rigidly assigning cars to the demands as they appear.

As was disclosed in the concurrently filed application, the allocation of calls is for the purpose of determining whether there is a sufficient number of cars committed to serve the registered calls. It does not mean that a car will necessarily serve the specific calls allocated to it. The allocation of calls is also instrumental in spacing the cars.

The preferred embodiment of the invention utilizes pulse position logic. Solid state scanning circuits rapidly and continuously scan ethe floors in the up and down direction for the location of calls and the position of the cars. This information is processed by solid state logic circuits which then develop signals to control the movement of the cars. By reallocating calls on each scan both to the cars serving in the direction of scan and the cars traveling in the opposite direction to serve calls in the direction of scan, the allocation of calls is being continually updated. If the car traveling in the second direction to serve first direction calls no longer sees a first direction demand in front of it, it will reverse at the next first direction call that it comes to. If there are no more first direction calls ahead of it, it will serve any second direction calls in front of it. If no such calls exist, the car will stop at the next floor and become available.

It is usually considered desirable in elevator supervisory systems to attempt to always have a car available at the main floor. Normally the main floor is the lower terminal floor of the building as is the case in the preferred embodiment of the invention. According to this invention therefore, if no car is located at the lower terminal floor, a demand is created to dispatch a car to that floor unless there is a car serving in the down direction in the lower portion of the building which has a predetermined number or less of stops to make. The assumption here is that if the car is close to the main floor and does not have an excessive number of stops ahead of it which would delay its arrival at the main floor, then there is no reason to assign another car to the main floor. In the preferred embodiment of the invention the predetermined number of stops is considered to be ONE which, in the normal course of things, would be the car call registered by the passenger within the car for the lower terminal floor since most down traveling passengers exit at the lower terminal. Little is lost if the passenger gets off at a floor above the terminal floor, since when the passenger departs the car will become available and can be immediately assigned to descend to the lower terminal.

If no car is traveling down in the lower portion of the building with only one stop ahead of it, the artificial demand at the main floor will be registered. This demand will be registered as an up demand at the lower terminal and the car assigned to it will therefore necessarily travel down to serve the up demand. If the assigned car detects any actual up corridor calls between it and the lower terminal floor, it will ignore the artificial demand at the lower terminal and will reverse at the lowest actual up corridor call. If a prospective passenger has registered an actual up corridor call at the main floor of course the car will then proceed to the lower terminal floor.

It is often the case during periods of heavy down traffic that down calls in the lower portion of the building remain unanswered for inequitably long periods of time if adequate precautions are not taken. This is due usually to the fact that cars are generally sent to the higher down calls first and become fully loaded so that they bypass the lower down calls. In order to preclude this, this invention provides that if a down call remains unanswered in the lower portion of the building for longer than a predetermined interval, those calls are given priority treatment.

When a timed-out down demand is registered all other demands are ignored so that the first car that becomes available is assigned to down corridor calls in the lower portion of the building. If the car assigned is below the highest down corridor call in the lower portion of the building the car will travel upward until reaching the highest down call. If more than the predetermined number of calls which can be allocated to a car traveling in one direction to serve calls in the other direction are registered in the lower portion of the building, a second demand can be created for an extra car to serve down corridor calls in the lower portion of the building.

If the car assigned to the lower portion of the building is above the highest down corridor call in the lower portion of the building, the car will bypass all down corridor calls until it enters the lower portion of the building. In order that the normal allocating circuits may allocate these bypassed calls to other cars serving down corridor calls or subsequently assigned to serve down corridor calls, the system simulates that the car assigned to the down corridor calls in the lower third of the building is located just above the highest floor in the lower third of the building although it may actually be many floors above this position. The allocating circuits will therefore allocate the predetermined number of calls to the car assigned to down corridor calls in the lower portion of the building beginning with the highest such down corridor call. Again, if more than the predetermined number of down corridor calls are registered in the lower portion of the building a demand will be created for another car to be assigned. In the meantime, the down corridor calls in the upper portion of the building that will be bypassed by the car assigned to the lower portion of the building can be allocated to other cars or create a demand for an extra car if not enough cars are assigned. Once the car has been assigned to serve the down corridor calls in the lower third of the building, the system is again permitted to see the other demands so that the normal order of assignments is reestablished.

An additional feature of the subject invention adds a new dimension to elevator control systems. This system, as do the prior art systems, attempts to minimize the period of time that a passenger must wait at a landing for a car. However, the passenger is primarily concerned with how long it will take him to arrive at his destination. This includes not only the time that he must wait for a car, but also the time that he spends in transit. The time that he spends in transit is not only dependent on the distance that he must travel, but also upon the number of stops that the car makes enroute.

A car must naturally stop for all car calls since a passenger within the car has indicated a desire to disembark at those landings. This is not so as to corridor calls since other cars will be able to serve them. Therefore, according to this invention, if a car has made a predetermined number of stops with passengers on board, subsequently encountered corridor calls on that trip will be ignored. In the preferred embodiment of the invention, the car will no longer be considered in the allocation of calls in the direction in which the car is traveling and it will therefore only serve car calls. Care must be taken to preserve the balance in the system to prevent giving too much service to passengers already in a car at the expense of other passengers waiting for cars. Therefore, in the preferred embodiment of the invention, a car will not ignore corridor calls after having made more than a predetermined number of stops with passengers on board unless there is an available car. In the embodiment of the invention described in detail, this feature is only applied to down traveling cars although it is within the scope of the invention to also apply the feature to cars serving in the up direction. Furthermore, in the specific embodiment of the invention described, the predetermined number of stops with passengers on board is two; however, this figure is arbitrary and the principles are applicable to any number of stops with passengers on board.

BRIEF DESCRIPTION OF THE DRAWINGS

FIGS. 3 through 24 show circuits suitable for the system of FIG. 1.

Figure 3A:
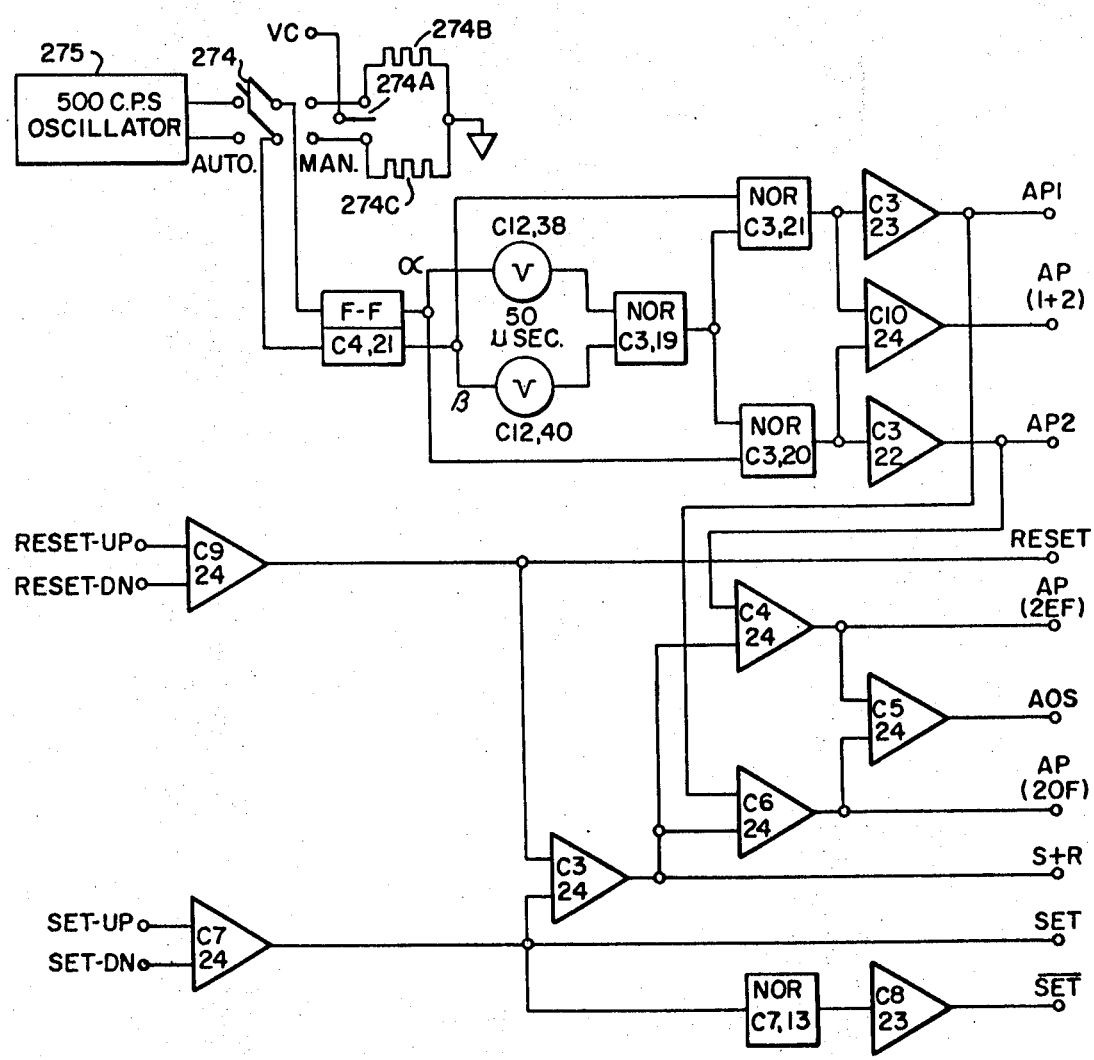
Figure 3B:
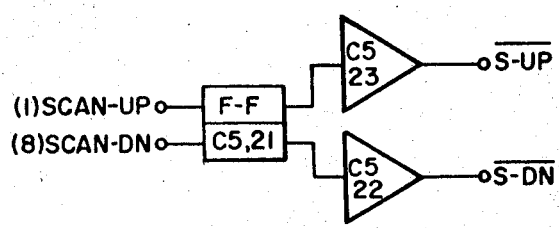

Where certain figures illustrate more than one sub-circuit, the individual sub-circuits are identified by the figure numeral followed by a letter designation. For instance, in FIG. 3 the two sub-circuits illustrated therein are identified as FIGS. 3A and 3B. In the description of the preferred embodiment of the invention, however, when referring to components or signals appearing in these sub-circuits, reference will generally be made to the figure numeral only.

DESCRIPTION OF THE PREFERRED EMBODIMENT

The circuits employed in the preferred embodiment of our invention are made up for the most part of well known logic components. The components most commonly utilized include NOR circuits, flip-flop memory circuits, pulse shapers and emitter follower amplifiers. The components will be represented herein in symbolic form to reduce the complexity of the drawings since their circuitry is well known. It is sufficient to say that the signals produced at the outputs of each of these components may have one of two states. Either no output voltage will be present or some discrete voltage, either positive or negative depending upon the internal circuitry of the components, will appear at the output. If no voltage appears at the output of a component the signal generated is said to have the value of ZERO. If the discrete voltage appears at the output the signal is said to have a value of ONE.

The NOR circuit can have any number of inputs but it has a single output. Its operating characteristics are such that if all of the input signals have a value of ZERO its output is ONE. On the other hand, if one or more of the input signals has a value of ONE the output signal is ZERO. The component identified by the reference character C3,19 in FIG. 3 is an illustration of a NOR component.

The flip-flop memory circuits, illustrated in the drawings as a rectangle divided by a horizontal line into an upper and a lower section or element (such as components C4,21 in FIG. 3), may also have any number of inputs but they have a maximum of two outputs. The inputs may be divided into two groups, one group connected to the upper element and the other connected to the lower element. Likewise, one output is associated with the upper element and the other with the lower element. The operating characteristics of the flip-flop memory circuit (hereinafter referred to as a "MEMORY element") are such that if an input signal with a value of ONE is applied to the upper element an output signal of ONE will appear on the lower element. The upper element will then have an output of ZERO. Similarly, if an input signal with a value of ONE is applied to the lower element, the upper element will have an output signal equal to ONE while the output signal of the lower element will be equal to ZERO. The output signal will remain at the value of ONE even though the input signal returns to ZERO. In fact, the output signal will stay equal to ONE until the associated input signals goes to ONE. An important charactertistic of this type of memory circuit which will be utilized in this invention is that if input signals with the value ONE are continuously applied to both the upper and the lower elements the output signals of both elements will remain at ZERO.

The third type of logic circuit component to be used in this invention is the pulse shaper which is illustrated in the drawings as a circle such as the component labeled C12,38 in FIG. 3. The operating characteristics of these components are such that when an input signal is applied, a pulse of a duration dependent upon the design characteristics of the particular PULSE SHAPER is produced at the output. If the input signal is terminated the output voltage of the PULSE SHAPER goes to ZERO even though the designed pulse time has not elapsed. However, if the input signal is maintained for a time longer than the designed pulse time, the output voltage of the PULSE SHAPER returns to ZERO when the pulse time has elapsed.

The other circuit component which appears frequently in the drawings in symbolic form is the emitter follower amplifier. This component is used mainly where the derived signal is used to drive several other components and therefore the load facing the signal is high. The emitter follower amplifies the signal under these circumstances. It can also be used as an OR circuit in that as long as any one of its inputs is equal to ONE it will produce an output (see component C9,24 in FIG. 3). Some other special purpose components are used in the system but they will be described as they appear in the drawings.

Although aspects of the invention may be incorporated in an elevator system arranged either for attendant operation or for fully automatic operation and serving a structure having any desired number of floors, the invention may be described adequately with reference to an elevator system arranged for fully automatic operation and serving a building structure having eight floors. For this reason, the illustration and description of the invention will be directed particularly to such a system.

The novelty and advantages of this multi-car system can be adequately described with an installation consisting of three cars although the principles involved are applicable to any system containing more than one car. The cars will be referred to as the A car, B car and C car. A good deal of the signals generated by this system are common to all the cars, however, there are many signals which are individual to each car. These latter signals are identified by a reference character which ends with a hyphen followed by the lower case letter $a$, $b$ or $c$ associated with the particular car. In most cases where the circuits for the individual cars are for all practical purposes identical, only those circuits applicable to the A car will be shown in the drawings. However, where necessary signals pertaining to all three cars will be shown. As is conventional in representing signals in pulse circuits, a signal identified by a reference character with a bar over it represents a signal which is the reverse of a signal represented by the same reference character without the bar. For example, the signal $\overline{SG}-a$ at the bottom of FIG. 7 has a value of ZERO when the signal $SG-a$ has a value of ONE and vice versa.

FIGURE 1

Figure 1:
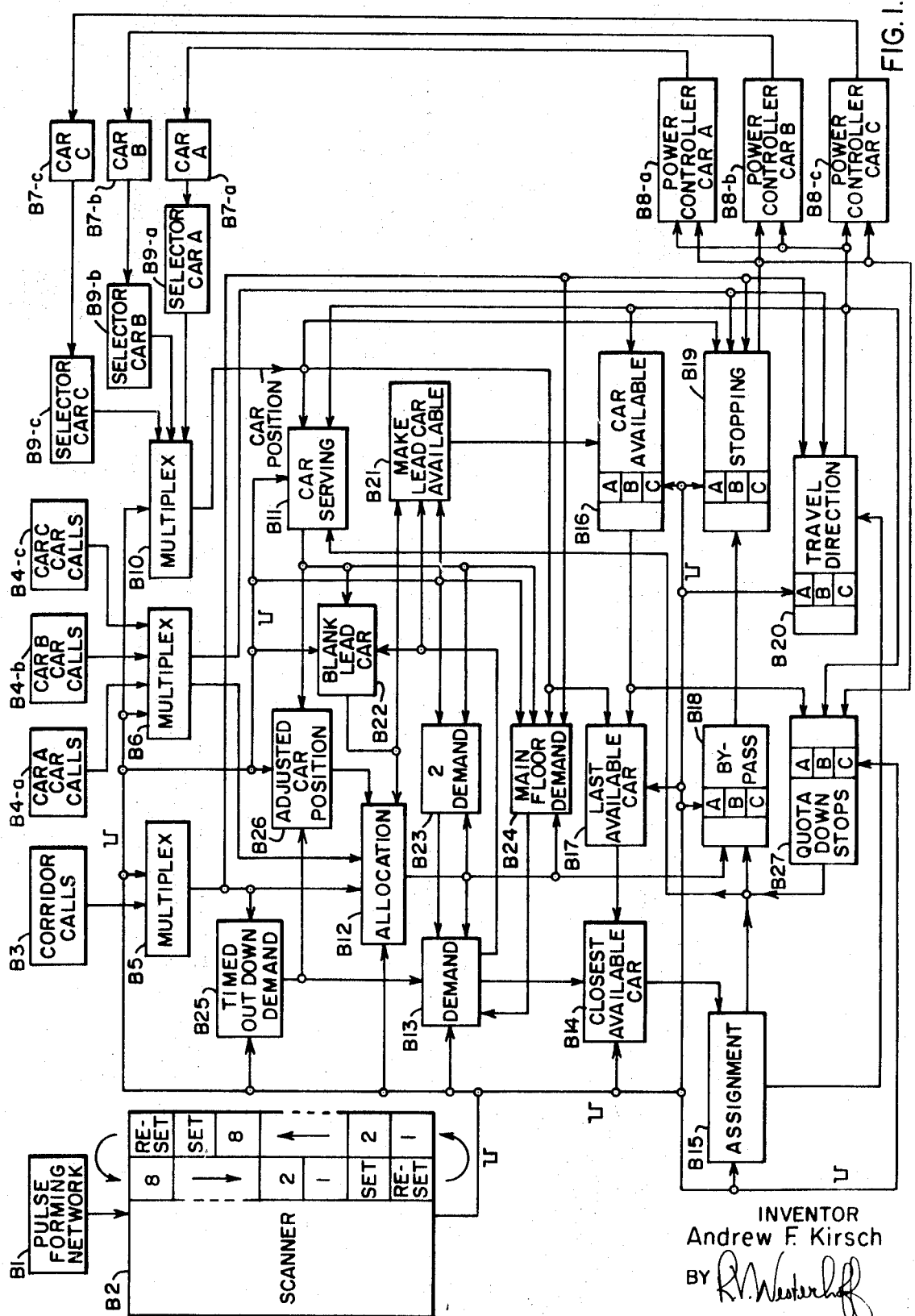
FIG. 1 is a block diagram of an elevator system embodying the invention.

FIG. 1 is a block diagram illustrating some of the features of the invention as applied to the preferred embodiment thereof. A block diagram is necessarily a simplification of the system; however, FIG. 1 is useful in gaining an understanding of the overall operation of the system.

The heart of the system is the pulse forming network B1 which generates repetitive pulses which drive the scanner B2. The scanner rapidly and continually generates successive signals associated with each of the landings. At the completion of the scan in each direction a set interval and a reset interval are provided by the scanner. The signals generated by the scanner serve to coordinate the operation of the other components of the system. Some circuits are affected by the individual scanning signals associated with each landing while others are only concerned with the direction of scan and still others are concerned only with the set and reset intervals. In the interest of simplifying the presentation however, all the scanning control signals are shown in FIG. 1 by a single line intermittently labeled with a negative pulse symbol $$\neg\sqcup\sqcap$$

for identification. Also in the interest of simplification, where some of the components illustrated are identical for each car, a single block is shown but is labeled with a reference to the A, B and C cars (e.g. see B16).

Corridor call signals generated in the corridor call circuits B3 for registering calls for up and down service at various landings are multiplexed by the scanning signals in B5 so that signals representative of corridor calls are only introduced into the system when the scanner is scanning at a floor at which a corridor call is registered. Likewise, car call signals generated by the individual car call circuits B4–$a$–$b$ and $c$ for the A, B and C cars, respectively, are multiplexed by the scanning signals at B6 so that the respective car calls are only introduced into the system when the scanner is scanning at the floor for which a car call is registered. Movement of the elevator cars B7–$a$–$b$ and $c$ up and down in the hoistway is controlled by power controllers B8–$a$–$b$ and $c$ associated with the A, B and C cars respectively. Selectors B9–$a$, $b$ and $c$ generate signals associated with the position of the cars respectively in the hoistway. The signals generated by the selectors are multiplexed by the scanning signals at B10 to produce car position pulses.

If a car is traveling in the same direction as the direction of scan and is not on assignment to serve in the other direction, the car will be labeled as serving in the direction of scan in B11 when the scanner passes the floor at which the car is located. Assuming for a moment that the conditions do not exist to generate a blank the lead car signal in B22, the indication that the car is serving in the direction of scan is fed into the allocating circuit B12. The allocating circuit will allocate corridor calls and car calls to the cars observed to be serving in the direction of scan. If a car is traveling in the direction opposite to the direction of scan, but on assignment to serve corridor calls in the direction of scan, it will be labeled as running to a demand in B11. As a result corridor calls not allocated to cars traveling in the direction of scan in B12 will be allocated to the car running to a demand in B23. The system described in detail has the capability of simultaneously allocating corridor calls in the direction of scan to two cars traveling in the direction opposite to the direction of scan. If the quota of calls per car traveling in both directions to serve calls in the direction of scan is exceeded or if none of the cars is in position to serve a certain call according to the scheme described in the summary of the invention, a demand for an extra car is created in the demand circuit B13. The system will then seek out an available car to serve the demand.

If a car has no calls to serve it will lose travel direction and be designated as available by the available car circuits represented by B16. As the scanner scans past the floors, the position of the last available car detected is stored in B17. Depending upon the position of the last available car observed and the position of the demand, the closest available car to the demand is selected by the circuit in B14. The selected car is then assigned to serve the demand by the assignment circuit B15. Depending upon the position of the available car with respect to the demand the assignment of the car will result in giving the car travel direction B20. The travel direction signal will then activate the power controller to start the car traveling toward the demand. When a car reaches a floor at which a car call or a corridor call for service in the direction of scan is registered, a stopping signal for the appropriate car is generated at B19 which causes the power controller to stop the associated car at that floor.

Under certain circumstances, it is desirable that the car bypass a corridor call. One example of this would be when a car is assigned to travel in one direction to serve calls in the opposite direction. Under these circumstances the car should bypass the corridor calls in the opposite direction until it reaches the floor at which the system desires the car to reverse direction. Another example would be where it was assigned to serve corridor calls in the direction in which it must travel to reach the first call allocated to it and it must pass another car serving in the same direction in order to reach its assigned call. Under these circumstances the car should bypass certain calls allocated to the other car in order to prevent bunching. In addition, according to this invention a car serving in the down direction will bypass down corridor calls when the car has made a quota of stops with down car calls registered if there are no available cars in the system. Under these circumstances, the signal will be generated at B27 which will cause the car to bypass the remaining down corridor calls and which will prevent the allocating circuits from allocating calls to this car by blocking the circuit of B11 from generating a car serving indication. When a car is to bypass corridor calls a bypass signal is produced at B18 which prevents the generation of a stopping signal at B19.

If there is a demand for service in one direction and there are no cars available to serve the demand, the system will blank the lead car serving in the opposite direction through B22 on the next scan. Therefore on that scan even though the car is serving in the direction of scan it will not be considered in the allocation of corridor calls. If the scan is completed without the creation of a demand in front of other cars serving in the direction of scan, the lead car will be made available and will be assigned in the manner previously described to serve the demand in the other direction.

If no car is located at the lower terminal floor an artificial main floor demand will be created at B24. This artificial demand will appear as a normal demand at B13 and an available car will be assigned to this demand in the manner previously described. However, if a car is serving down corridor calls in the lower third of the building and this car has only one call ahead allocated to it, an artificial demand will not be created at B24. Assuming that there is no such car however, an available car will be assigned to serve the artificial up demand at the lower terminal floor. If there are actual up corridor calls registered between the car assigned to the up demand at the lower terminal and the lower terminal, the artificial main floor demand will again be blocked and the down traveling car will stop and reverse at the lowest up corridor call registered.

If a down corridor call is registered in the lower third of the building for more than a predetermined period of time, a timed-out down demand is created at B25. This timed-out down demand will receive priority for assignment through the normal demand circuit at B13. If the available car assigned to the timed-out down demand is above the lower third of the building, the adjusted car position circuit B26 will cause the allocating circuits B12 to see the assigned car as if it was located just above the highest floor in the lower third of the building. The normal predetermined number of corridor calls in the lower third of the building will therefore be allocated to the car assigned to that zone and the down corridor calls above the lower third of the building will be allocated to other cars in the system. If more than the predetermined number of down corridor calls are registered in the lower third of the building, a normal demand will be created calling for an extra car. Once the car assigned to the down corridor calls in the lower third of the building reaches the lower third of the building, it is seen by the system in its actual position with respect to the floors.

FIG. 2

Figure 2:
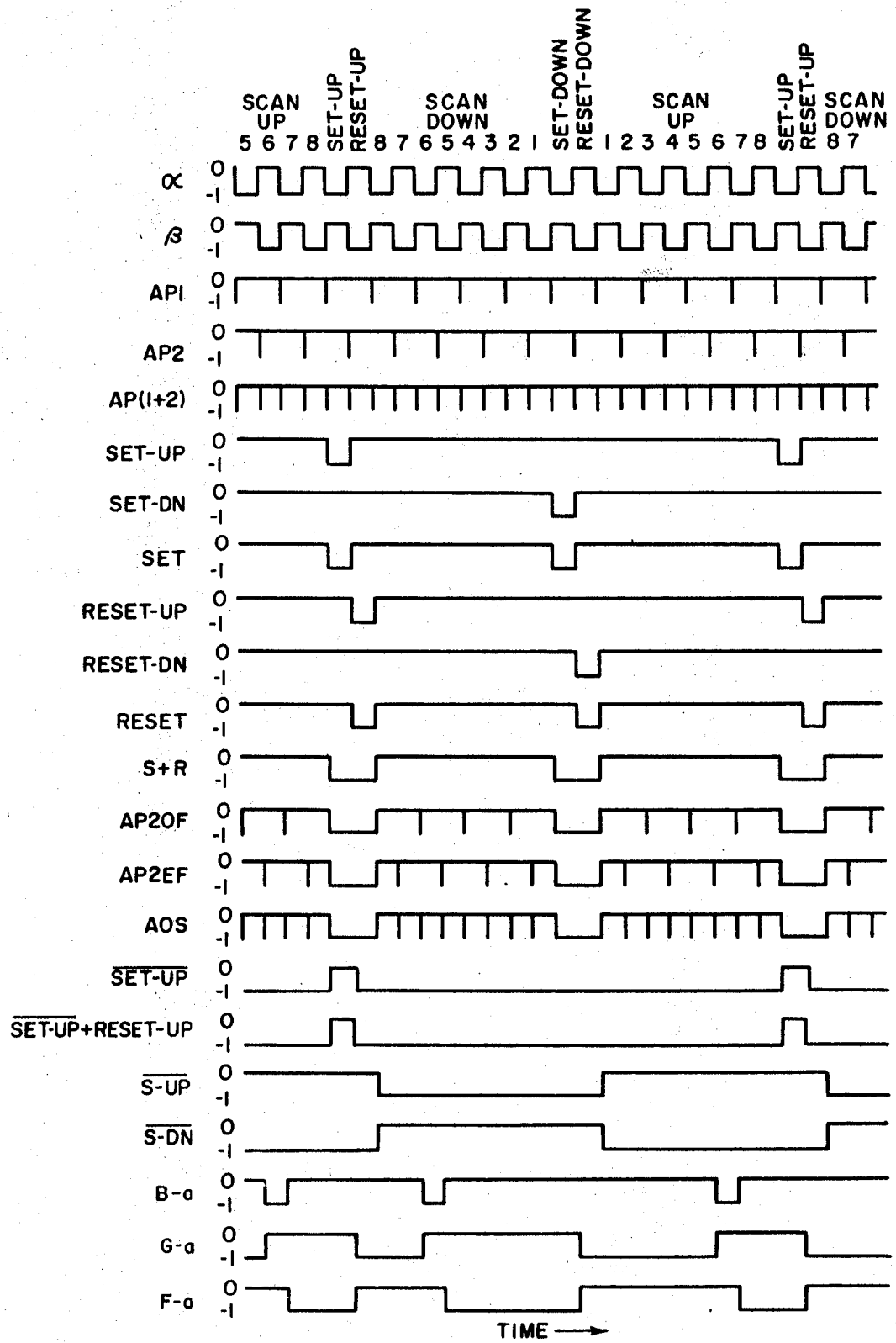
FIG. 2 is a graphical representation showing signals useful in the invention of FIG. 1.

A great many signals are being continuously generated by this system. Some of these signals are timing signals which are used to pace the system while other signals are information signals or command signals which reveal data about the position of the cars and the traffic situation or provide instructions to other parts of the system respectively. FIG. 2 graphically illustrates most of the timing signals and also shows three of the information signals (the last three signals shown). As mentioned previously, each of the signals has two states. Since the system herein described utilizes negative pulses the signals are shown in FIG. 2 as having a value of either 0 or −1. For ease of presentation however, the pulses will be referred to as either having a value of ZERO or ONE. The signals in FIG. 1 are shown as a function of time and with respect to each other. As illustrated by the arrow at the top of the figure, time progresses from left to right across the page. The signals are also related to the scanning sequence. For instance when the scanner is scanning up at the fifth floor a glance vertically down the page will indicate the value of each of the signals represented. It will be noticed that after the scanner has scanned through the floors in either direction there are two interim periods, a SET interval and a RESET interval. The function of these intervals will be developed later.

The heart of the system is an oscillator which produces two square wave signals $\alpha$ and $\beta$, the pulses of which are 180° out of phase as shown. These two basic waveforms are utilized in circuits to be described subsequently to produce the other timing signals. In the embodiment of the invention described, the oscillator produces signals having a frequency of 500 cycles per second. It can be seen then that an $\alpha$ pulse is developed 500 times a second and the pulses last for 1 millisecond. The $\beta$ pulses are also produced 500 times a second and last for 1 millisecond, however, since the $\alpha$ and $\beta$ pulses are 180° out of phase a pulse, either an $\alpha$ or $\beta$ pulse, is developed 1000 times per second. The selection of a pulse repetition rate of 1000 pulses per second is arbitrary and any other rate can be utilized with the sole qualification that it is desirable to have a scanning rate which is appreciably faster than the rate of movement of the elevator cars traveling at maximum speed.

The advance pulse AP1 is derived directly from the $\alpha$ pulse but is of a much shorter duration; on the order of 50 microseconds. It is produced at the on-set of each pulse. Likewise, the AP2 pulse, also with a duration of 50 microseconds, is produced at the on-set of the $\beta$ pulse. The signal AP(1+2) is a summation of the signals AP1 and AP2 and it is comprised of a continuous chain of pulses with a duration of 50 microseconds occurring one millisecond apart.

The SET-UP signal has a value of ZERO except during the SET interval at the completion of the up scan when it has a value of ONE for approximately one millisecond. Similarly, the SET-DOWN signal has a value of ZERO except during the SET interval at the completion of the down scan. The SET signal is obviously the summation of the SET-UP and SET-DN signals. The RESET-UP, RESET-DN and RESET signals are similarly formed during the RESET intervals.

The signal S+R is the summation of the SET plus RESET signals. The signal AP20F, advance pulse to odd floor, is a summation of the signal AP1 and S+R while the signal AP2EF, advance pulse to even floor, is a summation of the signal of AP2 and S+R. A signal AOS, advance or set, is a summation of the signal of AP20F and AP2EF.

The signal $\overline{\text{SET-UP}}$, do not SET-UP, is the reverse of the signal SET-UP and therefore has a value of ONE except during the SET interval upon the completion of the up scan when it has a value of ZERO. The signal $\overline{\text{SET-UP}}$+RESET-UP is a summation of the signals $\overline{\text{SET-UP}}$ and RESET-UP and since RESET-UP has a value of ZERO except during a period when $\overline{\text{SET-UP}}$ has a value of ONE, theoretically this resultant signal should be identical to the signal $\overline{\text{SET-UP}}$. However, in reality this signal $\overline{\text{SET-UP}}$ cannot go back to ONE after the SET period until the RESET signal goes to ONE. Since it is important to the sequencing of certain of the signals in the system that the signal $\overline{\text{SET-UP}}$ be returned to the value of ONE when the RESET signal goes to ONE, the combined signal was derived. Similar signals $\overline{\text{SET-DN}}$ and SET-DN+ RESET-DN associated with the down scan are also generated by the system although they are not illustrated in FIG. 2.

The signal $\overline{\text{S-UP}}$, do not scan up, has a value of ZERO whenever the system is scanning up including during the SET-UP and RESET-UP intervals and has a value of ONE when the system is scanning down including the SET-DOWN and RESET-DOWN intervals. Conversely, the signal S-DN, do not scan down, has a value of ZERO during the down scan and a value of ONE during the up scan. The reverse signals were used since the scanning signals are used mainly as gating signals.

The signals described so far control the sequencing with the supervisory system. As mentioned, many other signals some of which represent bits of information about the traffic situation are developed by the system. Three examples of informational signals are illustrated at the bottom of FIG. 2. The signal B–$a$ represents the location of the A car with respect to the floors. For the purpose of illustration the A car is assumed to be located at the sixth floor. It can be seen that signal B–$a$ is equal to ZERO except during those intervals during the up and down scans when the scanner is at the sixth floor. Hence, the signal B–$a$ equals ONE when the scanner is scanning at the floor at which the A car is located. The signal G–$a$ is equal to ONE if the scanner has not yet seen the A car on a particular scan. This applies on both directions of scan. In the example given it can be seen that G–$a$ equals ONE until the scanner reaches the sixth floor on the up scan at which time the signal goes to ZERO. The signal remains at ZERO until the RESET signal is produced at which time G–$a$ returns to a value of ONE. The signal F–$a$, on the other hand, is equal to ZERO until the scanner has passed the floor at which the A car is located at which time the signal goes to ONE. This signal is returned to ZERO by the RESET signal. Hence, in the illustration given the signal F–$a$ equals ZERO during the up scan until the scanner reaches the seventh floor at which time the signal goes to a value of ONE which is maintained until RESET-UP. As mentioned there are many more signals which are informational signals or command signals, however, those shown are sufficient to illustrate the relationship between the various signals.

FIG. 3

This figure shows the circuits which generate most of the timing signals. The derivation of the advance pulses AP1 and AP2 depends in part on the position of a two-pole double-throw switch 274 which has an automatic position AUTO and a manual position MAN. For present purposes, it will be assumed that the switch is in the AUTO position. In this position the advance pulses are derived from an oscillator 275 having a frequency high enough to perform the desired scanning operation cycle at a time during which the elevator cars cannot travel an appreciable distance. As representative of suitable parameters, the oscillator may have a frequency of the order of 200 cycles per second or higher. A frequency of 500 cycles per second has been found to be satisfactory and it will be assumed that such a frequency is employed here. The oscillator may be of any suitable type but an oscillator of the multivibrator type is preferred.

The oscillator conveniently generates square-wave pulses going from ZERO to an amplitude of −20 volts. With the switch 274 in the AUTO position the output of the oscillator 275 is connected to the upper and lower input terminals of a MEMORY element C4,21. The upper output of the MEMORY element C4,21 produces the signal $\alpha$, which serves as an input to the NOR element C3,20 and the PULSE SHAPER C12,38. The lower output of the MEMORY element C4,21 produces the signal $\beta$ which serves as an input to the NOR element C3,21 and the PULSE SHAPER C12,40. The PULSE SHAPERS C12,38 and C12,40 produce pulses for a duration of 50 microseconds when triggered. These pulses serve as inputs to the NOR element C3,19, the output of which serves as inputs to the NOR elements C3,20 and C3,21. Except when a pulse is applied to one of its inputs, the NOR element C3,19 has an output of ONE which holds the outputs of the NOR elements C3,20 and C3,21 at ZERO. Assuming for a moment that the oscillator is supplying an input through the upper input of the MEMORY C4,21, the signal $\beta$ will equal ONE while $\alpha$ equals ZERO. When the signal $\beta$ equals ONE the output of the NOR element C3,21 is ZERO. With the $\alpha$ signal equal to ZERO, however, the output of the NOR element C3,20 can go to ONE if the output of the NOR element C3,19 goes to ZERO. This will occur for 50 microseconds when the signal $\beta$ first goes to ONE since the $\beta$ signal will trigger the pulse shaper C12,40 which in turn will cause the output of the NOR element C3,19 to go to ZERO momentarily. With both inputs at ZERO the NOR element C3,20 will produce an output pulse for a duration of 50 microseconds. This pulse is passed through the AMPLIFIER C3,22 to produce the signal AP2.

On alternate half-cycles, when the oscillator supplies a pulse to the lower input of the MEMORY C4,21, a 50 microsecond pulse will be produced at the output of the NOR element C3,21 which will pass through the AMPLIFIER C3,23 to become the signal AP1. The output pulse of the NOR elements C3,20 and C3,21 are combined in the AMPLIFIER C10,24 to produce the signal AP(1+2) which comprises 50 microsecond pulses occurring 1000 times per second.

The signals RESET-UP and RESET-DN (the origin of which will be discussed below) are combined in the AMPLIFIER C9,24 to produce the signal RESET. Similarly the signals SET-UP and SET-DN are combined in AMPLIFIER C7,24 to produce the signal SET. The signals SET and RESET are inputs to the AMPLIFIER C3,24 which produces the signal $S+R$. The signal $S+R$ is combined with the signal AP1 in the AMPLIFIER C6,24 to produce the signal AP2OF (advance pulse to odd floor) and with the signal AP1 in AMPLIFIER C4,24 to produce the signal AP2EF (advance pulse to even floor). These latter two signals are summed in the AMPLIFIER C5,24 to produce the signal AOS (advance or set). The SET signal is reversed by the NOR element C7,13 and passed through the AMPLIFIER C8,23 to produce the signal $\overline{\text{SET}}$.

The signals $\overline{\text{S-UP}}$ and $\overline{\text{S-DN}}$ are generated by the MEMORY element C5,21. When the scanner comes to the first floor on the up scan ((1) SCAN-UP=1), the lower output of the MEMORY element C5,21 goes to ONE. This output passes through the AMPLIFIER C5,22 to become the signal $\overline{\text{S-DN}}$. Conversely, when the scanner comes to the top floor on the down scan ((8) SCAN-DN=1) the upper output of the MEMORY element C5,21 goes to ONE producing the signal $\overline{\text{S-UP}}$ through the AMPLIFIER C5,23. In other words, when the scanner reaches the first floor on the up scan the signal do not scan down $\overline{\text{S-DN}}$, goes to ONE and when the scanner reaches the top floor on the down scan, the do not scan up signal goes to ONE.

FIG. 4

This figure depicts the down scanning section of the scanner. Whenever the signal AP2EF goes to ONE the down scan MEMORY units DSM(1), (3), (5) and (7) are RESET. That is, their lower outputs are all made equal to ZERO. Similarly, whenever the signal AP2OF goes to ONE the down scan MEMORY units DSM(2), (4), (6) and (8) associated with the even floors are RESET. Down scanning is initiated by the signal SSTD (start scanning top down). This signal goes to ONE when the up scanning section of the scanner has completed its cycle. When SSTD goes to ONE it sets the lower output of DSM(8) equal to ONE which indicates that the scanner is scanning down at the eighth floor. Thus, the signal (8)SCAN-DN equals ONE. This signal induces a ZERO output from the NOR element DSN(8). When the signal AP20F delivers its next pulse to the lower input of the MEMORY DSM(8) the signal (8)SCAN-DN goes to ZERO. This produces an output of ONE from the NOR element DSN(8) which causes the PULSE SHAPER C8,30 to inject a 150 microsecond pulse into the upper input of the MEMORY DSM(7). This causes the lower output of the MEMORY DSM(7), which is the signal (7)SCAN-DN, to go to ONE. Hence, the scanner is now scanning down at the seventh floor. Even though the output of the NOR element DSN(8) remains equal to ONE, the output of the PULSE SHAPER returns to ZERO after 150 microseconds. One millisecond after the signal (7)SCAN-DN goes to ONE a pulse, AP2EF, is applied to the lower input of the MEMORY DSM(7) thereby causing the signal (7)SCAN-DN to return to ZERO. This in turn causes the output of the NOR element DSN(7) to go to ONE triggering the PULSE SHAPER C7,30 which by tripping the MEMORY DSM(6) causes the signal (6)SCAN-DN to go to ONE. It can thus be seen that upon successive pulses of the signals AP20F and AP2EF the down scan signal progresses from odd to even floors. It is obvious that such a scanner can be built for a building with any number of floors.

Assuming that down scanning has progressed until the signal (1)SCAN-DN equals ONE, the next time the signal AP2EF delivers a pulse, (1)SCAN-DN goes to ZERO so that NOR element DSN(1) triggers the PULSE SHAPER C1,30 to produce the signal DSC which indicates that the down scan is complete. Up to this point the upper outputs of the MEMORY elements D4,21 and D4,10 have both been equal to ONE. The upper output of the MEMORY D4,10 is kept equal to ONE by the periodic pulses of the signal AP2, while the upper output of the MEMORY D4,21 was made equal to ONE by the RESET-DN signal at the completion of the previous down scan. The signal SET-UP will also reset these MEMORIES during up scan, but is really only effective during start-up of the system. The signal DSC, however, trips the MEMORY D4,21 so that its lower output goes to ONE. This latter signal passes through the AMPLIFIER C9,23 to make the signal SET-DN equal to ONE. The scanner is now in the SET-DN condition during which the system will make certain decisions based upon what it saw on the previous scan.

It will be noticed that prior to the tripping of the MEMORY D4,21 by the signal DSC, the upper output of this MEMORY, through the AMPLIFIER C1,23, blocked any output from the NOR element D5,19. The output of D5,19 is kept at ZERO by the DSC signal while the upper output of the MEMORY D4,21 is going to ZERO. The output signal of the NOR element D5,19 remains blocked when DSC returns to ZERO by the output of the NOR element D4,12 which is driven by the signal AP1. It will be remembered that the signal DSC was produced when the signal AP2EF went to ONE. One of the signals that went into producing the signal AP2EF was the signal AP2. One millisecond later the signal AP1 will go to ONE momentarily. This causes the output of the NOR element D4,12 to go to ZERO and since now all of the inputs to the NOR element D5,19 are ZERO this element will deliver a pulse to the upper input of the MEMORY D4,10. The lower output of the MEMORY D4,10 then goes to ONE and when amplified by the AMPLIFIER C1,23 becomes the signal RESET-DN. This signal, RESET-DN, is used to return certain of the MEMORIES in the system to their original state following the down scan. The signal RESET-DN is combined with the signal $\overline{\text{SET-DN}}$ in the AMPLIFIER C2,24 to produce the signal $\overline{\text{SET-DN}}$+RESET-DN. The purpose of this latter signal will be discussed below.

When the signal RESET-DN goes to ONE it causes the upper output of the MEMORY D4,21 to go to ONE making $\overline{\text{SET-DN}}$ equal to ONE while simultaneously making the signal SET-DN equal to ZERO. One millisecond later the signal AP2 produces a 50 microsecond pulse. This pulse causes the signal RESET-DN to return to ZERO while triggering the PULSE SHAPER C12,20 to produce a pulse SSFU (start scanning first up). Although the signal AP2 continuously supplies pulses to the lower input of the MEMORY D4,10, the signal SSFU is only generated when the signal AP2 is effective to cause the upper output of the MEMORY D4,10 to go from ZERO to ONE. This only occurs at the completion of the down scan.

FIG. 5

This figure depicts the up scanning section of the scanner. The up scan is initiated by the signal SSFU in the lower right hand corner of the figure and progresses up through the floors in a manner very similar to that in which the down scan progressed. When the signal USC (up scan complete) goes to ONE the signal SET-UP goes to ONE. The SET-UP interval is followed by the RESET-UP interval which is in turn followed by the pulse SSTD which as previously noted will initiate the next down scan. The operation of this section of the up scan circuit can be traced in a manner very similar to the operation of the corresponding portion of the down scan circuit just described.

FIG. 6

This figure illustrates the circuits which produce the car position signals and the multiplex car call and corridor call signals. When the signal B–a equals ONE this is an indication that the scanner, whether scanning in the up or down direction, is scanning at a floor in the vicinity of which the elevator car A is located. The signal B–a is derived from one of the AND DRIVERS shown symbolically as large rectangles down the left hand side of the figure. There is an AND DRIVER for each floor in the installation. For instance AND DRIVER(8) is associated with the eighth floor. Such AND DRIVERS are described in detail in the incorporated application. Essentially, they have a plurality of inputs and a like number of outputs. In addition, they have a gate input. The operation of the AND DRIVER is such that if the input to the gate signal is ZERO an output of ONE will appear on those outputs associated with the inputs which equal ONE. When the gating signal equals ONE all outputs equal ZERO regardless of the value of the signals applied to the inputs. For instance, in FIG. 6 if the scanner is scanning up or down at the eighth floor, either (8)SCAN-UP or (8)SCAN-DN will equal ONE so that the gating signal $\overline{(8)\text{SCAN}}$ equals ZERO. Under these conditions, if the signal applied to any one of the inputs on the left hand side of AND DRIVER(8) equals ONE, a ONE will appear at the corresponding output.

The inputs to the AND DRIVERS include signals indicating the presence of the A, B and C cars at the associated floor, the existence of an up or a down corridor call at the associated floor, and the presence of a car call in either the A, B or C car at the associated floor. For example, consider the AND DRIVER for the seventh floor. If the signal (7)S–a=1 this indicates that the A car is physically located adjacent the seventh floor. Likewise if the signal (7)S–b or the signal (7)S–c equals ONE it indicates the presence of the associated car at the seventh floor. If the signal 10(7) equals ONE it indicates that an up corridor call is registered at the seventh floor. Correspondingly, if the signal 20(7) equals ONE a down corridor call is registered for the seventh floor and finally if the signal 30(7)–a equals ONE a car call is registered in the A car for the seventh floor. Signals 30(7)–b and 30(7)–c similarly indicate the existence of a car for the seventh floor in the B and C cars respectively. Notice that there is no up call signal for the eighth floor or down call signal for the first floor since such signals would be meaningless. As was mentioned above, there will be no output signal developed by any of the AND circuits regardless of the value of the input signals unless the scanner is scanning either up or down at the associated floor.

Figure 4:
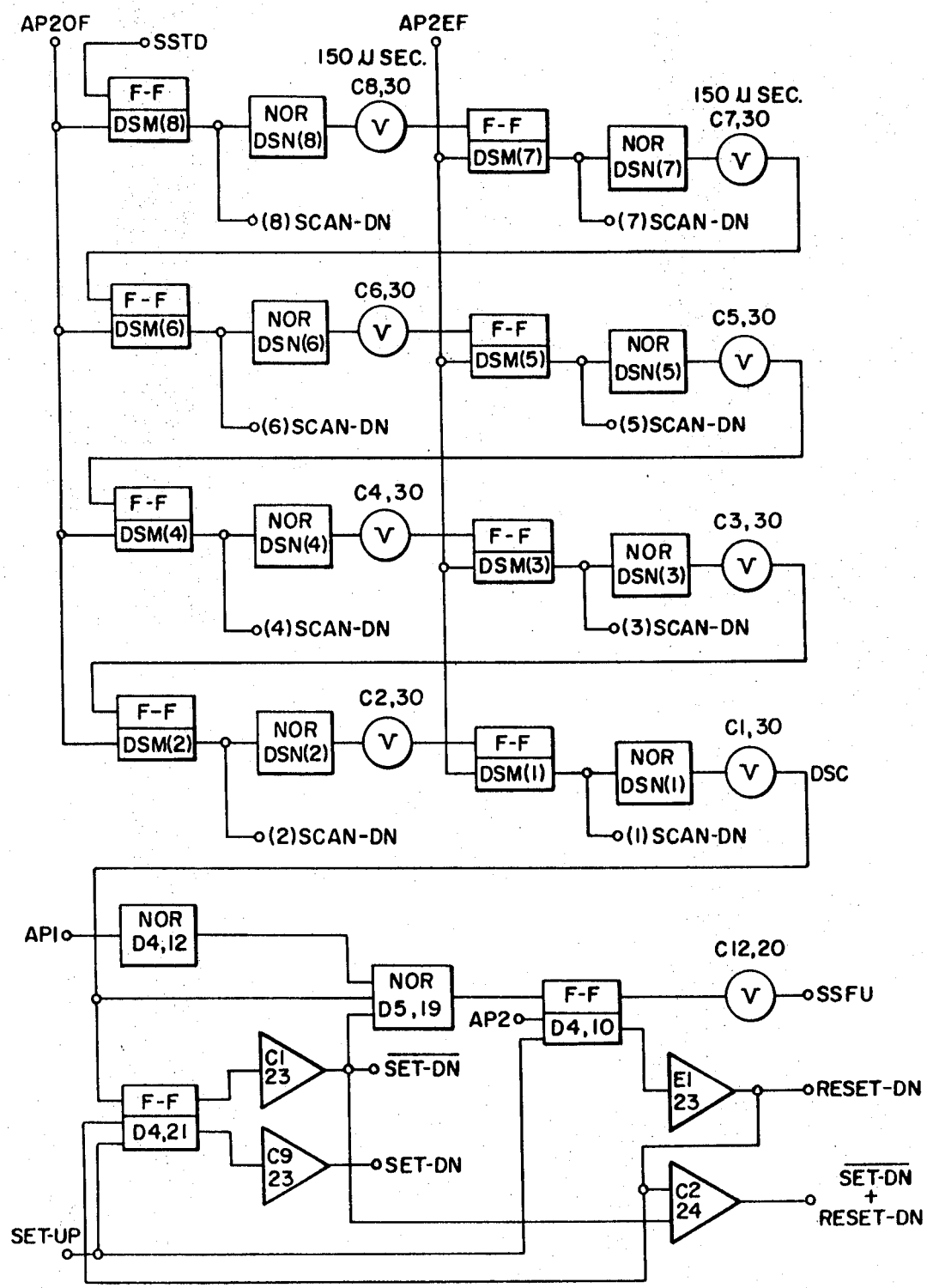
Figure 5:
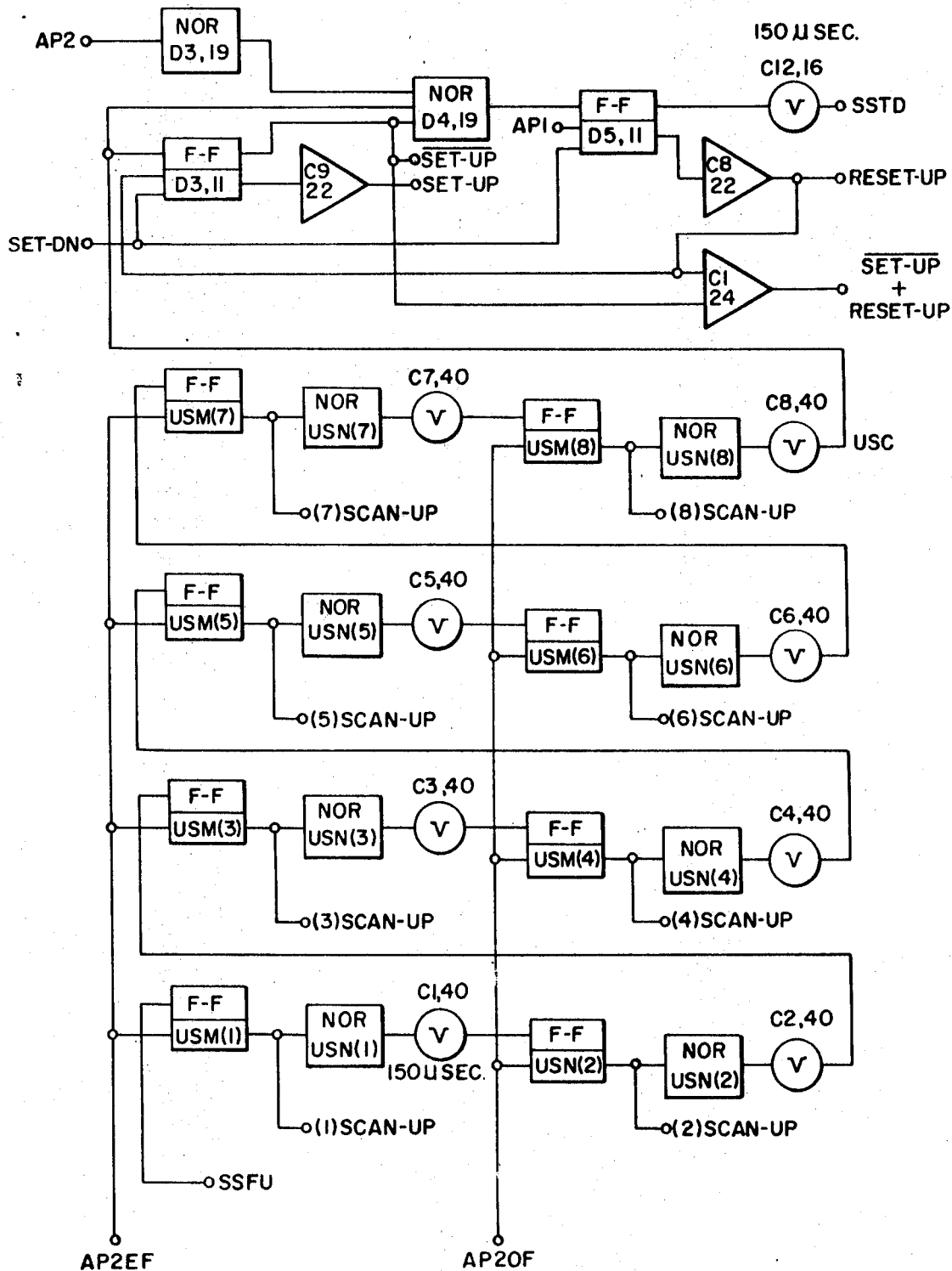

The car location signals, for instance (7)S–$a$, are derived from the individual floor selector associated with each car. The floor selector could be of the electromechanical type commonly used with relay elevator supervisory systems or could be of the solid state circuit type. It will be assumed that the solid state type of floor selector such as that illustrated in FIG. 4J of the incorporated application is utilized. The signal (1)S–$a$ which serves as an input to AND DRIVER(1) is produced by applying the signal $\overline{(1)S}$ developed in FIG. 4J of the copending application to the input of a NOR element. The output of this NOR element would be the signal (1)S and since the selector would be individual to the A car it would be identified by the suffix "–$a$". The corridor calls and car call signals could be derived from any conventional source for generating these signals. These signals too could be derived from a relay type system although the half wave solid state circuits illustrated in FIG. 4A of the above-mentioned incorporated application are entirely adequate.

If a scanner is scanning at the eighth floor, the signal $\overline{(8)\ SCAN}$ will equal ZERO and if the car is located at the eighth floor the signal (8)S–$a$ will equal ONE. Under these circumstances an output signal will appear at the top output of AND DRIVER (8). This signal when amplified by the AMPLIFIER D16,8 becomes the signal B–$a$. This signal B–$a$ serves as an input to the NOR element C11,16 which produces the signal $\overline{B1}$–$a$. This latter signal is the reverse of the signal B–$a$ so that when a B–$a$ equals ONE, $\overline{B1}$–$a$ equals ZERO and vice versa. The signal $\overline{B1}$–$a$ is combined with the timing signal AOS in the AMPLIFIER C11,24 to produce the signal $\overline{B}$–$a$. This signal $\overline{B}$–$a$ contains the signal AOS for sequencing purposes. As the scanner scans onto other floors the signal B–$a$ returns to ZERO. Of course, if the A car is at a floor other than the eighth floor the signal B–$a$ will appear when the scanner is scanning at that floor. It is obvious then that the signal B–$a$ will go to ONE only once during each scan and that will be when the scanner is scanning at the floor at which the A car is located. The signals B–$b$ and B–$c$ and their derivatives are similarly generated with respect to the scanning sequence to show the location of the B and C cars respectively. The signal 100M is the multiplexed up corridor call signal. If the scanner is scanning, either during an up scan or down scan at a floor at which an up corridor call is registered (for instance if 10(7) equals ONE when $\overline{(7)\ SCAN}$ equals ZERO) the signal 100M goes to ONE. This signal serves as an input to the NOR element A9,12 which is combined with the signal AOS in the AMPLIFIER B11,24 to produce the signal at $\overline{100M}$. The signal AOS again ensures that the signal $\overline{100M}$ equals ONE during the advance periods and during the SET and RESET intervals. This again is done for sequencing purposes. It is obvious that up corridor calls can be registered at more than one floor at any time so that during the up scan the signal 100M can go to ONE more than once during the scan. The result is a multiplexed up corridor call signal which must be matched with the scanning signal to determine at which floor the up corridor call has been registered. The down corridor call signal 200M which is the time multiplexed down corridor call signal is generated in a similar manner. There is also a corresponding $\overline{200M}$ signal.

The signal 300M–$a$ is the multiplexed car call signal for the elevator car A. It goes to ONE whenever the scanner is scanning at a floor at which a car call is registered for the A car. Again more than one car call can obviously be registered in the A car at any one time. The corresponding signal $\overline{300M}$–$a$ (no car call registered) which combines the output of the NOR element C3,13 with the signal AOS in the AMPLIFIER E5,24 is also generated. The car call registered signals and no car call registered signals for the B and C cars are similarly generated.

FIG. 7

This figure illustrates the circuits which generate the signals which indicate that the scanner has not yet seen the car on that scan, that the scanner has passed the position of a car on a particular scan, that the car is available, that the scanner has passed a car serving calls in the direction of scan, and that the scanner has not yet come to a car serving in the direction of scan. The figure also illustrates the circuits for generating signals which indicate the direction in which the car has been traveling.

The signal G–$a$, when it equals ONE, indicates that the scanner has not yet seen the A car on this scan. This signal is produced at the upper output of the MEMORY B4,19. It is reset to a value of ONE upon the completion of each scanning cycle by the RESET signal. G–$a$ remains equal to ONE until the scanner reaches the floor at which the A car is located. At this time signal B–$a$ goes to ONE thereby causing the signal G–$a$ to go to ZERO while the reverse signal which is generated at the lower output of the MEMORY B4,19 goes to ONE. It is obvious then that when the signal G–$a$ equals ONE the signal $\overline{G}$–$a$ equals ZERO.

When the signal F–$a$ equals ONE, it is an indication that the scanner has scanned past the position of the A car on that particular scan. The signal is generated by the output of the NOR element B4,24 which has as one input the signal B–$a$ and as a second input the signal G–$a$. It is obvious that when the RESET signal is generated causing the signal G–$a$ to go to ONE that the signal F–$a$ goes to ZERO. When the scanner reaches the floor at which the car is located the signal G–$a$ goes to ZERO as was just described. However, the signal F–$a$ remains ZERO since the signal B–$a$ remains equal to ONE for the time interval that the scanner is looking at the floor at which the A car is located. When the scanner advances to the next floor beyond the position of the A car, the signal B–$a$ goes to ZERO and hence the signal F–$a$ goes to ONE. The reverse signal $\overline{F}$–$a$ is generated at the output of the NOR element B4,21 which has the signal F–$a$ as an input.

The signal SF–$a$ equals ONE when the scanner has scanned past the A car and the A car is serving calls, either corridor or car calls, in the direction in which the scanner is scanning. This signal is produced at the lower output of the MEMORY B5,15. This MEMORY is reset at the completion of each scanning cycle by the RESET signal which causes the signal SF–$a$ to go to ZERO. There are two inputs to the upper element of the MEMORY B5,15; SFU–$a$ and SFD–$a$. The first of these signals is a ONE if the scanner has scanned past the A car in the up direction and the A car is serving calls in the up direction. This determination is made in a negative manner. If the A car is set for up travel and is not assigned to a down demand (is not traveling up for a down corridor call), then it must be serving calls in the up direction. This is true because, as will be seen later, if the car is traveling in a given direction and has no calls to serve, it will stop and become available.

The signal SFU–$a$ is derived in the NOR element B5,10. If the scanner is scanning up the signal $\overline{S\text{-}UP}$ will equal ZERO, if the car is set for up travel $\overline{81US}$–$a$ will equal ZERO, if the car is not assigned to down demands the signal A2DD–$a$ will equal ZERO and if the scanner has scanned past the position of the A car so that the signal $\overline{F}$–$a$ equals ZERO, then the signal SFU–$a$ will equal ONE. The signal SFD–$a$ will be generated in a similar manner from the output of the NOR element B5,17 if during the down scan, the scanner scans past the A car which is set for down travel and is not assigned to up demands. The signal $\overline{SF}$-$a$ is the signal which appears at the upper output of MEMORY D5,15 which has been passed through the AMPLIFIER D14,23.

The signal AV-$a$ equals ONE when the A car is available for service. That is, when the car has no car or corridor calls to serve. This signal is generated at the lower output of the MEMORY G3,12. This MEMORY has one upper input and three lower inputs. The upper input is the output of the NOR element G2,12 which has four inputs itself; the signal 70-$a$, the signal $\overline{MKA}$-$a$, the signal 32-$a$ and the output of the NOR element J12,19.

The signal 70-$a$ is the conventional non-interference signal. This signal is equal to ZERO when the non-interference time has expired and equals ONE when the car is running and during the non-interference interval. The interval is provided to permit time for the doors to open and for passengers to enter or leave the car and to register car calls. For present purposes it will be assumed that the signal 70-$a$ is derived in esentially the same manner as the signal 70 in FIG. 4E of the aforementioned incorporated application. A portion of the 70 circuit of the incorporated application is reproduced in order to show the modification made. The signal 70-$a$ is derived from an AMPLIFIER 122 which has as its input the output of NOR element 121. The NOR element has as its inputs the outputs of NOR elements 124 and 125 of the incorporated application and the additional signal STAV-$a$. This signal is equal to ONE when the car is to stop running and become available without opening its doors. Since as will be seen from the incorporated application the signal 70-$a$ must be equal to ONE when the car stops in order for the doors to open, when the signal STAV-$a$ equals ONE, 70-$a$ must equal ZERO and the doors will not open.

The signal 32-$a$ is the running signal which can be generated in any suitable manner such as that illustrated in FIG. 4D of the incorporated application. The signal 32-$a$ is equal to ONE whenever power is being applied to the hoist motor. The output of the NOR element J12,19 is controlled by the input signal C4N-$a$. This last mentioned signal is derived from a mechanical switch on the car door and equals ONE when the car doors are within a few inches of being closed and otherwise is equal to ZERO. The signal $\overline{MKA}$-$a$ is generated at the output of the NOR element G1,12 and is equal to ZERO if any one of the inputs derived from the NOR element G1,12, G1,16, G1,21, G1,41 or G1,42 is equal to ONE. The output of the NOR element G1,13 equals ONE if the A car is assigned to Counter No. 1 ($\overline{Z}$-$a$(1) equals ZERO), if the system determines that the car assigned to Counter No. 1 should be made available ($\overline{MC(1)A}$ equals ZERO) and if the A car is in service but is not assigned to run to a demand ($\overline{980A}$-$a$+R2D-$a$ equals ZERO).

In a similar manner the output of the NOR element G1,16 is ONE if the A car has been assigned to the Counter No. 2, the system indicates that the car assigned to Counter No. 2 should be made available and the A car is in service but is not assigned to a demand. Similar conditions must exist in order for the output of the NOR element G1,21 to be equal to ONE if the A car has been assigned to the Counter No. 3.

The output of the NOR element G1,41 will go to ONE at the completion of the up scan ($\overline{SET\text{-}UP}$ equals ZERO) if the A car has been conditioned for up travel ($\overline{81US}$-$a$ equals ZERO) and the car is to stop and become available (STAV-$a$ equals ONE). Similarly, the output of the NOR element G1,42 will go to ONE at the completion of the down scan ($\overline{SET\text{-}DN}$ equals ZERO) if the A car has been conditioned for down travel ($\overline{81DS}$-$a$ equals ZERO) and the car is to stop and become available (STAV-$a$ equals ONE).

If the car is taken out of service by the system or is assigned to run to a demand, the signal $\overline{980A}$-$a$+R2D-$a$ equals ONE. This will reset the MEMORY G3,12 and cause the signal AV-$a$ to go to ZERO. This MEMORY can also be reset by the signals CA-$a$ or CB-$a$. The first of these signals will equal ONE if the A car is set for up travel and has an up car call above it and the second will be equal to ONE if the car is set for down travel and has a car call registered for a floor below the position of the car. These signals are derived in the circuits of FIG. 16.

Assume for a moment that car A had been assigned to run to a demand so that the signal $\overline{980A}$-$a$+R2D equals ONE and signal AV-$a$ equals ZERO. Assume further that the car loses its assignment to run for a demand and there are no car calls registered. As will be seen later, this will cause the car to come to a stop. If the car is assigned to Counter No. 1 and the system indicated on the last scan in the direction in which the car was conditioned to travel "make the car assigned to Counter No. 1 available," the output of the NOR element G1,13 will go to ONE during the SET interval. This will cause the signal $\overline{MKA}$-$a$ to go to ZERO. After the car stops (32-$a$ goes to ZERO) and the interference time expires, the signal 70-$a$ will go to ZERO and when the doors are within a few inches of closing the signal C4N-$a$ will go to ONE so the output of the NOR element J12,19 goes to ZERO. At the completion of each subsequent scan in the direction in which the car was conditioned to travel the signal $\overline{MKA}$-$a$ will go to ZERO. During these intervals all of the inputs of the NOR element G2,12 are ZERO and therefore the output of this element will be ONE. This will cause the signal AV-$a$ to go to ONE. It can be seen then that the car can only become available during the SET interval at the completion of the scan in the direction in which it was conditioned to travel.

If the car is the lead car in the direction in which it is serving and it is determined that the car should be made available to serve a demand in the opposite direction, the output of NOR element G1,16 or G1,21 will go to ONE to cause $\overline{MKA}$-$a$ to go to ZERO. As the car begins to stop, the signal STAV-$a$ will go to ONE to cancel the non-interference time 70-$a$ and to ensure that $\overline{MKA}$-$a$ goes to ZERO at the completion of each scan in the direction in which the car was conditioned to travel so that the AV-$a$ signal can be developed when the car stops and 32-$a$ goes to ZERO.

If the A car is subsequently assigned to serve a demand, the signal $\overline{980A}$-$a$+R2D-$a$ will go to ONE. This will immediately cause the signal AV-$a$ to go to ZERO and through the circuits just described will cause the upper input to the MEMORY G3,12 to go to ZERO. Under these conditions, the reverse signal $\overline{AV}$-$a$ will equal ONE. This latter signal will equal ZERO when the signal AV-$a$ equals ONE. When the signal G-$a$ also equals ZERO the output of the NOR element B7,10 is ONE so that the signal GAV-$a$ which is produced at the output of the NOR element C8,13 equals ZERO. When this signal is equal to ZERO it indicates that the scanner is scanning at or past the floor at which the available car A is located. When the scanner is scanning in front of the A car or at any time that the A car is not available the signal GAV-$a$ will equal ZERO.

The signals $\overline{81US}$-$a$ and $\overline{81DS}$-$a$ are generated to maintain the direction of the A car when it is serving in the up direction and down direction, respectively. The signal $\overline{81US}$-$a$ is generated at the output of the NOR element G5,21 which is connected to the upper output of MEMORY G5,13, while the signal $\overline{81DS}$-$a$ is generated at the output of the NOR element G5,20 which is connected to the lower output of the MEMORY G5,13. The MEMORY G5,13 has two upper and two lower inputs. One input to the upper element is the signal 81D-$a$ which is the signal from the supervisory system telling the power controller to run the car in the down direction. The corresponding input to the lower element is the signal 81U-$a$ which tells the power controller to run the car in the up direction. The second input to the upper and lower elements of MEMORY G5,13, is the common output signal from the NOR element G4,16 the input of which is derived from the NOR element G4,13. The element G4,13 has two inputs, AV–a and $\overline{980A}$–a. Therefore, if the car is available or it is not in service (AV–a or $\overline{980A}$–a equals ONE), the NOR element G4,16 provides a ONE input for both the upper and lower elements of MEMORY G5,13. This causes both the upper and lower outputs of the MEMORY G5,13 to equal ZERO, consequently both $\overline{81US}$–a and $\overline{81DS}$–a equal ONE. If on the other hand, the A car is in service and is not available the output of the element G4,16 is ZERO. If the signal 81D–a goes to ONE indicating that the car is to travel in the down direction the lower output of the MEMORY G5,13 will go to ONE which in turn will cause the output of the NOR element G5,20 or the signal $\overline{81DS}$–a to go to ZERO. Under these circumstances $\overline{81US}$–a will stay equal to ONE. Conversely, if the signal 81U–a goes to ONE, the signal $\overline{81US}$–a would equal ZERO while the signal $\overline{81DS}$–a would equal ONE.

When the signal SG–a equals ONE, it is an indication that the scanner has not yet scanned past the A car which is at the time serving in the direction of the scan. The signal is derived from the NOR element F5,21 through the NOR element F2,24. The output of the NOR element F5,21 is the reverse signal $\overline{SG}$–a. The NOR element F5,21 has two inputs; SGU–a and SGD–a. The first of these signals is derived from the NOR element F5,17 which has four inputs; $\overline{S\text{-}UP}$, $\overline{81U}$–a, A2DD–a and the output of the AMPLIFIER G5,24. The AMPLIFIER G5,24 has two inputs; F–a and $\overline{980A}$–a. Therefore, all of the inputs to the NOR element F5,17 will equal ZERO in order that the signal SGU–a will equal ONE if the scanner is scanning up, if the A car is set for travel, if it is not assigned to down demands, if the scanner has not yet scanned past the A car and if the A car is in service. If any one of these conditions does not exist, that is if any one of these signals equals ONE, the signal SGU–a will equal ZERO. It can easily be seen that when the signal SGU–a equals ONE, the signal SG–a equals ONE. Similarly, the signal SGD–a, which is the output of the NOR element F5,15, equals ONE if the A car is in service ($\overline{980A}$–a equals ZERO), if the scanner has not scanned past the A car (F–a equals ZERO), if the scanner is scanning down ($\overline{S\text{-}DN}$ equals ZERO), the car is set for down travel ($\overline{81D}$–a equals ZERO) and the car is not assigned to up demands (A2UD–a equals ZERO).

Figure 7:
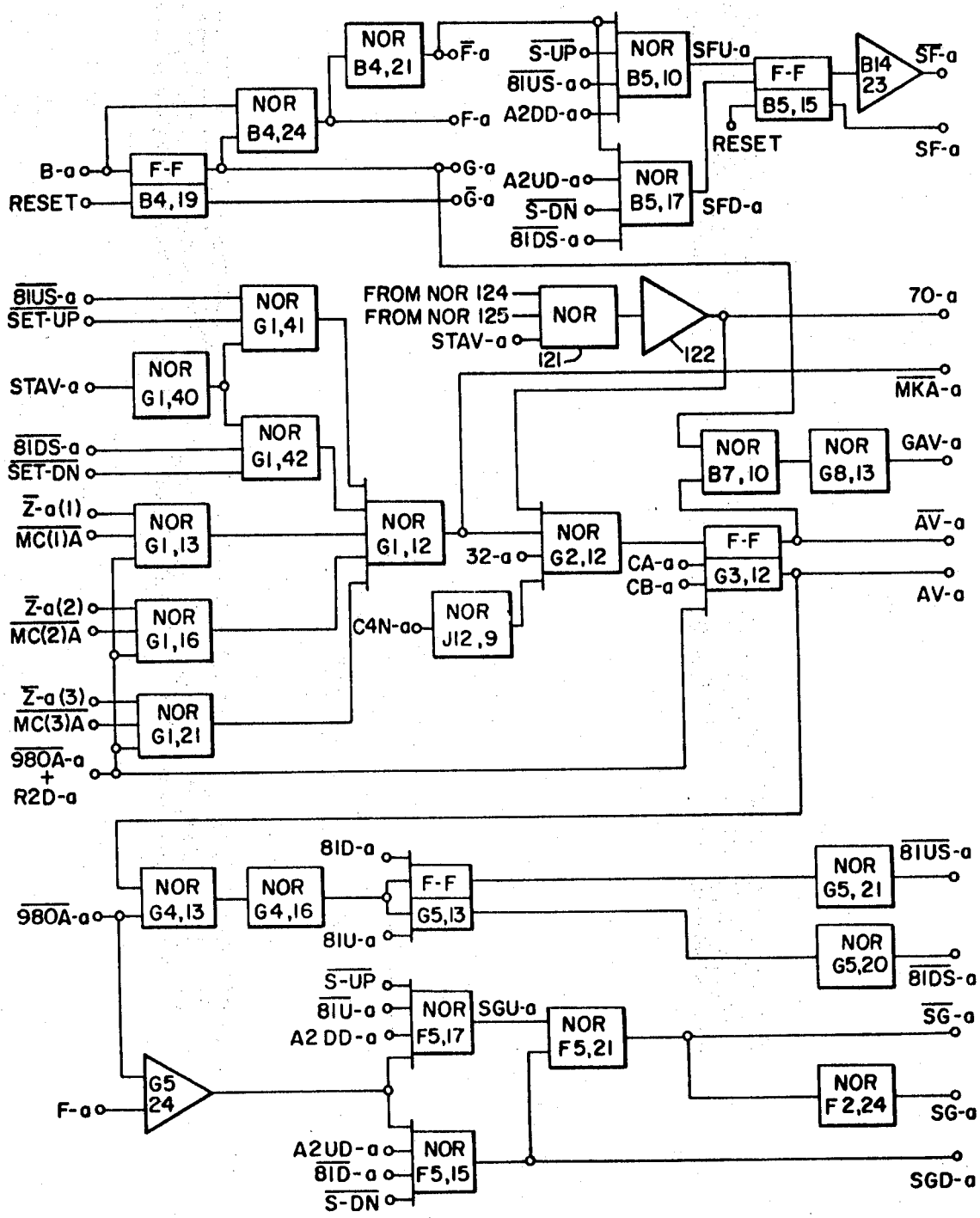

The signals generated in FIG. 7 are all individual to each car in the system. Analogous signals associated with the B and C cars are generated in similar circuits.

FIG. 8

This figure illustrates the circuits which generate the signals indicating that the scanner has scanned past cars serving in the direction of scan and the signals indicating that a particular car has been assigned to Allocated Call Counter No. 1, 2 or 3.

The signal SP(1)C, scanned past first car, goes to ONE during the scan in either direction when the scanner passes the first car it sees serving in the direction of the scan. It is generated at the output of the NOR element A6,12 which has as its input the output of the NOR element A1,13. The output of this latter NOR element when passed through the AMPLIFIER C1,22 produces the reverse signal $\overline{SP(1)C}$. The NOR element A1,13 has as its inputs the signals SF–a, SF–b and SF–c. If any one of these signals goes to ONE indicating that the scanner has scanned past the associated car, the signal SP(1)C will go to ONE.

The signal SP(2)C, scanned past second car, equals ONE and the reverse signal $\overline{SP(2)C}$ equals ZERO when the scanner has scanned past two cars serving in the direction of scan. In addition the reverse signal $\overline{SP(3)C}$ goes to ZERO if the scanner has scanned past three cars serving in the direction scanned. These two signals are generated in circuits combining the reverse signals $\overline{SF}$–a, b and c. If all of these signals are ZERO indicating that the scanner has scanned past all of the cars, the output of the NOR element A1,17 will be ONE so that the signal $\overline{SP(3)C}$ will equal ZERO. If any combination of two of these aforementioned signals both equal ZERO, the output of one of the NOR elements A1,21, A1,24 or A1,19 equals ONE causing the output of the NOR element A1,15 to equal ZERO. This in turn means that the signal SP(2)C will go to ONE. The output of the NOR element A1,15 also produces the reverse signal $\overline{SP(2)C}$ through the NOR element A1,21.

Cars serving calls in the direction of scan are assigned to Counters in the order in which they are seen. It takes a complicated circuit to do this, but the only inputs are the signals SF–a, b and c and the corresponding reverse signals. Combinations of these signals produce intermediate variables F1, 2 and 3 and their reverse signals $\overline{F1}$, $\overline{2}$ and $\overline{3}$. These intermediate variables combined with the signals SF–a, b and c produce signals such as $\overline{Z}$–a(1). This particular signal indicates "do not gate car A to be assigned to Counter No. 1." That is, if $\overline{Z}$–a(1) equals ONE, the A car is not to be assigned to Counter No. 1, but if $\overline{Z}$–a(1) equals ZERO, then the A car is to be assigned to the first counter.

The intermediate variable F1 is produced at the output of the AMPLIFIER B12,22 which has as its input the lower output of the MEMORY A2,21. The reverse signal $\overline{F1}$ is generated by appling the signal F1 to the input of the NOR element A2,19 and amplifying the output in the AMPLIFIER B12,23. The intermediate variables F2 and F3 are derived from the lower output of the MEMORY A2,10 and A2,17 by amplifying these outputs in the AMPLIFIERS B13,24 and B13,22, respectively. The reverse signals $\overline{F2}$, $\overline{F3}$ are similarly produced by amplifying the output of a NOR element which has as its input the primary signal (NOR element A2,13 and AMPLIFIER B13,23 for $\overline{F2}$ and NOR element A2,12 and AMPLIFIER B14,22 for $\overline{F3}$). The upper input of the MEMORY A2,21 is the output of the NOR element A1,11 which has as its input the signals SF–a and SF–b. The lower input of this MEMORY is the signal $\overline{SF}$–c. The upper output of the MEMORY A2,21 serves as an input to the NOR element A1,12. This NOR element also has as inputs the signals $\overline{SF}$–a and F3. The output of NOR element A1,12 serves as a lower input to the MEMORY A2,17. This MEMORY has two other lower inputs $\overline{SF}$–c and the output of NOR element A1,11. The upper inputs to the MEMORY A2,17 are $\overline{SF}$–a and $\overline{SF}$–b. This latter signal also serves as a lower input to the MEMORY A2,10 while the other lower input is the signal F1. The upper input of the MEMORY A2,10 is the signal $\overline{SF}$–a.

At the beginning of the scan the scanner has obviously seen no cars serving in the direction of scan, therefore, the signals SF–a, b and c all equal ZERO while the signals $\overline{SF}$–a, b and c all equal ONE. Under these conditions it can be seen that at the beginning of the scan the intermediate variables F1, 2 and 3 all equal ZERO. Obviously, the reverse signals $\overline{F1}$, $\overline{2}$ and $\overline{3}$ all equal ONE. With these initial conditions established, anyone skilled in the art should be able to determine the state of the intermediate variables depending upon the order in which the scanner sees the A, B and C cars serving in the direction of scan. For instance, if the scanner sees the C car serving in the direction of scan first, the signal SF–c will go to ONE and $\overline{SF}$–c will go to ZERO. Under these conditions, the lower input of the MEMORY A2,21 goes to ZERO while the upper input is equal to ONE. This will cause the intermediate variable F1 to go to ONE and of course the reverse signal $\overline{F1}$ will go to ZERO. The other intermediate variables will maintain the same value that they had at the beginning of the scan. It is obvious from an inspection of the circuit that it is important not only which cars the scanner sees serving in the direction of scan, but also in what order it detects them.

The intermediate variables are combined with each other, and in some instances with the signals $\overline{SF}$-$a$, $b$ or $c$, to produce signals which indicate that a particular car is to be assigned to a particular counter. The signals thus developed are reverse signals and therefore it is when these signals are equal to ZERO that the associated car is assigned to the particular counter. At all other times the signals are equal to ONE. The signal $\overline{Z}$-$a(1)$ is equal to ZERO when the input to the NOR element A3,21 is equal to ONE. This will occur when all the inputs of the NOR element A3,13 equal ZERO. That is, when F1, F2 and $\overline{SF}$-$a$, indicating that the scanner has passed the A car serving in the direction of scan, equal ZERO.

The A car will be assigned to Counter No. 2 if it is the second car seen by the scanner serving calls in the direction of scan, and this can occur under two sets of circumstances: (1) where the scanner sees the B car serving in the direction of scan and then the A car, and (2) where the scanner sees the C car serving in the direction of scan and then the A car. Under the first set of conditions the output of the NOR element A3,24 will equal ONE and under the second set of circumstances the output of the NOR element A3,19 will equal ONE. Either condition will cause the output of the NOR element A3,17, which is the signal Z-$a(2)$, to go to ZERO.

It can be seen by one skilled in the art that if the scanner sees the B car serving in the direction of scan first, that the intermediate variable F2 will go to ONE. Under these circumstances the signal $\overline{Z}$-$a(1)$ cannot go to ZERO. However, if the scanner next comes to the car A the signal $\overline{SF}$-$a$ will go to ZERO and since the signal F3 remains at its initial value of ZERO the output of the NOR element A3,24 will go to ONE. If on the other hand the scanner sees the elevator car C first, intermediate variable F1 will go to ONE thereby keeping the signal $\overline{Z}$-$a(1)$ equal to ONE. Now when the scanner comes to the A car next, the intermediate variables all retain the same values, but the signal $\overline{SF}$-$a$ goes to ZERO so that the output of the NOR element A3,19 goes to ONE.

In like manner, one skilled in the art will be able to determine from the circuits for the intermediate variables that if the scanner sees the elevator car B serving in the direction of the scan, then the elevator car C and finally the elevator Car A that the signals $\overline{F2}$, $\overline{F3}$ and $\overline{SF}$-$a$ will all go to ZERO which will make the output of the NOR element A3,15 equal to ONE. This signal in turn will cause the signal $\overline{Z}$-$a(3)$, which is the output of the NOR element A3,11, to go to ZERO indicating that the A car is to be assigned to Counter No. 3. The A car will also be assigned to the Counter 3 if the scanner sees the C car then the B car and finally the A car serving in the direction of scan since under these circumstances the signals $\overline{F1}$, $\overline{F3}$ and $\overline{SF}$-$a$ will be equal to ZERO simultaneously so that the output of the NOR element A3,10 will equal ONE.

The elevator car B will be assigned to the Counter No. 1, that is, the signal $\overline{Z}$-$b(1)$ will go to ZERO, if the B car is the first car seen by the scanner serving calls in the direction of the scan. This is the only circumstance under which the signal $\overline{F2}$ will go to ZERO, therefore, the signal $\overline{Z}$-$b(1)$ equals $\overline{F2}$. If the scanner sees the elevator car C serving calls in the direction of scan first and then the elevator car B, the signals $\overline{F1}$ and $\overline{F3}$ will both go to ZERO so that the output of the NOR element A3,12 will equal ONE. This will cause the output of the NOR element A4,21, which is the signal $\overline{Z}$-$b(2)$ to go to ZERO indicating that the B car is to be assigned to Counter No. 2. If the scanner sees the A car serving in the direction of scan before it sees the B car also serving in the direction of scan, then when $\overline{SF}$-$b$ goes to ZERO, F1, F2 and F3 will also all equal ZERO so that the output of NOR element A4,13 will go to ONE causing the signal $\overline{Z}$-$b(2)$ to go to ZERO.

If the scanner sees the elevator car C and then the elevator car A serving calls in the direction of scan, when the scanner then comes to the elevator car B serving in the direction of scan and the signal $\overline{SB}$-$b$ goes to ZERO, the intermediate variables $\overline{F1}$ and F3 will also equal ZERO so that the output of the NOR element A4,24 will equal ONE. This signal will cause the output of the NOR element A4,19, which is the signal $\overline{Z}$-$b(3)$, to go to ZERO thereby indicating that the elevator car B is to be assigned to Counter No. 3. Similarly, if the scanner sees the car A and then the elevator car C serving in the direction of scan, if and when it sees the elevator car B serving in the direction of the scan and $\overline{SF}$-$b$ goes to ZERO, the intermediate variables F1, F2 and F3 will also be equal to ZERO so that the output of the NOR element A4,17 will equal ONE which will similarly cause the signal $\overline{Z}$-$b(3)$ to go to ZERO.

The only time that the signal $\overline{F1}$ will go to ZERO is if the elevator car C is the first car seen by the scanner serving in the direction of scan. Under these circumstances, the signal $\overline{Z}$-$c(1)$ is equal to $\overline{F1}$ and the C car will be assigned to Counter No. 1. The signal $\overline{Z}$-$c(2)$ will go to ZERO, indicating that the elevator car C is assigned to Counter No. 2, when the output of the NOR element A4,11 goes to ZERO. This can only occur when the output of the NOR element A4,10 is equal to ONE which means that the intermediate variables F1 and $\overline{F3}$ must both equal ZERO. If the elevator car C is the third car to be seen by the scanner serving calls in the direction of scan, when the signal $\overline{SF}$-$c$ goes to ZERO the signals F1 and F3 will also be ZERO so that the output of the NOR element A4,15 will equal ONE. This in turn will cause the output of the NOR element A4,12, which is the signal $\overline{Z}$-$c(3)$ to go to ZERO.

The circuits are arbitrarily arranged so that if the scanners sees two cars at the same floor serving calls in the direction of scan it will assign the cars to the scanners in alphabetical order. For instance if the scanner sees the elevator cars B and C at the same floor and they are both serving calls in the direction of scan, the B car will be assigned to Counter No. 1 and the C car will be assigned to Counter No. 2.

Of course it should be kept in mind that the scanner may not see three cars serving in a direction of scan on any one scan. In fact, it is possible that the scanner will not see any cars serving in the direction of scan depending on the traffic situation. Since the system herein described has been limited to three cars for the purposes of illustration, a counter has been provided for each of the cars in the system. However, those installations requiring more than three cars where it would be unlikely that more than three cars would be serving calls in one direction at a time, it would be necessary to have one counter for each car in the system. On the other hand, if significantly more cars were added to the system, it would be desirable to add additional counters. From the disclosure herein, one skilled in the art would be able to modify the circuits shown to effect assignment of the cars to the additional counters.

FIG. 9

This figure illustrates the circuits for the Allocated Call Counters. The embodiment of the invention herein described utilizes three such counters, each having basically the same circuit configuration. The major differences are in the portions of the circuits through which corridor calls allocated to a particular counter are inserted in that counter. The circuit illustrated in FIG. 9A is for Counter No. 1, therefore the component character references in addition to the designations for the input, output and intermediate signals developed are directed to those associated with Counter No. 1.

FIGS. 9B and 9C illustrate the circuits for Allocated Call counters Nos. 2 and 3 respectively. The portions of these circuits represented by the boxes labeled ACC-2 and ACC-3 in FIGS. 9B and 9C respectively are similar to the portion of the circuit of FIG. 9A enclosed in the broken line and labeled ACC-1 except that the signals in FIGS. 9A identified by a reference character including the number one in parenthesis are replaced in FIGS. 9B and 9C by signals identified by the numeral two or three in parenthesis respectively. In addition, no input is supplied to the terminal labeled BLK in Counter No. 1; however, the signals BLK(2) and BLK(3) are supplied to the associated input for Counter Nos. 2 and 3.

Referring now to Counter No. 1, the outputs include SDO(1) (service demand of ZERO), $\overline{SDO}(1)$ (the reverse signal of SDO(1)), SSD2(1) (special service demand of the second order), SSD3(1) (special service demand of the third order) and CCN(1) (do not count corridor call). The signal SDO(1) which is produced at the output of the NOR element A7,11 equals ONE when there are no calls, either corridor calls or car calls, entered in the counter. The signal $\overline{SDO}(1)$ is derived from the output of NOR element E1,9 which has as its input signal SDO(1). This signal of course equals ZERO if no calls ar eentered into the counter and equals ONE if any calls of either type are recorded in the counter.

The signal SSD2(1) normally equals ZERO but goes to ONE if the second or any subsequent call entered into the counter is a corridor call. Once the signal goes to ONE it remains equal to ONE for the remainder of the scan. The signal will not go to ONE if the second call to be entered in the counter is a coincident call or a car call alone. A coincident call is a corridor call in the direction of scan at the same floor at which there is a car call registered. The signal SSD2(1) is derived from the upper output of the MEMORY A7,19.

When the signal SSD3(1), special service demand of the third order, produced at the output of the NOR element A7,15 equals ONE, it indicates that there are more calls for the car assigned to Counter No. 1 to stop for than that car can handle. It will be recalled from the summary of the invention that the system arbitrarily allocates two calls per car and if the system sees more calls than this facing the car assigned to Counter No. 1, a demand for another car is created. Therefore, if more than two calls are entered in Counter No. 1, SSD3(1) will go to ONE. However, this is only true if the third or at least one of the subsequent calls allocated to Counter No. 1 is a corridor call. If the third and all subsequent calls are car calls only, which obviously only the car assigned to Counter No. 1 can serve, then SSD3(1) will remain equal to ZERO. The signals SSD3(2) and SSD3(3) also equal ONE when there are more calls facing the cars assigned to Counters No. 2 and 3 respectively, than these cars can handle; however, as will be seen below, a demand for an extra car will only be created when SSD3(1) goes to ONE. This is so because excess calls in front of the cars asigned to Counters No. 2 and 3 will be sloughed off on trailing cars.

The inputs to Counter No. 1 are car calls registered in the car assigned to Counter No. 1 and corridor calls which the system wants Counter No. 1 to see. Car calls which are to be counted in Counter No. 1 cause the signal CC(1) in the lower left center of the figure to go to ONE when the scanner is at the floor at which the call is registered. The signal CC(1) is derived at the output of the NOR element A6,11 which has as its inputs the timing signal AOS and the output of the NOR element A6,10. Both these latter signals must be ZERO in order for the signal CC(1) to go to ONE. The signal AOS it will be remembered goes to ONE for 50 microseconds each time the scanner advances. This insures that the signal CC(1) goes to ZERO as the scanner advances from floor to floor. This is done so that car calls registered at adjacent floors may be distinguished and also so that transients from the counter circuit itself may be given time to settle down. The output of the NOR element A6,10 goes to ZERO if any of its three inputs go to ONE. The first input is the output of the NOR element A6,19 which goes to ONE if the signal $\overline{Z}-a(1)$ equals ZERO indicating that the A car has been assigned to Counter No. 1 and if the signal $\overline{300M}-a$ goes to ZERO indicating that a car call is registered in the A car for the floor at which the scanner is scanning. In like manner, the output of the NOR element A6,21 will go to ONE if the B car instead of the A car is assigned to Counter No. 1 ($\overline{Z}-b(1)$ equals ZERO) and a car call for the floor at which the scanner is scanning is registered in the B car ($\overline{300M}-b$ equals ZERO). However, if the C car which has been assigned to Counter No. 1 ($\overline{Z}-c(1)$ equals ZERO), then the output of the NOR element A6,15 will go to ONE when the scanner comes to a floor at which a car call is registered for the C car ($\overline{300M}-c$ equals ZERO).

If a corridor call is to be counted by Counter No. 1, the signal GCC(1), gate corridor call into Counter No. 1, goes to ONE. This signal applied to the input of the NOR element E1,13 produces the reverse signal $\overline{GCC}(1)$. The signal GCC(1) is derived from the output of the NOR element A5,21 which has as its inputs the output of the NOR element A5,13 and the signal $\overline{MUDCC}$. Both of these inputs must be equal to ZERO in order for the signal GCC(1) to go to ONE. The signal $\overline{MUDCC}$ will go to ONE if the system wants one of the counters to see a corridor call when the scanner is at the floor at which the call is registered. The output of the NOR element A5,13 will go to ZERO if the system wants the No. 1 Counter to see the corridor call. The output of the NOR element A5,13 will be ZERO if any one of the inputs equals ONE. If the scanner has not scanned past a second car serving in the direction of scan the signal $\overline{SP(2)C}$ will equal ONE. This is obvious since under these conditions the scanner has only seen one car serving in the direction of the scan therefore, all of the calls which the system wants a car assigned to a counter to see should be assigned to the car associated with Counter No. 1.

Once the scanner sees the second car serving in the direction of the scan it will assign it to Counter No. 2 and the signal SP2C will go to ZERO. Assuming for a moment that the signals SSD3(2) and BLK(2) are both ZERO, the output of the NOR element A5, 13 will equal ONE and therefore the signal GCC(1) cannot go to ONE. Under these circumstances the car assigned to Counter No. 2 is now closer to the corridor calls and subsequent calls will be assigned to Counter No. 2. However, if the quota of calls for the car assigned to Counter No. 2 is exceeded, the signal SSD3(2) will go to ONE thereby unblocking the input of corridor calls into Counter No. 1. Even though the car assigned to Counter No. 2 may not have its full quota of calls, under circumstances to be discussed later, it is sometimes desirable to divert corridor calls in front of the car assigned to Counter No. 2 to Counter No. 1. Under these circumstances the signal BLK(2) (block calls to Counter No. 2) goes to ONE to cause the output of the NOR element A5,13 to go to ZERO with the effect that subsequent calls will be inserted into Counter No. 1.

The signals CC(1) and GCC(1) are combined in the circuit shown in FIG. 9 to produce the intermediate variable CC1(1), CC2(1) and CC3(1) and their reverse signals in addition to the signal CC4(1). These intermediate signals are combined to produce the output signals, such as SDO(1), described earlier. The signals CC1(1) and $\overline{CC2}(1)$ along with signal $\overline{MUDCC}$ serve as inputs to the NOR elements A7,17. The output of this NOR element serves as the lower input to the MEMORY A7,19.

The upper input to this MEMORY is the signal SP(1)C. This latter signal which equals ONE until the scanner has scanned past the first car serving calls in the direction of scan, also serves as an upper input to the MEMORIES A5,24, A5,17 and A6,17.

At the beginning of the scan the signals GCC(1) and CC(1) equal ZERO while the signal $\overline{SP(1)C}$ equals ONE. It can be seen under these circumstances that the intermediate variables CCI(1), $\overline{CCI}$(1), CC2(1), CC3(1) and CC4(1) all equal ZERO while signals $\overline{CC2}$(1) and $\overline{CC3}$(1) equals ONE. Under these conditions the signal SDO(1) equals ONE while the output signals $\overline{SDO}$(1), SSD2(1) and SSD3(1) all equal ZERO. From this starting point one skilled in the art can follow the changes in the states of the circuit elements in Counter No. 1 as a series of corridor and car calls are assigned to the counter. Since this is a sequential counter and there are a large number of combinations of states in which the various components can be, it would take too much space to describe all of the various combinations in step by step detail. Consequently, just one sequence of calls will be described.

Assume that before the scanner sees any car serving in the direction of scan, that it sees a corridor call for service in the direction of scan. Under these circumstances the scanner has obviously not passed the second car serving in the direction of scan so that the signal $\overline{SP(2)C}$ equals ONE and therefore the output of the NOR element A5, 13 is ZERO. When the scanner sees the first corridor call, the signal $\overline{MUDCC}$ will go to ZERO also thereby causing the signal GCC(1) to go to ONE, even though no car has yet been assigned to Counter No. 1. However, since the scanner has not yet passed the first car serving in the direction of scan, the signal $\overline{SP(1)C}$ will still equal ONE. This latter signal will keep the MEMORIES A5,24, A5,17 and A6,17 in their original states. Consequently, the corridor call seen by the system before a car has been assigned to Counter No. 1 will have no lasting effect upon the counter.

Assume now that the scanner passes the A car serving in the direction of scan. The A car will be assigned to Counter No. 1 causing the signal $\overline{Z}$-$a$(1) to go to ZERO. At the same time the signal $\overline{SP(1)C}$ will also go to ZERO thereby unblocking the MEMORIES of the counter. At this point, assume that the scanner comes to a floor at which a car call is registered for the A car. This will cause the signal $\overline{300M}$-$a$ to go to ZERO, thereby making CC(1) equal to ONE. This makes $\overline{CC3}$(1) equal to ZERO which permits $\overline{CCI}$(1) and CC3(1) to go to ONE. Although the output of NOR element A5,11 goes to ZERO, the output of the NOR element A5,12 remains ZERO since $\overline{CC2}$(1) still equals ONE. The latter signal also keeps the output of the NOR element A6,13 equal to ZERO. In addition, the output of the NOR element A5,10 remains equal to ZERO because although $\overline{CC3}$(1) is now equal to ZERO, CC(1) equals ONE.

After the scanner leaves the floor at which the car call is registered, CC(1) goes back to ZERO so that the output of the NOR element A5,10 goes to ONE causing CC2(1) to go to ONE while $\overline{CC2}$(1) goes to ZERO. However, the output of the NOR element A5,12 remains ZERO since the output of the NOR element A5,11 goes back to ONE.

The signal SDO(1) had been equal to ONE because CC2(1) and CC3(1) were both ZERO, but when CC3(1) goes to ONE, SDO(1) goes to ZERO indicating that a call has been entered into Counter No. 1. With $\overline{CC2}$(1) equal to ONE, SSD3(1) was ZERO, but now $\overline{CCI}$(1) keeps it at ZERO. Also SSD2(1) was originally kept ZERO (it is made equal to ZERO at the completion of each scan by $\overline{SP(1)C}$) by $\overline{CC2}$(1), but after the first call is registered, $\overline{CC2}$(1) goes to ZERO so that the signal $\overline{MUDCC}$ equals ONE is what keeps SSD2(1) equal to ZERO. So now SSD2(1) is ready to go to ONE if another corridor call is seen by the counter.

To summarize the states of the intermediate signals after the first car call has been entered in the counter, CC1(1), $\overline{CC2}$(1), $\overline{CC3}$(1) and CC4(1) all equal ZERO while $\overline{CCI}$(1), CC2(1) and CC3(1) all equal ONE. Next assume that the scanner comes to a corridor call which the system wants the counters to see, i.e., $\overline{MUDCC}$ goes to ZERO. Since it was stated that at this point the ouput of the NOR element A5,13 is equal to ZERO, the signal GCC(1) goes to ONE. This causes the output of NOR element A5,11 to go to ZERO, and since CC1(1) and $\overline{CC2}$(1) both equal ZERO the output of NOR element A5,12 goes to ONE. This causes the signal CC3(1) to go to ZERO. $\overline{CC3}$(1) also stays equal to ZERO since GCC(1) equals ONE is an input to the lower element of the MEMORY A6,17. CC2(1) and $\overline{CC2}$(1) stay unchanged. In fact once any calls are assigned to Counter No. 1, these signals stay in the aforementioned states for the remainder of the scan. Signals CC1(1) and $\overline{CC2}$(1) remain equal to ZERO, i.e. therefore, since $\overline{MUDCC}$ is also equal to ZERO, the output of the NOR element A7,17 goes to ONE to set SSD2(1) equal to ONE. This obviously only occurs when the second call is a corridor call since otherwise the signal $\overline{MUDCC}$ would be equal to one.

When the scanner leaves the floor at which the car call is registered, GCC(1) goes to ZERO when $\overline{MUDCC}$ goes to ONE. This causes the output of NOR element A5,11 to return to ONE making the output of A5,12 return to ZERO. However, with GCC(1) equal to ZERO the output of NOR element A6,13 which is the signal CC4(1) goes to ONE. This causes the signal $\overline{CC3}$(1) to go to ONE which in turn makes CC(1) equal to ONE and $\overline{CCI}$(1) equal to ZERO. Even though the signal $\overline{CCI}$(1) and $\overline{CC2}$(1) are both now equal to ZERO, SSD3(1) remains equal to ZERO since CC4(1) now equals ONE.

Subsequent car calls for the car assigned to Counter No. 1 have no effect on the counter. CC4(1) stays equal to ONE to maintain SSD3(1) equal to ZERO. Again this is done because SSD3(1) should only to go to ONE if another car is needed in the system and obviously only the car in which the car calls are registered can serve those car calls. $\overline{CC3}$(1) does go to ZERO while the scanner is at the floor at which the car call is registered, but this has no effect on the rest of the circuit.

As the scanner passes the second car serving calls in the direction of scan, the signal SP(2)C will go to ZERO and if SSD3(2) equals ZERO (the quota of calls for the second car is not exceeded) and BLK(2) equals ZERO (do not block the second counter) then the output of the NOR element A5,13 will go to ONE and corridor calls will no longer be gated into the No. 1 Counter. However, if the quota of calls for the car assigned to Counter No. 2 is exceeded, subsequent calls will again be gated into Counter No. 1 (assuming that no third car is serving in the direction of the scan). In other words, corridor calls are gated into the counter associated with the last car seen serving calls in the direction of scan until the quota (of two calls) is filled. Subsequent corridor calls are then referred back to counters associated with cars seen earlier in the scan, i.e. those assigned to a lower order counter.

Assume that a quota of calls is allocated to the car assigned to Counter No. 2 so that SSD3(2) which is an input to the NOR element A5,13 of Counter No. 1 goes to ONE. Now when another corridor call is intercepted (when $\overline{MUDCC}$ goes to ZERO), $\overline{CC3}$(1) goes to ZERO as previously, however, there is an important difference. Now CC4(1) goes to ZERO and remains ZERO because CC3(1) goes to ONE. With CC4(1) now equal to ZERO and since $\overline{CC2}$(1) and $\overline{CCI}$(1) still both equal ZERO, SSD3(1) goes to ONE. This is a special service demand for an extra car. It is generated because there are more than two calls per car serving calls in the direction of scan, therefore another car is needed.

The signal CCN(1), negate the corridor call, is produced at the output of the NOR element A7,12 which has as its two inputs the output of NOR element A6,10 and CC1(1). As is mentioned previously, the output of the NOR element A6,10 goes to ZERO if the scanner comes to a floor at which a car call is registered for the car assigned to Counter No. 1. The signal CC1(1) is equal to ZERO if there is one call or less registered in the counter. Hence, the signal CCN(1) will go to ONE if the scanner comes to a floor at which a car call is registered for the car assigned to Counter No. 1 and Counter No. 1 has less than two calls allocated to it. This signal is utilized in situations where there is a coincident call. The manner in which it is utilized will be discussed later, however, it is worth noting at this point that when the signal CCN(1) equals ONE the signal $\overline{\text{MUDCC}}$ will not go to ZERO. This is important to the operation of the circuit described in FIG. 9A where the coincident corridor call would have been assigned to Counter No. 1. Under these circumstances, the call would enter the counter as a car call and not a corridor call. In other words, CC(1) would go to ONE but GCC(1) would remain equal to ZERO. This is important where there is already one call stored in the counter because it should be remembered from the discussion above, that if the second call to be entered in the counter is a corridor call signal SSD2(1) will go to ONE, however, if the second call to be entered in the counter is a car call, signal SSD2(1) remains ZERO. Of course if two calls are already allocated to Counter No. 1, CC1(1) will equal ONE and CCN(1) cannot go to ONE. Therefore if two calls are already allocated to the counter and the scanner sees another corridor call, this corridor call will not be blocked even if there is a car call registered for the same floor.

As is mentioned above, the circuits for Allocated Call Counters No. 2 and 3 are illustrated in FIGS. 9B and 9C respectively. It should be recalled that the portions of the circuits of Counters No. 2 and 3 which are essentially the same as the portion of the circuit for Counter No. 1 enclosed by the broken line are illustrated as a box labeled ACC–2 and ACC–3 respectively. The portions of the circuits for Counters No. 2 and 3 through which corridor calls are introduced are shown in detail.

Gated corridor calls for Counter No. 2 appear at the output of the NOR element A8,21 in FIG. 9B. Essentially, the inputs to this NOR element do not differ widely from those inputs to the NOR element A5,21 in Counter No. 1. As with Counter No. 1 there is a corridor call input, $\overline{\text{MUDCC}}$, and similar to Counter No. 1 there is an output from a NOR element. Here the NOR element A8,13 has inputs quite similar to the inputs of NOR element A5,13 in Counter No. 1. If the scanner has not scanned past a third car serving calls in the direction of scan, the signal $\overline{\text{SP(3)C}}$ will equal ONE so that the output of the NOR element A8,13 will be ZERO and will not therefore block corridor calls into Counter No. 2. If the scanner has scanned past the third car serving calls in the direction of the scan, that car will be assigned to Counter No. 2 and since it is now the lead car subsequent corridor calls that the scanner comes to will first be allocated to Counter No. 3. Under these circumstances signal SP(3)C will go to ZERO and if the quota of calls for the Counter No. 3 is not exceeded, the signal SSD3(3) will be ZERO as will be the signal BLK(3) if calls are not blocked from Counter No. 3. Therefore the output of the NOR element A8,13 will be ONE and block the input of corridor calls to Counter No. 2. However, if the quota or calls for the car assigned to Counter No. 3 is exceeded, the signal SSD3(3) will go to ONE thereby unblocking the input of corridor calls to Counter No. 2. Counter No. 2 will also be unblocked if the signal to block Counter No. 3 is generated (BLK(3) goes to ONE).

There is an additional gating signal in the corridor call input circuit to Counter No. 2 that does not appear in Counter No. 1. This is the signal BLK(2) shown as an input to the NOR element A8,21. Under the circumstances mentioned above where it is desirable to refer corridor calls back to the Counter No. 1, this signal will prohibit corridor calls from being entered into Counter No. 2. Notice that it is the same signal, BLK(2), which blocks Counter No. 2 that unblocks Counter No. 1.

The signal BLK(2) is also applied to the BLK input of the NOR element for Counter No. 2 corresponding to the NOR element A7,17 of Counter No. 1. It can be seen by referring to FIG. 9A that this NOR element is instrumental in producing the signal SSD(2) which will equal ONE if the second call allocated to Counter No. 2 is a corridor call. Since if one call has already been allocated to Counter No. 2, the signals CC1(2) and $\overline{\text{CC2}}(2)$ will be equal to ZERO so that when another corridor call in the direction of scan is detected and the signal $\overline{\text{MUDCC}}$ goes to ZERO, the signal SSD(2) would go to ONE, the signal BLK(2) must also serve as an input to this NOR element to prevent SSD2(2) from going to ONE when the corridor call is being referred back to Counter No. 1.

The signal GCC(3), gate corridor calls into Counter No. 3, is generated at the output of the NOR element A11,21 in FIG. 9C. This NOR element has only two inputs; $\overline{\text{MUDCC}}$ and BLK(3). The signal GCC(3) will go to ONE at every corridor call the scanner sees (when $\overline{\text{MUDCC}}$ goes to ZERO) unless the signal BLK(3) is equal to ONE. Again the circumstances under which the latter signal goes to ONE will be discussed later. The fact that signal GCC(3) goes to ONE for every corridor call the scanner permits the system to see is not a problem since the signal $\overline{\text{SP(3)C}}$ (which corresponds to the signal $\overline{\text{SP(1)C}}$ shown in the circuit of Counter No. 1) remains equal to ONE and holds the MEMORY elements of Counter No. 3 in their initial states until the scanner has passed the third car serving in the direction of scan. The BLK(3) signal is applied to the BLK terminal in Counter No. 3 so that when one call is registered in Counter No. 3 and a corridor call is to be referred back to a lower order Counter, the signal SSD2(3) cannot go to ONE.

It will be noticed that if a quota of calls is exceeded in Counter No. 2 or Counter No. 3 so that corridor calls are referred back to a lower order counter, that the corridor call is still entered into the higher order counter. This is of no consequence, however, since under these circumstances the counter has already counted out to its maximum. As was mentioned previously, the output signals illustrated in FIG. 9A such as SSD2(1), etc. are replaced by the signals SSD2(2) and SSD2(3) etc. in FIGS. 9B and 9C for the No. 2 and 3 counters, respectively.

As was mentioned previously, if more cars were added to the system it would not be necessary to add additional counters although under some circumstances it might be desirable to have one counter for each car in the system.

FIG. 10

This figure illustrates the circuits for generating master corridor call signals. The master Up-Down corridor call signal $\overline{\text{MUDCC(X)}}$ is generated at the output of the AMPLIFIER C10,23 which has as its input the output of the NOR element A13,21. The two inputs to this NOR element include MUCC, the master up corridor call signal and MOCC, the master down corridor call signal. The signal MUCC, which produces the reverse signal $\overline{\text{MUCC}}$ through the NOR element B5,21, is generated by the NOR element A13,10. MUCC will equal ONE if the scanner while scanning up ($\overline{\text{S-UP}}$ equals ZERO) comes to a floor at which an up corridor call is registered ($\overline{\text{100M}}$ equals ZERO) as long as the system wants the cars to see the up corridor call (BMCC1 and BMCC2 both equal to ZERO). Likewise the signal MDCC, which produces the reverse signal $\overline{\text{MDCC}}$ through the NOR element C11,13, is derived from the output of the NOR element A13,15. This signal will go to ONE if the scanner while scanning down ($\overline{\text{S-DN}}$ equals ZERO) comes to a floor at which a down corridor call is registered ($\overline{\text{200M}}$ equals ZERO). Again the cars will not see the down corridor calls on the down scan if either of the block master corridor call signals, BNCC1 or BNCC2, equal ONE.

The signal $\overline{\text{MUDCC(X)}}$ equals ONE except when the scanner comes to a floor at which a corridor call for service in the direction of scan which the system wants the cars to see is registered. While the scanner is at such a floor, the signal $\overline{\text{MUDCC}}(X)$ equals ZERO. Since the signals $\overline{\text{100M}}$ and $\overline{\text{200M}}$ both are derived from the signal AOS (see FIG. 6), the signal $\overline{\text{MUDCC(X)}}$ will return to ONE as the scanner advances from floor to floor even if corridor calls are registered at adjacent floors.

The signal $\overline{\text{MUDCC}}$, which it will be remembered is the corridor call input signal to the counters, is derived from the output of the AMPLIFIER C2,23 which has as its input the output of the NOR element E4,13. This NOR element, in turn, serves to reverse the output of the NOR element D6,13 which has as input signals $\overline{\text{MUDCC(X)}}$ and CCN(1–3). It can be seen therefore that the signal $\overline{\text{MUDCC}}$ equals ONE when the signal $\overline{\text{MUDCC(X)}}$ equals ONE, and that it has a value of ZERO when the signal $\overline{\text{MUDCC(X)}}$ equals ZERO except if one of the signals CCN(1, 2 or 3) equals ONE. In other words, since $\overline{\text{MUDCC(X)}}$ is derived from the signals MUCC and MDCC, even though the system may want the cars to see certain corridor calls (MUCC or MDCC equals ONE) it may not want the call to be counted in a counter, therefore $\overline{\text{MUDCC}}$ will remain equal to ONE. The reason for this will be explained later.

Under certain circumstances the system does not want the cars to see corridor calls at all. The first such situation is where the car is stopping for the call but it has not yet cancelled the call. Under these circumstances the block master corridor call signal, BMCC1, will equal ONE which will ensure that the signals MUCC and MDCC cannot go to ONE. BMMCC1 is derived from the output in the NOR element D7,19 which has as its input the output of the NOR element D7,24. The NOR element D7,24 has three inputs, one associated with each elevator car. For purposes of illustration only the input associated with the A car will be described in detail. The input associated with the elevator car A is produced at the output of the NOR element D6,11. If the elevator car A is answering the call, the car must be at the floor ($\overline{\text{B}}-a$ must equal ZERO) and the scanner must not have passed the elevator car A which is serving calls in the direction of scan (SG–$a$ must equal ZERO). In addition, the output of the NOR element E8,13 must equal ZERO. This will occur if any of the three inputs to this NOR element equal ONE. If the car has been running and receives a stop signal, the signal 34–$a$ will go to ONE. If the car is standing available at the floor at which the corridor call is registered and it is assigned to that corridor call, the door open signal will be generated. If the car is assigned to an up corridor call, the door signal 42U–$a$ will go to ONE while if it is assigned to a down corridor call the signal 42D–$a$ will go to ONE. Under either of these conditions, when the car is approaching the floor and has a stop signal or when the car is available at the floor and receives a door open signal, the call is in the process of being answered and therefore there is no reason to generate the master corridor call signal.

The second situation in which the system does not permit the cars to see a corridor call is when a car with a coincident call is only a few floors away from the corridor call and has no other stops to make in between. Under these circumstances the second block master corridor call signal, BMCC2, will equal ONE. This latter signal is derived from the NOR element D7,12 which has as its input the output of NOR element D7,15. This NOR element has four inputs, the first of which is the signal AP(1+2) which it will be remembered goes to ONE for 50 microseconds each time the scanner advances. The other three inputs are associated, with the A, B and C cars respectively. Again only the circuit associated with the A car will be described in detail. The input associated with the A car is derived from the NOR element D7,17 which has three inputs; $\overline{\text{SF}}-a$, $\overline{\text{300M}}-a$ and the output of the MEMORY D8,21. This MEMORY has as its lower input the signal AP(1+2) and as its upper input the output of the PULSE SHAPER C12,31. The PULSE SHAPER has as its input the upper output of the MEMORY G11,12. This MEMORY has one lower input and two upper inputs. The lower input is the signal B–$a$ while the two upper inputs are the RESET signal and the signal CC–$a$.

The circuit which generates the signal CC–$a$ is shown in the box labeled CC–$a$ in the upper left-hand corner of the figure. Similar circuits are required to generate the signals CC–$b$ and CC–$c$ associated with the B and C cars respectively; however, due to space limitations they are illustrated here symbolically by the boxes marked CC–$b$ and CC–$c$. The signal CC–$a$ is generated by passing the output of the NOR element D10,13 through the NOR element D10,24. The NOR element D10,13 has three inputs which are the outputs of the NOR elements E10,11, E10,12 and D10,21. The output of these latter NOR elements are equal to ONE if the elevator car A has been assigned to the first, second or third counter respectively and a corridor call has been gated into the associated counter. In other words, if the elevator car A has been assigned to Counter No. 1 the signal $\overline{\text{Z}}-a(1)$ will equal ZERO and if a corridor call is gated to No. 1 Counter, the signal $\overline{\text{GCC}}(1)$ will equal ZERO so that the output of the NOR element E10,11 will equal ONE. The circuits which generate the signals CC–$b$ and CC–$c$ are similar except that the signals $\overline{\text{Z}}-a(1)$ etc. are replaced by the signals $\overline{\text{Z}}-b(1)$ etc. and $\overline{\text{Z}}-c(1)$ etc. respectively.

The signal BMCC2 is generated by the A car as follows. At the completion of each scan, the RESET signal sets the upper output of the MEMORY G11,12 equal to ZERO. Each time a scanning pulse is generated the signal AP(1+2) goes to ONE for 50 microseconds to set the upper output of the MEMORY D8,21 equal to ONE. If the scanner now comes to the elevator car A, the signal B–$a$ will go to ONE making the upper output of the MEMORY G11,12 equal to ONE. This signal activates the PULSE SHAPER C12,31. The pulse generated by the PULSE SHAPER causes the upper output of the MEMORY D8,21 to go to ZERO. The MEMORY will hold this output at ZERO even though the lower input, AP(1+2), periodically goes to ONE as long as the output of the PULSE SHAPER equals ONE.

The duration of the pulse from the PULSE SHAPER is related to the pulse repetition rate of the scanner so that the upper output of MEMORY D8,21 remains equal to ZERO while the scanner scans past the predetermined number of floors, for example, four floors. (This would require a pulse length of 4 milliseconds and if the scanner were scanning down and found the A car at the seventh floor, it would block calls at the seventh, sixth, fifth and fourth floors.) When the output of the PULSE SHAPER terminates, the next advance of the scanner (when AP(1+2) goes to ONE again), will reset the upper output of the MEMORY D8,21 equal to ONE. However, before this occurs, if the A car is serving calls in the direction of scan, the signal $\overline{\text{SF}}-a$ will go to ZERO when the scanner advances to the next floor beyond the position of the A car. If the scanner then sees a car call registered in the A car ($\overline{\text{300M}}-a$ equals ZERO) while the output of the MEMORY D8,21 is still ZERO, the signal BMCC2 will go to ONE to block any corridor call for service in the direction of scan which may be registered at the same floor as the car call.

The nature of the PULSE SHAPER C12,31 is such however, that if the input is terminated, the output pulse will be terminated immediately. Consequently, if the A car is assigned to Counter No. 1 ($\overline{Z}$-$a$(1) equals ZERO) and a noncoincident call is allocated to Counter No. 1 ($\overline{GCC}$(1) equals ZERO) the signal CC-$a$ will go to ONE because the input of the PULSE SHAPER will go to ZERO. The result is that the output of the MEMORY D8,21 will go to ONE so that even if the A car is within four floors of a coicident corridor call, the blocking signal BMCC2 will not be generated if the A car must stop at a non-coincident corridor call before it gets there.

In summary, the function of the signal BMCC2, is to block other cars from seeing the corridor call if there is a car within four floors which is serving a car call at the same floor and has no other corridor call stops to make in between. It will be seen later that by preventing the signals MUCC or MDCC from going to ONE that the other cars will not see the corridor call at all and hence cannot stop for it. The purpose of this is to prevent the bunching of cars and to more efficiently utilize the cars in the system. It should be noted that at this point that if on the other hand, a counter is blocked from counting the corridor call because one of the signals CCN(1, 2 or 3) equals ONE, the cars can still see the corridor call and stop for it.

FIG. 11

This figure shows the circuits which generate the demand input signal, the up and down demand signals, the blank lead car up and down signals, the make lead car available up and down signals and the master make lead car available signal. The demand input signal, DEMIN, is produced at the lower output of the MEMORY G4,12. The upper output of this MEMORY produces the reverse signal $\overline{DEMIN}$. The signal DEMIN is made equal to ZERO upon each advance of the scanner by the signal AOS which serves as the lower input to the MEMORY. There are three upper inputs to the MEMORY, the first of which is the output of the NOR element G14,21 which in turn has three inputs CDEM, 2DEM and the output of the NOR element G14,16. The inputs to the NOR element G14,16 include the signal DISTX and the output of the PULSE SHAPER C14,30 which is triggered by the signal SSD3(1). If the scanner has seen cars serving calls in the direction of the scan but then sees more corridor calls than those cars can handle, the signal SSD3(1) goes to ONE indicating a special service demand for an extra car. This signal will trigger the PULSE SHAPER C14,30 which causes the output of the NOR element G14,16 to go to ZERO. Assuming for the moment that the signals CDEM and 2DEM are both equal to ZERO (these two signals will only equal ONE under special circumstances to be described later), the output of the NOR element G14,21 will go to ONE to cause the signal DEMIN to go to ONE. The signal AOS will cause the signal DEMIN to go back to ZERO when the scanner advances to the next floor. The signal SSD3(1) remains equal to ONE for the remainder of the scan, however, the PULSE SHAPER ensures that it only causes the signal DEMIN to go to ONE at the floor at which SSD3(1) goes to ONE. If a corridor call for service in the direction of scan is more than a predetermined number of floors ahead of the car serving in the direction of scan to which it is allocated, the signal DISTX (developed in the circuits of FIG. 19) will go to ONE momentarily to generate a DEMIN signal at that floor even though the quota of calls for that car has not been exceeded. Under these circumstances, it will be an appreciable time before the car to which the call is allocated will reach that floor, therefore a demand for another car is generated.

The other two upper inputs to the MEMORY G4,12 are the signals DFCU (demand for car in the up direction) and DFCD (demand for car in the down direction). These signals go to ONE when there is a corridor call for service in their respective directions and there is no car in position to serve the call. The signal DFCU is derived from the output of the NOR element G2,19 which has as one of its inputs the signals $\overline{S\text{-}UP}$. The signal DFCD is derived from the output of the NOR element G2,20 which has as one of its inputs the signal $\overline{S\text{-}DN}$. Both of these NOR elements have as a common input the output of the NOR element G2,18 which receives its input from the output of the PULSE SHAPER C14,31. The PULSE SHAPER is triggered by the upper output of the MEMORY B3,10. This MEMORY has two upper inputs and two lower inputs. The upper inputs are the signals SP(1)C and RESET while the two lower inputs are master corridor call signals MUCC and MDCC.

The signals DFCU and DFCD are generated in the following manner. During the RESET interval the output of the MEMORY B3,10 is made equal to ZERO. As long as the scanner does not pass a car serving calls in the direction of scan the signal SP(1)C remains equal to ZERO so that the upper output of the MEMORY B3,10 is not clamped in the ZERO state. When the scanner comes to a floor at which a corridor call is registered for service in the direction of scan, the signal MUCC or MDCC goes to ONE (only signals representing calls in the direction of scan can go to ONE). Assume for a moment that the scanner is scanning up and has not seen any cars serving in the up direction when it comes to a floor at which an up corridor call is registered. At this time the signal MUCC will go to ONE causing the upper output of the MEMORY B3,10 to go to ONE. This will trigger the PULSE SHAPER C14,31 which will cause the output of the NOR element G2,18 to go to ZERO for the duration of the pulse. Since we assumed that the scanner is scanning up, the signal $\overline{S\text{-}UP}$ is also ZERO so that the signal DFCU goes to ONE to cause the signal DEMIN to go to ONE. When the scanner advances to the next floor, the signal AOS will cause the signal DEMIN to return to ZERO. The duration of the pulse produced by the PULSE SHAPER C14,31 is 150 microseconds, which is less than the interval between successive pulses of the signal AOS. Therefore, even if the output of the MEMORY B3,10 remains equal to ONE for the remainder of the scan the signal DFCU can only go to ONE at one floor during the scan. If the scanner comes to a car serving calls in the up direction before it sees an up corridor call, the signal SP1C will go to ONE to clamp the output of the MEMORY B3,10 at ZERO for the remainder of the scan. The signal DFCD is generated on the down scan in a similar manner which is obvious from the above discussion.

The signals UDEM and DDEM are derived from the lower outputs of the MEMORY elements C8,18 and C8,12, respectively. The MEMORY C8,18 has as upper inputs the signals DFCU and UDFXC (up demand for an extra car). The upper inputs to the MEMORY C8,12 are DFCD and DDFXC (down demand for an extra car). The signal UDFXC is derived from the output of the NOR element B1,21 which has as one input the signal $\overline{S\text{-}UP}$. The signal DDFXC is derived from the output of the NOR element B2,13 which has as one of its inputs the signal $\overline{S\text{-}DN}$. These NOR elements have the common inputs AVM (master available car signal) and $\overline{DFXC}$ (no demand for an extra car signal). The signal $\overline{DFXC}$ is derived from the output of the NOR element B1,12 which has as its input the signal SSD3(1). The signal UDFXC will go to ONE if during the up scan (when $\overline{S\text{-}UP}$ equals ZERO) there are more corridor calls than the cars serving calls in the up direction can handle (SSD3(1) equals ONE) and there are no cars available (AVM equals ZERO). The signal DDFXC goes to ONE under similar circumstances during the down scan (when $\overline{S\text{-}DN}$ equals ZERO).

Notice that the MEMORY C8,18 has as its lower input the signal RESET-DN. Consequently, once the signal UDEM goes to ONE on the up scan it will remain equal to ONE for the remainder of the up scan, through the SET-UP and RESET-UP intervals and through the entire down scan until the RESET-DN interval is reached. Likewise, the MEMORY element C8,12 has as its lower input the signal RESET-UP so that the signal DDEM once generated on the down scan will not be terminated until the RESET-UP interval is reached.

The signals UDEM and DDEM are utilized to store the indication of certain demands for service in the up and down directions, respectively. If no car is available, to be assigned to a demand, the system searches out and blanks the lead car serving calls in the opposite direction on the next scan. If no demand for an extra car in the opposite direction is created by doing this, then the system will make the lead car available to serve the demand in the first direction.

The signal BLCD, blank lead car down, is generated from the output of the NOR element B4,10. This NOR element has as its inputs the signals $\overline{\text{S-DN}}$, $\overline{\text{UDEM}}$, DDFXC and the output of NOR element B2,21. If a UDEM was created on the up scan the signal $\overline{\text{UDEM}}$ will equal ZERO. During the down scan, when $\overline{\text{S-DN}}$ equals ZERO, as long as no down demand for an extra car is created, DDFXC equals ZERO, and assuming for the moment that the output of NOR element B2,21 equals ZERO, then the signal BLCD will go to ONE. The reverse signal $\overline{\text{BLCD}}$ is created at the output of the NOR element E3,18. With the signal BLCD equal to ONE, the system will ignore the lead car serving in the down direction on the down scan to see if it is really needed to serve the down calls then existing. In other words, the calls in front of the lead car serving in the down direction will be referred back to another car serving in the down direction. If by the time the down scan is complete no down demand for an extra car is created, then the lead car in the down direction may be made available so that it may be assigned to the up demand.

If the lead car in the down direction can be removed from service without creating a demand for service in the down direction, the signal MLCAD, make lead car available down, will go to ONE. This signal is generated at the output of the NOR element B2,11 which has as its inputs the signals $\overline{\text{UDEM}}$, the lower output of the MEMORY B2,24 and the signal $\overline{\text{SET-DN}}$. The signal $\overline{\text{SET-DN}}$ also serves as a lower input to the MEMORY B2,24 which has as its upper inputs the signal DDFXC and the output of the NOR element B2,21. The NOR element B2,21 has as its inputs the upper output of the MEMORIES B2,24 and B2,15. This latter MEMORY has two upper inputs and two lower inputs. The upper inputs are the signals DDFXC and MLCAD. The lower inputs are the upper output of MEMORY B2,24 and the signal SET-DN.

The signal $\overline{\text{SET-DN}}$ equals ONE during the entire scanning cycle except during the SET-DN interval. It therefore clamps the signal MLCAD at ZERO except during the SET-DN interval. The signal also attempts to make the upper output of the MEMORY element B2,24 equal to ONE except during the SET-DN interval. Assume that on a particular down scan no down demand for an extra car is created (DDFXC remains equal to ZERO). Therefore, during the SET-DN interval, when SET-DN goes to ONE, the upper output of the MEMORY B2,15 goes to ONE causing the output of the NOR element B2,21 to go to ZERO. When the scanner advances to the RESET-DN interval, the signal $\overline{\text{SET-DN}}$ goes back to ONE. This causes the upper output of the MEMORY B2,24 to go to ONE. This latter signal serves as an input to the NOR element B2,21 and as the lower input to the MEMORY B2,15 so that the output of the NOR element B2,21 is held at ZERO.

Now assume that on the next up scan that an up demand for extra car is again created ($\overline{\text{UDEM}}$ goes to ZERO). If at the start of the down scan when $\overline{\text{S-DN}}$ goes to ZERO there is no down demand for an extra car (DDFXC equals ZERO), the signal BLCD will go to ONE, since the output of NOR element B2,21 equals ZERO. Therefore during the down scan the system will blank the lead car serving in the down direction. If the scanner completes the down scan without creating a down demand for an extra car, that is without DDFXC going to ONE, then when the signal $\overline{\text{SET-DN}}$ goes to ZERO the two upper inputs to the MEMORY B2,24 are ZERO so that its lower output remains equal to ZERO and the signal MLCAD will go to ONE indicating that the lead car in the down direction should be made available. This signal serves as an upper input to the MEMORY element B2,15 and even though the signal SET-DN goes to ONE, the upper output of this MEMORY will remain equal to ZERO. It is during the SET-DN interval that the decision is made as to whether the lead car in the down direction should be taken out of service in the down direction and made available for the up demand. When the scanner advances and the signal $\overline{\text{SET-DN}}$ returns to ONE, the signal MLCAD is returned to ZERO. In addition, it ensures that the upper output of MEMORY B2,24 is equal to ONE which holds the output of NOR element B2,21 equal to ZERO until such time that the system sees the signal DDFXC go to ONE.

Assume on the other hand, that during the down scan the blanking of the lead car serving calls in the down direction overloads the trailing cars so that the signal DDFXC goes to ONE. This immediately unblanks the lead car since this signal serves as an input to the NOR element B4,10 causing the signal BLCD to go to ZERO. The signal DDFXC also causes the upper output of the MEMORY element B2,24 to go to ZERO although the lower output of this MEMORY remains equal to ZERO since the signal $\overline{\text{SET-DN}}$ is still equal to ONE. However, since the upper output of the MEMORY B2,24 is equal to ZERO and since the signal DDFXC causes the upper output of the MEMORY B2,15 to go to ZERO, the output of NOR element B2,21 goes to ONE. Now during the SET-DN interval when the signal $\overline{\text{SET-DN}}$ goes to ZERO the lower output of the MEMORY B2,24 will go to ONE so that the signal MLCAD cannot go to ONE. In other words, if we remove the lead car serving calls in the down direction from down service to serve the up demand we would create a down demand. It should be noted that the signal DDFXC will remain equal to ONE during the SET-DN interval so that the upper output of the MEMORY B2,15 will remain equal to ZERO. This will ensure that the output of NOR element B2,21 will remain equal to ONE at least through another entire scanning cycle, and therefore the system does not blank the lead car in the down direction on the next down scan.

The purpose of the signal produced by the NOR element B2,21 is twofold. First, suppose for a moment that on a down scan a down demand for an extra car is created so that DDEM goes to ONE. On the next up scan, a circuit similar to the circuit just described will blank the lead car serving calls in the up direction (the MLCAU circuit). If this does not create a demand in the up direction than that car is made available and is assigned to the down demand. However, if ignoring the lead car on the up scan creates a demand in the up direction, it is a false demand since under these circumstances this car will not be removed from serving up calls. Nevertheless, the signal $\overline{\text{UDEM}}$ will go to ZERO and cannot be reset until the down scan has been completed. Consequently, the circuit just described in detail above, will attempt to blank the lead car in the down direction to see if it can serve that up demand. However, since the real shortage is in the down direction, we do not want to blank the lead car serving in the down direction and the one output from the NOR element B2,21 will ensure that the signal BLCD does not go to ONE. Of course once the scanner sees the true down demand the signal DDFXC will go to ONE to cause BLCD to go to ZERO, but the output of the NOR element B2,21 prevents BLCD from going to ONE at all on the down scan.

The second purpose of the output of NOR element B2,21 is to inhibit the blanking of the lead car in the down direction when it was determined on the previous down scan that diverting this car to serve an up demand would cause a false demand for service in the down direction. In other words, if blanking the car in the down direction causes DDFXC to go to ONE, then during the SET-DN interval output of NOR element B2,21 will go to ONE. This signal will then prevent the blanking of the lead car on the next down scan.

However, it should be noticed that if no genuine demand for an extra car in the down direction is observed on this down scan, the output of B2,21 will go back to ZERO at the completion of the scan. Consequently, if the up demand still exists, then on the next down scan the lead car will be blanked again to see if the situation has changed. In other words, if blanking the lead car creates a demand for an extra car, the system will check on every other down scan to see if the lead car can be released. Of course blanking the lead car does not remove it from service and it can still stop for calls in front of it. As will be seen later, blanking the lead car merely removes it from consideration by the Call Allocating Counters which is of no great consequence under the circumstances since there are no available cars to be assigned to the false demands created.

The signal MLCAU, make the lead car available in the up direction, is the counterpart of the signal MLCAD for the up directon. From the detailed description of the operaton of the MLCAD circuit above, one can easily follow the operation of the MLCAU circuit illustrated at the bottom of FIG. 11. Briefly, it can be said that if the signal $\overline{DDEM}$ goes to ZERO on a down scan then on the next up scan the signal BLCU will go to ONE to blank the lead car in the up direction during the up scan. If the scanner completes the scan in the up direction without observing an up demand for an extra car (UDFXC equals ZERO), the signal MLCAU will go to ONE during the SET-UP interval. In a manner similar to the operation of the MLCAD circuit, the output of the NOR element B1,24 will remain equal to ONE to prevent blanking of the lead car in the up direction if a false down demand is created in an attempt to release the lead car in the down direction to satisfy an up demand. Likewise, it will inhibit blanking of the lead car in the up direction it was determined on the previous up scan that diverting the lead car in the up direction to serve a down demand would create a false demand for service in the up direction.

The two signals MLCAD and MLCAU serve as inputs to the NOR element E2,9 which produces the reverse master make car available signal $\overline{MCAM}$.

FIG. 12

This figure illustrates the circuits for generating the signals DEMP, DEM and their reverse signals. All of these signals are associated with demands for service. The signal DEMP is utilized in the circuits which stop a car traveling in one direction to serve corridor calls in the opposite direction at the proper floor and the circuits which select and assign the closest available car to a demand. The signal DEM on the other hand is effective in the circuits which determines the closest available car and in the circuit which assign cars to demands for service.

The signal DEMP is generated at the lower output of the MEMORY element B8,13. The upper output of this MEMORY generates the reverse signal $\overline{DEMP}$ through the AMPLIFIER C6,22. The MEMORY B8,13 has two inputs; the signal DEMIN and the output of the PULSE SHAPER C12,16. The PULSE SHAPER has as its input the signal 2DEM. The MEMORY B8,13 is reset with each advance of the scanner by the signal AOS. The signal DEMIN goes to ONE when a corridor call exists and no car is in position to serve the call or when there are more corridor calls in the direction of scan than cars serving in that direction can handle. As was mentioned previously, the signal DEMIN goes to ZERO automatically whenever the scanner advances to the next floor. The generation of the signal 2DEM will be discussed later but it is sufficient to say that it goes to ONE under certain circumstances when cars are traveling in one direction to serve calls in the opposite direction. Once the signal goes to ONE it remains equal to ONE for the remainder of the scan. However, the PULSE SHAPER C12,16 ensures that the signal only causes the signal DEMP to go to ONE at one floor during a scan.

The signal DEMP serves as the upper input to the MEMORY element B8,17 the lower output of which produces the signal DEM through the AMPLIFIER C10,22. The reverse signal DEM is also produced from the lower output of MEMORY B8,17 through the NOR element B8,21.

There are three lower inputs to the MEMORY B8,17 and they include the RESET signal, the signal BDEM, and the signal CATS (car assigned this scan). At the completion of the scan in each direction the RESET signal ensures that the signal DEM equals ZERO for the start of the next scan. Under some circumstances, however, the system does not want a car to be assigned to a demand. The system is so designed that only one car may be assigned to a demand per scan. This is done so that equitable attention will be given to service in both directions and no more than one car will be assigned to a demand. If there are two demands for service in one direction, however, and there are cars available to serve them the delay in the assignment of a car to a second demand will not be appreciable since the scan sequence is so rapid.

The signal CATS is generated at the lower output of MEMORY F12,17 and is reset to ZERO at the completion of each scan by the RESET signal. If a car which is in service is assigned to serve a demand, the appropriate signal, such as $\overline{980A}-a+R2D-a$ for the A car, will go to ONE. This will cause the PULSE SHAPER F13,13 to produce a 50 microsecond pulse which in turn will make the signal CATS go to ONE. With the signal CATS equal to ONE the signal DEM is clamped at ZERO even if the signal DEMP goes to ONE. Under these circumstances then, the signal DEM can only go to ONE once during a scan despite the number of demands the system sees. The PULSE SHAPERS are necessary in the input circuits to the MEMORY F12,17 because the signals such as $\overline{980A}-a+R2D$ can remain equal to ONE for a duration much longer than one scan and it is only on the scan on which the car is assigned that it is desirable to block the signal DEM.

The signal BDEM, block DEM, is effective to block the DEM signal when a car is traveling in one direction to serve calls in the opposite direction. In the embodiment of the invention described, when a car is traveling in one direction to serve calls in the opposite direction, the corridor call which created the demand will continue to create a signal DEMP until the call is answered. Since a car is already assigned to answer this demand it is desirable that the signal DEM not go to ONE to preclude the assignment of another car to the demand.

The signal BDEM is generated at the output of the NOR element C7,19 which has two inputs; the output of the NOR element G7,18 and the output of the NOR element G18,12. The NOR element G7,18 has as its inputs the signals DMR2D and UMR2D. These signals also serve as the inputs to the NOR element G17,19 the output of which serves as an input to the NOR element G18,12. This latter NOR element has two additional inputs; the signal 2CR2D which is produced at the output of the NOR element G18,18 and a signal $\overline{CDEM}$. The signal DMR2D is produced at the output of the NOR element G8,13 which has two inputs; the signal $\overline{\text{S-DN}}$ and the output of the NOR element G8,16. The signal UMR2D is produced at the output of the NOR element D6,24 which also has two inputs; the signal $\overline{\text{S-UP}}$ and the output of the NOR element D6,21. The NOR element G8,16 has as its inputs the signals A2DD–a, b and c while the NOR element D6,21 has as its inputs the signals A2UD–a, b and c.

For purposes of illustration assume that the A car is traveling up to serve down calls (A2DD equals ZERO). This will make the output of the NOR element G8,16 ZERO. During the down scan when the signal $\overline{\text{S-DN}}$ equals ZERO the signal DMR2D will equal ONE. Therefore the outputs of the NOR elements G7,18 and G17,19 will equal ZERO. It will be assumed for a moment that the signal 2CR2D, which equals ZERO unless two cars are assigned to travel in one direction to serve calls in the opposite direction, also equals ZERO. If this is the first time that the signal DEMIN has gone to ONE during the scan the signal $\overline{\text{CDEM}}$ will equal ONE. Therefore the output of the NOR element G18,12 will be ZERO. Since as was mentioned the output of the NOR element G7,18 is ZERO, the signal BDEM is equal to ONE. Consequently, the signal DEM will not go to ONE when the signal DEMP goes to ONE. In terms of the traffic situation, even though a demand for service is seen, no car should be assigned because another car was assigned on a previous scan to serve the demand. The same would be true if during the up scan a demand was created but there was a car already traveling down to serve the up demand (if A2UD–a for instance equals ONE while $\overline{\text{S-UP}}$ equals ZERO).

The above described circuitry is effective therefore to prevent the assignment of a second car to serve the first demand seen on a scan when a car is already traveling in the opposite direction to serve the demand. As will be seen later, the car traveling in the opposite direction to serve calls in the direction of scan will be assigned two corridor calls to answer. If there are more calls than this in the direction of scan a second car should be assigned. Therefore, the signal DEM should be permitted to go to ONE when the second demand is seen by the scanner. Under these circumstances the negative signal does not see the demand, $\overline{\text{CDEM}}$, goes to ZERO after the scanner passes the corridor call which creates the first demand. It will be remembered from the discussion above that if a car is traveling in the opposite direction to serve calls in the direction of scan, the output of the NOR element G17,19 will be ZERO. Since it was assumed that only one car is traveling in that manner, the signal 2CR2D also remains equal to ZERO. Therefore, the output of the NOR element G18,12 is ONE so that the signal BDEM must equal ZERO. Under these circumstances the signal DEM will not be blocked and if another demand is seen the system will attempt to assign a second car. Notice that if no cars are assigned to travel in the opposite direction to serve calls in the direction of scan, the signals DMR2D and UMR2D will equal ZERO so that the NOR element G7,18 will have an output of ONE. This will likewise make the signal BDEM equal to ZERO so that the assignment circuits will see the demands. Since except under special circumstances to be discussed below the output of the NOR element G10,12 is also equal to ZERO.

The specific embodiment of the invention herein described is designed so that two cars may simultaneously travel in the same direction to serve calls in the opposite direction. When this occurs, the signal 2CR2D (two cars running to demands) will equal ONE causing the signal BDEM to go to ONE thereby inhibiting further assignment of cars on that scan. It may be desirable, and it is within the scope of the invention, to permit more than two cars to travel in the opposite direction to serve calls in the direction of scan especially in installations utilizing more cars.

The signal 2CR2D is created at the output of the NOR element G8,18 which has as its input the output of the NOR element G8,19. If two cars are traveling down to serve up calls, the output of the NOR element G17,20 will equal ONE causing the signal 2CR2D to go to ONE. On the other hand, if two cars are assigned to travel up to serve down calls, the output of the NOR element G18,20 will equal ONE also causing 2CR2D to go to ONE. The NOR element G17,20 has both the signal $\overline{\text{S-UP}}$ and the output of NOR element H17,15 as inputs. This latter NOR element has three inputs; the outputs of the NOR elements G17,13, G17,16 and G18,13. If a car is assigned to travel down to serve up calls the associated signal, for instance $\overline{\text{A2UD}}$–a for the A car, will equal ZERO. Therefore, if the A car and B car are assigned to travel down to serve up calls, the output of the NOR element G17,13 will equal ONE to cause the output of the NOR element G17,20 to go to ONE during the up scan. If the B and C cars are assigned to travel down to serve up calls, the output of the NOR element G17,16 will equal ONE and if it is the A car and the C car, the output of the NOR element G18,13 will equal ONE. Similar combinations of the signals $\overline{\text{A2DD}}$–a, b, c produce a ZERO at the output of the NOR element H17,10 if two cars are assigned to travel up to serve down calls. If this occurs on the down scan the output of NOR element G18,20 will equal ONE to cause the signal 2CR2D to go to ONE.

FIG. 13

This figure illustrates the circuits for generating the last available car signals, the master available car signals and the per floor available car signal.

When one of the signals LAV–a, b or c equals ONE, it is an indication that the appropriate car is the last car that the scanner has seen so far on a particular scan. The signals are generated from the outputs of NOR elements B9,12, B9,21 and B9,17 for the signals LAV–a, b and c respectively. The reverse signals LAV–a, b, c are produced from the outputs of the NOR elements H5,19, D2,11 and F6,13 respectively. The last available car circuit is a sequential circuit which has only the signals GAV–a, b, c as inputs. Internally the circuit comprises three MEMORY elements, B8,11, B9,15 and B10,21, and six NOR elements. The interconnections between these MEMORY elements and NOR elements and between these elements and the input signals as well as the output NOR's can be understood by reference to the circuit of FIG. 13. As an aid in following the internal workings of the circuit, the output of all the internal elements have been identified by reference characters F11 through F19 including the reverse signals $\overline{\text{F11}}$ through $\overline{\text{F13}}$.

At the beginning of each scan and until the scanner has seen an available car, the input signals GAV–a, b, c are all equal to ONE. Since one of these signals is applied directly to each of the output NOR's the signals LAV–a, b, c will all be equal to ZERO. Under these conditions all of the internal signals including the reverse signals will also be equal to ZERO. Assume now that the scanner scanning past the floors comes to a floor at which the A car is standing available so that the signal GAV–a goes to ZERO. Since the signals GAV–a, b, c still equal ONE and since they were applied directly to the inputs of the NOR elements B9,21 and B9,17 respectively, the signals LAV–b and c will remain equal to ZERO. However, with the signal GAV–a equal to ZERO the signal LAV–a will go to ONE if the other inputs to the NOR element B9,12 remain equal to ZERO. The signal F16 will stay equal to ZERO since it is produced at the output of the NOR element B9,11 which has as one of its inputs the signal GAV–b. The signal F19 will also stay equal to ZERO since it is produced at the output of the NOR element B10,13 which has as one of its inputs the signal GAV–c. The signals $\overline{\text{F12}}$ and $\overline{\text{F13}}$ will go to ONE, but they will have no effect on the system at this time. Therefore, the signal LAV–a will equal ONE and the signal $\overline{\text{LAV}}$–a will equal ZERO.

Assume that the scanner now sees the elevator car B standing available at a floor. When the signal GAV–b goes to ZERO, the signal F13 will remain equal to ZERO. Therefore, the signal F16 will go to ONE which will in turn cause the signal LAV–a to go back to ZERO. The signal $\overline{\text{F13}}$ will also stay equal to ONE so that the signal F14 will remain equal to ZERO. With the signal GAV–c still equal to ONE, the signal F15 will remain equal to ZERO and since GAV–b is now equal to ZERO the signal LAV–b will go to ONE indicating that the B car was now the last available car seen by the scanner. It can thus be seen that whichever car is the last available car to be seen by the scanner will cause its associated LAV signal to go to ONE. It can also be seen from the circuit of FIG. 13 that only one LAV signal may be equal to ONE at any particular time.

If the scanner comes to a floor at which two cars are standing available, only one will be selected as the last available car seen. In the preferred embodiment of the invention disclosed, the decision as to which car will be designated as the last available car is to a certain extent by random selection. By way of example, assume that the scanner has seen no available cars and then it goes to a floor at which the B and the C cars are both standing available. Since the signal GAV–a remains equal to ONE, the signal LAV–a cannot go to ONE and the signals F14 and F18 will remain equal to ZERO. Since the signals GAV–b and GAV–c will go to ZERO a decision as to whether the B or the C car will be designated as the last available car is dependent upon the signals F15 and F17. The states of these NOR elements however, depend upon the signals F11 and $\overline{\text{F11}}$ which are at the upper and lower outputs of the MEMORY B8,11. It will be remembered that the characteristics of the MEMORIES used herein are such that if both the upper and lower inputs are equal to ONE, both of the upper and lower outputs will be equal to ZERO. This is the case when both the signals GAV–b and GAV–c both equal ONE. However, if both the upper and lower inputs are removed from the MEMORY one or the other of the outputs must go to ONE. Theoretically the signals GAV–b and GAV–c go to ZERO simultaneously, however, in reality this will never be exactly true and therefore one signal will last slightly longer than the other and cause F11 or $\overline{\text{F11}}$ to go to ONE. Assume that the signal GAV–c goes to ZERO slightly after the signal GAV–b goes to ZERO. Under these circumstances then, the C car was the last available car seen by the scanner. Therefore, the signal F11 will go to ZERO and $\overline{\text{F11}}$ will go to ONE. With F11 equal to ZERO and the signal GAV–c equal to ZERO, both the inputs to the NOR element D9,13 are equal to ZERO so that the signal F15 goes to ONE to prevent the signal LAV–b from going to ONE. On the other hand, since the signal $\overline{\text{F11}}$ which is equal to ONE serves as an input to the NOR element B9,24, the signal F17 will be equal to ZERO. With all the NOR inputs of the NOR element B9,17 now equal to ZERO, the signal LAV–c will go to ONE. The same random selection would have to be made if all three of the cars were seen standing available at the same floor.

The master available car signal AVM is produced at the output of the NOR element D8,12 from the reverse signal $\overline{\text{AVM}}$. This latter signal is produced at the output of the NOR element D8,13 which has as its inputs the signals AV–a, b and c. Obviously, if all the signals AV–a, b and c are equal to ZERO the signal AVM will also be equal ZERO. On the other hand, if any of the cars are available, that is if any of the signals AV–a, b or c equals ONE, the signal AVM will equal ONE. The signal AVM is an indication that there is an available car in the system and is equal to ONE continuously independent of the scan sequence if any of the cars are available.

The per floor available car signal, BAVM, is derived from the reverse signal $\overline{\text{BAVM}}$ through the NOR element D2,12. The signal $\overline{\text{BAVM}}$ is generated at the output of the NOR element D8,17 which has as its inputs the outputs of the NOR elements D8,15, D8,10 and D8,11. The signals $\overline{\text{B}}$–a and $\overline{\text{AV}}$–a serve as the inputs to the NOR elements D8,15. Similar inputs associated with the elevator cars B and C serve as inputs for the NOR elements D8,10 and D8,11 respectively. If the A car is available, the signal $\overline{\text{AV}}$–a will equal ZERO and if the scanner is scanning at the floor at which the A car is standing the signal $\overline{\text{B}}$–a will equal ZERO. This will cause the output of the NOR element D8,15 to go to ONE which will make the signal $\overline{\text{BAVM}}$ equal to ZERO so that BAVM will equal ONE. Therefore, if the scanner is scanning at a floor at which there is an available car, the signal BAVM will equal ONE. At all other times it will equal ZERO.

FIG. 14

This figure illustrates the circuits for generating the signal Q which is utilized in assigning the closest available car to a demand. The circuit is composed of four subcircuits; two binary counters with analog current outputs, a comparator circuit and a bias circuit. The binary counters are a well known type composed of a number of RST flip-flop MEMORY units connected in series. The flip-flops utilized in these counters differ in one important respect from the MEMORIES used in the circuits described hereinbefore. Like the other MEMORIES these MEMORIES have an upper and lower output and an upper input, however, they have a second input called a TRIP input. Referring to the MEMORY C3,16 it will be noticed that the upper input is marked with the letter R. This is the RESET input. When a pulse is supplied to this input the lower output goes to ONE while the upper output goes to ZERO no matter what the previous state of the outputs were. Notice that the TRIP input identified by the letter T is illustrated as being applied to the MEMORY exactly at the dividing line between the upper and lower elements. When a pulse is supplied to this input the output signals change their value no matter what state they were in to begin with. For instance, if the lower output of the MEMORY C33,16 is ONE and the upper ouput is ZERO, when the TRIP input is activated the upper output will flip to a value of ONE and the lower output will become ZERO. If a second pulse is applied to the TRIP input, the upper output will revert to a value of ZERO and the lower output will return to a value of ONE. Therefore, it can be assumed that on successive TRIP pulses the outputs alternately flip-flop between a value of ZERO and ONE.

On alternate pulses when the lower output of the MEMORY C3,16 goes to ONE a TRIP signal is applied to the second MEMORY in the upper scanner, C4,16. Thus one pulse is applied to the TRIP input of the MEMORY C4,16 for every two TRIP signals applied to MEMORY C3,16. This MEMORY C4,16 represents the second digit of the binary number stored in the counter. In a similar manner the MEMORY C5,16, C6,16 and E6,16 represent the third, fourth and fifth digits of the stored binary number. With the five binary digits illustrated it is possible to have thirty-two different states of the counter. Although in the specific embodiment of the invention shown there are only eight floors in the system so that only three digits would be necessary, the counters illustrated would be suitable for buildings with many more floors.

It will be noticed that the upper output of each of the MEMORIES of the upper counter is connected through a resistor to the input $Q_1$ of the comparator. These resistors serve to convert the digital output of the counters to an analog current which is the function of the count in the counter. When there is a count of 1 in the upper counter the upper output of MEMORY C3,16 equals ONE. Since the MEMORIES utilized have an output voltage of −20 volts, this will produce a current through the 150K resistor R1 of approximately 133 microamps. If the count in the counter is 2 so that the upper output of the MEMORY C3,16 is ZERO while the upper output of the MEMORY C4,16 is equal to ONE, a current of approximately 425 microamperes will be supplied to the input $Q_1$ of the comparator through the 47K resistor R2. If the count in the counter is a 3 so that the outputs of both C3,16 and C4,16 are equal to ONE, the total current applied to the input $Q_1$ by the upper counter will be 550 microamperes.

Except for the inputs to be discussed shortly, the lower counter is identical to the upper counter just described. For a count of 1 in the lower counter, the upper output of the MEMORY C7,16 will equal ONE while the upper outputs of all the other MEMORIES in the lower counter will be equal to ZERO. This count of 1 will similarly supply a current of approximately 133 microamperes to the input $Q_2$ of the comparator through the 150K resistor R7.

Therefore it can be seen that the states of the various MEMORIES in each counter can be combined in a variety of ways to supply current inputs $Q_1$ and $Q_2$ to the comparator which are representative of the count stored in the respective counters.

A bias circuit supplies a slight bias current to the comparator input $Q_1$ or $Q_2$ so that these two inputs are never exactly equal. The bias is supplied by the MEMORY H3,21. At the end of each scan during the RESET interval the upper output of the MEMORY H3,21 which is the signal $\overline{SP1AC}$, have not scanned past the first available car, goes to ONE. This will supply a bias current of approximately 61 microamperes to the input $Q_2$ through the 330K resistor R12. When the scanner comes to the first floor at which an available car is located, the signal BAVM goes to ONE. This causes the signal $\overline{SP1AC}$ to go to ZERO, however, now the signal SP1AC will go to ONE to supply a bias current of approximately 61 microamperes to the input $Q_1$ of the comparator through the 330K resistor R6.

The comparator is a current comparator which can be constructed by anyone skilled in the art. It has such characteristics that if the input $Q_1$ exceeds the input $Q_2$ the output of the comparator will be equal to ONE. On the other hand, if the input $Q_2$ exceeds $Q_1$ the output of the comparator will be ZERO. The output of the comparator serves as an input to the NOR element C11,21 the output of which is the signal $\overline{Q}$. The signal $\overline{Q}$ is applied to the input of the NOR element C11,20 to produce the signal Q. Thus, it can be seen that if the signal $Q_1$ exceeds the signal $Q_2$, the signal Q will equal ONE. If on the other hand, the current at $Q_2$ exceeds the current at $Q_1$ the signal Q will equal ZERO.

All of the MEMORIES in the upper counter are reset by the signal UCR (upper counter reset). When this signal is equal to ONE the lower output of each of the MEMORIES of the upper counter is made equal to ONE. Whenever UCR equals ONE therefore the current supplied to the input $Q_1$ by the upper counter disregarding the bias for a moment is ZERO. The signal UCR which is produced at the output of the NOR element C2,18 also is utilized as an input to the NOR element C2,12 which serves as the input gate for the upper counter. The input to the NOR element C2,18 is the output of the NOR element C2,19 which has as its inputs the signal $\overline{SP1AC}$ and the output of the NOR element C2,20. The NOR element C2,20 has two inputs; the signal $\overline{BAVM}$ and the signal DEM. The latter signal also serves as an input to the NOR element C2,12 which has as a third input the advance pulse signal AP(1+2).

The advance pulse signal also serves as an input to the NOR element B14,12 which is the input gate for the lower counter. This NOR element also has the signals DEMP and $\overline{DEM}$ as inputs. The output of this NOR element is the TRIP pulse for the lower counter. The reset pulse for the MEMORIES in the lower counter is the signal LCR (lower counter reset) supplied by the AMPLIFIER E8,24. This signal is applied to the lower counter MEMORIES during the RESET interval and when the signal $\overline{DEM}$ equals ZERO.

For purposes of illustration, let us assume that the scanner has just completed an up scan, that there is an available car at the eighth floor and that a down corridor call is registered at the fifth floor which will create a demand for service in the down direction. During the RESET-UP interval the RESET signal will go to ONE causing the signal $\overline{SP1AC}$ to go to ONE and the signal SP1AC to go to ZERO. The signal $\overline{SP1AC}$ will cause the output of the NOR element C2,19 to go to ZERO making the signal UCR go to ONE. This signal will reset all of the MEMORIES in the upper counter so that the upper outputs of these MEMORIES will be equal to ZERO. Since the signal SP1AC, as just mentioned, is equal to ZERO there will be ZERO current input to the comparator at $Q_1$. The UCR signal will also prevent the development of any triggering pulses in the upper counter by the NOR element C2,12.

With the RESET signal equal to ONE, a reset signal will also be applied to each MEMORY in the lower counter so that the upper output of each of the MEMORIES will be equal to ZERO. Therefore, no current will be supplied to the comparator at $Q_2$ by the lower counter. However, with the signal $\overline{SP1AC}$ equal to ONE, a current of 61 microamperes will be supplied to $Q_2$ through the resistor R12. Consequently, as mentioned above, the signal Q will equal ZERO while the signal $\overline{Q}$ will equal ONE.

When the scanner receives another pulse and advances to the eighth floor on the down scan, the signal AP(1+2) will go ONE 50 microseconds. When the signal AP(1+2) returns to ZERO no triggering pulse will be supplied to either counter because the signal UCR being equal to ONE prevents the output of NOR element C2,12 from going to ONE while the signal $\overline{DEM}$ being being equal to ONE prevents the output of the NOR element B14,12 from going to ONE. Since it was assumed that an available car was located at the eighth floor, the signal BAVM will go to ONE. This will cause the signal SP1AC to go to ONE and $\overline{SP1AC}$ to go to ZERO. With the latter signal equal to ZERO the bias will be removed from the $Q_2$ input of the comparator circuit. However, the bias will now be supplied to the $Q_1$ input of the comparator by the signal SP1AC through the resistor R6. Since the current input at $Q_1$ exceeds the current input at $Q_2$ the signal Q will go to ONE.

Although the signal $\overline{SP1CA}$ goes to ZERO, the reset signal for the upper counter UCR, remains equal to ONE since the signals $\overline{BVAM}$ and DEM (since no demand exists) both equal ZERO thereby providing a ONE input to the NOR element C2,19 from the output of the NOR element C2,20. The upper counter remains clamped at RESET and therefore the floor at which the available car is located is not counted.

When the scanner advances to the seventh floor the signal $\overline{BAVM}$ returns to ONE since it was presumed that there is no available car at the seventh floor. This causes the output of the NOR element C2,20 to go to ZERO and since the signal $\overline{SP1AC}$ remains equal to ZERO for the remainder of the scan, the signal UCR goes to ZERO thereby removing the reset signal from the MEMORY elements of the upper counter and from the triggering gate of the upper counter, NOR element C2,12. When the scanner advanced to the seventh floor, the signal AP(1+2) went to ONE. 50 microseconds after the scanner advances this signal returns to ZERO. Since the signal UCR is equal to ZERO, and since no demand has been seen yet the signal DEM equals ZERO, the output of the NOR element C2,12 goes to ONE. This sginal triggers the MEMORY C3,16 to cause the lower output to go to ZERO and the upper output to go to ONE. This supplies a current representative of a count of ONE to the comparator input $Q_1$ through the resistor R1. Since the signal $\overline{DEM}$ remains equal to ONE this advance of the scanner has no effect on the lower counter.

When the scanner advances to the sixth floor the signal AP(1+2) again goes to ONE momentarily and returns to ZERO. Since there is no available car located at the sixth floor and there is no down corridor call registered, there the only effect on the circuit is for the NOR element C2,12 to supply another triggering pulse to the MEMORY C3,16 when the signal AP(1+2) goes to ZERO. With this pulse the upper output of the MEMORY C3,16 returns to ZERO while the lower output goes to ONE. This triggers the MEMORY C4,16 causing its lower output to go to ZERO while its upper output goes to ONE. This upper output then supplies a current of approximately 425 microamperes to the $Q_1$ input of the comparator through the resistor R2. Again there is no effect on the lower counter since the signal $\overline{DEM}$ keeps the output of the NOR element B14,12 at ZERO.

Since it was assumed that a down corridor call at the fifth floor created a demand for service, when the scanner advances to the fifth floor position the signal DEM will go to ONE. Hence, both the signals $\overline{BAVM}$ and DEM are equal to ONE. The signals UCR will remain equal to ZERO so that the upper counter will retain its count. With the signal DEM equal to ONE, the output of the NOR element C2,12 cannot go to ONE this time when the signal AP(1+2) returns to ZERO. In other words the upper counter is locked up at a count of 2.

However, with the signal $\overline{DEM}$ going to ZERO the reset signal is removed from the MEMORY elements in the lower counter. A count will not be entered in the lower counter when the signal AP(1+2) returns to ZERO this time because while the scanner is at the floor at which the demand is located the signal DEMP will be equal to ONE to maintain the output of the NOR element B14,12 at ZERO. When the scanner advances to the next floor, however, the signal DEMP will go to ZERO. The signal DEM will remain equal to ONE and the reverse signal $\overline{DEM}$ will remain equal to ZERO until a car is assigned to the demand or the end of the scan is reached. Therefore, when the scanner advances to the fourth floor position, the output of the NOR element B14,12 will go to ONE to provide a triggering pulse to the MEMORY C7,16 when the signal AP(1+2) returns to ZERO. This will cause the lower output of that MEMORY to go to ZERO while the upper output will go to ONE thereby supplying a current of approximately 133 microamperes to the input $Q_2$ of the comparator through the resistor R7. Since the current applied to the $Q_1$ input of the comparator is equal to the 425 microamperes through the resistor R2 and the 61 microamperes bias current through the resistor R6 for a total of 486 microamperes, the input at $Q_1$ exceeds the input at $Q_2$ so that the signal Q remains equal to ONE.

When the scanner advances to the third floor, another triggering pulse is supplied to the MEMORY C7,16 when the signal AP(1+2) returns to ZERO. This causes the upper output of the MEMORY C7,16 to go to ZERO while the lower output goes to ONE. The latter signal triggers the MEMORY C8,16 to cause the lower output of that MEMORY to go to ZERO while the upper output goes to ONE. The upper output of this MEMORY will therefore supply a 425 microampere current to the comparator input $Q_2$ through the resistor R8. Both counters now show a count of 2, however, the 61 microampere bias applied to $Q_1$ keeps the signal Q equal to ONE.

The situation in review is that the scanner in scanning down the floors saw an available car at the eighth floor. The upper counter then counted out two floors, the seventh floor and the sixth floor, and held the count at 2 when it saw a demand at the fifth floor. The lower counter then picked up the count and registered a count of 1 at the fourth floor and a count of 2 at the third floor. Thus, it can be seen at this point that there is no car closer to the demand at the fifth floor than the car already seen at the eighth floor. When the scanner advances to the second floor position another triggering pulse is supplied to the MEMORY C7,16 which returns the lower output of the MEMORY to ZERO and again makes the upper output equal to ONE. When the lower output of the MEMORY C7,16 returns to ZERO the MEMORY C8,16 is not triggered therefore its upper output remains equal to ONE. Consequently, a current of 558 microamperes is supplied to the input $Q_2$; 425 microamperes through the resistor R8 and 133 microamperes through the resistor R7. As was shown above the current input at $Q_1$ now exceeds the input at $Q_1$ and the signal Q will go to ZERO. In other words, the system has counted out as many floors below the demand as the available car seen at the eighth floor was above the demand and therefore the system "quotas" out.

It should be noted that if the system detects a second available car before it sees a demand, the upper counter will be reset to ZERO. This occurs because since the scanner has not seen a demand, the signal DEM equals ZERO and when another available car is seen the signal $\overline{BAVM}$ goes to ZERO causing the output of the NOR element C2,20 to go to ONE. This causes the signal UCR to go to ONE which resets all the MEMORIES in the upper counter. Each time that the scanner sees an available car before it sees a demand the upper counter will be reset to ZERO. If an available car is seen after the system has seen a demand, that is after the signal DEM goes to ONE, it will have no effect upon the upper counter because the output of the NOR element C2,20 is clamped at ZERO. It will also have no effect on the lower counter, since neither the signal BAVM nor its reverse signal is an input to the lower counter. Under these circumstances the assignment circuit to be described shortly is effective to determine which car should be started. It should be remembered from the discussion of the circuits generating the signal DEM that this signal can only go to ONE once during any one scan. Once the signal goes to ONE it will remain equal to ONE for the remainder of the scan unless a car is assigned on that scan. It will be observed that if a demand is seen before an available car, the upper counter will never begin to count on that scan. The lower counter will count, however, and therefore even if an available car is seen at the next floor after the demand so that the bias is shifted to the $Q_1$ input of the comparator, the current supplied to the $Q_2$ input by the first count will exceed the bias and the signal Q will remain ZERO throughout. One further note. It will be seen that when a car is assigned to the demand, the signal $\overline{DEM}$ will return to ONE to reset the lower counter to ZERO. Therefore, with the bias applied to the $Q_1$ input of the comparator the signal Q will equal ONE.

FIG. 15

This figure illustrates the circuits for initiating the starting of the available car closest to a demand. The portion of the circuit other than that enclosed in the dashed line is a sequential circuit which takes into account the output of the Q circuit just described along with the sequence in which the demand and the available cars are seen in order to determine which car should be started and in which direction it should run. The Q circuit merely determined if an available car was seen before the demand and if so whether the scanner had counted out the same number of floors beyond the demand that the first available car was before the demand. This circuit takes that information into consideration and if the same number of floors have been counted out beyond the demand without seeing an available car, it will generate a signal to start the first car. However, if another available car is seen beyond the demand but a fewer number of floors beyond the demand than the first available car is before the demand, it will generate a signal to start the second available car to travel in the direction opposite to the direction of the scan to serve the demand. Furthermore, this circuit will generate a signal to open the doors of an available car which is standing at the floor at which a demand exists. The circuit then is in effect an assignment circuit. The portion of the circuit described so far is common to all of the elevator cars in the system.

The second portion of the circuit is that enclosed in the dashed line along the right hand edge of the figure. The components shown therein and the signals generated are individual to each car. The circuit illustrated is that for the A car, but those for the B and C cars are similar. In order for the A car to be selected it must be the last available car seen (LAV–$a$ must equal ZERO—see FIG. 13).

Figure 15:
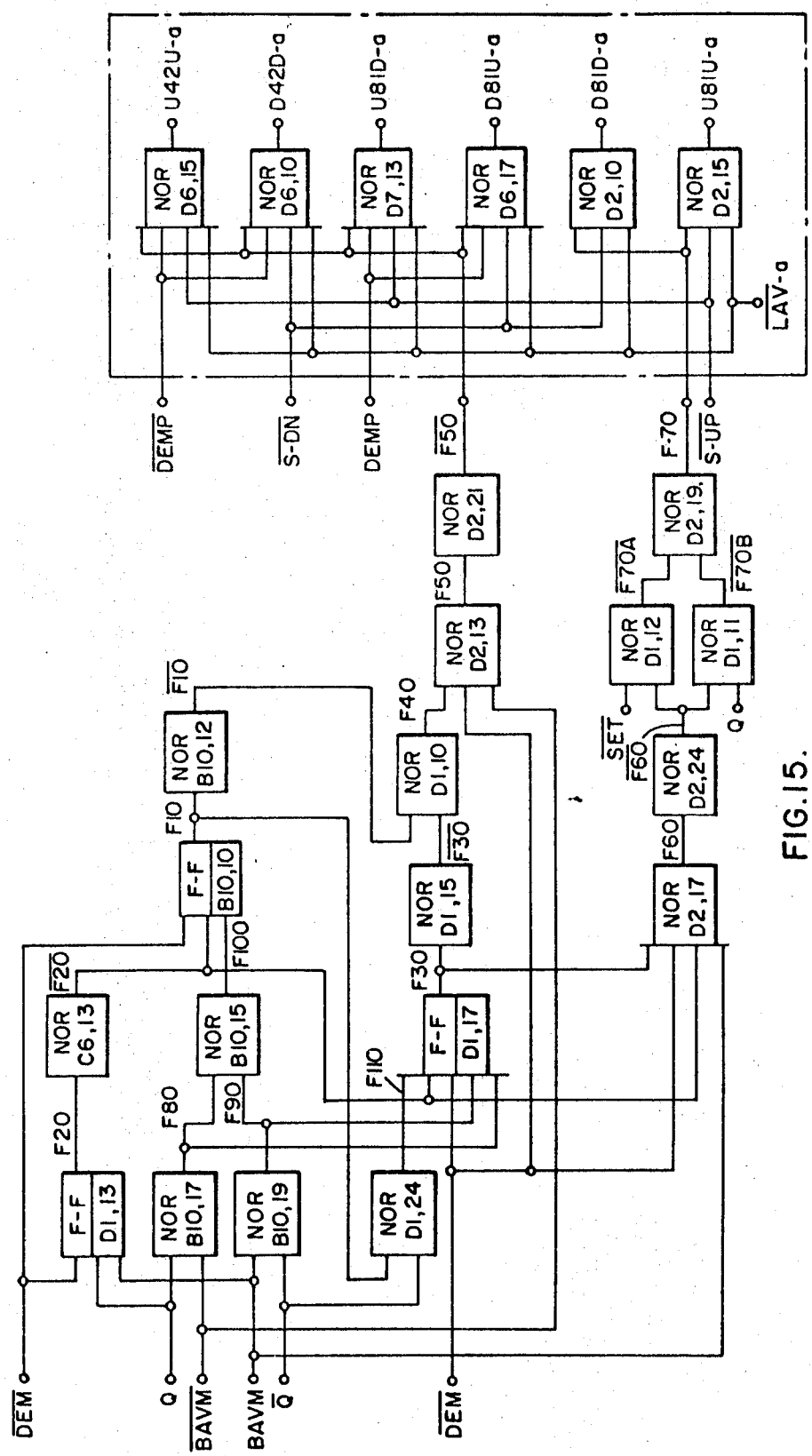

The circuits shown in FIG. 15 are effective to start the closest available car as soon as the decision can be made as to which car should be started. For instance, if a demand as seen first by the scanner, the first available car that the system sees is necessarily the closest and therefore may be started immediately. On the other hand, if an available car is seen first and then a demand it cannot be determined whether that car is the closest available car until the same number of floors beyond the demand as the first available car was before the demand have been scanned. However, if the scanner completes the scan before it has scanned the same number of floors beyond the demand as the available car observed was before the demand, no other car can be closer and it can be started during the SET interval.

The inputs to the sequential circuit of FIG. 15 are BAVM, Q, the reverse signals $\overline{BAVM}$ and $\overline{Q}$ and the signal $\overline{DEM}$. The only outputs of the sequential portion of the circuit are the signals $\overline{F-50}$ and F–70. One other input signal is the signal $\overline{SET}$. The circuit contains a number of NOR and MEMORY elements with numerous cross connections. In the preferred embodiment of the invention herein described the arrangement of these logic components and the interconnections between the components can be understood by reference to the circuit diagram of FIG. 15. The internally utilized output signals of these components are identified by the reference characters F10, F20, etc. through F110. Some of these signals are the reverse signals such as $\overline{F10}$.

At the completion of each scan the signal DEM is reset so that the signal $\overline{DEM}$ is equal to ONE at the start of each scan. In addition, at the beginning of each scan the signal Q equals ZERO as does the signal BAVM. It is also clear that the signal $\overline{SET}$ is equal to ONE except during the SET interval at the end of each scan. Therefore, as can be seen from FIG. 15, at the beginning of each scan the signals F10, F20, F30, F30, F60, F80, F90 and F110 are equal to ZERO while the signals $\overline{F50}$, F70 and F100 all equal ONE.

By way of example, assume that on a particular scan the system sees a demand before it sees an available car. As soon as the demand is seen the signal $\overline{DEM}$ will go to ZERO. It can be seen by referring to the circuit diagram that all of the other signals maintain the same values that they had at the beginning of the scan for the time being. It will be remembered from the discussion of the Q circuit that if the signal Q equals ZERO when the signal $\overline{DEM}$ goes to ZERO, Q will remain equal to ZERO for the rest of the scan. Under these circumstances the only signal that can change is the signal BAVM.

Assume that the scanner continues scanning past floors and that it comes to a floor at which an available car is located so that the signal BAVM now goes to ONE. At the same time signal $\overline{BAVM}$ goes to ZERO. As was just stated the signal Q is ZERO therefore, the signal F80 goes to ONE which makes the signal F100 go to ZERO. With the signal BAVM equal to ONE the signal F20 goes to ONE making the reverse signal $\overline{F20}$ equal to ZERO. The signal F110 is held equal to ZERO by the signal $\overline{Q}$ and hence all of the upper inputs to the MEMORY D1,17 are ZERO. However, since the signal F80 is now equal to ONE the signal F30 goes to ONE. This latter signal holds the signal F60 equal to ZERO and $\overline{F60}$ equal to ONE which it can be seen will maintain F70 equal to ONE. On the other hand, the signals F10 and therefore F40 remain equal to ZERO and since $\overline{DEM}$ and $\overline{BAVM}$ both also equal ZERO, all of the inputs to the NOR element D2,13 are equal to ZERO and the signal $\overline{F50}$ will go to ZERO. Therefore, the signal $\overline{F50}$ now equals ZERO and the signal F70 remains equal to ONE. It is when one of these signals goes to ZERO that a car has been designated to serve a demand. Cars will only be assigned to serve corridor calls for service in the direction of scan; however, the car may have to travel in the opposite direction to reach the call in which case, as in the example justed considered, the signal $\overline{F50}$ will go to ZERO. If the car is standing at the floor at which the corridor call to which it is assigned is registered, it is also the signal $\overline{F50}$ which effects assignment. On the other hand, if the car must travel in the direction of scan to reach the corridor call to which it is assigned, the signal F70 will go to ZERO.

When a car is assigned to a demand, the signal $\overline{DEM}$ will go back to ONE thereby blocking the signals $\overline{F50}$ and F70 from going to ZERO. Remember that when this occurs the signal $\overline{DEM}$ will remain equal to ONE for the remainder of the scan to prevent the assignment of more than one car per scan.

Assume now that on a particular scan the scanner sees an available car before it sees a demand. Remember that at the beginning of the scan, all of the F signals except $\overline{F50}$, F70 and F100 are equal to ZERO. When an available car is seen the signal BAVM goes to ONE and $\overline{BAVM}$ goes to ZERO. It should be remembered from the discussion of the Q circuit that when the system sees an available car before $\overline{DEM}$ goes to ZERO the signal Q will go to ONE. The only effect on the circuit at this point is that with the signal $\overline{Q}$ equal to ZERO and, as was mentioned with the signal F10 also equal to ZERO, the signal F110 will go to ONE.

When the scanner advances to the floor beyond the position of the available car and the Q circuit starts counting, the signal BAVM will go to ZERO so that the signal F90 goes to ONE. However, the signal F30 will remain equal to ONE because the signals F110, $\overline{F20}$ and $\overline{DEM}$ all equal ONE. Now when the scanner comes to a floor at which a demand exists and the signal $\overline{DEM}$ goes to zero, the signal F20 will go to ONE since the signal Q still equals ONE. With the signal F90 equal to ONE the signal F100 equals ZERO so even though the signals $\overline{F20}$ and $\overline{DEM}$ now equal ZERO the signal F10 remains equal to ZERO. Therefore, the signal F110 remains equal to ONE to hold F30 equal to ZERO. At this point, the signal $\overline{BAVM}$ maintains the signal $\overline{F50}$ at the value of ONE. With F30, $\overline{F20}$, $\overline{DEM}$ and BAVM all equal to ZERO the signal $\overline{F70A}$ equals ZERO, and since the signal Q equals ZERO. However, since the signal $\overline{SET}$ equals ONE, the signal $\overline{F70A}$ equals ZERO, and since the signal Q equals ONE the signal $\overline{F70B}$ equals ONE, so that the signal F70 remains equal to ONE. Therefore, under these circumstances, it is not yet clear which car is the closest car to the demand and the decision to assign a car will be delayed.

The important matter now is whether the signal Q goes to ZERO before the signal BAVM goes to ONE. Let us assume for the moment that before another available car is seen the signal Q goes to ZERO. In other words, assume that the scanner has counted the same number of floors beyond the point where it saw the demand as the first available car it saw was before the demand. Under these circumstances then the first car was the closest car and the decision can now be made to start the car. When Q goes to ZERO it will have no effect on the signal $\overline{F20}$ which will remain equal to ZERO. When the signal $\overline{Q}$ goes to ONE the signal F110 goes to ZERO, however, F30 will remain equal to ZERO since both the signals F80 and F90 will now be equal to ZERO. Therefore the signal $\overline{F60}$ remains equal to ZERO, but with the signal Q now equal to ZERO, the signal $\overline{F70B}$ goes to ONE causing the signal F70 to go to ZERO. As will be seen shortly, this signal will be effective to start the first available car seen traveling in the direction of scan to serve calls in the direction of scan.

Assume however, that an available car is seen while the signal Q still equals ONE. This will cause the signals F80 and F90 to go to ZERO so that the signal F30 will remain equal to ZERO. The signal $\overline{F30}$ in turn will remain equal to ONE so that F40 stays equal to ZERO. Since $\overline{DEM}$ is equal to ZERO, and now $\overline{BAVM}$ is equal to ZERO, the signal $\overline{F50}$ will go to ZERO. This signal, it will be seen, will be effective to start the second available car detected in the direction opposite to that of the scanner to serve the demand. In other words the car past the demand is closer to the floor at which the demand is registered. With Q equal to ONE and $\overline{SET}$ equal to ONE the signal F70 remains equal to ONE. If the signal Q goes to ZERO at the same floor that the signal BAVM goes to ONE this is an indication that the car seen before the demand and the car now being scanned are both the same distance from the demand but on opposite sides of it. Under these circumstances either one could be selected to answer the call, however, it can be seen by following the signals generated by the circuit illustrated for the preferred embodiment of the invention that the second car is preferred. Therefore with the signal BAVM equal to ONE, the signal F60 goes to ZERO making the signal $\overline{F60}$ equal to ONE so that even though Q goes to ZERO the signal $\overline{F70B}$ remains equal to ZERO so that F70 remains equal to ONE. At the same time, since the signals F40, $\overline{DEM}$ and now $\overline{BAVM}$ are equal to ZERO, the signal $\overline{F50}$ will go to ZERO.

One situation remains, and that is where an available car is seen, then a demand and then the scan is completed before the Q circuit quotas out or another available car is detected. Obviously, the available car in front of the demand is the closest. Under these circumstances, as shown above, $\overline{F60}$ will equal ZERO and when $\overline{SET}$ goes to ZERO, $\overline{F70A}$ will go to ONE to cause F70 to go to ZERO.

The preferred embodiment of the invention is so designed that in assigning an available car to a demand the system will always start the last available car seen by the scanner up to that point in the scan. For instance, if the scanner sees the demand first and then sees an available car, that car is the last available car seen up to this point by the scanner. It is also the closest available car and therefore should be dispatched to serve the demand. Likewise, if an available car is seen before the demand and the Q circuit counts out indicating that it has gone as many floors beyond the demand without seeing another available car as the last available car seen was before the demand, it will start that last available car. It is obvious also if an available car is seen then a demand and a second available car is seen closer to the demand it is the last available car seen by the scanner.

An available car may be located in one of three positions with respect to a demand at the time that it is assigned to the demand. First, as far as the scanner is concerned, it may be in front of the demand and therefore must be in the same direction as the scan to reach the demand, second, it may be behind the demand with respect to the direction of the scan so that the car will have to travel in the direction opposite that of the scan to serve the demand or in the third case the car may be at the floor at which the demand is registered. Under the latter circumstances, the car does not have to travel at all but the doors must be open since arbitrarily according to this invention, the doors of an elevator car close when it is standing available. Only the circuits for the elevator car A are shown and will be described, however, circuits for the B car and the C car will be identical except the input signal $\overline{LAV-a}$ will be replaced by $\overline{LAV-b}$ and c, respectively.

As was shown above, if the available car is located at the floor at which the demand is located, the signal $\overline{F50}$ goes to ZERO. Since the car is at the floor at which the demand is located the signal $\overline{DEMP}$ will equal ZERO. Since we are assuming here that it is the A car, the signal $\overline{LAV-a}$ will equal ZERO indicating that it was the last available car seen. If the scanner was scanning up when it discovered the corridor call which caused the signal $\overline{DEMP}$ to go to ZERO, the signal $\overline{S-UP}$ will also go to ZERO. Under these circumstances all the inputs to the NOR element D6,15 equal ZERO so that the signal U42U-a will go to ONE. This signal will be effective to open the doors and prepare the car for up travel since it was an up corridor call which created the demand. If it was a down corridor call which creates the demand so that $\overline{DEMP}$ goes to ZERO while the signal $\overline{S-DN}$ is equal to ZERO, then all the inputs of the NOR element D6,10 will be ZERO and the signal D42D-a will equal ONE so that the doors will open and the car will be prepared for down travel.

It will be remembered from the discussion of the sequential circuit above that if the scanner sees an available car, then a demand and then quotas out before seeing another available car that the signal F70 will go to ZERO. Under these circumstances, the car seen before the demand should be dispatched in the direction of scan to serve corridor calls in that direction. If the scan is up so that the signal $\overline{S-UP}$ equals ZERO and the A car is the available car below the up demand, this car should be started in the up direction. Since all of the inputs to the NOR element D2,15 will equal ZERO under these conditions, the signal U81U-a will equal ONE indicating that the A car should be started in the up direction to serve an up demand. Conversely, if this occurred on a down scan, the A car should be started in the down direction to serve a down demand. Under these conditions, the signal $\overline{S-DN}$ equals ZERO so that all the inputs of the NOR elements D2,10 will equal ZERO to make the signal D81D-a equal to ONE.

If the sequential circuit determines that the car below a down demand is closest to the demand, the signal $\overline{F50}$ goes to ZERO on the down scan. Since the car is not at the floor at which the car call which created the demand is registered, the signal DEMP will also equal ZERO. Therefore, all of the inputs to the NOR element D6,17 will be equal to ONE to make the signal D81U-a equal to ONE. This will start the car A in the up direction to serve the down demand. If on the other hand, the system determines on the up scan that the A car is the closest car above an up demand, all the inputs to the NOR element D7,13 will be equal to ZERO so that U81D-a will go to ONE to start the A car traveling down for the up demand.

FIG. 16

Figure 16:
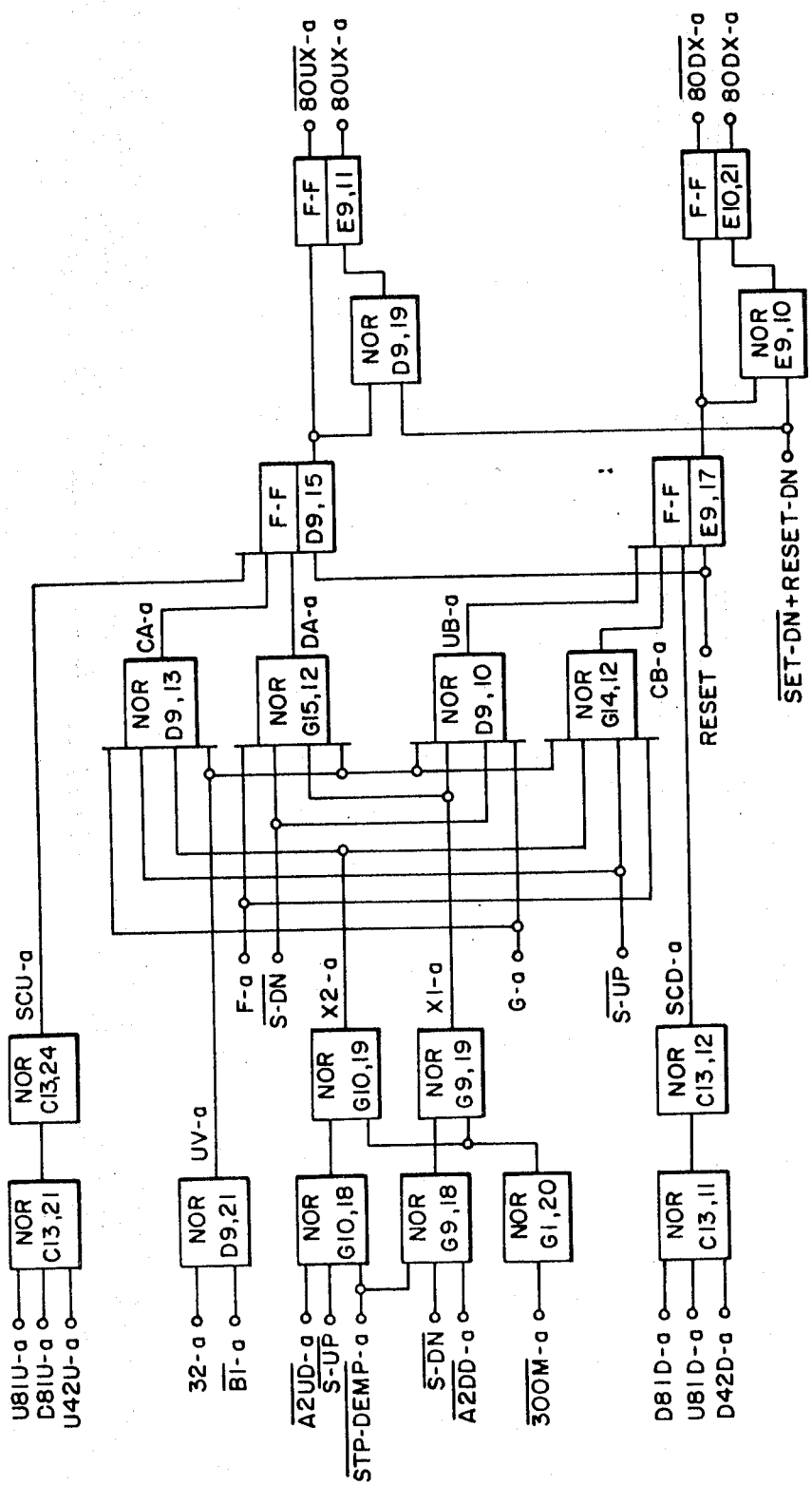

FIG. 16 illustrates the circuit for generating the signals 80UX-a and 80DX-a. These signals are the car call and demand direction signals for the up and down directions respectively. They are effective to give a car direction in response to car calls and to the assignment of the car to a demand. The circuits shown are individual per car and again appropriate circuits for the A car are illustrated. The circuits for the B car and C car are identical except that the inputs are those associated with the particular car.

The signal 80UX–$a$ is generated at the lower output of the MEMORY E9,11 while the reverse signal $\overline{80UX}$–$a$ is generated at the upper output of the same MEMORY. This MEMORY has a lower input which is the output of the NOR element D9,19 and an upper input which is the lower output of the MEMORY D9,15. This latter signal serves as an input along with the signal $\overline{SET-DN}$+RESET-DN for the NOR element D9,19. The lower input to the MEMORY D9,15 is the RESET signal. There are three upper inputs to this MEMORY; SCU–$a$, CA–$a$ and DA–$a$.

The signal SCU–$a$, start the car up, is derived from the output of the NOR element C13,23 which has as its input the output of the NOR element C13,21. This latter NOR element has three input signals derived from the circuit for starting the closest available car which appears in FIG. 15. Signal U81U–$a$ goes to ONE if the A car is assigned to up corridor calls and it is below the up corridor call creating the demand. The signal D81U–$a$ goes to ONE if the elevator car A is assigned to a down demand and it is below the down corridor call creating the demand. On the other hand, if the A car is assigned to up corridor calls and it is standing available at the floor at which the corridor call which creates the demand is registered, the signal U42U–$a$ will go to ONE. Under any of these conditions the elevator car A should be set for up travel and therefore the signal SCU–$a$ will go to ONE.

When SCU–$a$ goes to ONE, the lower output of the MEMORY D9,15 will go to ONE which in turn will cause the signal 80UX–$a$ to go to ONE. Once the A car is assigned to a demand it will lose its availablity and the signal which caused the signal SCU–$a$ to go to ONE will return to ZERO. When the RESET interval is reached, the lower output of the MEMORY D9,15 will be returned to ZERO. However, the signal 80UX–$a$ will not be returned to ZERO at this time. This is because the signal $\overline{SET-DN}$+RESET-DN will only go to ZERO during the SET-DN interval. That is, only during the SET-DOWN interval will the lower input of the NOR element D9,19 go to ZERO.

Assume that the A car is assigned to serve up corridor calls above. The signal SCU–$a$ is made equal to ONE by the signal U81U–$a$ on the up scan. Therefore, even though during the RESET-UP interval the lower output of the MEMORY D9,15 is made equal to ZERO, the signal $\overline{SET-DN}$+RESET-DN remains equal to ONE so that the signal 80UX–$a$ cannot be reset to ZERO. However, during the SET-ON interval the signal $\overline{SET-DN}$+RESET-DN goes to ZERO. Since at this time the lower output of the MEMORY D8,15 is also equal to ZERO, the output of the NOR element D9,19 will go to ONE to return the signal 80UX–$a$ to ZERO. If the A car is assigned to serve a down demand where it is to be started in the up direction since it is below the highest down corridor call creating the demand, the signal D81U–$a$ goes to ONE on the down scan to make 80UX–$a$ equal to ONE. Under these conditions during the SET-DN interval the lower output of the MEMORY D9,15 is still equal to ONE when the signal $\overline{SET-DN}$+RESET-DN goes to ZERO so that the signal 80UX–$a$ is not reset. It is not until the next advance of the scanner, that the RESET signal goes to ONE and the lower output of the MEMORY D9,15 goes to ZERO. It can be appreciated here why the signal $\overline{SET-DN}$+RESET-DN was generated. As was mentioned previously, this signal has almost the same time characteristic as the $\overline{SET-DN}$ signal as shown in FIG. 2. However, it can be seen that if the $\overline{SET-DN}$ signal is slow to return to a value of one when the scanner advances to the RESET interval both inputs to the NOR element D9,19 will momentarily be equal to ZERO which would cancel the 80UX–$a$ signal. However, with the RESET-DN signal combined with the $\overline{SET-DN}$ signal, false cancellation of the 80UX–$a$ signal is eliminated. Even though the signal D81U–$a$ returns to ZERO as soon as the car loses its availability the signal 80UX–$a$ will remain equal to ONE at least through the next entire up scan and down scan.

The signal CA–$a$ which can also cause 80UX–$a$ to go to ONE will be equal to ONE if all four of the inputs to the NOR element D9,13 are equal to ZERO. The signal UV–$a$ is generated at the output of the NOR element D9,21 which has as its two inputs the signals 32–$a$ and $\overline{B1}$–$a$. The signal 32–$a$ is the running signal and will equal ONE whenever the A car is running. For an understanding of how this signal is generated refer to the earlier filed patent identified above. The signal $\overline{B1}$–$a$ is equal to ONE except when the scanner is scanning at the floor at which the A car is located. Therefore, the signal UV–$a$ will equal ZERO unless the scanner is scanning at the floor at which the A car is standing. A second input to the NOR element D9,13 is the signal $\overline{S-UP}$ which equals ZERO during the up scan. The third input is the signal G–$a$ which is equal to ZERO if the scanner is scanning at or past the car in the direction of scan, in this case the A car. The fourth input of the NOR element D9,13 is the signal X2–$a$.

The signal X2–$a$ will be equal to ZERO under two circumstances. First, when the scanner is scanning at a floor at which a car call is registered for the A car, the signal $\overline{300M}$–$a$ will be equal to ZERO. This signal will make the output of NOR element G1,20 equal to ONE, so that the signal X2–$a$ will equal ZERO. Secondly, the signal X2–$a$ will be equal to ZERO if the output of the NOR element G10,18 is equal to ONE. This will occur during the up scan (when $\overline{S-UP}$ equals ZERO) if the A car is assigned to travel down to serve up demands ($\overline{A2UD}$–$a$ equals ZERO) when the scanner comes to the floor at which the up corridor calls is registered which the system wants the A car to stop for ($\overline{STP-DEMP}$–$a$ equals ZERO). It should be appreciated that for the signal CA–$a$ to go to ONE the signal X2–$a$ must go to ZERO when the other inputs in the NOR element D9,13 go to ZERO. Therefore CA–$a$ will go to ONE during the up scan when the scanner sees a car call above the car or when the scanner sees the downwardly traveling A car at a floor at which it is to stop for an up call.

The signal DA–$a$ will equal ONE if all the inputs to the NOR element D15,12 equal ZERO. As mentioned above, the signal UV–$a$ will equal ZERO if the car is running or if the scanner is not scanning at the floor at which the car is stopped. With the scanner scanning in the down direction, the signal $\overline{S-DN}$ will equal ZERO and if it has not yet passed the A car the signal F–$a$ will equal ZERO. Lastly, the signal X1–$a$ must equal ZERO. This will occur if either of the inputs to the NOR element G9,19 are equal to ONE. The output of the NOR element G1,20 will cause X1–$a$ to go to ZERO if the scanner is scanning at a floor at which a car call is registered for the A car ($\overline{300M}$–$a$ equals ZERO). In addition, X1–$a$ will go to ZERO if all of the inputs to the NOR element G9,18 are equal to ZERO. This will occur on a down scan ($\overline{S-DN}$ equals ZERO) if the car is assigned to travel up to serve down demands ($\overline{A2DD}$–$a$ equals ZERO) when the scanner comes to the floor at which the down corridor call which the system wants the A car to stop for is registered (STP-DEMP–$a$). In other words, the signal DA–$a$ will go to ONE during the down scan if a corridor call is registered in the A car for a floor at or above the position of the A car or if the A car is assigned to travel up to serve down demands and the car is below the floor at which the down call which creates the demand is registered.

It can be seen from these circuits of FIG. 16 that if the car is running for a car call above or is running up to serve down corridor calls that the signal 80UX–a will remain equal to ONE as long as the car sees a call to run to. The importance of this will be evident later when it will be seen that the car will stop if it does not see a call to run to.

The signal 80DX–a is generated in a similar manner when the A car is to travel in the down direction. The circuits in FIG. 16 which generate this signal can be understood once the 80UX–a circuit have been mastered. If the A car is to be started in the down direction to serve a down demand (D81D–a equals ONE) or serve an up demand which is below the car (U81D–a equals ONE) or if the car is assigned to a down demand at the floor at which it is located (D42D–a equals ONE), then the signal SCD–a (start the car down) will go to ONE to cause the signal 80DX–a to equal ONE. If during the down scan ($\overline{\text{S-DN}}$ equals ZERO) when the scanner is scanning at the position of the A car (G–a equals ZERO) and the car is running (32–a equals ONE) or anytime the scanner is scanning below the car (G–a equals ZERO, $\overline{\text{B1}}$–a equals ONE) and it sees a car call registered for the A car ($\overline{\text{300M}}$–a equals ZERO) the signal UB–a will equal ONE. This will also cause the signal 80DX–a to go to ONE. The signal UB–b will also go to ONE on the down scan if the A car is assigned to travel up to serve down demands ($\overline{\text{A2DD}}$–a equals ZERO) when the scanner sees the A car (G–a goes to ZERO) at the floor at which it is to stop and reverse direction to serve down corridor calls ($\overline{\text{STP-DEMP}}$–a equals ZERO).

In addition, the signal 80DX–a can be made equal to ONE by the signal CB–a. If during the up scan ($\overline{\text{S-UP}}$ equals ZERO) while the scanner is at or below the elevator car A (G–a equals ZERO) it sees a car call registered for the A car ($\overline{\text{300M}}$–a equals ZERO), CB–a will go to ONE. Also, the signal CB–a will go to ONE on the up scan causing the signal 80DX–a to go to ONE, if the A car is assigned to up demands ($\overline{\text{A2UD}}$–a equals ZERO), when the scanner comes to the floor at which the up call which the system wants the A car to stop for is registered ($\overline{\text{STP-DEMP}}$–a equals ZERO).

It should be noted that the signal CB–a and UB–a as well as CA–a and DA–a will only equal ONE at the particular floor at which all of the appropriate conditions are met. Therefore, during RESET interval the lower output of the MEMORIES E9,17 and D9,15 are both set at ZERO. Like the signal 80UX–a, the signal 80DX–a will not be reset to ZERO when the output of the MEMORY element E9,17 first goes to ZERO. However, if during the next down scan the lower output of MEMORY E9,17 is not again made equal to ONE by one of the upper input signals, then during the SET-DN interval when the signal $\overline{\text{SET-DN}}$+RESET-DN goes to ZERO the signal 80DX–a will be reset to a value of ZERO. Again if the car is serving a car call below it or is assigned to travel down to serve an up call, the signal UB–a or CB–a must go to ONE during the down scan or up scan respectively so that the signal 80DX–a remains equal to ONE. This is an indication to other parts of the system that the car still has a call to run to.

FIG. 17

This figure illustrates the circuits for generating the corridor call above and below signals, the up and down travel signals and the master travel signal.

The signal $\overline{\text{78U}}$–a which is the no corridor call above the car signal is normally equal to ONE. It is generated at the upper output of the MEMORY F1,21 which has as an upper input the lower output of the MEMORY D10,10 and as a lower input the output of the NOR element D10,12. This NOR element has as an input the lower output of the MEMORY D10,10 and the signal $\overline{\text{SET-DN}}$ + RESET-DN. The MEMORY D10,10 has one lower input which is the signal RESET-DN and three upper inputs which include the signals U1, U2 and U3. U1 is produced at the output of the NOR element G3,9 which has as its inputs the signals $\overline{\text{MUDCC(X)}}$, $\overline{\text{S-UP}}$ and $\overline{\text{SF}}$–a. The signal U2 is produced at the output of the NOR element D10,17 which has as its inputs the signals $\overline{\text{100M}}$, $\overline{\text{B}}$–a and the signal Y. The signal U3 is similarly produced from the output of the NOR element D10,15 which has as its inputs the signals $\overline{\text{F}}$–a, $\overline{\text{MCC}}$ and Y. The signal Y is produced by the NOR element D6,18 which has as its input the output of the NOR element D10,19. This latter NOR element has as inputs the signals $\overline{\text{S-UP}}$, R2D–a and AV–a.

If no corridor calls are registered at floors at or above the position of the A car, then during the RESET-DN interval the output of the MEMORY D10,10 will go to ZERO. If through the next up and down scan none of the signals U1 through U3 go to ONE, then when the SET-DN interval is reached the signal $\overline{\text{SET-DN}}$+RESET-DN will go to ZERO so that the NOR element D10,12 will supply a signal to the lower input of the MEMORY F1,21 to make the signal $\overline{\text{78U}}$–a equal to ONE. As was mentioned previously, the signal $\overline{\text{SET-DN}}$+RESET-DN is equal to ONE at all times except during the SET-DN interval. Therefore this is the only time that the signal $\overline{\text{78U}}$–a can be made equal to ONE.

If during the up scan ($\overline{\text{S-UP}}$ equals ZERO) when the scanner has scanned past the A car serving in the up direction ($\overline{\text{SF}}$–a equals ZERO), an up corridor call is reached which the system wants the A car to see ($\overline{\text{MUDCC(X)}}$ equals ZERO), then the signal U1 will go to ONE. This will cause the lower output of the MEMORY D10,10 to go to ONE which will cause the signal $\overline{\text{78U}}$–a to go to ZERO indicating that there is an up corridor call above the A car serving up calls.

There is another situation where the signal $\overline{\text{78U}}$–a will go to ZERO. It is a unique feature of this invention that if a car is running up to serve a down demand above it and that demand is canceled by another car, the first-mentioned car will continue to travel up and stop at the next down corridor call that it sees. If there are no such calls then the car will change its assignment, continue traveling up and stop at any up corridor calls that it sees above. In other words, the car will continue traveling in the up direction as long as it will be of use in doing so.

The flexibility of the system is illustrated by the fact that cars can be individually removed from service and be run independently. At times it may be desirable to have one car running 2BC, two-button collective, in the manner in which cars were run in some earlier relay systems. This system of control is well known in the art. Under this type of control the car must also be given direction. Since the car is removed from service, the signal $\overline{\text{SF}}$–a will remain equal to ONE at all times so that direction cannot be generated by generation of the signal U1. To give the car direction under these circumstances, the signal Y will go to ZERO during the up scan ($\overline{\text{S-UP}}$ equals ZERO) when the car is not running to a demand (R2D–a equals ZERO) and is not available (AV–a equals ZERO). If an up corridor call is then registered ($\overline{\text{100M}}$ equals ZERO) at the floor at which the car is located ($\overline{\text{B}}$–a equals ZERO), the signal U2 will equal ONE to give the up direction to the A car. In addition, if the system sees either an up or down corridor call ($\overline{\text{MCC}}$ equals ZERO), during the up scan when the scanner has passed the A car ($\overline{\text{F}}$–a equals ZERO), then the signal U3 will go to ONE to cause the signal $\overline{\text{78U}}$–a to go to ZERO. In other words, when the car is out of service, the call above signal $\overline{\text{78U}}$–a will equal ZERO if there is an up call registered at the floor at which the car is located or if there is an up or down corridor call registered at a floor above the car.

The corridor call below the signal $\overline{78D}$-a is generated in a similar manner from the upper output of MEMORY F1,11. The upper input to this MEMORY is the signal generated at the lower output of the MEMORY F1,17. This latter signal along with the signal $\overline{SET\text{-}DN}$+ RESET-DN serves as an input to the NOR element F2,21 the output of which is the lower input of the MEMORY F1,11. The lower input of the MEMORY F1,17 is the signal RESET-DN. The MEMORY F1,17 has three upper inputs; D1, D2 and D3. If the scanner is scanning down ($\overline{S\text{-}DN}$ equals ZERO) below the A car which is serving in the down direction ($\overline{SF}$-a equals ZERO) and the system sees a down corridor call which it wants the A car to see ($\overline{MUDCC(X)}$ equals ZERO) all of the inputs of the NOR element G3,18 will equal ZERO and therefore the signal D1 will go to ONE. This will set the lower output of the MEMORY F1,17 equal to ONE which will make the signal $\overline{78D}$-a equal to ZERO.

Once again, if the car is operating 2BC means must be provided to indicate that these is a call below the car. As described above, if the car is operating 2BC the signal Y will equal ZERO. Notice that this occurs on the up scan. Since the scanner is scanning up the signal $\overline{G}$-a will equal ZERO if the scanner is still below the car. If the scanner sees either an up or down corridor call, the signal $\overline{MCC}$ will go to ZERO. This will cause the signal D3 to go to ONE and thereby make $\overline{78D}$-a equal to ZERO. If while serving 2BC a down corridor call is registered at the floor at which the A car is located ($\overline{200M}$ and $\overline{B}$-a both equal ZERO) all of the inputs to the NOR element F1,15 will equal ZERO and D2 will go to ONE. This will also be effective to cause the signal $\overline{87D}$-a to go to ZERO.

The signal 81U-a is the up travel signal which commands the power controller to run the drive motor so that the car is moved in the upward direction. The circuits through which this is effected may be the same as those illustrated in the incorporated application. For instance, the reverse signal $\overline{81U}$-a can serve as an input in the circuit for energizing the auxiliary go up relay GUA, shown in FIG. 4D of the incorporated application.

The signal 81U-a is generated at the output of the AMPLIFIER E8,23 from the output of the NOR element E9,24. The NOR element E9,19 generates the reverse signal $\overline{81U}$-a. The NOR element E9,24 has three inputs; 81DX-a, which it will be seen is effective to stop the car when it is traveling up for down calls, the signal 81D-a, which is a blocking signal to prevent generation of signals 81U-a and 81D-a at the same time, and the upper output of the MEMORY D9,17. The two upper inputs of the MEMORY D9,17 are the signals 80UX-a and the output of the NOR element E9,21. This last-mentioned NOR element has four input signals; $\overline{78U}$-a, $\overline{81US}$-a, STAV-a and 77-a. The two lower inputs to the MEMORY D9,17 are the signals RDC-a and $\overline{81H}$-a.

Since the signal 81DX-a only goes to ONE when the A car is traveling in the up direction and it is to stop for a down corridor call, this signal is normally equal to ZERO. Assuming that the car has not already been given the signal to run in the down direction, the signal 81D-a will be equal to ZERO. If under these circumstances the upper output of the MEMORY D9,17 is also equal to ZERO, the signal 81U-a can go to ONE. Once the signal 81U-a is generated the signal 81D-a cannot go to ONE.

As was seen in the description of FIG. 16, the signal 80UX-a will go to ONE if the A car has a car call registered in the car for a floor above the position of the car, or if the car is assigned either to up corridor calls at or above the position of the car or to down corridor calls which are above the car. Under any of these conditions, the signal 80UX-a will cause the upper output of the MEMORY D9,17 to go to ZERO thus giving the indication that the A car should travel in the up direction.

If the A car is set for up travel ($\overline{81US}$-a equals ZERO), is serving in the up direction and sees up corridor calls above it ($\overline{78U}$-a equals ZERO), is not instructed to stop and become available (STAV-a equals ZERO) and the car is not running up to serve down calls nor is it instructed to bypass because of load (77-a equals ZERO) then the output of the NOR element E9,21 will be ONE to cause the signal 81U-a to go to ONE.

The upper output of the MEMORY D9,17 may be made equal to ONE so that the signal 81U-a will go to ZERO if either of the lower inputs to the MEMORY equal ONE while both upper inputs to the MEMORY are ZERO. The signal RDC-a will go to ONE if both of the inputs to the NOR elements H3,19, the signals $\overline{32}$-a and 34-a, equal ZERO. The signal 34 is the stopping signal and therefore equals ZERO except during the stopping sequence. The generation of this signal will be discussed below. The signal $\overline{32}$-a is the reverse of the running signal 32-a. These signals are generated in any suitable manner such as that in which the corresponding signals are generated in FIG. 4D of the incorporated application. The signal $\overline{32}$-a equals ZERO whenever the elevator drive motor is receiving power. It is quite obvious then that the signal RDC-a will equal ONE any time the car is running and it does not have a stop signal (34-a equals ZERO). When this signal equals ONE, it attempts to make the upper output of the MEMORY element D9,17 equal to ONE which would cause the signal 81U-a to go to ZERO. It is clear then that this signal is attempting to cancel the up travel order any time that the car is running. However, it will be remembered that the characteristics of the MEMORY herein used are such that if one of the upper inputs is equal to ONE, the upper output may stay at ZERO regardless of what the lower input is. Therefore, as long as the signal 80UX-a or the output of the NOR element E9,21 is equal to ONE the upper output of the MEMORY D9,17 will stay equal to ZERO. One of these two upper inputs will stay equal to ONE as long as the car has someplace to go. If the A car no longer has any car or corridor calls to serve so that the signal 80UX-a and the output E9,21 are both equal to ZERO, the signal RDC-a will cause the signal 81U-a to go to ZERO. This in turn will cause the car to stop and become available.

Once a car receives a stop signal, the signal 34-a goes to ONE. This causes the signal RDC-a to go to ZERO and therefore become ineffective to cancel the up travel signal. However, a second canceling signal, $\overline{81H}$-a, is effective under certain conditions to cancel the up travel signal when the car is stopped. The signal $\overline{81H}$-a is derived from the output of the NOR element H3,30 which has as its inputs the signals $\overline{41}$-a and 70-a. The signal 70-a is the non-interference signal referred to earlier and is equal to ONE any time the car is running and for a predetermined time after the car stops. When the predetermined time expires, the signal goes to ZERO. The signal is used to permit the time for the doors to open and passengers to exit or enter and register their calls before the system makes a decision about what to do with the car. It can also be arranged so that the signal 70 will go to ONE whenever a light beam across the entranceway to the car is interrupted by a passenger. The signal $\overline{41}$-a is associated with door opening and is equal to ONE any time the doors are not fully closed.

Assume that the car is running so that the signal 70-a equals ONE, thereby making the signal $\overline{81H}$-a equal to ZERO. When the A car receives a stop signal the signal RDC-a will go to ZERO but the signal 70-a will remain equal to ONE to maintain $\overline{81H}$-a equal to ZERO for a predetermined time. In other words, during this period when the car is stopping, no canceling signal is generated and hence the travel direction is maintained. As the doors start to open, the signal $\overline{41}$-$a$ goes to ONE. Therefore, even though the non-interference time eventually expires, the signal $\overline{81H}$-$a$ remains equal to ZERO. When the non-interference times does expire, the doors will begin to close and when they are fully closed the signal $\overline{41}$-$a$ will go to ZERO so that the signal $\overline{81H}$-$a$ will go to ONE. Therefore, if the A car while traveling in the up direction stops for an up corridor call, the up travel indication is maintained temporarily. If a passenger does not enter the car and register a car call for a floor above, or there are no more up corridor calls above, then when the doors close the car will become available and the up direction will be canceled.

The signal 81D-$a$ is the down travel signal which commands the power controller to run the car in the down direction when it equals ONE. It is derived from the output of the NOR element E10,13 through the AMPLIFIER E6,22. The reverse signal $\overline{81D}$-$a$ is generated by the NOR element E10,19. The NOR element E10,13 has three inputs; the signal 81U-$a$, the signal 81UX-$a$ and the upper output of the MEMORY E10,17. If all of these inputs are equal to ZERO the signal 81D-$a$ will equal ONE. The 81U-$a$ input is provided to prevent the system from generating both the up and down travel signals simultaneously. The signal 81UX-$a$ is equal to ZERO except when the A car which is traveling in the down direction notches into the floor at which it is to stop for an up corridor call.

The upper output of the MEMORY E10,17 is equal to ZERO under similar circumstances for a car traveling in the down direction as was the upper output of the MEMORY E9,17 for a car traveling in the up direction. In other words as long as one of the two upper inputs of the MEMORY E10,17, either 80DX-$a$ or the output of the NOR element E9,13 is equal to ONE, the upper output will equal ZERO. This upper output will remain equal to ZERO even if the upper inputs return to ZERO unless one of the lower inputs equals ONE. The upper input 80DX-$a$ is equal to ONE when the car is to start traveling in the down direction, when a car call for a floor below the position of the car is registered or when the car is to run down for an up call below. The output of the NOR element E9,13 is equal to ONE whenever the A car which is set for down travel ($\overline{81DS}$-$a$ equals ZERO) is serving corridor calls in the down direction and there is a down corridor call below the position of the car ($\overline{78D}$-$a$ equals ZERO), is not instructed to stop and become available (STAV-$a$ equals ZERO) and the car is not running down to serve an up call nor instructed to bypass because of a full load (77-$a$ equals ZERO). The canceling signal RDC-$a$ as mentioned above is equal to ONE when the car is running and has not yet received a stop signal. Also, the canceling signal $\overline{81H}$-$a$ is equal to ONE when the car is stopped, the non-interference time has expired and the doors have reclosed.

If the A car, while serving corridor calls in either direction, is instructed to stop and become available despite corridor calls in front of it, the signal STAV-$a$ will go to ONE to cause the output of NORS E9,21 and E9,13 to go to ZERO as the car is stopped. Since as was described in connection with FIG. 7, the STAV-$a$ signal will cause the 70-$a$ signal to go to ZERO which in turn will prevent the doors from opening so that $\overline{41}$-$a$ remains equal to ZERO, the signal $\overline{81H}$-$a$ will go to ONE to cancel the direction signal as the car stops.

FIG. 18

This figure illustrates the circuits for generating the stopping signal and the door open signals. The circuits illustrated are for the A car, however, similar circuits are required for each car.

The signal 34-$a$ is the stopping signal which serves as a command to the power controller to initiate the stopping sequence. When 34-$a$ equals ONE stopping is initiated. Since for purposes of illustration the power controller of the incorporated application has been adapted to complete the system herein disclosed, circuits similar to those shown in FIGS. 2 and 4D of the incorporated application are suitable for effecting stopping of the car in response to the generation of the signal 34-$a$. Since any conventional means may be employed for stopping the car in response to the stopping signal, the circuits of the incorporated application are only referred to as one method of achieving this.

The signal 34-$a$ is generated from the output of the NOR element F4,19. The signal 34-$a$ generates the reverse signal $\overline{34}$-$a$ through the NOR element H5,12. The NOR element F4,19 has as an input the output of the NOR element F4,11. This latter NOR element has as one input the output of the NOR element F4,21. In addition, the NOR element F4,11 has three other inputs; the signal 45-$a$, the signal STAV-$a$ and the output of the NOR element F4,13. The signal $\overline{45}$-$a$ is the master door signal. It may be derived from a circuit similar to that of FIG. 4E of the incorporated application. This signal equals ONE when the doors are to be opened and is utilized to regenerate the stopping signal if the doors must be reopened after they have begun to close. The signal STAV-$a$ equals ONE when the car is to stop and become available without opening its doors and it is effective to hold the 34-$a$ signal once generated under these conditions. The two inputs to the NOR element F4,13 are the non-interference signal $\overline{70}$-$a$ and the reverse signal $\overline{34}$-$a$. The output of this NOR element is effective to hold the 34 signal once it has been generated under all other conditions not covered above, such as normal stops for car and corridor calls, until the non-interference time expires.

The NOR element F4,21 has as its intputs the output of the NOR element F2,51 and the output of the NOR element G12,9. The input to this latter NOR element is the signal 39-$a$. The signal 39-$a$ is a gating signal which may be derived from circuits similar to that shown in FIG. 4M of the incorporated application which generates the signal 39. To understand the purpose of this signal it must be realized that the floor selector utilized in the incorporated application is the notching type. That is, it advances in discrete steps to indicate the position of the elevator cars in the hatchway. Floor selectors which operate on this principal are well known in the art. In order to advance the indicated position of the floor selector it is conventional to utilize inductor plates mounted in the hatchway between the floors which impede currents in coils carried by the cars as they pass the inductor plates. Since it takes time and therefore distance in terms of car travel to stop a moving elevator car, the decision to stop the car must be made in advance of the arrival of the car at the desired stopping point. It is conventional to make this decision as the car passes the inductor plates or "notches" into a floor since this point is usually halfway between floors. The switching times of the solid state components utilized in this invention are instantaneous compared to the time it takes the elevator car to pass the inductor plates in the hatchway. Therefore, as soon as the notching signal is produced the logic circuits adjust to the new indicated position of the car and the system has adequate time to determine whether the car should be stopped at the floor it is approaching and if so, to generate the stopping signal. In very high speed installations it is sometimes necessary to generate a stopping signal several floors in advance of the floor at which it is desired to stop the car in order to maintain acceptable rates of deceleration. Under such circumstances schemes such as delaying the car position signals as discussed in the incorporated application are effective to provide the necessary lead yet are compatible with the stopping sequence herein described.

Figure 18A:
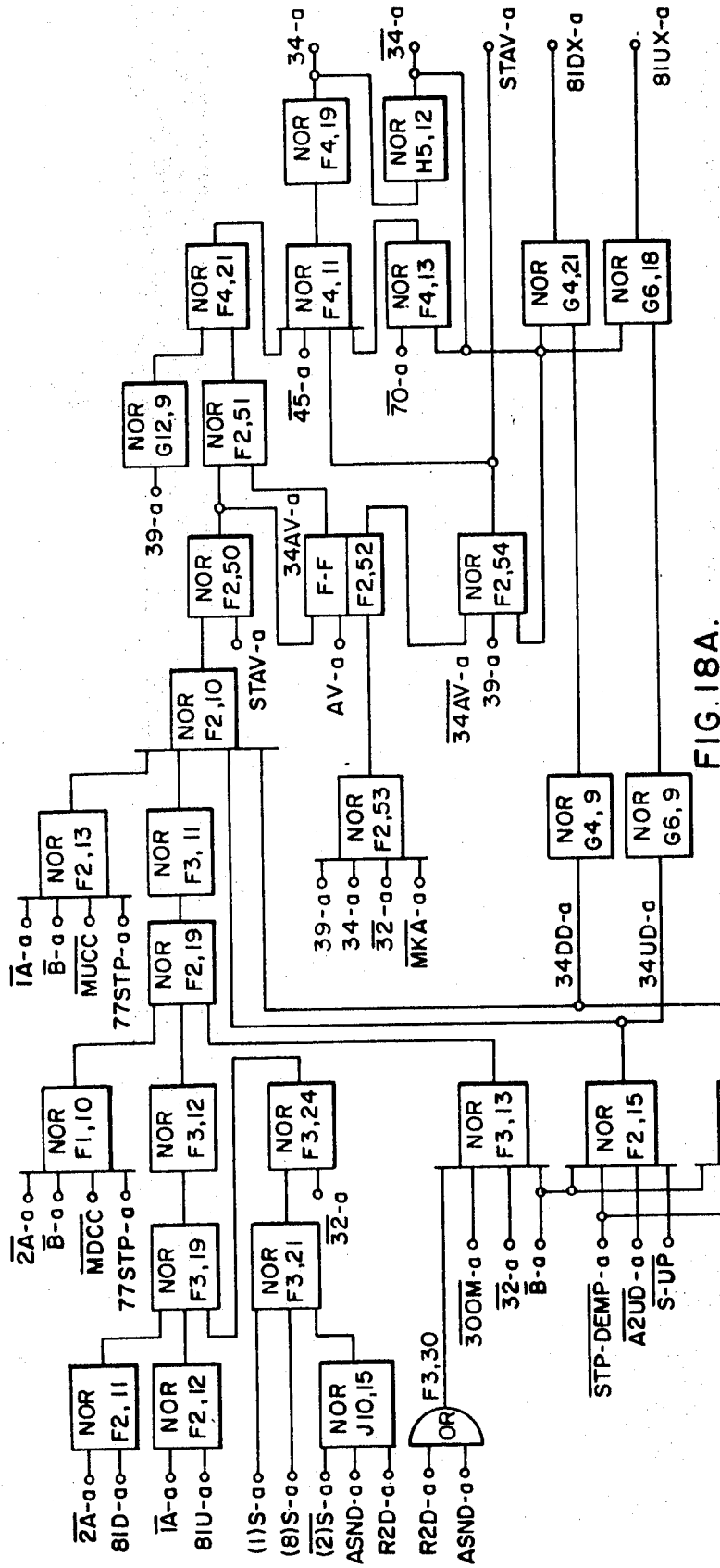
Figure 18B:
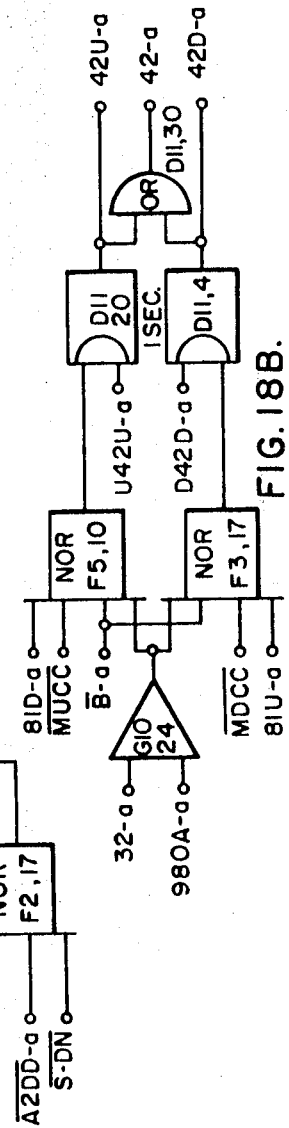

It can be seen from FIG. 18 that the gating signal 39-$a$ must be equal to ONE to make the output of the can generate the stopping signal 34–*a* by causing the output of the NOR element F2,10 to go to ZERO.

The NOR element F2,51 has two inputs. The first input is the output of NOR element F2,50 which in turn has as its inputs the signal STAV–*a* and the output of NOR element F2,10. The second input to NOR element F2,51 is the signal 34AV–*a* which is generated at the upper output of the MEMORY F2,52. This MEMORY has as its two upper inputs the signal AV–*a* and the output of NOR element F2,50, and as its lower input the output of NOR element F2,53. This latter NOR element has as its inputs the signals 39–*a*, 34–*a*, $\overline{32}$–*a* and $\overline{MKA}$–*a*. The lower output of the MEMORY F2,52 along with the signals 39–*a* and $\overline{34}$–*a* serve as inputs to the NOR element F2,54 which produces the signal STAV–*a*. The signals 34AV–*a* and STAV–*a* are normally equal to ZERO.

The NOR element F2,10 has four inputs. The first input is the output of the NOR element F2,13 which also has four inputs. These inputs include the signals $\overline{1A}$–*a*, $\overline{B}$–*a*, $\overline{MUCC}$ and 77STP–*a*.

The second input to the NOR element F2,10 is the output of the NOR element F3,11 which derives its input from the output of the NOR element F2,19. This latter NOR element has three inputs; the output of the NOR elements F1,10, F3,12 and F3,13. The NOR element F1,10 has four inputs; the signals $\overline{2A}$–*a*, $\overline{B}$–*a*, $\overline{MDCC}$ and 77STP–*a*. The NOR element F3,12 receives as its input the output of the NOR element F3,19. This latter NOR element has three inputs also; the output of the NOR elements F2,11, F2,12 and F3,24. The NOR elements F2,11 has two inputs; $\overline{2A}$–*a* and 81D–*a*. Conversely, the NOR element F2,12 has the signals $\overline{1A}$–*a* and 81U–*a* as inputs. The NOR element F3,24 has as its inputs the signal $\overline{32}$–*a* and the output of the NOR element F3,21. F3,21 has as its inputs the signals (1)S–*a*, (8)S–*a* and the output of the NOR element J10,15. The latter NOR element has as its inputs the signal $\overline{2S}$–*a*, ASND–*a* and R2D–*a*.

The third input to the NOR element F2,19 is the output of the NOR element F3,13. The NOR element F3,13 has as its inputs the signals $\overline{B}$–*a*, $\overline{32}$–*a*, $\overline{300M}$–*a* and the output of the OR element F3,30. The OR element utilized here is also a commonly used logic component. The characteristics of this component are such that if any of a plurality of the inputs are equal to ONE the output is equal to ONE. Only if all of the inputs are equal to ZERO is the output equal to ZERO. The two inputs to the OR element F3,30 are the signals R2D–*a* and ASND–*a*.

The third input to the NOR element F2,10 is the output of the NOR element F2,15. Inputs to this NOR element are the signals $\overline{B}$–*a*, $\overline{STP\text{-}DEMP}$–*a*, $\overline{A2UD}$–*a* and $\overline{S\text{-}UP}$. The fourth input to the NOR element F2,10 is the output of the NOR element F2,17 which also has four inputs. These inputs are the signals $\overline{B}$–*a*, $\overline{STP\text{-}DEMP}$–*a*, $\overline{A2DD}$–*a* and $\overline{S\text{-}DN}$. The output of the NOR element F2,15 also serves as the input to the NOR element G6,9, the output of which serves as an input to the NOR element G6,18. Another input to this NOR element is the signal $\overline{34}$–*a*. The output of the NOR element G6,18 is the signal 81UX–*a*. The signal 81DX–*a* is generated from the output of the NOR element G4,21, the inputs of which are the signals $\overline{34}$–*a* and the output of the NOR element G4,9. The input to this latter NOR element is the output of the NOR element F2,17.

As an aid in understanding the functioning of the 34–*a* circuit, assume that the elevator car A is running in the up direction so that the signal $\overline{1A}$–*a* equals ZERO. This signal is an indication that power is actually being supplied to the motor to run the car in the up direction. It can be generated by a circuit similar to that illustrated in FIG. 4B of the copending application. If the scanner is scanning at the floor at which the floor selector indicates that the A car is located, the signal $\overline{B}$–*a* will be equal to ZERO. As mentioned above, the floor selector notches into the new floor position as soon as the coil on the car reaches the inductor plate between floors. Hence, the signal $\overline{B}$–*a* can go to ZERO even though the car is actually only halfway to the new floor position. If there is an up corridor call registered at the floor that the selector has just notched into which the system wants the A car to see, the signal $\overline{MUCC}$ will equal ZERO. The signal 77STP–*a*, the origin of which will be discussed later, will equal ZERO unless the system wants the A car to bypass the particular call. Therefore, if the A car is running up and is at a floor at which a car call is registered which the system will permit the A car to stop for, the output of the NOR element F2,13 will go to ONE. This in turn will cause the output of the NOR element F2,10 to go to ZERO under the conditions described, the signal STAV–*a* is equal to ZERO also so that the output of the NOR element F2,51 will be equal to ZERO. If the car is still adjacent the inductor plate as it approaches the floor, the signal 39–*a* will cause the output of the NOR element G12,9 to go to ZERO so that the output of the NOR element F4,21 will go to ONE. This will cause the output of the NOR element F4,11 to go to ZERO so that the signal 34–*a*, produced at the output of the NOR element F4,19 will equal ONE.

Since the conditions for generating the stopping signal 34–*a* only exist for the instant that the scanner is scanning at the floor at which the car is to stop and since this is in the neighborhood of 1 millisecond, means must be provided to hold the stopping signal long enough for the electromechanical relays of the controller to respond. As indicated above, the output of the NOR element F4,11 must be equal to ZERO in order for 34–*a* to be equal to ONE. It will be remembered that when the signal 34–*a* is generated, $\overline{34}$–*a* goes to ZERO. While the car is running and for a predetermined time after the power is cut off the signal $\overline{70}$–*a* will equal ZERO. Therefore, if the car is running and the stop signal is generated, the output of the NOR element F4,13 will go to ONE to hold the output of the NOR element F4,11 equal to ZERO. When the interference time expires and $\overline{70}$–*a* goes to ONE the output of the NOR element F4,13 will go to ZERO, so that the output of the NOR element F4,11 will go to ONE to cancel the stop signal 34–*a*.

As another example, if power is being applied to drive the elevator car A in the down direction the signal $\overline{2A}$–*a* will equal ZERO. This signal like the signal $\overline{1A}$–*a* may FIG. 4B of the copending application. If the elevator car B is at the floor at which the scanner is scanning the signal $\overline{B}$–*a* will equal ZERO and if there is a down corridor call registered at this floor, the signal $\overline{MDCC}$ will equal ZERO. In addition, if the system does not want the A car to bypass this down call, the signal 77STP–*a* will also equal ZERO. This will cause the output of the NOR element F1,10 to go to ONE and if this signal is followed through the sequence of NOR elements it will be seen that the signal 34–*a* will go to ONE while the gating signal 39–*a* is also equal to ONE. In other words, the output of the NOR element F1,10 goes to ONE to generate the stopping signal when the elevator car A traveling in the down direction is to stop for a down corridor call.

If the elevator car A is running ($\overline{32}$–*a* equals ZERO) and is at the floor ($\overline{B}$–*a* equals ZERO) at which a car call is registered ($\overline{300M}$–*a* equals ZERO) the output of the NOR element F3,13 will go to ONE to generate a stopping signal. However, if the car has already been assigned to serve corridor calls in the opposite direction from that in which the car is traveling (R2D–*a* equals ONE) or it has been assigned to serve corridor calls in the direction in which the car is traveling but has not yet reached the first assigned corridor call (ASND–*a* equals ONE), the car calls will be ignored. This priority is a matter of preference and is most useful in the instance where an available car is standing at the main floor with the doors open. If it becomes assigned to a demand and then a passenger enters the car and registers a car call before the car can depart on its assignment, the service to the passenger whose corridor call created the demand would be delayed. If it is desired to give preference at all times to car calls this can be accomplished by eliminating the OR element F3,30.

If on the up scan ($\overline{S\text{-}UP}$ equals ZERO) the scanner sees the A car ($\overline{B}\text{-}a$ equals ZERO) running down to serve up calls ($\overline{A2UD}\text{-}a$ equals ZERO) at the floor at which the up corridor call which the system wants the A car to stop for is located ($\overline{STP\text{-}DEMP}\text{-}a$ equals ZERO), then the output of the NOR element F2,15 will go to ONE. This in turn will cause the stop signal 34–$a$ to go to ONE. It will also cause the output of the NOR element G6,9 to go to ZERO and since the signal $\overline{34}\text{-}a$ is not now equal to ZERO, the signal 81UX–$a$ will go to ONE. This latter signal it will be remembered is effective to cancel the down direction signal 81D–$a$. If on the other hand, while the scanner is scanning down ($\overline{S\text{-}DN}$ equals ZERO) it sees the A car ($\overline{B}\text{-}a$) which is assigned to run up to serve down demands ($\overline{A2\text{-}DD}\text{-}a$ equals ZERO) and it is at the floor at which the system wants the A car to stop for a down corridor call ($\overline{STP\text{-}DEMP}\text{-}a$ equals ZERO), then the signal generated by the NOR element F2,17 will go to ONE. In addition to causing the stop signal 34–$a$ to go to ONE, it will cause the signal 81DX–$a$ to go to ONE which will cancel the up direction signal 81U–$a$.

Figure 17A:
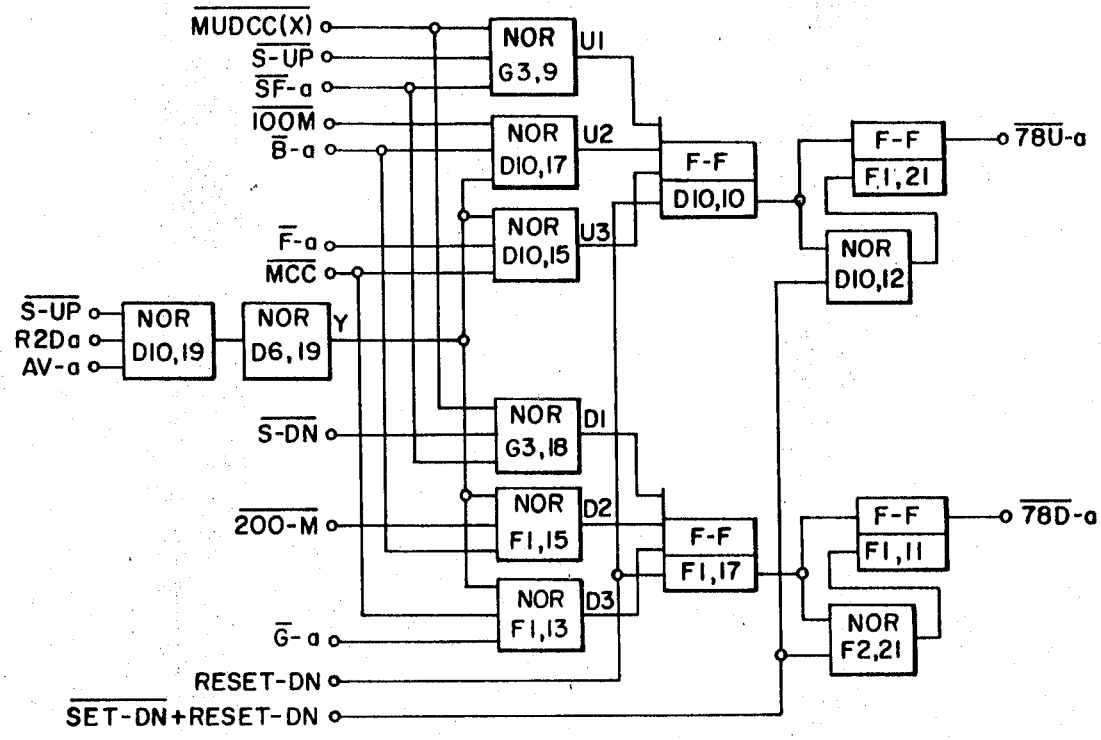
Figure 17B:
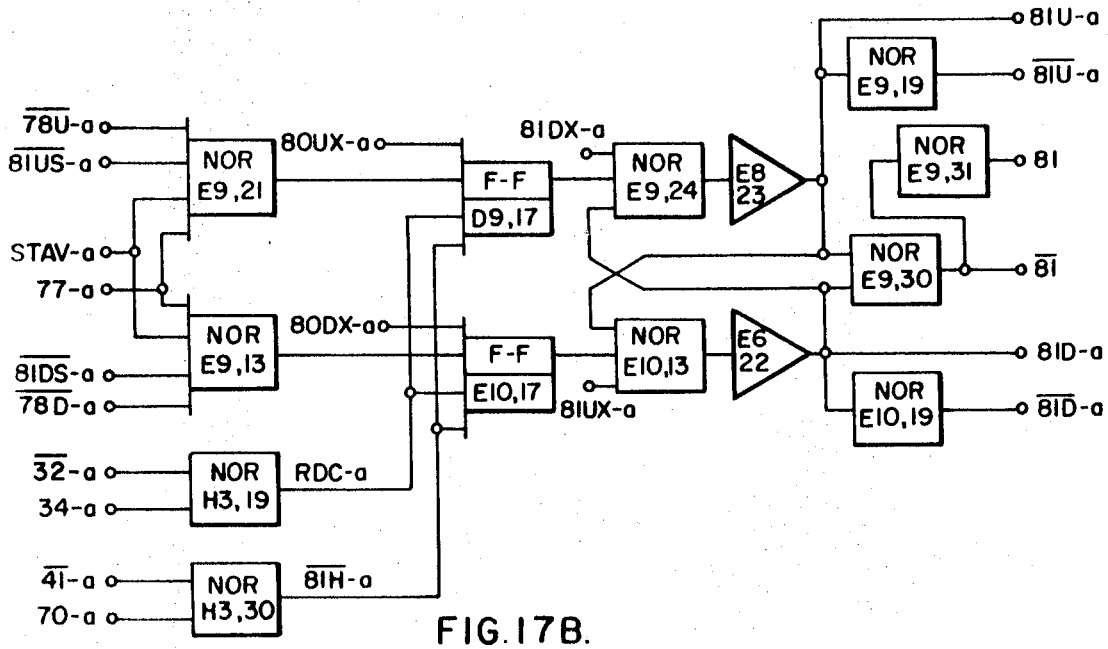

In the event that the power controller should get out of sequence with the supervisory system it is desirable that the car be stopped so that the system can be put in order. Therefore, if the power controller is driving the car in the down direction, 2A–$a$ equals ZERO, but the supervisory system is not indicating that the car should be traveling in the down direction (81D–$a$ equals ZERO), then the output of the NOR element F2,11 will equal ONE which will generate, through the sequence of NOR elements illustrated, the stopping signal 34–$a$. Similarly, if the power controller is telling the car to run up (1A–$a$ equals ZERO) but the supervisory system is not indicating that the car should be traveling up (81U–$a$ equals ZERO) then the output of the NOR element F2,12 will equal ONE to generate the stopping signal. The signals generated by the NOR elements F2,11 and F2,12 will also generate a stop signal when all of the calls ahead of a car are answered by other cars and also for high and low call reversal when the car is running 2BC as was explained in connection with FIG. 17.

Likewise, the cars should generate a stopping signal at the top and bottom floors whether there is a call registered for that floor or not. Consequently, if the position indicator indicates that the A car is at the bottom floor ((1)S–$a$ equals ONE) or at the top floor ((8)S–$a$ equals ONE) the output of the NOR element F3,21 will equal ZERO. Since the car has a running signal as it approaches the top or the bottom floor ($\overline{32}\text{-}a$ equals ZERO), the output of the NOR element F3,24 will go to ONE to generate a stopping signal while the car is passing the inductor plate and 39–$a$ equals ONE.

In buildings which have a basement or a lower parking floor, the floor which is designated here as the second floor may actually be the main floor. In some installations it is desirable to have all of the cars stop at the main floor in both directions unless they are on specific assignments. Hence, if the car is at the second floor ($\overline{(2)S}\text{-}a$ equals ZERO) and is not assigned to a demand to serve either calls in the same direction (ASND–$a$ equals ZERO) or the opposite direction (R2D–$a$ equals ZERO), then the output of the NOR element J10,15 will go to ONE to generate a stopping signal. However, if the A car was in the basement and was assigned to serve up demands (ASND–$a$ equals ONE) the car would not stop at the main floor unless an up corridor call was registered there (this would cause the signal ASND–$a$ to go to ZERO). Likewise a car traveling down through the main floor to serve an up demand in the basement would not stop at the main floor since the signal R2D–$a$ would equal ONE. Nor would a car in the basement which was assigned to serve down demands above stop when the car passed through the main floor since R2D–$a$ would also equal ONE under those circumstances.

As was mentioned previously, it is desirable under certain circumstances to stop a car serving in one direction so that it may become available and be assigned to serve calls in the opposite direction. If such a decision is made ($\overline{MKA}\text{-}a$ goes to ZERO) while the car is running ($\overline{32}\text{-}a$ equals ZERO), the output of the NOR element F2,53 will go to ONE to cause the signal 34AV–$a$ to go to ONE as long as the selector is not notching (39–$a$ equals ZERO) and a stop signal has not already been generated (34–$a$ equals ZERO). The 34AV–$a$ signal will cause the output of NOR element F2,51 to go to ZERO and when the selector notches into the next floor (39–$a$ goes to ONE), the stopping signal will be developed. The 34–$a$ signal will be held in temporarily by the $\overline{70}\text{-}a$ and the $\overline{34}\text{-}a$ signals as explained above. When the inductor coil passes the inductor plate in the hatchway, the signal 39–$a$ will return to a value of ZERO which will cause the signal STAV–$a$ to go to ONE. This latter signal is applied to the signal input of NOR element F4,11 to hold the 34–$a$ signal. This is necessary because as was mentioned above, the STAV–$a$ signal is utilized to cancel the non-interference time (causes $\overline{70}\text{-}a$ to go to ONE). The STAV–$a$ signal is also applied to the input of NOR element F2,50 to prevent signals generated in other parts of the stopping circuit from interfering once the final decision has been made to stop the car and make it available. When the car becomes available, AV–$a$ will go to ONE to cause 34AV–$a$ to go to ZERO. The signal AV–$a$ will also cause the lower output of the MEMORY F2,52 to go to ONE, thereby causing STAV–$a$ to go to ZERO. With all of the inputs to NOR element F4,11 now equal to ZERO, the stopping signal will go to ZERO while the reverse signal, $\overline{34}\text{-}a$, goes to ONE.

Under the conditions just described, the car will stop and become available immediately without opening its doors in order to expedite its reassignment. However, if a corridor call for service in the direction in which the car was serving is registered at the floor at which the car stops, it is desirable to have the car serve that call. This is a matter of choice and of course only minor modifications need be made to cause the system to ignore the corridor call in favor of becoming available.

Priority is given to the corridor call in the following manner. The signal 34AV–$a$ indicating that the car should stop and become available must be generated before the car notches into the floor at which the car is to be stopped since with the signal 39–$a$ as an input to NOR element F2,53, the 34AV–$a$ signal cannot be generated during notching which is the only time the stopping signal can be generated. However, the output of F2,50 cannot go to ONE in response to a corridor call until the position signal $\overline{B}\text{-}a$ goes to ZERO. It is the onset of the notching signal which causes $\overline{B}\text{-}a$ to go to ZERO. Therefore if the car is to stop and become available with its doors closed, the signal 34AV–$a$ will equal ONE and when the selector notches into the next floor the signal 34–$a$ will be generated. While the notching signal is present the signal STAV–$a$ is held at ZERO. If the scanner observes a corridor call at the floor which the car is approaching, the output of NOR element F2,50 will go to ONE to cause the signal 34–$a$ to go to ZERO and make the lower output of MEMORY F2,52 equal to ONE. This latter signal will remain equal to ONE to hold the STAV–a signal equal to ZERO when the notching signal goes back to ZERO. If the output of NOR element F2,10 does not go to ZERO until after the notching signal goes to ZERO, the signal STAV–a will go to ONE and prevent F2,50 from going to ONE.

The signals 42U–a and 42D–a are signals utilized for opening the doors when the car is set for up or down travel respectively. These signals are generated from the outputs of one-shot multivibrators illustrated in symbolic form in FIG. 18 by the reference characters D11,20 and D11,4. The one-second indication immediately above each multivibrator is the duration of the pulse generated by these elements. The circuits for this type of element are well known and therefore it is sufficient to say that the characteristics of these elements are such that when triggered by an input pulse, however short in duration, a one-second pulse will be developed at the output. It will be remembered from previous discussions that if the elevator car A is available and is assigned to an up corridor call at the floor at which it is located the signal U42U–a will be generated. This signal will have a duration in the neighborhood of only a few milliseconds, however, by tripping the multivibrator D11,20 a signal 42U–a is produced for one second. It is necessary to have this signal last for one second because the relay circuits in which it is utilized for door opening are not responsive to signals of the duration of only a few milliseconds. Likewise, if the elevator car A is available and is assigned to a down corridor call at the floor at which it is located, the signal D42D–a will be generated momentarily to trigger the one-shot multivibrator D11,4 to produce the signal 42D–a. These two signals 42U–a and 42D–a are combined in the OR element D11,30 to produce the signal 42–a. The circuits through which this latter signal is effective to initiate door opening, can be found in the incorporated application. Other circuits for door opening when a car is traveling and stops for a corridor call or a car call can also be found in the incorporated application. Furthermore, suitable circuits by which solid state signals generated by the supervisory system are effective to control the door drive motor can also be found in the incorporated application.

The signals 42U–a and 42D–a will also be generated to initiate door opening when the car has been removed from full automatic control by the supervisory system (when 980A–a equals ZERO). This will occur for instance when the car is operating in the 2BC mode mentioned previously. Under these circumstances, when the stop signal is received and power is cut-off from the drive motor, the signal 32–a will go to ZERO as the car goes into a floor. If the car is at the floor ($\overline{B}$–a equals ZERO) at which an up corridor call is registered ($\overline{MUCC}$ equals ZERO) and the car is not receiving a down direction signal (81D–a equals ZERO), then the output of the NOR element F5,10 will equal ONE. This will trigger the one-shot multivibrator D11,20 to produce the signal 42U–a. In a similar manner, if the car is not set for up travel but is at a floor at which a down corridor call is registered the output of the NOR element F3,17 will go to ONE to produce a signal 42D–a when 32–a goes to ZERO.

FIG. 19

This figure depicts the circuits utilized in assigning and stopping cars traveling in one direction to serve calls in the opposite direction. The signals generated in this figure are signals common to all of the cars in the system.

This system is so designed that more than one car can be assigned to travel in a given direction to serve calls in the opposite direction at any given time. In the specific embodiment of the invention disclosed, provision is made so that two cars may be on assignment at any one time to travel in the same direction to serve calls in the opposite direction. Since the system is designed so that a demand is not canceled when a car is assigned to travel in the opposite direction to satisfy the demand until the car answers the corridor call which created the demand, means must be provided for creating a second demand so that the second car can be assigned when required. When signal 2DEM in FIG. 19 equals ONE this is an indication of the demand for a second car to travel in the direction opposite the direction of the scan to serve the corridor calls in the direction of scan. Of course before a second car can be assigned to serve calls in the opposite direction there must be a first car so assigned. If there is a first car assigned then we will let the system see the second demand so that a second car can be assigned. For this purpose then the signal CDEM is generated. Actually, it is a reverse signal $\overline{CDEM}$, do not see demand, which is utilized in the 2DEM circuit. If a first car is not seen traveling in one direction to serve calls in the opposite direction, the signal CDEM is equal to ONE to block the formation of the signal 2DEM.

The signal CDEM and the reverse signal $\overline{CDEM}$ are generated at the lower and upper outputs respectively of the MEMORY element G17,9. This MEMORY has one lower input which is the RESET signal. The upper input is the output of the NOR element G17,12 which has four inputs including; the signal DEMIN, the upper output of the MEMORY G16,9, the lower output of the MEMORY J6,21 and the signal AOS. Both of these MEMORY elements have as a lower input the RESET signal. The upper input of the MEMORY G16,9 is the signal DEMIN while the upper input to the MEMORY J6,21 is the signal DEM.

At the completion of each scan the RESET signal causes the signal CDEM to go to ZERO while the reverse signal $\overline{CDEM}$ goes to ONE. It also causes the lower output of the MEMORY J6,21 to go to ZERO while the upper output of the MEMORY G16,9 goes to ONE. This latter signal holds the upper input to the MEMORY G17,9 equal to ZERO. It will be remembered from the discussion of the circuits which generate the signal DEM (see FIG. 12) that when the scanner reaches a corridor call which creates a demand to which a car has already been assigned to travel in the opposite direction to serve, the signal DEMIN will go to ONE, however, the signal DEM will remain equal to ZERO. The signal DEMIN will cause the upper output of the MEMORY G16,9 to go to ZERO, however, the output of the NOR element G17,12 will be kept equal to ZERO by the DEMIN signal. The lower output of the MEMORY J6,21 will remain equal to ZERO. When the scanner advances to the next floor, the signal DEMIN will go to ZERO. Since all of the inputs to the NOR element G17,12 are now equal to ZERO its output signal will go to ONE to cause the signal CDEM to go to ONE. At the same time, the reverse signal, $\overline{CDEM}$, will go to ZERO. These latter two signals will retain these values for the remainder of the scan. If the scanner happens to see a later demand which generates the signal DEM this can have no effect on the circuit since even though the output of the NOR element G17,12 will go to ZERO, the outputs of the MEMORY G17,9 will remain as they are.

If, however, no car is already assigned to travel in the opposite direction to serve the first demand seen, then at the time that the signal DEMIN goes to ONE the signal DEM will also go to ONE. Again the signal DEMIN will make the upper output of the MEMORY G16,9 equal to ZERO, however, the signal DEM will cause the lower output of the MEMORY J6,21 to go to ONE. Now when the signal DEMIN goes to ONE the output of the NOR element G17,12 will remain equal to ZERO since the lower output of the MEMORY J6,21 will remain equal to ONE. The signal AOS, which it will be remembered goes to ONE for 50 microseconds every times the scanner advances and is equal to ONE during the SET and RESET periods, is provided to hold the output of the NOR element G17,12 equal to ZERO during the transient state of the other inputs to that NOR element as the scanner advances from floor to floor. This is necessary here because it will be remembered that it is the signal DEMIN which generates the signal DEM.

To summarize then, the signal $\overline{\text{CDEM}}$ will be made equal to ONE at the beginning of each scan. If a car is assigned to travel in the opposite direction to serve calls in the direction of scan, then when the scanner passes the first demand it sees, the signal $\overline{\text{CDEM}}$ will go to ZERO, otherwise it will remain equal to ONE for the remainder of the scan.

The signal 2DEM is generated at the output of the NOR element G16,18 which has as its inputs the signals $\overline{\text{CDEM}}$, $\overline{\text{FY}}$ and the output of the NOR element G15,9. The signal $\overline{\text{FY}}$ is generated from the output of the NOR element G16,19 which has as its input the upper output of the MEMORY G16,20. This MEMORY has the signal $\overline{\text{CDEM}}$ as the upper input and as its lower inputs the output of the NOR element G15,9 and the signal DISTX. The NOR element G15,9 has as its inputs the signal P and $\overline{\text{FX}}$. $\overline{\text{FX}}$ is generated at the output of the NOR element G16,16 which has as its input the upper output of the MEMORY G15, 13. This MEMORY has as its lower input the signal P and as its upper input the signals $\overline{\text{CDEM}}$ and the output of the NOR element G16,13. This latter NOR element has as its inputs the signal $\overline{\text{FY}}$ and the signal $\overline{\text{P}}$. The signal $\overline{\text{P}}$ serves as an input to the NOR element G15,21 to generate the signal P. The signal $\overline{\text{P}}$ is generated at the output of the NOR element G15,20. A first input to this NOR element is the output of the NOR element G15,18 which has as its inputs the signal SP(1)C and $\overline{\text{MUDCC(X)}}$. The second input to the NOR element G15,20 is the output of the NOR element G15,19 which has as its inputs the signals $\overline{\text{SSD3(1)}}$ and $\overline{\text{MUDCC(X)}}$.

As will be remembered from the discussion of the Allocated Call Counters, the specific embodiment of the invention described is designed to allocate two calls per car. In light of this, if the system sees a call to which a car has been assigned to run in the opposite direction to serve, it will count that call plus one other call to be served by the assigned car. If the system sees a third call in the direction of scan and no other car is in position to serve it, a demand will be created for another car. The indication that this condition exists is that the signal 2DEM will go to ONE.

At the beginning of the scan when the signal $\overline{\text{CDEM}}$ is equal to ONE the upper outputs of the MEMORIES G15,13 and G16,20 are equal to ZERO so that the signals $\overline{\text{FX}}$ and $\overline{\text{FY}}$ are both equal to ONE. Since both $\overline{\text{CDEM}}$ and $\overline{\text{FY}}$ are equal to ONE, 2DEM will equal ZERO. If the scanner comes to a corridor call ($\overline{\text{MUDCC(X)}}$ goes to ZERO) before it passes the first car serving in the direction of scan (SP1C remains equal to ZERO), the output of the NOR element G15,18 will go to ONE. This in turn will make the signal $\overline{\text{P}}$ equal to ZERO and the signal P equal to ONE. Although this corridor call will cause DEMIN to go to ONE, it will be remembered from the discussion immediately above that the signal $\overline{\text{CDEM}}$ will remain equal to ONE while the scanner is still at this floor. Therefore, even though the signal P is now equal to ONE, the signal $\overline{\text{CDEM}}$ will maintain the upper output of the MEMORY G15,13 equal to ZERO. Since the signals $\overline{\text{FX}}$ and $\overline{\text{FY}}$ both remain equal to ONE there is no change in the outputs of the NOR element G16,13 and G15,9. Therefore it can be seen that this corridor call has no lasting effect on the 2DEM circuit.

When the scanner advances to the next floor the signal $\overline{\text{MUDCC(X)}}$ will return to a value of ONE causing the signal $\overline{\text{P}}$ to return to ONE while the signal P goes back to a value of ZERO. At this time the signal $\overline{\text{CDEM}}$ will also go to ZERO. However, the latter change will have no immediate effect on the circuit since the lower inputs to both of the MEMORIES are also equal to ZERO at this point. Furthermore, since the signal $\overline{\text{FY}}$ remains equal to ONE, the signal 2DEM remains equal to ZERO.

Assume now that before the scanner sees any cars serving corridor calls in the direction of scan another corridor call for service in the direction of scan is reached so that the signal $\overline{\text{MUDCC(X)}}$ goes to ZERO again. Again the signal $\overline{\text{P}}$ goes to ZERO and the signal P goes to ONE. Since the signal $\overline{\text{FY}}$ maintains the output of the NOR element G16,13 equal to ZERO, the signal P which now equals ONE will cause the upper output of the MEMORY G15,13 to go to ONE. This will cause the signal $\overline{\text{FX}}$ to go to ZERO, however, since the signal P remains equal to ONE as long as the scanner is scanning at this floor, the output of the NOR element G15,9 remains equal to ZERO. When the scanner advances to the next floor, the signal $\overline{\text{P}}$ will return to ONE and P will go to ZERO. Now since the signal $\overline{\text{FX}}$ still equals ZERO the output of the NOR element G15,9 will go to ONE causing the upper output of the MEMORY G16,20 to go to ONE. This will cause the signal $\overline{\text{FY}}$ to go to ZERO, however the output of the NOR element G15,9 stays equal to ONE so that the signal 2DEM will remain equal to ZERO.

The system has now seen two calls which the car traveling in the opposite direction to serve calls in the direction of scan can handle. Assume now, however, that the scanner comes to a car which is serving calls in the direction of scan. Under these circumstances the signal SP(1)C will go to ONE, and remain equal to ONE for the remainder of the scan. The signal $\overline{\text{SSD3(1)}}$ is also still equal to ONE of this point. Consequently, the next corridor call that the system sees will not effect the 2DEM circuit since it will be allocated to the car serving calls in the direction of scan (even though the signal $\overline{\text{MUDCC(X)}}$ goes to ZERO the signals SP(1)C and $\overline{\text{SSD3(1)}}$ keep the signal $\overline{\text{P}}$ equal to ONE). Assume, however, that the scanner sees more calls than the car serving the direction of scan can handle so that the signal $\overline{\text{SSD3(1)}}$ goes to ZERO the next time the signal $\overline{\text{MUDCC(X)}}$ goes to ZERO. This will cause the signal $\overline{\text{P}}$ to go to ZERO and the signal P to go to ONE. With the signal P equal to ONE the output of the NOR element G15,9 will go to ZERO. Since now all of the inputs to the NOR element G16,18 are equal to ZERO, the signal 2DEM will go to ONE indicating that there is a second demand for a car to travel in the direction opposite to the direction of scan. With the signal $\overline{\text{P}}$ equal to ZERO and $\overline{\text{FY}}$ equal to ZERO, the output of the NOR element G16,13 goes to ONE to cause the upper output of the MEMORY G15,13 to go to ZERO despite the fact that the signal P equals ONE. Therefore the signal $\overline{\text{FX}}$ will go to ONE to hold the output of the NOR element G15,9 equal to ZERO even after the signal P returns to ZERO when the scanner advances to the next floor. Consequently, the signal 2DEM once generated will remain equal to ONE for the remainder of the scan in the direction in which it was generated.

Although the system will allocate two calls to the car which is traveling in one direction to serve calls in the opposite direction, when the second call is an appreciable number of floors away from the first call it becomes desirable to create another demand so that a second car may be assigned to the second call. The second demand is created by the signal DISTX. It will be remembered that if a car is assigned to travel in one direction to serve calls in the opposite direction, the first demand seen will cause the signal $\overline{\text{CDEM}}$ to go to ZERO after the scanner passes the corridor call which created the demand. It will also be remembered from the discussion above that if only one call has been seen for the car traveling in the direction opposite to the direction of scan to serve, that the signal $\overline{\text{FY}}$ will be equal to ONE. It is this latter signal which keeps the signal 2DEM equal to ZERO, since the output of the NOR element G15,9 is also equal to ZERO at this point.

Normally, as described above, the next call would not cause the signal 2DEM to go to ONE since it was assumed that the first car could handle two calls. However, if this second call is detected an appreciable number of floors away from the first call, the signal DISTX will go to ONE. This signal is a pulse which will cause the upper output of the MEMORY G16,20 to go to ONE, which in turn causes the signal $\overline{FY}$ to go to ZERO. Since the output of the NOR element G15,9 remains equal to ZERO as was mentioned and since the signal $\overline{CDEM}$ equals ZERO, the signal 2DEM will go to ONE.

The signal DISTX is a fifty microsecond pulse produced by the PULSE SHAPER F13,15 which is amplified by the AMPLIFIER G16,23. The input to the PULSE SHAPER is the signal DIST which is produced at the lower output of the MEMORY J12,12. The lower input to this MEMORY is the RESET signal while the upper input is the output of the NOR element J12,10. This NOR element has two inputs; $\overline{MUDCC(X)}$ and the output of the NOR element J11,11. The input to the NOR element J11,11 is the output of the DELAY element D12,16. This DELAY element is also a commonly used solid state component well known in the field. The characteristics of this component are such that if an input signal equal to ONE is applied to it, an output signal equal to ONE will appear a predetermined time later depending upon the parameters of the component. The output signal will remain equal to ONE thereafter as long as the input signal remains equal to ONE. However, whenever the input signal goes to ZERO, the output signal immediately goes to ZERO. The input to the DELAY D12,16 is derived from the lower output of the MEMORY J10,10. This MEMORY has as its upper input the lower output of the MEMORY J10,13 and as its lower input the RESET signal, and the output of the NOR element J11,30. The RESET signal also serves as a lower input to the MEMORY J10,13, the upper inputs of which are the signals MDCC and MUCC. The input to NOR element J11,30, is derived from the output of the NOR element J11,19. In addition to the signal STP-DEMP, the NOR element J11,19 has as its inputs the outputs of the PULSE SHAPERS F13,14, F13,30 and F13,31 which in turn have as their inputs the signals SF–a, SF–b and SF–c respectively.

At the completion of each scan, the RESET signal sets the lower outputs of each of the MEMORIES J10,13, J10,10 and J12,12 equal to ZERO. When the scanner sees the first corridor call on the next scan, the signal MUCC or MDCC, depending on the direction of scan, will go to ONE causing the lower output of the MEMORY J10,13 to go to ONE. Assuming that the scanner has not yet seen a car serving in the direction of scan and that one car has already been assigned to travel in the opposite direction to serve calls in the direction of scan, then this first corridor call will cause the signal STP-DEMP to go to ONE This will cause the output of the NOR element J11,19 to go to ZERO making the output of the NOR element J11,30 equal to ONE. Therefore, even though the lower output of the MEMORY J10,13 equals ONE, the output of the NOR element J11,30 will keep the lower output of the MEMORY J10,10 equal to ZERO. However, when the scanner advances to the next floor, the signal STP-DEMP will go to ZERO thereby removing the ONE input to the lower input of the MEMORY J10,10. Since the lower output of the MEMORY J10,13 will remain equal to ONE for the remainder of the scan, the lower output of the MEMORY J10,10 will now go to ONE. This will trigger the DELAY element D12,16 which will produce an output signal with a value of ONE a predetermined time later. The duration of the delay is related to the frequency of the scanner in such a manner that the scanner will scan past a predetermined number of floors before an output signal is produced by the DELAY element D12,16. Assume that the duration of the delay is such that the scanner will be scanning at the fourth floor past the floor at which the corridor call appeared when an output is produced by the DELAY element. This ONE output signal will cause the output of the NOR element J11,11 to go to ZERO. This signal serves as an input to the NOR element J12,10. If the scanner now comes to another corridor call for service in the direction of scan, the signal $\overline{MUDCC(X)}$, which is normally equal to ONE, will go to ZERO. Since both inputs in NOR element J12,10 are equal to ZERO its output will go to ONE. The signal thus developed will cause the lower output of the MEMORY J12,12, which is the signal DIST, to go to ONE. This signal will cause the PULSE SHAPER F13,15 to produce a fifty microsecond pulse which when amplified by the AMPLIFIER G16,23 becomes the signal DISTX. As mentioned above, this latter signal will cause the signal 2DEM to go to ONE if it has not already done so.

Suppose that the scanner comes to the A car serving in the direction of scan before the DELAY element D12,16 has timed out. Under these circumstances the signal SF–a goes to ONE causing the PULSE SHAPER F13,14 to supply a fifty microsecond pulse to the NOR element J11,19. This causes the output of the NOR element J11,30 to go to ONE for fifty microseconds which causes the lower output of the MEMORY J10,10 to go to ZERO. Since the input of the DELAY element D12,16 is now equal to ZERO, the DELAY element is reset and a new timing cycle is begun when the output of the PULSE SHAPER returns to ZERO so that the lower output of the MEMORY J10,10 can go back to ONE. It can be seen therefore that the DELAY element D12,16 is reset each time the scanner sees a car serving calls in the direction of scan. This is done because these cars serving calls in the direction of scan will take car of any corridor calls directly in front of them. It should be noted that if the scanner counts out the predetermined number of floors beyond the last car it has seen serving in the direction of scan, the output of the NOR element J11,11 will go to ZERO. Now if the scanner sees a corridor call which is not a coincident call less than two stops away from a car serving calls in the direction of scan, the signal $\overline{MUDCC(X)}$ will go to ZERO also producing the signal DIST and the pulse DISTX.

The signal STP-DEMP is effective to reset the DELAY element D12,16 in the situation where the scanner first sees a car serving in the direction of scan and then subsequently sees a demand for which a car is already traveling in the direction opposite to the direction of scan to serve. Under these circumstances, a second demand should be created if a second call is registered an appreciable number of floors beyond the corridor call which created the first demand. The corridor call which created the first demand will cause the signal STP-DEMP to go to ONE. This, it can be seen from the circuits illustrated, will start the DELAY element timing from that corridor call.

The signal STP-DEMP is utilized to stop cars traveling in one direction to serve calls in the opposite direction at the proper floor. As was mentioned previously, the system is designed so that two cars may be traveling in a given direction to serve calls in the opposite direction simultaneously. In the interest of efficient utilization of the cars it is desirable that the lead car proceed to the farthest demand for service in the opposite direction. However, the lead car may not be the first car assigned. Therefore, rather than assign a car to a specific corridor call or group of corridor calls, the system will not let either car see the closest demand until the lead car is no longer in a position to answer that closer demand. At this time, the system will allow the cars to see the closer demand so that the second car may stop for it. The lead car is considered no longer in position to stop for the closer demand when it has passed the inductor plate for the floor at which the closer demand is registered. In this manner, if the two cars are running close together, the second car will not miss the closer demand.

The signal STP-DEMP is generated at the lower output of the MEMORY J2,15, while the upper output generates the signal $\overline{\text{STP-DEMP}}$. The lower input to this MEMORY is the signal AOS and the upper input is the output of the NOR element J6,11. The inputs to this NOR element are the signal $\overline{\text{DEMP}}$ and the output of the NOR element J1,10. The four inputs to the NOR element J1,10 are the signals $\overline{\text{CDEM}}$ and SPAC–a, b and c. The signal SPAC–a is generated at the output of the NOR element J1,19 which has as its inputs the signal $\overline{\text{R2D}}$–a, the signal SF–a and the output of the NOR element G6,13. This latter NOR element has as its input the signal F–a and the output of the NOR element P5,19 which has as inputs the signals $\overline{\text{B}}$–a and 39–a. The signals SPAC–b and c are generated by signals and components associated with the B and C car respectively which correspond to those which produce the signal SPAC–a.

The signal AOS, which goes to ONE for fifty microseconds each time the scanner advances, assures that the signal STP-DEMP equals ZERO at the beginning of the can. It will also be remembered that the signal $\overline{\text{CDEM}}$ is equal to ONE at the beginning of the scan. This signal causes the output of the NOR element J1,10 to be equal to ZERO. If the scanner now reaches a floor at which a demand is registered the signal $\overline{\text{DEMP}}$ will go to ZERO causing the output of the NOR element J6,11 to make the signal STP-DEMP go to ONE. When the scanner advances to the next floor, the signal AOS goes to ONE momentarily to make the signal STP-DEMP return to ZERO while the signal $\overline{\text{STP-DEMP}}$ goes to ONE. It will be remembered from the discussion above that if a car is assigned to travel in one direction to serve calls in the opposite direction, then the signal $\overline{\text{CDEM}}$ goes to ZERO when the scanner advances after seeing the first demand. Assuming for a moment that all of the signals SPAC–a, b and c are equal to ZERO, the output of the NOR element J1,10 will go to ONE so that subsequent demands will not cause the signal STP-DEMP to go to ONE.

However, assume that the scanner now detects the A car running in the opposite direction to serve calls in the direction of scan approaching the floor at which the second demand to which the cars are running in the opposite direction to serve is registered. As soon as the inductor relay associated with the A car indicates that the car is approaching the floor, the solid state floor selector indicates that the A car is opposite that floor. Therefore, with the scanner looking at that floor, the signal $\overline{\text{B}}$–a equals ZERO and the signal 39–a will remain equal to ONE for the time, which can be measured in milliseconds, that it takes the inductor coil to pass the inductor plate while the car is approaching the floor. It will be remembered from the discussion of the stopping circuits, that it is during this interval only that a stopping signal for the A car can be generated. Therefore, the signal 39–a is equal to ONE to prevent the signal SPAC–a from going to ONE since the A car could still stay at that floor (the signal F–a will also be equal to ZERO because the scanner has obviously not yet passed the A car). As was explained previously, the rate of scan is much more rapid than the rate of movement of the car so that the signal 39–a may stay equal to ONE for a couple of scans. However, when the car has passed the inductor plate the signal 39 will go to ZERO. The A car may no longer stop at this particular floor. With both inputs to the NOR element F5,19 equal to ZERO, its output will cause the output of the NOR element G6,13 to go to ZERO. Since it was posted that the A car was traveling in the direction opposite to the scan to serve calls in the direction of scan, the signals $\overline{\text{R2D}}$–a and SF–a will both equal ZERO. Therefore, the signal SPAC–a will now go to ONE. This will cause the output of the NOR element J1,10 to go to ZERO and if there is a second demand for a car traveling in the opposite direction at this floor the signal $\overline{\text{DEMP}}$ would also go to ZERO so that the STP-DEMP signal will go to ONE. When the scanner advances to the next floor so that it is now past the A car, the signal F–a will go to ONE to keep the signal SPAC–a equal to ONE for the remainder of the scan.

FIG. 20

This figure illustrates the circuit for generating signals which indicate that a car has been assigned to either up or down demands and the circuit which generates the signal which initiates the stopping at the proper floor of a car traveling in the opposite direction from the calls it is to serve in order to reach those calls. The signals generated here are individual to each car but only those circuits associated with the A car are illustrated.

When the signal A2UD–a equals ONE this is an indication that the A car has been assigned to serve up demands. When the signal A2DD–a equals ONE this indicates that the A car has been assigned to serve down demands. These signals are produced at the lower outputs of the MEMORIES F3,15 and F4,15 respectively. The signals are applied to the NOR elements G10,9 and G9,9 respectively to produce the reverse signals $\overline{\text{A2UD}}$–a and $\overline{\text{A2DD}}$–a. The upper inputs of the MEMORY F3,15 are the signals U81U–a and U81D–a. The lower inputs to this MEMORY are the signals CUD–a, 81UX–a and the output of the NOR element J10,12. The input to the NOR element J10,12 is the output of the NOR element J10,11 which has the signals $\overline{\text{980A}}$–a and SG–a as inputs. The signal CUD–a is produced at the output of the NOR element J7,10 which has as inputs the signals $\overline{\text{A2UD}}$–a, $\overline{\text{SAWC}}$, F–a and $\overline{\text{S-UP}}$.

The upper inputs to the MEMORY F4,15 are the signals D81D–a and D81U–a. The lower inputs to this MEMORY are the signals 81DX–a, CDD–a and the output of the NOR element J10,12 the source of which was just discussed. The signal CDD–a is produced at the output of the NOR element J7,15 which has as inputs the signals $\overline{\text{F}}$–a, $\overline{\text{SAWC}}$, $\overline{\text{S-DN}}$ and $\overline{\text{A2DD}}$–a. The signal SAWC is produced at the output of the AMPLIFIER G17,24 which has as its input the signal $S+R$ and the upper output of the MEMORY H17,19. This MEMORY has the RESET signal as the upper input and the signals MUCC and MDCC as lower inputs.

The indications that a car has been assigned to a demand are produced by the car starting signals of FIG. 15. For instance, if the A car is to be started in the up direction to serve up calls, the signal U81U–a will go to ONE. This will cause the signal A2UD–a to go to ONE which will in turn cause the signal U81U–a to be canceled. The signal A2UD–a will remain equal to ONE however. Under these conditions, the A car is below the lowest up call and is to serve calls in the direction in which it must travel to reach the first call. At the beginning of the next up scan since the A car is in service, the signal $\overline{\text{980A}}$–a will equal ZERO. It will be remembered from the discussion of FIG. 7 that at the beginning of this up scan, since the A car is serving calls in the direction of scan, that the signal SG–a will equal ONE. This will produce a ONE output on the NOR element J10,12 which will cause the signal A2UD–a to go to ZERO. In other words, if the A car is assigned to travel up to serve up calls above, the signal A2UD–a will be canceled at the beginning of the next up scan.

If however, the A car is assigned to serve up demands but is above the lowest up demand, it must travel down or in the opposite direction to reach the first up call. Under these circumstances it is the signal U81D–a which causes the signal A2UD–a to go to ONE. Again the signal U81D-a will be canceled after the signal A2UD-a goes to ONE. Since the A car is now traveling in a direction opposite to the direction of the calls to which it is assigned, the signal SG-a will be equal to ZERO so that the output of the NOR element J10,12 will be ZERO and cannot cancel the signal A2UD-a. However, when the A car notches into the floor at which the lowest up call is registered, the signal 81UX-a goes to ONE (see FIG. 18). This in turn will cancel the signal A2UD-a.

If while the A car is traveling down to serve up demands the up demand is canceled, the A car will continue traveling down and stop at the next up corridor call that it comes to. As will be recalled from the summary of the invention, if there are no up corridor calls remaining below the car, the car will continue traveling down and serve any down corridor calls below it. In order to accomplish the latter alternative, the signal A2UD-a must be canceled.

At the completion of each scan, the RESET signal causes the upper output of the MEMORY H17,19 to go to ZERO although the signal $S+R$ keeps the signal SAWC equal to ONE during the SET and RESET intervals. However, at the beginning of the scan, the signal SAWC is equal to ZERO. On the up scan, the signal $\overline{\text{S-UP}}$ is equal to ZERO and of course at this time the signal $\overline{\text{A2UD}}$-a equals ZERO. Since the scanner has not yet seen the A car, the signal $\overline{\text{F}}$-a will equal ONE. With the latter signal equal to ONE the output of the NOR element J7,10 is held at ZERO so that the signal A2UD-a cannot be canceled. When the scanner sees an up corridor call, the signal MUCC goes to ONE causing the upper output of the MEMORY H17,19 and therefore the signal SAWC to go to ONE. SAWC will remain equal to ONE for the rest of the scan. If the scanner sees this up corridor call before it passes the A car (before $\overline{\text{F}}$-a goes to ZERO), the signal CUD-a cannot go to ONE on that scan. However, if the scanner has not seen an up corridor call by the time it has passed the A car then all of the inputs to the NOR element J7,10 will be equal to ZERO and a signal CUD-a will go to ONE to cause the signal A2UD-a to go to ZERO. The signal $\overline{\text{A2UD}}$-a will then go to ONE to return the signal CUD-a to ZERO where it will remain until the car is again assigned to up demands.

The circuit generating the signal A2DD-a operates in a similar manner when the A car is assigned to a down demand. If the A car is above the highest down corridor call when it is assigned, the D81D-a signal will cause the signal A2DD-a to go to ONE. However, if the car is below the highest down demand to which it is assigned, the signal D81U-a will trip the MEMORY F4,15. Likewise, the output of the NOR element J10,12 will cause the signal A2DD-a to return to ZERO on the next down scan if the A car is above the highest down corridor call when assigned. In a similar manner, if the A car must travel up to serve the highest down call the signal 81DX-a will cancel the indication when the car reaches the highest down corridor call. Finally, the signal CDD-a will cancel the signal A2DD-a if the down demand is canceled and no down calls are present above the A car.

The master signal R2D-a, running to demand, indicates that the car is either assigned to an up demand or a down demand. It is generated from the output of the NOR element F5,24 which has as its input the reverse signal $\overline{\text{R2D}}$-a. This latter signal is produced at the output of the NOR element F5,13 which has as its inputs the signals A2UD-a and A2DD-a. It is clear then that the signal R2D-a will equal ONE when either A2DD-a or A2UD-a equals ONE.

The signal $\overline{\text{STP-DEMP}}$-a is effective to stop the elevator car A at the appropriate floor when it is traveling in one direction to serve calls in the opposite direction. It is generated from the output of the NOR element J7,11 which has as its input the output of the AMPLIFIER G2,24. The inputs to this AMPLIFIER are the signals STP-DEMP and the output of the NOR element J7,19. The two inputs to the NOR element J7,19 are the signals $\overline{\text{MUDCC(X)}}$ and $\overline{\text{LCSC}}$-a. This latter signal is produced at the upper output of the MEMORY J7,21 which has two upper inputs and two lower inputs. The upper inputs are the outputs of the NOR elements J7,13 and J7,17. These NOR elements have two common inputs; the signals $\overline{\text{F}}$-a and SAWD. The NOR element 17,13 has two additional inputs, the signals $\overline{\text{S-DN}}$ and $\overline{\text{A2DD}}$-a, while the NOR element J7,17 has the signals $\overline{\text{S-UP}}$ and $\overline{\text{A2UD}}$-a as additional inputs. The lower inputs to the MEMORY J7,21 are the outputs of the NOR elements J3,10 and J3,17 which have the signals $\overline{\text{G}}$-a and $\overline{\text{SAWD}}$ as common inputs. Additional inputs for the NOR element J3,10 are the signals $\overline{\text{A2DD}}$-a and $\overline{\text{S-DN}}$. The two other inputs to the NOR element J3,17 are the signals $\overline{\text{A2UD}}$-a and $\overline{\text{S-UP}}$. The signal SAWD is produced at the output of the AMPLIFIER G18,24, which has as inputs the signals S+R and the upper output of the MEMORY H17,21. The signal $\overline{\text{SAWD}}$ is produced at the output of the AMPLIFIER G11,22 which has as its single input the lower output of the MEMORY H17,21. This MEMORY has as its upper input the signal RESET and as its lower input the signal DEMP.

As mentioned previously, the car assigned to travel in a given direction to serve calls in the opposite direction will stop when it notches into the floor at which the farthest call in the given direction is registered or at the floor at which the second demand is developed if it is the trailing car of two cars traveling in the given direction to serve calls in the opposite direction. Under either of these circumstances, that is where the car is traveling for an actual demand for service in the opposite direction, the signal STP-DEMP will go to ONE as previously described. This signal will cause the signal $\overline{\text{STP-DEMP}}$-a to go to ZERO. As also mentioned previously, if while a car is traveling in the given direction to serve calls in the opposite direction the demand is canceled, the car continues to travel in the given direction until it reaches a corridor call for service in the opposite direction. Under these conditions the output of the NOR element J7,19 goes to ONE to also cause the signal $\overline{\text{STP-DEMP}}$-a to go to ZERO and thereby initiate stopping of the car. It should be mentioned at this time that the signal $\overline{\text{STP-DEMP}}$-a must go to ZERO on each scan in the direction of service requested by the corridor calls in order for the car to continue traveling in the other direction to serve that call.

For ease of presentation, assume that the elevator car A is assigned to travel up to serve down corridor calls. At the completion of the up scan during the RESET interval, the lower output of the MEMORY H17,21 will go to ONE causing the signal $\overline{\text{SAWD}}$ to equal ONE while the signal SAWD equals ZERO. In other words at the beginning of the scan the scanner has not yet seen a demand. Since it is assumed that the car is assigned to down demands, the signal $\overline{\text{A2DD}}$-a will equal ZERO and during the down scan the signal $\overline{\text{S-DN}}$ will also equal ZERO. Since the scanner has not yet seen the car A on the down scan, the signal $\overline{\text{G}}$-a will equal ZERO and the signal $\overline{\text{F}}$-a will equal ONE. Under these circumstances, all the inputs of the NOR element J7,13 equal ZERO except the signal $\overline{\text{F}}$-a while the only input to the NOR element J3,10 which equals ONE is the signal $\overline{\text{SAWD}}$.

Assume that the scanner sees a down demand before it sees the elevator car A. When the signal DEMP goes to ONE, the signal $\overline{\text{SAWD}}$ goes to ZERO and therefore the output of the NOR element J3,10 goes to ONE. This causes the signal $\overline{\text{LCSC}}$-a, do not let car see call, to go to ONE. This blocks the output of the NOR element J7,19 so that the NOR element can have no effect on the signal $\overline{\text{STP-DEMP}}$–a for the remainder of the scan.

Even though the signal $\overline{\text{F}}$–a goes to ZERO when the scanner has passed the elevator car A, the signal SAWD, which it will be remembered now equals ONE, remains equal to ONE for the entire scan. Under these circumstances then, the only signal which can effect the signal $\overline{\text{STP-DEMP}}$–a is the signal STP-DEMP. The signal $\overline{\text{LCSC}}$–a of course will equal ONE until the upper input of MEMORY J7,21 goes to ONE.

Assume now that the down demand above the elevator car A is canceled. On the next down scan then the signal $\overline{\text{SAWD}}$ remains equal to ONE until the scanner has passed the elevator car A. Therefore, the signal SAWD still equals ZERO when the signal $\overline{\text{F}}$–a goes to ZERO and the output of the NOR element J7,13 goes to ONE. This causes the signal $\overline{\text{LCSC}}$–a to go to ZERO. Any down corridor calls below the car A now cause the signal $\overline{\text{MUDCC(X)}}$ to go to ZERO making the $\overline{\text{STP-DEMP}}$–a equal to ZERO although this has no effect on the A car at this time. However, during the next down scan, any down corridor call above the A car causes $\overline{\text{STP-DEMP}}$–a to go to ZERO insuring that the elevator car A continues to travel in the up direction and providing a stopping signal for the elevator car A when it reaches the next down corridor call that it comes to.

As was stated before, if the scanner on the down scan does not see the signal $\overline{\text{STP-DEMP}}$–a go to ZERO before it sees the A car, the car will lose its assignment to down corridor calls and will continue to travel in the up direction if there are any up corridor calls above which it can answer.

Similar operation of the $\overline{\text{STP-DEMP}}$–a circuit is effected when the A car is assigned to travel down to serve up demands. If the scanner sees an up demand below the down traveling A car, the output of the NOR element J3,17 will go to ONE so that the signal $\overline{\text{STP-DEMP}}$–a can only be controlled by the signal STP-DEMP. Likewise, if the scanner sees no up demands below the A car but does see an up corridor call below the A car, the output of the NOR element J7,17 will go to ONE to cause the signal $\overline{\text{STP-DEMP}}$–a to go to ZERO when the signal $\overline{\text{MUDCC(X)}}$ goes to ZERO. Notice that it takes two scans after the demand beyond the car is canceled before a corridor call will produce the signal $\overline{\text{STP-DEMP}}$–a.

FIG. 21

This figure illustrates the circuits for generating the bypass signal, the signals which indicate that a car assigned to a particular Allocated Call Counter should be made available, the signals for blocking the input of corridor calls to Allocated Call Counters No. 2 and 3 and the in service signals.

The signal 77STP–a is a bypass signal utilized in the stopping circuits of FIG. 18 which causes the car to bypass certain corridor calls for service in the direction in which the car is traveling. This signal is generated from the output of the NOR element J3,11 which has as its input the output of the NOR element J3,12. This latter NOR element has two inputs; the signals 77ADV–a and 77–a. The signal 77–a is produced at the output of the NOR element E2,16 which has as its input the output of the NOR element E10,10. This latter NOR element has two inputs; the signals R2D–a and 77S–a. The signal 77S–a is the conventional bypass signal which is equal to ONE when the car is fully loaded (usually 80% of load capacity) or when the pass button is depressed while the system is operating on attendant operation. Suitable solid state circuits for generating this signal may be found in FIG. 4K of the inocrporated application. The signal 77 generated therein can be utilized as the signal 77S–a in the system herein disclosed.

The signal 77ADV–a is generated at the output of the NOR element J1,21. This NOR element has two inputs; the signal $\overline{\text{BYP}}$ and the signal $\overline{\text{ASND}}$–a. $\overline{\text{BYP}}$ is derived from the output of the NOR element J4,11 which receives an input from the NOR element J4,19. This latter NOR element has as its inputs the signals $\overline{\text{SP(1)C}}$, SSD2(1) and DIST. The signal $\overline{\text{ASND}}$–a is produced at the upper output of the MEMORY J2,21. The upper input of this MEMORY is the signal R2D–a while the lower inputs are the signals 34–a and C77ADV–a. The signal C77ADV–a is derived from the NOR element J2,30 which has as its inputs the signals $\overline{\text{SF}}$–a, SSD2(1) and $\overline{\text{SET}}$.

If the car is traveling in one direction to serve calls in the opposite direction, the signal R2D–a equals ONE. This causes the output of the NOR element E10,10 to equal ZERO so that the signal 77–a equals ONE. With this latter signal equal to ONE, the signal 77STP–a equals ONE and therefore the car will not stop for corridor calls in the direction in which it is traveling. Likewise, if the car is fully loaded or if it is on attendant operation and the pass button is depressed, the signal 77S–a goes to ONE to cause the bypass signal 77STP–a to equal ONE. Under either of these latter conditions the car should not stop for corridor calls in the direction in which it is traveling even though the car may be serving calls in that direction.

When a car is assigned to serve corridor calls in a given direction and must travel in that direction to get to the first call it is to answer, it is desirable at times for it to bypass certain calls which other cars are already in position to answer. It will be recalled that when a car is so assigned, the signal R2D–a goes to ONE at least momentarily. This causes the signal $\overline{\text{ASND}}$–a to go to ZERO. If the signal $\overline{\text{BYP}}$ is also equal to ZERO the signal 77ADV–a goes to ONE to cause the signal 77STP–a to go to ONE.

The signal $\overline{\text{BYP}}$ equals ONE if any one of the three inputs to the NOR element J4,19 equal ONE. However, if the A car is the first car that the scanner sees serving calls in the direction of scan, the signal SP(1)C equals ONE indicating that the scanner has not scanned past the first car serving in the direction of scan. Under these circumstances, since the A car is the only car that the scanner has seen so far serving calls in that direction, it does not want the car to bypass any corridor calls in that direction and therefore the signal $\overline{\text{BYP}}$ equals ONE making 77ADV–a equal to ZERO. As long as 77–a is also equal to ZERO, the signal 77STP–a equals ZERO and the A car will stop for all corridor calls in front of it.

However, if the scanner has already seen another car serving in the direction of scan ($\overline{\text{SP(1)C}}$ equals ZERO), the A car bypasses the corridor calls unless the other car serving in the direction of scan cannot answer the call promptly. If the other car cannot answer the call in less than two stops, the signal SSD2(1) equals ONE so that 77STP equal ZERO. Even if the other car should serve the call in less than two stops if the other car is still several floors away from answering the call, the signal DIST equals ONE so that the A car is not blocked from stopping for the call (77STP–a will be held at ZERO). The signal DIST goes to ONE if the scanner sees a corridor call after it has scanned four floors past any car serving in the direction of scan. In this situation even though the other car has less than two calls to serve before reaching the call in question, it will be awhile before that other car reaches this call, so the A car might as well stop for it.

When the car makes its first stop and the signal 34–a goes to ONE, the signal $\overline{\text{ASND}}$–a also goes to ONE, until the car is again assigned to serve a demand. If the A car is traveling in the direction in which it is serving calls ($\overline{\text{SF}}$–a equal ZERO) and if at the completion of the scan in that direction (when $\overline{\text{SET}}$ equals ZERO) less than two calls are assigned to the other car serving calls in the direction of scan, or at least if the second or subsequent calls assigned to the other car are not corridor calls (SSD2(1) equals ZERO), then the signal C77ADV–$a$ will cause $\overline{\text{ASND}}$–$a$ to go to ONE. Therefore, the car A will no longer bypass.

When the signal 980–$a$ equals ONE it is an indication that the elevator car A is to be considered by the supervisory system in handling the traffic at hand. The signal is generated at the output of the NOR element F4,32. The signal 980–$a$ serves as an input to the NOR element B7,21 which produces the reverse signal $\overline{980A}$–$a$ through the AMPLIFIER C4,22. The first input to the NOR element F4,32 is the signal 77S–$a$. The other inputs include the signal $\overline{980}$–$a$ and the output of the DELAY element F4,34. The input to the DELAY element is the output of the NOR element F4,33 which has as its inputs the signals $\overline{81}$–$a$ and 32–$a$. The signal $\overline{980}$–$a$ is produced from the signal 980–$a$ through the NOR element F4,31. The signal 980–$a$ is produced at the output of the NOR element F4,30 which has as its inputs the signals TR–$a$, $\overline{60}$–$a$ and EA–$a$.

The signal 980–$a$ equals ONE when the elevator car A is to be run on automatic operation. The signal 980A–$a$ is equal to ONE when the car is on automatic operation and is to be considered by the system in allocating calls to cars serving and determining whether a demand exists. The car may be removed from automatic operation, that is the signal 980–$a$ may equal ZERO, under three conditions. When the car is to be run by an attendant the signal TR–$a$ will equal ONE. Under these conditions the attendant in the car can determine which direction the car will travel, he can pass up corridor calls which he does not want to stop for, and he can control the door open time among other things. Secondly, the car may be removed from automatic operation during maintenance operations. Under these conditions the signal $\overline{60}$–$a$ will equal ONE. For maintenance purposes the operator can move the car up and down at slow speeds to any position he desires. The third situation where a car will be removed from automatic operation is under conditions that will be referred to as hospital emergency. Although it may be desirable to have similar service in other situations, it is frequently encountered in hospital installations and therefore is referred to as hospital emergency. When the system is operating under these circumstances a car will not respond at all to corridor calls, but is under the complete control of the operator. This is valuable in situations in a hospital where it is desirable to transport a patient to a specific floor such as the operating room floor without being diverted for other calls.

Appropriate circuits for generating the signals TR–$a$, $\overline{60}$–$a$ and EA–$a$ may all be found in the incorporated application.

If the car is removed from automatic operation the signal $\overline{980}$–$a$ will equal ONE to cause the signal 980A–$a$ to go to ZERO. This in turn will cause the signal $\overline{980A}$–$a$ to go to ONE. Normally, however, with the system on automatic operation the signal $\overline{980}$–$a$ will equal ZERO. Likewise under normal conditions the bypass signal 77S–$a$ will equal ZERO, therefore, normally the signal 980A–$a$ will equal ONE.

Even though the car is on automatic operation it may not be considered by the system in allocating calls and assigning cars to demands under one other condition. This would occur where someone holds up the car for an inappropriately long period. When the car receives a signal to run the signal $\overline{81}$–$a$ will go to ZERO and until the car actually starts the running signal 32–$a$ will also equal ZERO. This will cause the output of the NOR element F4,33 to go to ONE thereby starting the timer in the DELAY element F4,34. This timer has a delay of ten seconds. If the car does not start running within ten seconds after it receives the start signal, the output of the delay element F4,34 will go to ONE thereby causing the signal 980A–$a$ to go to ZERO and removing the car from consideration by the supervisory system. If however, as would be normal, the signal 32 goes to ONE in less than ten seconds, the output of the NOR element F4,33 will go to ZERO to reset the DELAY element.

The signal $\overline{980A}$–$a$+R2D–$a$ is generated at the output of the NOR element F4,12 which has as its input the output of the NOR element F4,17. The four inputs to this latter NOR element includes the signals $\overline{980A}$–$a$, R2D–$a$, 42U–$a$ and 42D–$a$. The signal $\overline{980A}$–$a$+R2D–$a$ will equal ONE if the car is not to be considered by the supervisory system ($\overline{980A}$–$a$ equals ONE), if the car is assigned to travel to serve an up or down demand (R2D–$a$ equals ONE) or if the car is assigned to serve an up or down corridor call at the floor at which the car is standing (42U–$a$ or 42D–$a$ equals ONE). The signal $\overline{980A}$–$a$+R2D–$a$ is utilized in the available car circuits of FIG. 7 and the demand circuits of FIG. 12. When the signal is equal to ONE it will cancel the availability of the A car and will block the generation of the signal DEM on the remainder of the scan on which the A car is assigned to serve a demand.

The remaining signals generated in this figure are common to the system and are associated with a particular counter rather than with a particular car. The reverse signal $\overline{\text{MC}(1)\text{A}}$, do not make car assigned to Counter No. 1 available, is generated at the output of the NOR element E3,13 which has as its input the output of the NOR element E3,12. The four inputs to this NOR element are the signals $\overline{\text{SDO}(1)}$, SSD2(2), SSD(3) and $\overline{\text{SET}}$.

It should be recalled that a car may be selected to become available not only when it is at rest with no calls to serve, but also if it is receiving a direction signal but has no place to go. It will be remembered also that under certain circumstances the system will blank the lead car serving in a given direction and then make this car available for service in the opposite direction if removing it from service in the given direction does not create a demand for service in that direction.

The signal $\overline{\text{MC}(1)\text{A}}$ must go to ZERO in order for the car assigned to Counter No. 1 to be designated as available. This can occur if any one of the three inputs to the NOR element E3,12 go to ONE. It should be recalled that the car assigned to Counter No. 1 is the first car that the scanner has been serving calls in the direction of scan and that the cars assigned to Counter Nos. 2 and 3 are the second and third cars seen by the scanner serving calls in the direction of scan. It will be noticed that the decision to make the car available can only be made, that is the signal $\overline{\text{MC}(1)\text{A}}$ can only go to ZERO, during the SET interval when the signal $\overline{\text{SET}}$ equals ZERO. It is only after the scanner has scanned past all the floors that the system can make the decision as to whether any of the cars can become available.

If when the scan is complete no calls have been assigned to Counter No. 1 the signal $\overline{\text{SDO}(1)}$ will equal ZERO. However, even if no calls have been allocated to that car if the quota of two calls has been allocated to the car assigned to Counter No. 2 and the second or subsequent call is a corridor call, the signal SSD2(2) will be equal to ONE to prevent the car assigned to Counter No. 1 from becoming available. Under these circumstances although there are no calls specifically allocated to the car assigned to Counter No. 1, it is in a position to help out the car assigned to Counter No. 2 which at this time is carrying its full load. Even if these two conditions do not exist, if there is a car assigned to Counter No. 3 and there are more than two calls in front of it and the third or at least one subsequent call is a corridor call, the signal SSD3(3) will be equal to ONE to keep the car assigned to Counter No. 1 traveling in the same direction to help out with the excess calls. If however, at the end of the scan none of the above conditions exist the signal $\overline{MC(1)A}$ will go to ZERO so that the car assigned to Counter No. 1 can be made available.

The signal $\overline{MC(2)A}$, do not make car assigned to Counter No. 2 available, is generated at the output of the NOR element E3,21 which has as inputs the outputs of the NOR elements E3,20 and E3,19. The NOR element E3,19 has as its inputs the signals $\overline{SDO}(2)$, SSD2(3) and SET. The NOR element E3,20 also has as an input the signal $\overline{SDO}(2)$ but its other two inputs are the signals $\overline{MCAM}$ and $\overline{BLK}(2)$. The signal $\overline{BLK}(2)$ is derived from the output of the NOR element H4,19 whis has as its input the signal BLK(2), blank Counter No. 2. This signal is derived from the output of the NOR element H2,17 which has as inputs the signals $\overline{SP(2)C}$, $\overline{SPLC}$, BLK(3) and the output of the NOR element H2,21. The signal $\overline{SPLC}$ is derived from the output of the NOR element H11,11 which receives it sinput, SPLC (scanned past last car), from the output of the NOR element H4,13. This NOR element has as its inputs the signals SG–a, b and c. The NOR element H2,21 has as its inputs the output of the NOR elements H5,21 and H5,24. Both of these NOR elements have as an input the signal AVM. In addition the signals $\overline{S\text{-UP}}$ and $\overline{BLCU}$ serve as other inputs to the NOR element H5,21. Two other inputs to the NOR element H5,24 are the signals $\overline{S\text{-DN}}$ and $\overline{BLCD}$.

The signal $\overline{MC(3)A}$, do not make car assigned to Counter No. 3 available, is generated at the output of the NOR element E2,12. The inputs to this NOR element are the outputs of the NOR elements E2,20 and E2,21. The signal $\overline{SDO}(3)$ is a common input to these latter two NOR elements. Additional inputs to the NOR element E2,20 are the signals $\overline{SET}$ and the lower output of the MEMORY E2,18. The other two inputs to the NOR element E2,21 are the signals $\overline{MCAM}$ and $\overline{BLK}(3)$. This latter signal is generated at the output of the NOR element H4,21 which has as its input the signal BLK(3). This signal in turn is generated at the ouput of the NOR element H2,13 which has as inputs the signals $\overline{SPLC}$, $\overline{SP(3)C}$ and the output of the NOR element H2,21. The MEMORY E2,18 has as its upper inputs the signals MUCC and MDCC while the lower input is the signal $\overline{SPLC}$.

It will be remembered from the previous discussion that when there is a demand for service in a given direction and no cars are available to serve that demand, the system will blank the lead car serving in the opposite direction momentarily and slough off calls that would be allocated to the lead car to the trailing cars. If this does not create a new demand, then the lead car will be made available so that it can serve the original demand.

Figure 21A:
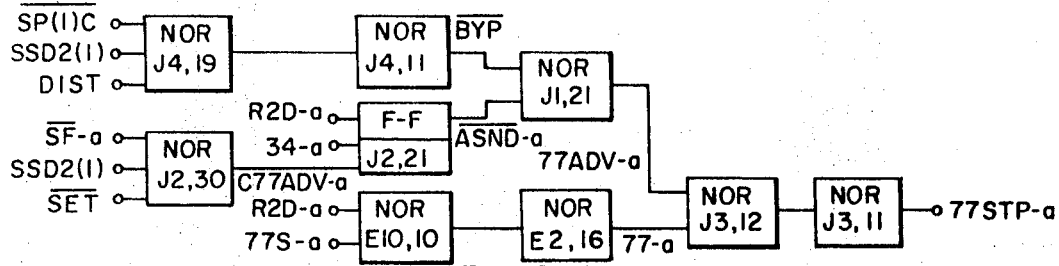
Figure 21B:
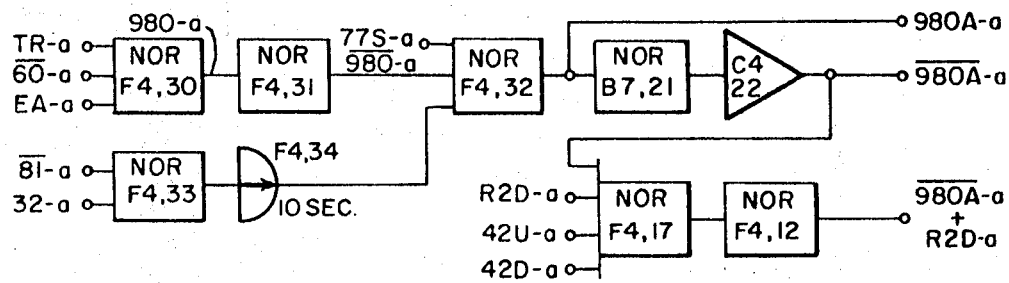
Figure 21C:
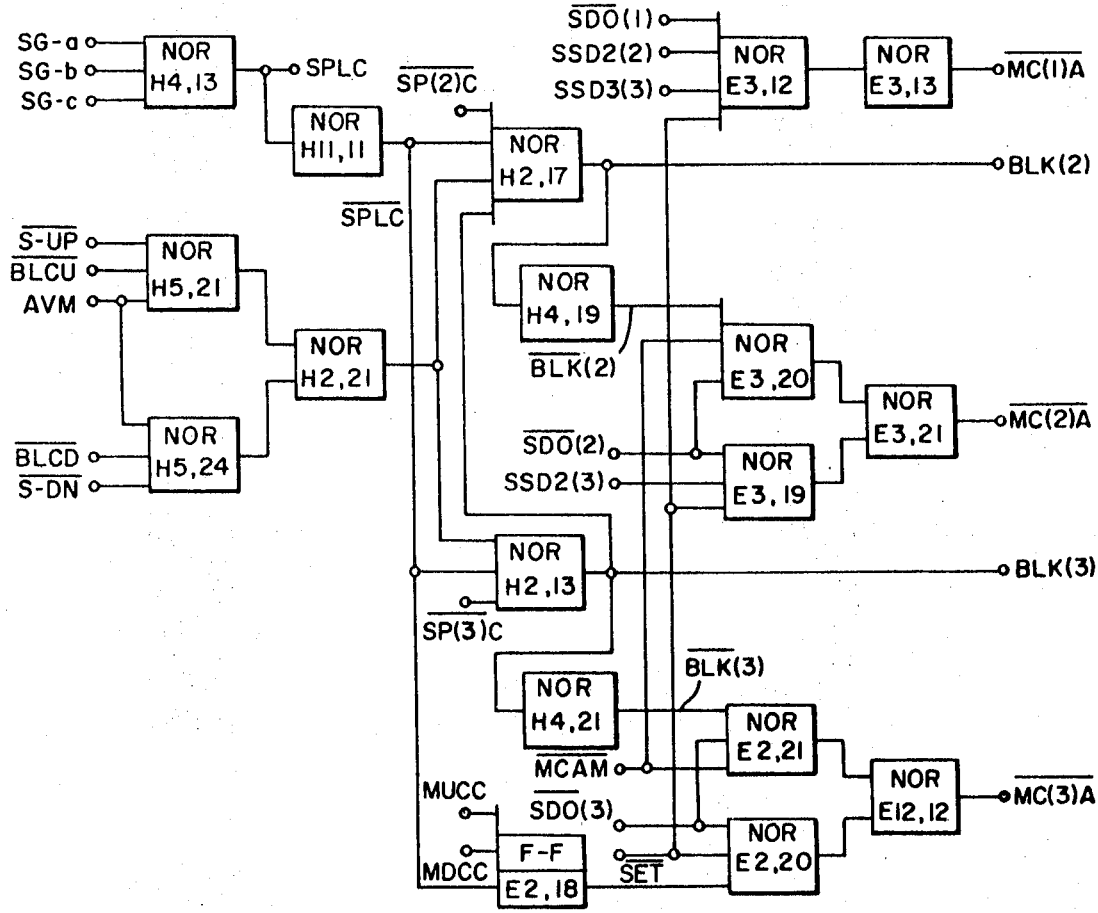

The circuits in the lower half of FIG. 21 determine which counter the lead car is assigned to and then generate the signal to block the input of corridor calls to that counter. Since cars are assigned to Counter Nos. 1, 2 and 3 in the order of their appearance on a scan, the highest order counter to which a car is assigned is associated with the lead car. Obviously, if only one car is serving in the direction of scan, it is the lead car. Since a car will not run if there are no calls for it to serve and therefore blanking calls to the lone car serving calls in the direction of scan will necessarily create a demand, there is no reason to generate a signal for blocking calls to Counter No. 1. Therefore, only the signals BLK(2) and BLK(3) have any significance.

Before the system can know whether to blank calls into the counter associated with the car which it has just passed, it must know whether that can is the lead car. If the A car is serving in the direction of scan, but the scanner has not yet passed the car, the signal SG–a will equal ONE. Under all other circumstances e.g. the A car is serving in the direction of scan but the scanner has passed the car or the car is serving in the opposite direction or it is available, the signal SG–a will equal ZERO. The same applies to the signals SG–b and c associated with the B and C cars respectively. Therefore, if the scanner has not yet passed the lead car serving in the direction of scan, at least one of the signals SG–a, b or c will equal ONE to keep the signal SPLC equal to ZERO. This will make the signal $\overline{SPLC}$ equal to ONE blocking the generation of the signals BLK(2) and BLK(3). Once the scanner has passed the lead car serving in the direction of scan, the signal $\overline{SPLC}$ will go to ZERO.

For the purpose of illustrating the generation of the blanking signals, assume that on a down scan a down demand is created and there is no available car to serve the demand (AVM equals ZERO). On the up scan when the signal $\overline{S\text{-UP}}$ goes to ZERO the signal $\overline{BLCU}$ will also be equal to ZERO (i.e. blank the lead car in the up direction). This will cause the output of the NOR element H5,21 to go to ONE causing the output of the NOR element H2,21 to go to ZERO. If the scanner detects a car serving in the direction of scan assigned to Counter No. 3 it is necessarily the lead car. Therefore, when the scanner passes this car the signals $\overline{SP(3)C}$ and $\overline{SPLC}$ will both go to ZERO to cause the signal BLK(3) to go to ONE. Even though in order to reach the third car serving in the direction of scan the scanner had to pass the car assigned to Counter No. 2 ($\overline{SP(2)C}$ had to go to ZERO first), the signal $\overline{SPLC}$ was equal to ONE until the scanner passed the car assigned to Counter No. 3. However, when this occurs the signal BLK(3) went to ONE to keep the signal BLK(2) equal to ZERO. On the other hand, had the signal $\overline{SPLC}$ gone to ZERO when the scanner passed the car assigned to Counter No. 2 (that is when $\overline{SP(2)C}$ went to ZERO), the signal BLK(2) would have gone to ONE since BLK(3) would have been equal to ZERO.

The decision to make a car available either because it is not needed in the direction of scan or because it is needed to serve a demand in the other direction can only be made at the end of a scan when the entire traffic situation has been scanned. At all other times the signals $\overline{SET}$ and $\overline{MCAM}$, the master do not make available signal, both equal ONE. The car assigned to Counter No. 3 will be made available, that is the signal $\overline{MC(3)A}$ will go to ZERO, if at the completion of the scan when the signal $\overline{SET}$ goes to ZERO, there are no car calls or corridor calls allocated to the car assigned to Counter No. 3 ($\overline{SDO}(3)$ equals ZERO) and in fact there are no corridor calls at all in the front of the car assigned to Counter No. 3 (the lower output of MEMORY E2,18 equals ZERO). Before the scanner passes the lead car serving in the direction of scan the signal $\overline{SPLC}$ equals ONE to make the lower output of the MEMORY E2,18 equal to ZERO. If there is a third car serving in the direction of scan, the signal $\overline{SPLC}$ will not go to ZERO until the scanner has passed the car assigned to Counter No. 3. If a corridor call is then seen in front of the car before the end of the scan, that is, the signal MUCC or MDCC depending upon the direction of scan goes to ONE, the lower output of the MEMORY E2,18 will go to ONE to prevent the car assigned to Counter No. 3 from geing made available. However, had there been a demand for a car in the other direction and no cars were available so that the signal $\overline{BLK}(3)$ was equal to ZERO, and had the blanking of the car assigned to Counter No. 3, to which no calls were allocated ($\overline{SDO}(3)$ equals ZERO), not created a demand for service in the direction of scan, then at the completion of the scan the signal $\overline{MCAM}$ would go to ZERO thereby causing the signal $\overline{MC(3)A}$ to go to ZERO. Under these circumstances although there may be corridor calls in front of the car assigned to Counter No. 3 they will be taken care of by either the car assigned to Counter No. 1 or Counter No. 2 and therefore the car assigned to Counter No. 3 should be released to serve the demand for service in the opposite direction.

As for the car assigned to Counter No. 2, if it has no car or assigned corridor calls ahead of it ($\overline{SDO}(2)$ equals ZERO) and if the car assigned to Counter No. 3 (which is of course ahead of the car assigned to Counter No. 2) has less than two calls to handle or at least the second stop it is to make is not just a corridor call (SSD2(3) equals ZERO) then during the SET interval the output of the NOR element E3,19 will go to ONE causing the signal $\overline{MC(2)A}$ to go to ZERO. It will be recalled from the counter circuits that even if the second call assigned to the car assigned to Counter No. 3 is a corridor call, the signal SSD2(3) will not go to ONE if that call is a coincident call, that is if a car call is also registered in the car assigned to Counter No. 3 for that floor. Likewise, if the car assigned to Counter number 2 is the lead car and a blank lead car signal is generated so that the signal $\overline{BLK}(2)$ goes to ZERO, the signal $\overline{MC(2)A}$ will go to ZERO during the SET interval if there are no calls allocated to the car assigned to Counter No. 2 ($\overline{SDO}(2)$ equals ZERO) and blanking that car does not create a demand for service in the direction of scan ($\overline{MCAM}$ equals ZERO).

FIG. 22

Figure 6:
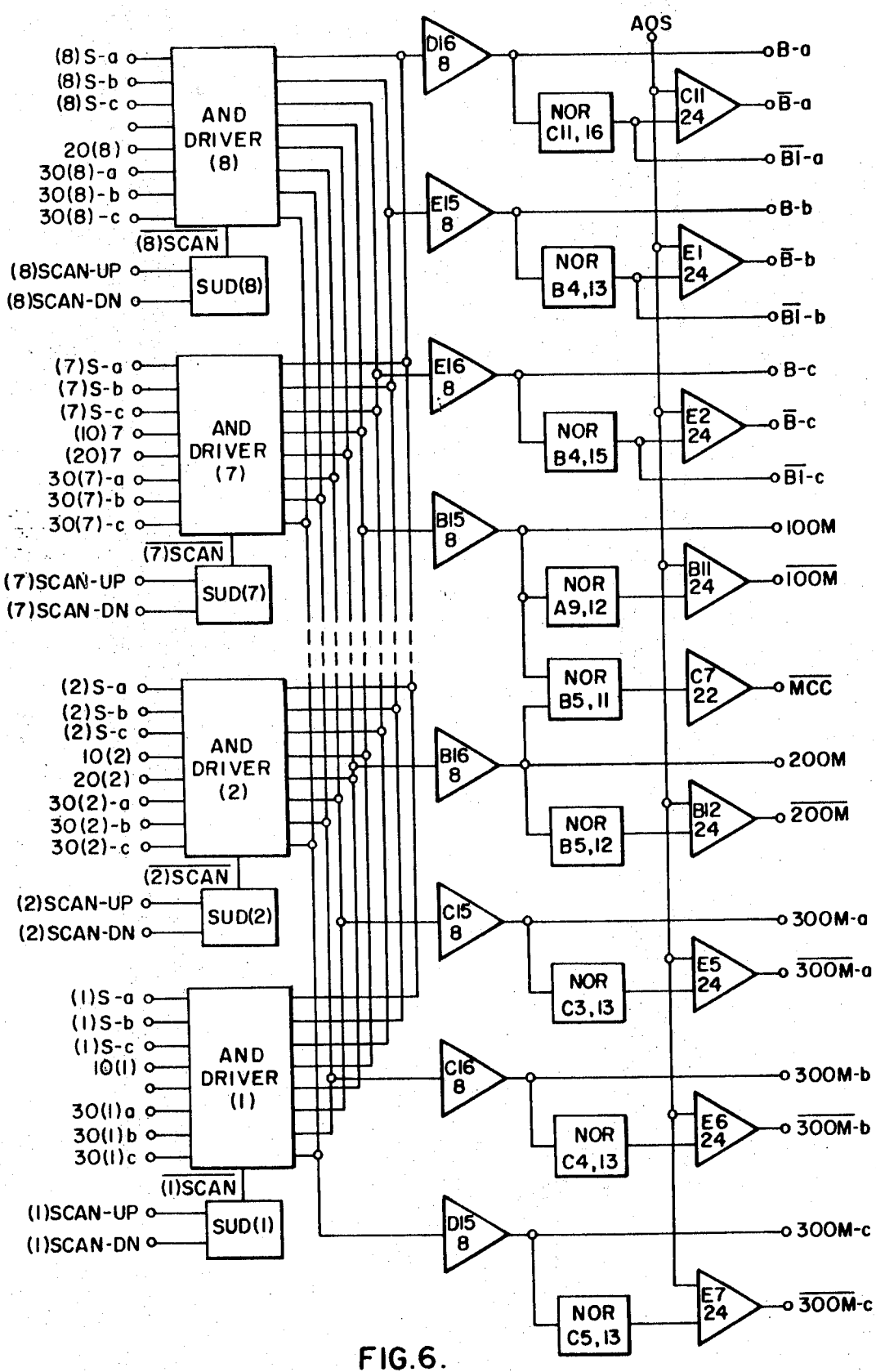
Figure 12:
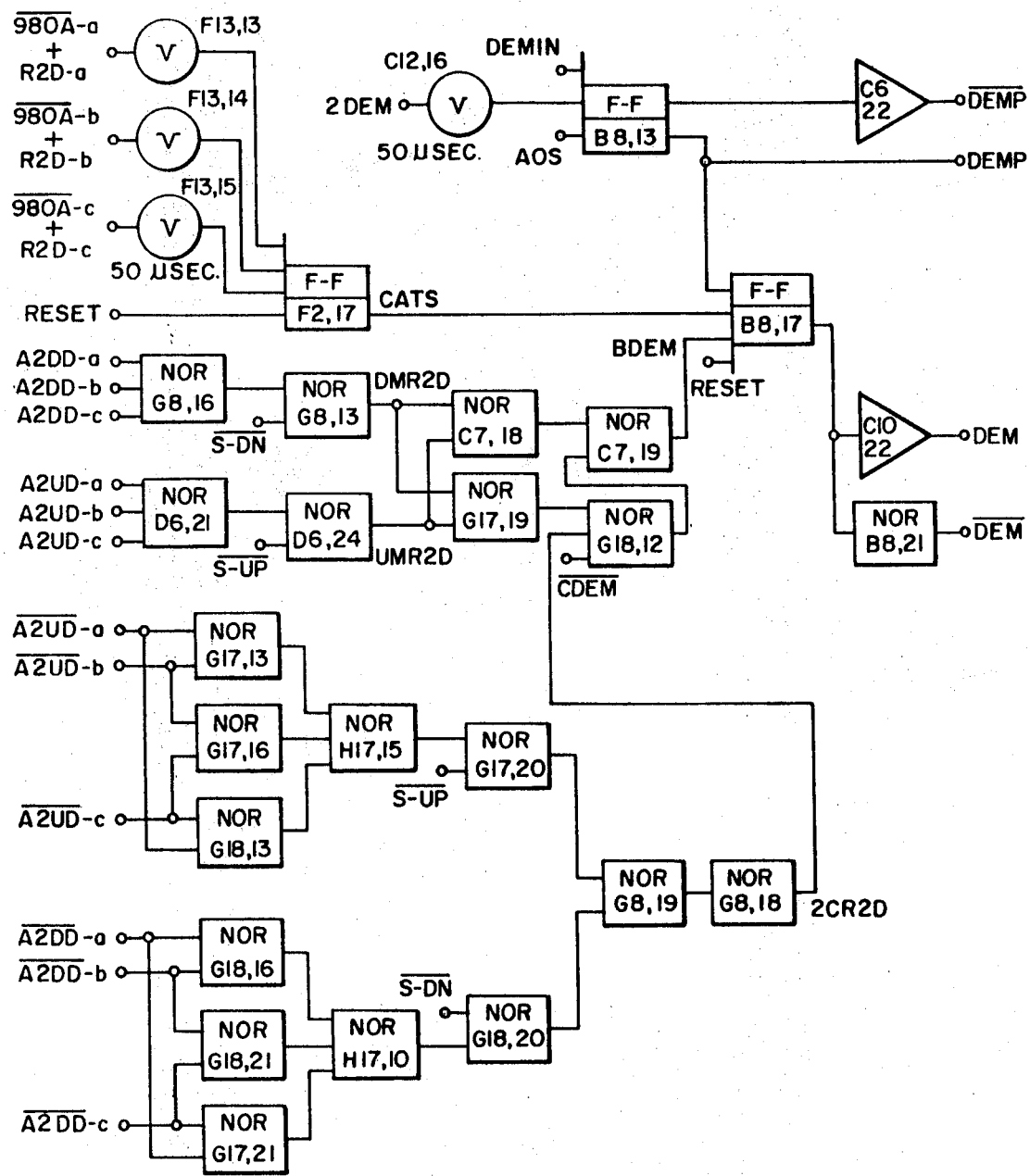
Figure 22:
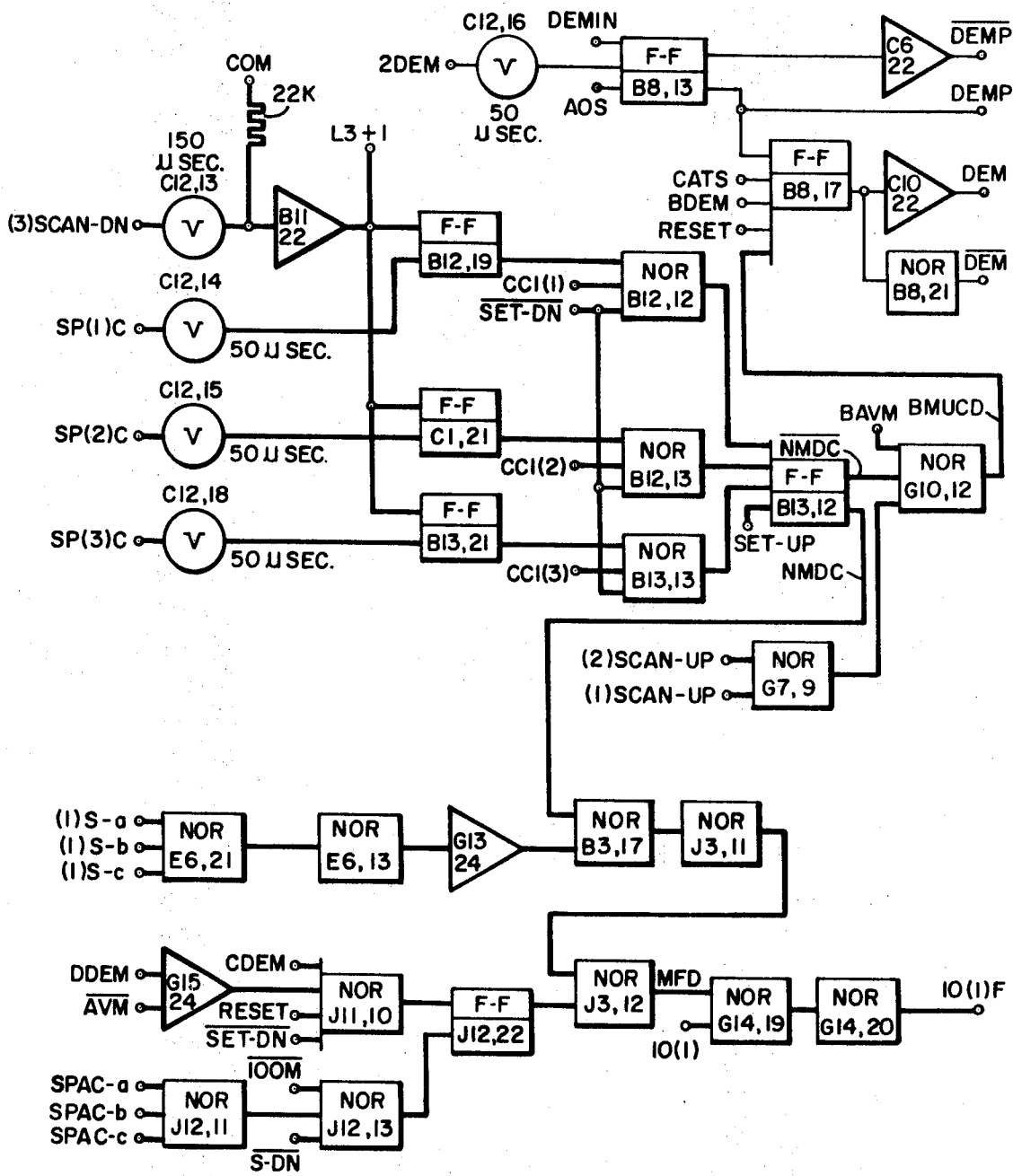

FIG. 22 illustrates the modifications of the circuits for creating the DEM and DEMP of FIG. 12 and a modification of the circuit for generating the up corridor call input to the AND DRIVER (1) of FIG. 6. The added components are shown in heavy lines.

The up corridor call input for AND DRIVER (1) is the signal 10(1) which can be generated in circuits similar to those illustrated in the incorporated application. According to the subject invention the signal 10(1) shown as an input to the AND DRIVER (1) of FIG. 6 should be replaced by the modified signal 10(1)F which is derived in the circuits of FIG. 22. The signal 10(1)F goes to ONE not only when an actual up corridor call is registered at the first floor, but also when an artificial demand for up service at the main floor is created.

The signal 10(1)F is derived from the output of the NOR element G14,20 which has as its input the output of the NOR element G14,19. This latter NOR element has as its inputs the actual up corridor call at the first floor signal 10(1) generated in circuits similar to that in the incorporated application and the artificial main floor demand signal MFD. The signal MFD is generated at the output of the NOR element J3,12 which has as its inputs the signal BLMFD, blank main floor demand, and the output of the NOR element J3,11. The input to the NOR element J3,11 is the output of the NOR element B3,17 which has for its inputs the signals NMDC and the output of the AMPLIFIER G13,24. The AMPLIFIER G13,24 receives its input from the NOR element E6,13 which in turn receives its input from the NOR element E6,21. This latter NOR element has as its inputs the signals (1)S–a, b and c. These latter signals are equal to ONE if the associated car is located at the first floor. They may be derived from circuits similar to those illustrated in the incorporated application for deriving such signals. Assuming for a moment that the signals NMDC and BLMFD are equal to ZERO, the signal 10(1)F will go to ONE to indicate the need for a car at the main floor if all of the signals (1)S–a, b and c are all equal to ZERO indicating that there is no car located at the first floor.

If there are no cars serving down calls within a few floors of the main floor (signal NMDC equals ZERO) an available car will be assigned to serve what appears to be an up demand at the main floor. Since the car will be assigned to up demands, if an up corridor call appears below the car while it is traveling down to the main floor so that in fact there is an actual up demand which the car is in position to serve, the artificial demand at the main floor should be ignored in order that the car may serve the actual demand. The signal BLMFD, blank main floor demand, is generated for this purpose.

The signal BLMFD is produced at the upper output of the MEMORY element J12,22. This MEMORY has an upper input which is the output of the NOR element J11,10 and a lower input which is the output of the NOR element J12,13. The NOR element J11,10 has as inputs the signals CDEM, RESET, $\overline{SET\text{-}DN}$ and the output of the AMPLIFIER G15,24 which has as inputs the signals DDEM and $\overline{AVM}$. The NOR element J12,13 has as inputs the signal $\overline{100M}$, $\overline{S\text{-}DN}$ and the output of the NOR element J12,11. The NOR element J12,11 has three inputs; the signals SPAC–a, b and c. The generation of these latter signals is discussed in connection with the circuits for the STP-DEMP signal in FIG. 19, but briefly it can be said that these signals equal ZERO unless the scanner has scanned past a car traveling in the direction of scan assigned to serve corridor calls in the opposite direction.

For purposes of illustrating the generation of the signal BLMFD, assume that the A car is traveling down to serve the artificial up demand at the main floor and that the scanner is scanning in the down direction. If the scanner has not yet passed any car traveling in the down direction to serve up demands, the signals SPAC–a, b and c will all equal ZERO. Therefore, the output of the NOR element J12,11 will equal ONE and BLMFD cannot be made equal to ONE. However, once the scanner passes the A car on a down scan, the signal SPAC–a will go to ONE to cause the gating signal, which is the output of the NOR element J12,11, to go to ZERO. Since $\overline{S\text{-}DN}$ is also equal to ZERO, if the scanner sees an up corridor call and $\overline{100M}$ goes to ZERO, the output of the NOR element J12,13 will go to ONE to cause the signal BLMFD to go to ONE.

Even though there is an actual up corridor call below the A car which it can serve, the system may still want the car to respond to the artificial demand at the main floor. The decision that the A car should continue on its assignment to the main floor is made during the SET-DN interval when the down scan is complete. This is timely because the signal BLMFD is not effective until the scanner reaches the main floor on the up scan. If at this time, when $\overline{SET\text{-}DN}$ and RESET equal ZERO, there is an available car which could serve the actual up call ($\overline{AVM}$ equals ZERO), there are no down demands (DDEM equals ZERO) and no cars are traveling up for down corridor calls (CDEM equals ZERO), then the output of the NOR element J11,10 will equal ONE to cause the signal BLMFD to go to ZERO. If, however, there are no available cars or there are down demands or a car is traveling up to serve down demands, the output of the NOR element J11,10 cannot go to ONE to cancel the BLMFD signal.

As has been mentioned previously the artificial demand at the main floor will not be generated if there is a car serving in the down direction close to the main floor with only one stop in front of it. The presence of such a car will cause the signal NMC to go to ONE which it can be seen will prevent the signal MFD from going to ONE. The presence of such a vehicle traveling down in the lower third of the building serving down corridor calls will also prevent the creation of a demand for an extra car at the main floor under certain conditions through generation of the signal BMUCD. When the signal BMUCD which serves as a lower input to the MEMORY B8,17 goes to ONE the signal DEM cannot go to ONE.

The signal BMUCD is generated at the output of the NOR element G10,12. There are three inputs to this NOR element; the signal $\overline{NMDC}$, BAVM and the output of the NOR element G7,9. The inputs to this NOR element are the signals (1)SCAN-UP and (2)SCAN-UP. The signal $\overline{NMDC}$ is generated at the upper output of the MEMORY B13,12 which produces the signal NMDC at is lower output. This MEMORY has as its lower input the signal SET-UP. The upper inputs are the outputs of the NOR elements B12,12, B12,13 and B13,13. The inputs to the NOR element B12,12 include the signals $\overline{SET-DN}$, CC1(1) and the lower output of the MEMORY B12,19. The lower input of this MEMORY is the output of the PULSE SHAPER C12,14 which is triggered by the signal SP(1)C. The upper input to this MEMORY is the signal L3+1. This signal is produced at the output of the AMPLIFIER B11,22 which receives its input from the PULSE SHAPER C12,13. A pulse is developed across the 22K resistor which is connected to ground. The input to the PULSE SHAPER C12,13 is the signal (3)SCAN_DN. The signals developed by the NOR elements B12,13 and B13,13 are similar except that the inputs are associated with the Allocated Call Counter Nos. 2 and 3, respectively.

The portion of the circuit just described operates as follows. At the completion of the up scan, the signal SET-UP makes the signal $\overline{NMDC}$ equal to ONE. Since the signal $\overline{SET-DN}$ is equal to ONE except during the SET-DN interval, the outputs of the NOR elements B12,12, B12,13 and B13,13 are all held equal to ZERO. At the beginning of each scan the signals SP(1)C, SP(2)C and SP(3)C are all equal to ZERO since the scanner has not yet scanned past any cars serving in the direction of scan. Assume that as the scanner scans down the floors that it sees the elevator car A serving down corridor calls at the sixth floor. When the scanner advances to the fifth floor position, the A car will be assigned to Counter No. 1 causing the signal SP(1)C to go to ONE. This will produce a 50 microsecond pulse from the PULSE SHAPER C12,14 which will cause the lower output of the MEMORY B12,19 to go to ZERO.

Assume further that as the scanner scans down the floors that it observes the B car serving down calls at the fourth floor. When the scanner advances to the third floor, the elevator car B will be assigned to Counter No. 2 causing the signal SP(2)C to go to ONE. This will produce a 50 microsecond pulse from the PULSE SHAPER C12,15 which will make the lower output of the MEMORY C1,21 equal to ZERO. Since by way of example it was assumed that the lower three floors would be considered the lower third of the building, when the scanner notched into the third floor, the signal (3)SCAN-DN went to ONE producing a 150 microsecond pulse from the PULSE SHAPER C12,13. This signal when passed through the AMPLIFIER B11,22 becomes the signal L3+1 which supplies the pulse to the upper inputs of the MEMORIES B12,19, C1,21 and B13,21. This will cause the lower outputs of the MEMORIES B12,19 and B13,21 to go to ONE. On the other hand, the lower input to the MEMORY C1,21 is equal to ONE for 50 microseconds, the lower output of this MEMORY will stay equal to ZERO temporarily. However, since the pulse L3+1 will last for 150 microseconds, the lower output of the MEMORY C1,21 will also go to ONE when the output of the PULSE SHAPER C12,15 returns to ZERO. Since the signals SP(1)C and SP(2)C stay equal to ONE for the remainder of the scan and the outputs of the PULSE SHAPER C12,14 and C12,15 go to ZERO after 50 microseconds, the lower outputs of the MEMORIES B12,19 and C1,21 will remain equal to ONE for the rest of the scan.

Assume however, that the scanner observes the elevator car C serving down calls at the third floor. When the scanner advances to the second floor, the elevator car C will be assigned to Counter No. 3 and the signal SP(3)C will go to ONE. Therefore, the PULSE SHAPER C12,18 will supply a 50 microsecond pulse to the lower input of the MEMORY B13,21 causing the lower output of this MEMORY to go to ZERO. Assuming that the only call allocated to the elevator car C is a car call registered for the main floor, the signal CC1(3) will still be equal to ZERO upon the completion of the down scan. Therefore, during the SET-DN interval when the signal $\overline{SET-DN}$ goes to ZERO, the output of the NOR element B13,13 will go to ONE. Notice that the outputs of the NOR elements B12,12 and B12,13 cannot go to ONE at this time since the lower outputs of the MEMORIES B12,19 and C1,21 are equal to ONE. The signal $\overline{NMDC}$ therefore will go to ZERO. Notice that this signal cannot be made equal to ONE again until the completion of the up scan (when SET-UP goes to ONE).

As the scanner begins the up scan, the signal (1)SCAN-UP goes to ONE to cause the output of the NOR element G7,9 to go to ZERO. If there is no available car located at the main floor, the signal BAVM will also equal ZERO and therefore the signal BMUCD will equal ONE to preclude the signal DEMP from causing the signal DEM from going to ONE. Therefore, even if there is an actual up corridor call registered at the main floor, the signal DEM cannot go to ONE to assign another car to proceed there because the C car will be available in that portion of the building shortly. However, if there had been an available car at the main floor so that the signal BAVM was equal to ONE, the actual up corridor call could create a demand at the main floor so that the available car would be assigned.

Since the specific embodiment of the invention described calls for a double lower terminal floor at the first and second floors, a demand for a car to serve an up corridor call at the second floor will not be created either if there is a car traveling down in the lower third of the building with only one stop in front of it. Even if the trip of the downward traveling car does not terminate at the second floor, if the last passenger departs at a nearby floor the car will become available and can be assigned immediately. Notice in the example discussed that if all of the cars serving calls in the down direction had been above the third floor or if there had been two calls allocated to the elevator car C so that the signal CC1(3) was equal to ONE, the signal BMUCD would not have been able to go to ONE when the scanner came to the first and second floors on the up scan.

FIG. 23

This figure illustrates the circuits associated with the timed-out calls. It also shows the effect of the timed-out calls on the DEM and DEMP circuits of FIG. 12, on the DDEM and BLCD circuits of FIG. 11 and the STP-DEMP circuit of FIG. 19. Again the added components are shown in heavy lines.

The timed-out down demand signal, TDD is derived from the output of the delay element D11,16 through the AMPLIFIER C11,23. The input of the delay element is derived from the upper output of MEMORY B12,21. The lower input to this MEMORY is the output of the NOR element B11,12 which has three inputs; the signals $\overline{L3D}$, SET-DN and $\overline{200M}$. The signal $\overline{L3D}$ is derived from the upper output of the MEMORY B11,21 which produces the signal L3D at its lower output. The upper input to the MEMORY B11,21 is the signal L3+1 while the lower input is the signal SET-DN. The first of the upper inputs of the MEMORY B12,21 is the output of the NOR element B11,19. This NOR element has as its inputs the signal $\overline{L3D}$ and the output of the NOR element B11,13 which has as its inputs the signals SGD–a, b and c. The second upper input to the MEMORY B12,21 is derived from the voltage source $V_c$ through the manual switch TDD VOID and the resistor R20.

A timed-out down demand is created in the following manner. When the scanner reaches the third floor on the down scan the signal L3+1 goes to ONE to cause the signal $\overline{\text{L3D}}$ to go to ZERO. If there are no cars serving down corridor calls at or below the third floor, the output of the NOR element B11,13 will be equal to ONE. This is so because the signals SGD generated in the circuits of FIG. 7 are equal to ZERO at all times except when the scanner is scanning in the down direction above or at a floor at which a car serving down corridor calls is located. Since it will be assumed for the moment that there are no cars serving down corridor calls in the lower third of the building, the output of the NOR element B11,13 will be equal to ONE so that the output of the NOR element B11,19 is equal to ZERO. If during the down scan the scanner now encounters a down corridor call the signal $\overline{\text{200M}}$ will go to ZERO. Since the signal SET-DN is equal to ZERO except during the SET-DN interval, the output of the NOR element B11,12 will go to ONE. This will cause the upper output of the MEMORY B12,21 to go to ONE to trigger the delay element D11,16.

The delay element D11,16 can be set for any length of time but 60 seconds would be representative of a suitable time interval. It should be remembered that the delay element will produce an output if an input is provided to it for the entire delay interval. When the scanner advances to the next floor beyond the down corridor call, the signal $\overline{\text{200M}}$ will return to ONE however the upper output of the MEMORY B12,21 will remain equal to ONE to maintain the input to the delay element. At the completion of the down scan the signal SET-DN will go to ONE to cause the signal $\overline{\text{L3D}}$ to go to ONE. On subsequent scans the upper output of the MEMORY B12,21 will remain equal to ONE unless the scanner detects a car serving down corridor calls in the lower third of the building. If no such car is detected, then at the completion of the delay interval the output of the delay element D11,16 will go to ONE to cause the signal TDD to go to ONE. This will cause the reverse signal $\overline{\text{TDD}}$ produced at the output of the NOR element C11,18 to go to ZERO.

In order to give priority to the down corridor calls in the lower third of the building, the signal TDEM is generated to block the system from seeing other demands until a car has been assigned to down demands in the lower third of the building. The signal TDEM, which serves as the lower input to the MEMORY B8,17 which produces the signal DEM, is derived from the output of the NOR element C8,20. This NOR element has as inputs the signals L3D and $\overline{\text{TDDP}}$. The latter signal is generated at the upper output of the MEMORY C20,20. The upper input to this MEMORY is supplied by the PULSE SHAPER C20,25 which is triggered by the signal TDD. The lower inputs to the MEMORY include the signal $\overline{\text{TDD}}$ and AL3M. The latter signal is derived from the output of the NOR element C20,21 which derives its input from the NOR element C20,22 which has as its inputs the signals AL3–a, b and c.

When the signal TDD goes to ONE it triggers the PULSE SHAPER C20,25 to cause the signal $\overline{\text{TDDP}}$ to go to ZERO. Since as was previously mentioned the signal L3D is equal to ZERO except when the scanner is scanning down in the lower third of the building, the signal TDEM will be equal to ONE to prevent the system from assigning a car to a demand other than the timed-out down demand in the lower third of the building. When a car is assigned to the lower third of the building the appropriate signals such as AL3–a for the A car will go to ONE to cause the master signal AL3M to go to ONE. This will cause the signal $\overline{\text{TDDP}}$ to go to ONE so that the signal TDEM will be clamped at ZERO and the system may revert to normal assignment.

If a car serving down corridor calls enters the lower third of the building before a car becomes available for assignment to the timed-out down demand the timed-out down demand will be canceled. This will occur because one of the signals SGD–a, b or c associated with the car serving down corridor calls in the lower third of the building will be equal to ONE to cause the output of the NOR element B11,13 to go to ZERO while the signal $\overline{\text{L3D}}$ is equal to ZERO. This it can be seen will result in the signal TDD going to ZERO while the reverse signal $\overline{\text{TDD}}$ goes to ONE. With the latter signal equal to ONE, the signal $\overline{\text{TDDP}}$ will go to ONE also so that the signal TDEM is clamped at ZERO.

It will be recalled from the previous discussion that the signal BDEM is generated to prevent the demand assignment signal DEM from being generated at the first demand seen on the scan if a car is traveling in the opposite direction to serve that demand. For instance if a car has been assigned to run in the up direction to serve down demands (for instance if the signal $\overline{\text{A2DD}}$–a equals ZERO) then on the down scan the signal DMR2D will be equal to ONE. If this is the first corridor call to create a demand on this down scan, the signal $\overline{\text{CDEM}}$ will also be equal to ONE so that the signal BDEM will be equal to ONE to prevent the assignment of a second car to this demand. It will also be recalled that if a second down demand is seen on this scan, the signal $\overline{\text{CDEM}}$ will then be equal to ZERO so that the output of the NOR element G18,12 will be equal to ONE to hold the signal BDEM equal to ZERO. Therefore, the signal DEM can go to ONE and another car, if available, can be assigned to the second demand. Furthermore, it will be remembered that if two cars have been assigned to travel in the up direction to serve down demands, that the signal 2CR2 will be equal to ONE thereby preventing the assignment of any other cars to travel up to serve down demands.

Since priority is given to down corridor calls registered in the lower third of the building for longer than a predetermined interval, a car assigned to travel in the up direction to serve these calls will ignore any down demand in the upper part of the building. Under these circumstances the car traveling up to serve down calls should not prevent the signal DEM from going to ONE so that another car can be assigned to that down demand in the upper part of the building when it becomes available. This car traveling up to serve down calls in the lower third of the building should be seen however, when the scanner reaches the lower portion of the building to prevent the assignment of another car to these calls.

Figure 23:
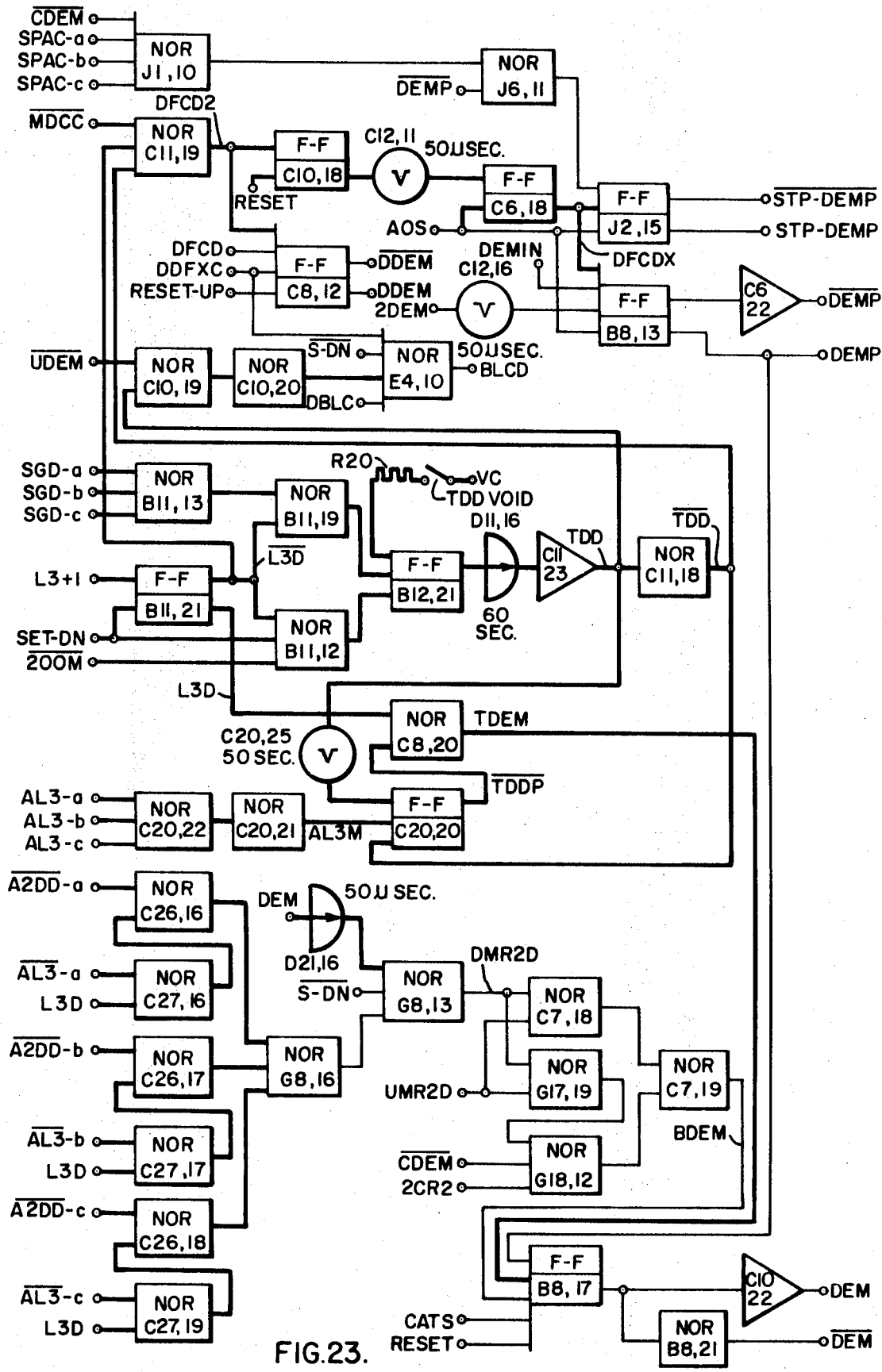

It is with these considerations in mind that the modifications of the BDEM circuit of FIG. 12 are shown in FIG. 23. In place of the signal A2DD–a as an input to the NOR element it is the output of NOR element C26,16 which has as its inputs the signal $\overline{\text{A2DD}}$–a and the output of the NOR element C27,16. This latter NOR element has as its inputs the signals $\overline{\text{AL3}}$–a and L3D. The other inputs to the NOR element G8,16 in FIG. 12 are replaced by similar circuits having inputs associated with the B and C cars respectively.

The BDEM circuit of FIG. 23 performs in the same manner as that of FIG. 12 if one of the cars is not assigned to travel in the up direction to serve down corridor calls in the lower third of the building. For instance if the A car is not assigned to serve down corridor calls in the lower third of the building, the signal $\overline{\text{AL3}}$–a will equal ONE so that the output of the NOR element C27,16 will equal ZERO. Therefore, if the A car is assigned to travel in the up direction to serve down corridor calls so that the signal $\overline{\text{A2DD}}$–a is equal to ZERO, then on the down scan the signal DMR2D will go to ONE to generate the signal BDEM at the first landing at which the DEMP signal is generated to prevent the generation of the assignment signal DEM. However, if the A car is assigned specifically to serve a timed-out down demand in the lower third of the building, the signal $\overline{\text{AL3}}$–a will be equal to ZERO. While the scanner is scanning down in the upper portion of the building, the signal L3D, the generation of which was discussed above, will be equal to ZERO also to make the output of the NOR element C27,16 equal to ONE. Therefore, even though the signal $\overline{\text{A2DD}}$-a may be equal to ZERO, the signal BDEM cannot go to ONE. Consequently, the signal DEM can go to ONE so that the system will search for an available car if there is a down demand in the upper portion of the building. When the scanner reaches the lower third of the building however, the signal L3D will go to ONE and therefore if the A car is assigned to travel up to serve down demands, the signal DMR2D can go to ONE to prevent the assignment of another car to the highest demand in the lower third of the building.

When a down corridor call has been registered for longer than a predetermined time, the signal DEM must be generated so that a car can be assigned to serve this call. In addition the STP-DEMP signal must be generated as explained in the discussion of FIG. 19 so that a car traveling up to serve these down calls may be stopped and reversed at the proper landing. The signal which accomplishes this is the signal DFCDX generated at the lower output of the MEMORY C6,18. This MEMORY has as its lower input the signal AOS and as its upper input the output of the PULSE SHAPER C12,11. This PULSE SHAPER is triggered by the lower output of the MEMORY C10,18 which in turn has as its lower input the RESET signal and as its upper input the signal DFCD2. This latter signal is generated at the output of the NOR element C11,19 which has as its inputs the signals $\overline{\text{MDCC}}$, $\overline{\text{L3D}}$ and $\overline{\text{TDD}}$.

When a down corridor call has been registered for longer than a predetermined time in the lower third of the building, the signal $\overline{\text{TDD}}$ will go to ZERO. When the scanner reaches the lower third of the building on the down scan the signal $\overline{\text{L3D}}$ will equal ZERO and when the scanner reaches a landing at which a down corridor call is registered, the signal $\overline{\text{MDCC}}$ will go to ZERO. Therefore, the signal DFCD2 will go to ONE at the highest down corridor call in the lower third of the building when there is a timed-out down demand registered. This signal will cause the lower output of the MEMORY C10,18 to go to ONE thereby triggering the PULSE SHAPER C12,11 to cause the signal DFCDX to go to ONE. The signal DFCDX will cause the STP-DEMP signal and the DEMP signal to go to ONE. The latter signal will cause the DEM signal to go to ONE so that a car may be assigned to down corridor calls in the lower third of the building. When the scanner advances to the next floor below the highest down corridor call in the lower third of the building the signal AOS will cause the lower output of the MEMORY C6,18 to return to ZERO. Although the lower output of the MEMORY C10,18 remains equal to ONE for the rest of the scan, the pulse produced by the PULSE SHAPER C12,11 is of short duration so that the signal DFCDX will only go to ONE at the highest down corridor call in the lower third of the building. It should be noticed that no matter which landing in the lower third of the building the call was registered for more than the predetermined time, the demand will be created and the assigned car will proceed to the highest registered down corridor call in the lower third of the building.

The creation of the timed-out down demand in the lower third of the building also has an effect on other portions of the system. It should be noticed that the signal DFCD2 will cause the DDEM signal of FIG. 11, reproduced here in FIG. 23, from going to ONE. The signal that this signal is instrumental in seeking out a car traveling in the up direction to serve the heavy demand in the down direction. On the other hand, when there is a timed-out down demand in the lower third of the building, these calls are given priority and therefore it is not desirable to consider releasing a car in the down direction to serve up demands. It is desirable under these circumstances therefore to prevent the signal BLCD, blank lead car in the down direction, which is generated in FIG. 11 but reproduced herein FIG. 23, from going to ONE. The signal BLCD cannot go to ONE if the output of the NOR element C10,20, which has as its input the output of NOR element C10,19, is equal to ONE. The two inputs to the NOR element C10,19 are the signal $\overline{\text{UDEM}}$ and TDD. If there is no up demand ($\overline{\text{UDEM}}$ equals ONE) then there is no need to blank the lead car in the down direction and the signal BLCD cannot go to ONE. However, even if there is an up demand the signal BLCD will be prevented from going to ONE if there is a timed-out down demand (TDD equals ONE).

FIG. 24

This figure discloses the circuits which generate the signals which assign a car to the lower third of the building and illustrate the effect that this has on the signals which indicate that a car is serving in the down direction and on the bypass signal. In addition the circuit for generating the signal indicating that a car has made a quota of stops in the down direction with passengers on board is depicted. The circuits illustrated here are individual per car and although only the circuits for the A car are illustrated, similar circuits are provided for the B and C cars.

The signal AL3-a indicating that the A car has been assigned to serve down calls in the lower third of the building is generated at the lower output of the MEMORY B32,40. This MEMORY has as its lower input the signal $\overline{\text{TDD}}$ and as its upper input the output of the NOR element B33,21. The inputs to this NOR element include the signal $\overline{\text{TDDP}}$ and the output of the NOR element B33,20 which has as its inputs the signals SCU-a and SCD-a. It will be recalled from the discussion of FIG. 23 that when a timed-out down demand is generated, the signals $\overline{\text{TDD}}$ and $\overline{\text{TDDP}}$ both go to ZERO. If at this time the A car is assigned to start in the up or down direction (either SCU-a or SCD-a goes to ONE) the output of the NOR element B33,20 will also go to ZERO causing the output of the NOR element B33,21 to go to ONE. Since the A car was given the start signal while the timed-out down demand had priority, the signal AL3-a will go to ONE indicating that the A car has been assigned to down corridor calls in the lower third of the building. The signal AL3-a will cause the reverse signal $\overline{\text{AL3}}$-a which is generated at the output of the NOR element B32,41, to go to ZERO.

If the A car is above the lower third of the building when it is assigned to the timed-out down demands, it should bypass all down corridor calls until it reaches the lower third of the building. Since it will not stop for these down corridor calls in the upper portion of the building, the car should not be considered serving in the down direction so that the allocating circuits can determine whether another car is needed to serve those down calls in the upper portion of the building. Portions of the circuit of FIG. 21 which produces the bypass signal 77STP-a and of the circuit of FIG. 7 which produces the signal SFD-a are reproduced here in FIG. 24 to how the modifiication necessary when the car is assigned to serve down corridor calls in the lower third of the building.

If the SFD-a circuit the A2UD-a input to the NOR element B5,17 is replaced by the output of the NOR element G13,13 which has as its input the output of NOR element G13,16. The inputs to this latter NOR element include the signals A2UD-a, the output of NOR element G31,16 and the signal QODC-a. The inputs to the NOR element G31,16 include the signals $\overline{\text{AL3}}$-a and L3D. As was the case with the circuit of FIG. 7, the signal SFD-a will go to ONE on the down scan ($\overline{\text{S-DN}}$ equals ZERO) when the scanner has scanned past the A car ($\overline{\text{F}}$-a equals ZERO) if the car is set for down travel ($\overline{\text{81DS}}$-a equals ZERO), but it is not traveling down to serve up demands (A2UD-a equals ZERO). However, if the A car is assigned to serve down calls in the lower third of the building ($\overline{AL3}$-*a* equals ZERO) the output of the NOR element G31,16 will be equal to ONE to prevent the signal SFD-*a* from going to ONE as long as the scanner is scanning down in the upper portion of the building (L3D equals ZERO). With the signal SFD-*a* equal to ZERO the allocating circuits will not considered the A car in the allocation of down corridor calls in the upper portion of the building.

When the scanner reaches the lower third of the building and the signal L3D goes to ONE, the output of the NOR element G31,16 will go to ZERO so that the signal SFD-*a* can go to ONE. At this point the allocating circuits can begin allocating down corridor calls in the lower third of the building to the A car to see if the A car can comfortably handle all of these calls or if another demand should be created. Notice that no matter where the A car is located in the upper portion of the building, it appears to the allocating circuits that the A car is located just above the lower third of the building since it is at the highest floor in the lower third of the building that the signal SFD-*a* goes to ONE to indicate the scanner has just passed the A car serving in the down direction. It can also be seen that when the signal QODC-*a* goes to ONE indicating that the A car has made its quota of down stops with passengers on board that the signal SFD-*a* is held equal to ZERO so that the A car will not be considered in the allocation of the remaining down corridor calls registered.

It can also be seen that the bypass signals 77STP-*a* will be equal to ONE to prevent the A car from stopping for down corridor calls when the output of the NOR element G31,16 is equal to ONE indicating that the A car is assigned to down calls in the lower third of the building and the down call in consideration is in the upper portion of the building. In like manner, the bypass signal will be generated when the A car has made its quota of down stops with passengers on board (QODC-*a* equals ZERO).

The signal code QODC-*a* is generated at the output of the NOR element B4,19 which has as its inputs the signals $\overline{AVM}$ and TDD in addition to the output of the AMPLIFIER B14,24. Two inputs to this AMPLIFIER are the lower outputs of the MEMORIES B11,16 and B12,16. These two MEMORIES form a binary counter much the same as the binary counters described in connection with FIG. 14. These MEMORIES each have one upper input which is the output of the NOR element B6,11 and like the MEMORIES utilized in the binary counters of FIG. 14 they have a TRIP input rather than a lower input. The TRIP input for the MEMORY B12,16 is the lower output of the MEMORY B11,16 while the trip input to this latter MEMORY is the output of the NOR element B11,18. It will be recalled that the operation of this type MEMORY is such that if the upper input is ZERO then each time that the TRIP signal goes from ZERO to ONE the output of the MEMORY will be reversed. The input to the NOR element B6,11 which provides the RESET signal for the MEMORIES is derived from the output of the NOR element B14,18 which has as its inputs the signal $\overline{80DX}$-*a* and 81U-*a*. The inputs to the NO Relement B11,18 include the signal 70-*a*, the upper output of the MEMORY C4,19 and the output of the NOR element B4,20 which has as its input the output of the AMPLIFIER B14,24. The upper input of the MEMORY C4,19 is the signal SFD-*a* while the lower input to his MEMORY is the signal 81U-*a*.

The signal QODC-*a* is generated in the following manner. While the A car is traveling in the up direction, the signal 81U-*a* will be equal to ONE to reset the MEMORIES B11,16 and B12,16 and to cause the upper output of the MEMORY C4,19 to go to ONE. The lower outputs of the MEMORIES B11,16 and B12,16 will therefore both be equal to ONE so that the signal QODC-*a* cannot go to ONE. Assuming that the car subsequently becomes assigned to travel in the down direction to serve down corridor calls, the signal SFD-*a* generated in the circuits of FIG. 7 will go to ONE to cause the upper output of the MEMORY C4,19 to go to ZERO, since under these conditions the up direction signal 81U-*a* must be equal to ZERO.

At this point the output of the NOR element B14,20 will be equal ZERO, but as the car travels down the non-interference signal 70-*a* will be equal to ONE to maintain the output of the NOR element B11,18 equal to ZERO. When the car stops for down corridor calls, the signal 70-*a* will remain equal to ONE for a period long enough to allow a passenger to enter the car and register a call for the floor to which he desires to be transported. When a passenger registers a call for a floor below the position of the car, the signal $\overline{80DX}$-*a*, generated in the circuits of FIG. 16, will go to ZERO. Since as was mentioned, the signal 81U-*a* is equal to ZERO at this point, the RESET signal for the counter MEMORIES will go to ZERO. When the non-interference time expires and the doors begin to close, the signal 70-*a* will go to ZERO to cause the output of the NOR element B11,18 to go to ONE. This TRIP signal will therefore cause the lower output of the MEMORY B11,16 to go to ZERO. However, since the output of the MEMORY B12,16 remains equal to ONE the signal QODC-*a* is clamped at ZERO. When the car is started the signal 70-*a* will return to a value of ONE to cause the output of the NOR element B11,18 to go to ZERO. However, the lower output of the MEMORY B11,16 will remain equal to ZERO.

If a car call for a floor below the position of the car is still registered at the time that the non-interference time expires when the car makes another stop for the down corridor call, the output of the NOR element B11,18 will again go to ONE this time causing the lower output of the MEMORY B11,16 to return to a value of ONE. This signal will trip the MEMORY B12,16 to cause its lower output to go to ZERO, however, the signal QODC-*a* is maintained equal to ZERO by the output of the MEMORY B11,16. The next time that the non-interference time expires after stopping for a down corridor call, the lower output of the MEMORY B11,16 will return to ZERO. Since at this time the output of B12,16 is also equal to ZERO, the signal QODC-*a* will go to ONE if there is an available car in the system ($\overline{AVM}$ equals ZERO) and no timed out down corridor calls are registered (TDD equals ZERO).

It will be recalled from the summary of the invention that the requirement that another car be available is imposed to prevent the car from bypassing corridor calls when another car is not available to serve the calls. It will be noticed that the counter counted to 3 before producing the signal QODC-*a*. However, the first count was entered at the floor at which the passenger registering the car call boarded the car. Hence the signal QODC-*a* was developed after the car had made two stops with a passenger on board. Notice also that the counter is reset whenever there is no car call registered for a floor below the car (when $\overline{80DX}$-*a* goes to ONE).

OPERATIONS

From the drawings illustrating the invention and from the foregoing discussion in which the figures of the drawings are discussed in detail, it is possible to trace the operation of the elevator system in response to various demands for elevator service. Because of the complexity of the system, however, it will be helpful at this stage to describe a number of representative operations thereof.

(1) The assignment of available cars to corridor calls

Assume that the scanner is in operation and it is rapidly and continually scanning the floors in the up and down directions. Further assume that the A car is standing available at the eighth floor, the B and C cars are standing available at the first floor and that a down corridor call is registered by a prospective passenger at the fifth floor. As the scanner begins the down scan and the signal (8)SCAN-DN in FIG. 4 goes to ONE, the AND DRIVER for the eighth floor shown in FIG. 6 will be open. Since it was assumed that the A car was located at the eighth floor the signal (8)S–$a$ will equal ONE and therefore the signal B–$a$ will equal ONE and the signal $\overline{B}$–$a$ will equal ZERO. With the latter signal equal to ZERO and since it was assumed that the A car was available so that the signal $\overline{AV}$–$a$ is equal to ZERO, the signal BAVM in FIG. 13 will be equal to ONE and the signal $\overline{BAVM}$ will be equal to ZERO. The signal BAVM will cause the signal SP1AC in FIG. 14 to go to ONE thereby applying a bias to the Q1 input of the comparator circuit in FIG. 14. This it will be remembered causes the signal Q to go to ONE. Since the system has seen no demand up to this point in the scan, the signal DEM will equal ONE. When the scanner advances to the next floor a count of ONE will be entered into the upper counter of FIG. 14 in the manner described in the detailed description of that figure. When the scanner advances to the sixth floor a count of TWO will be entered in the upper counter.

Figure 10:
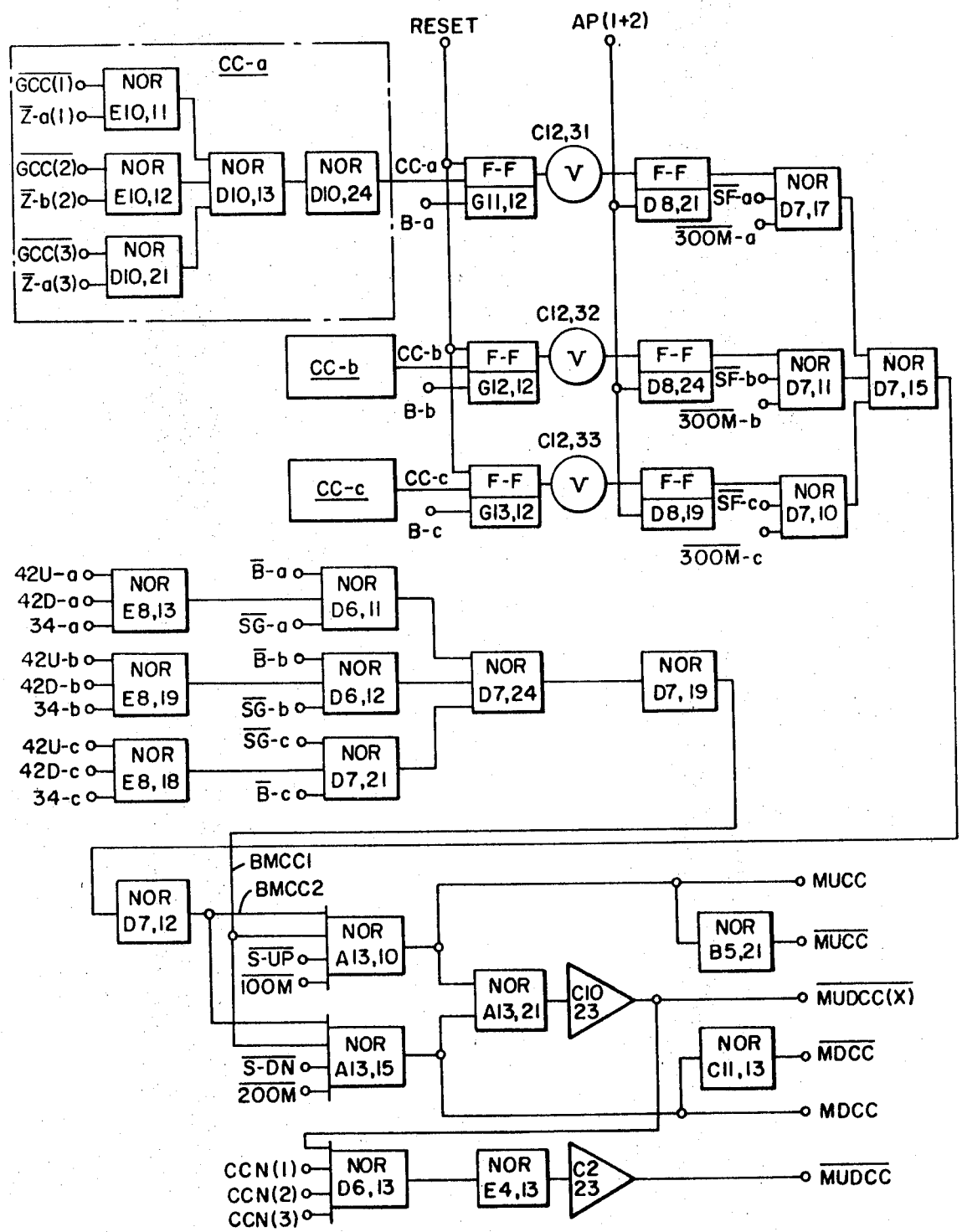

When the scanner advances to the fifth floor and the gate to AND DRIVER (5) is opened, the down corridor call signal 20(5) will cause the signal $\overline{200M}$ in FIG. 6 to go to ZERO. Since the signal $\overline{200M}$ is equal to ZERO, the scanner is scanning down, and there are no conditions existing to generate a blocking signal, all of the inputs to the NOR element A13,15 in FIG. 10 are equal to ZERO so that the signal MDCC goes to ONE. This latter signal when applied to the lower input of the MEMORY B3,10 in FIG. 11 causes the signal DFC to go to ONE. As can be seen from the circuits of FIG. 11, this will cause the signal DEMIN to go to ONE.

This signal DEMIN when applied to the upper input of the MEMORY B8,13 in FIG. 12 will generate a DEMP signal which in turn will cause the signal DEM to go to ONE. With the signal DEM equal to ONE, the count in the upper counter illustrated in FIG. 14 will be held at a count of TWO. With the signals $\overline{DEM}$ and BAVM equal to ZERO and the signal Q equal to ONE at this point, it will be recalled from the detailed discussion of FIG. 15 that the signals $\overline{F50}$ and F70 both remain equal to ONE. Therefore, no assignment of a car to the demand is made at this time.

Figure 13A:
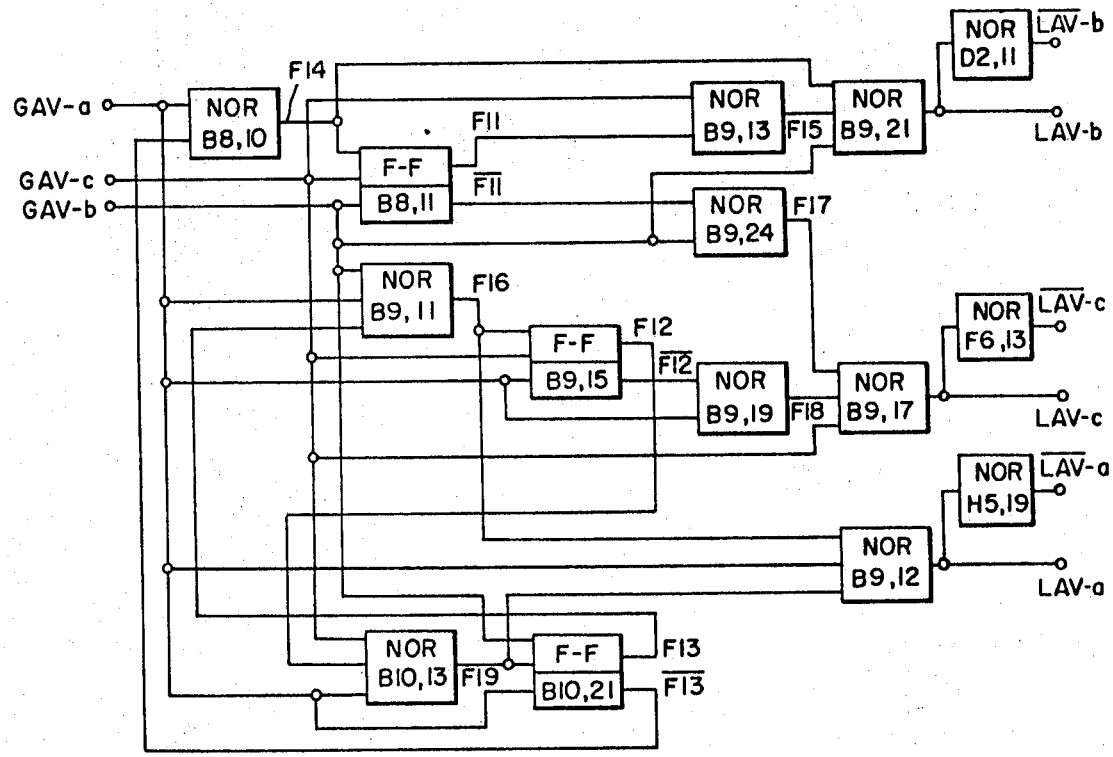
Figure 13B:
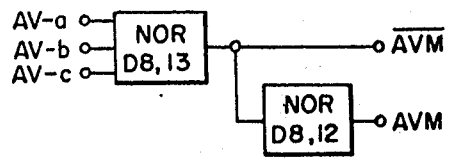
Figure 13C:
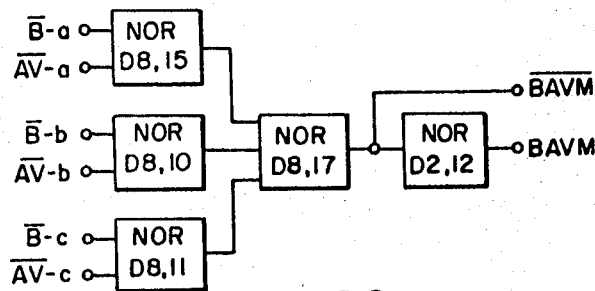
Figure 14:
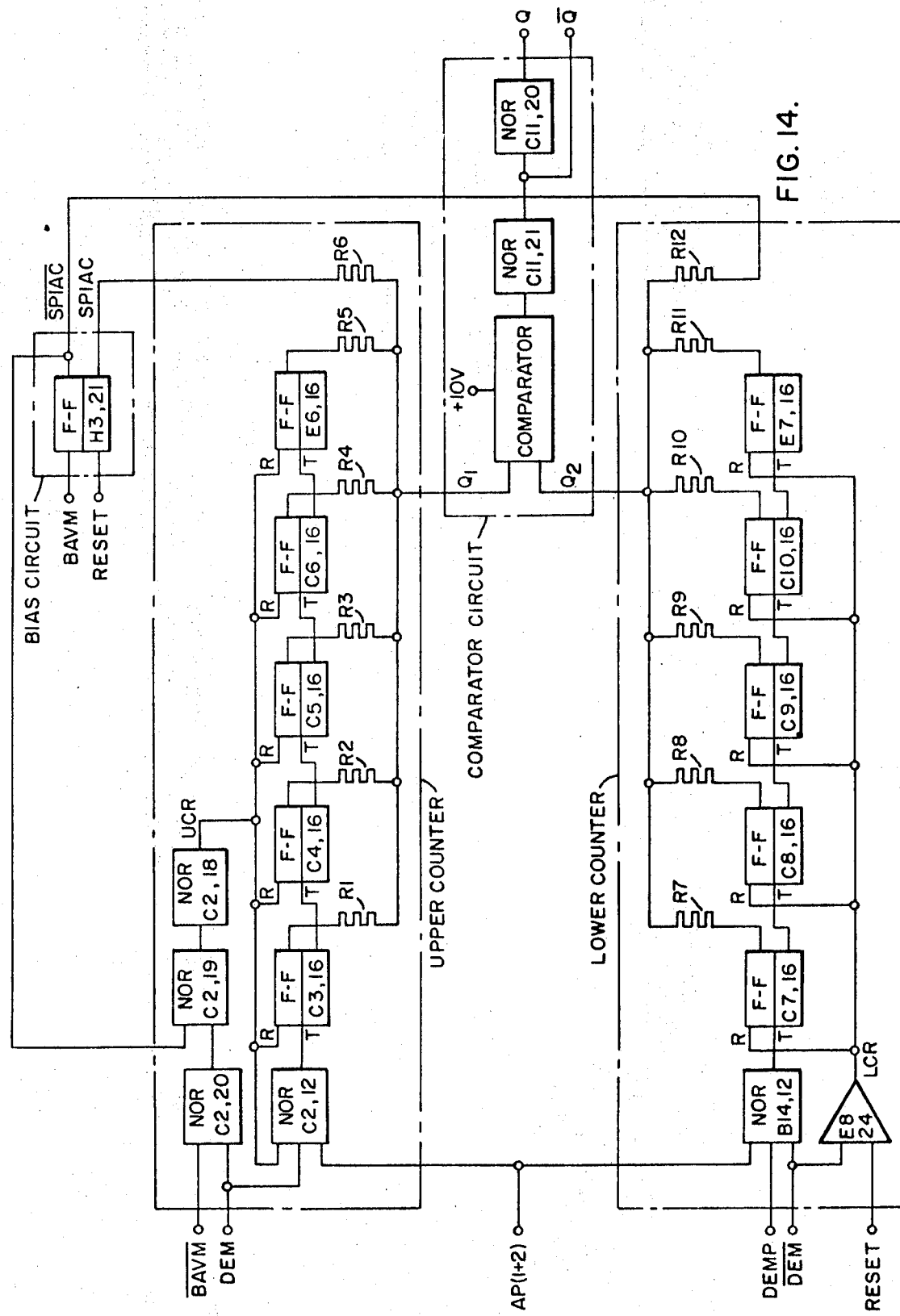

When the scanner advances to the fourth floor, the lower counter in FIG. 14 begins to count. When the scanner reaches the second floor on the down scan which is the same number of floors below the demand at the fifth floor that the A car was above that demand, the count in the lower counter will be THREE which will exceed the count in the upper counter and therefore the signal Q will go to ZERO. With the signals $\overline{DEM}$, BAVM and now Q all equal to ZERO, it will be recalled from the discussion of FIG. 15 that the signal F70 will go to ZERO. Since F70 is equal to ZERO while the scanner is scanning down ($\overline{S\text{-}DN}$ equals ZERO) and since the A car is the last available car seen ($\overline{LAV}$–$a$ generated in the circuits of FIG. 13 equals ZERO) the signal D81D–$a$ in FIG. 15 will go to ONE.

With the signal D81D–$a$ applied to the input of the NOR element C13,11 in FIG. 16, the signal 80DX–$a$ will go to ONE. This signal in turn when applied to the upper input of the MEMORY E10,17 in FIG. 17 will cause the signal 81D–$a$ in FIG. 17 to go to ONE. This signal through circuits similar to those illustrated in the incorporated application is effective to cause the power controller to start the elevator car A moving in the down direction to serve the down corridor call at the fifth floor.

Figure 20A:
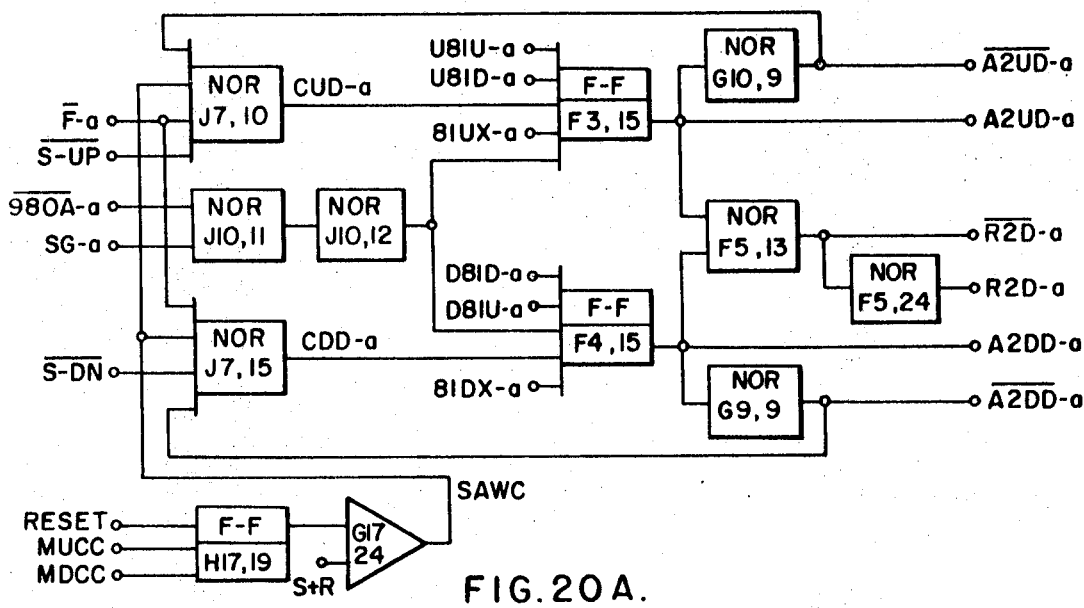
Figure 20B:
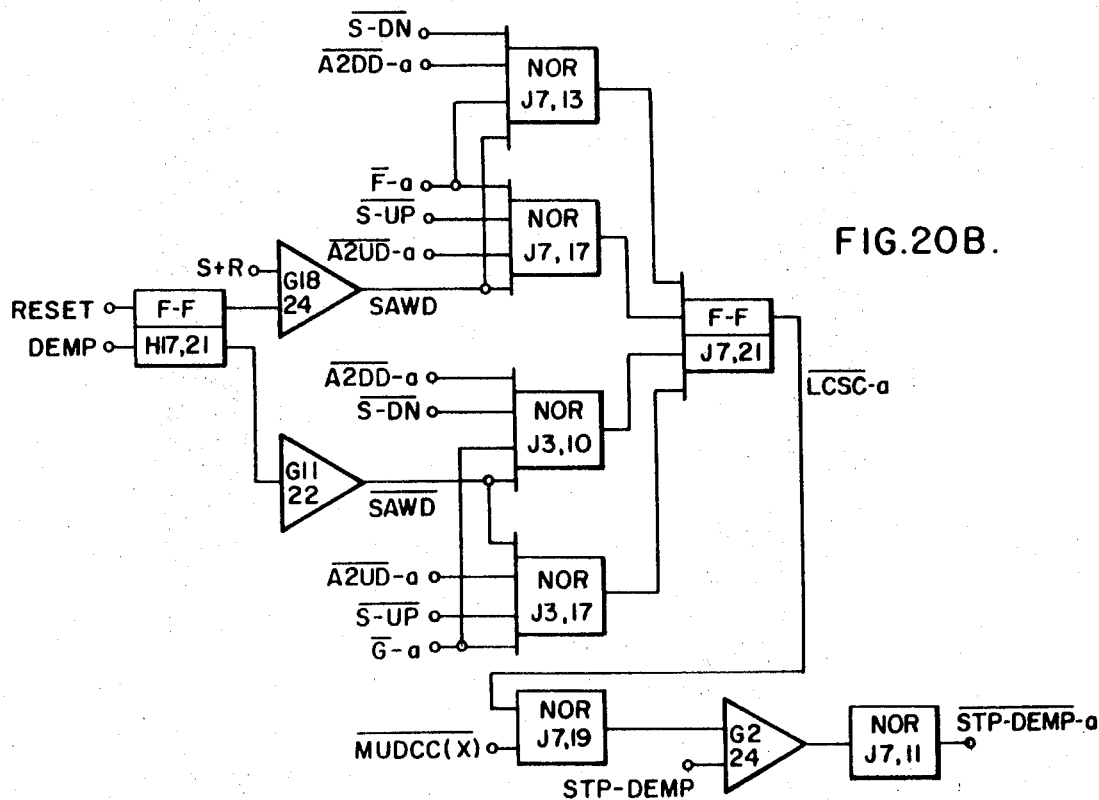

The signal D81D–$a$ will also cause the signal A2DD–$a$ in FIG. 20 to go to ONE. This latter signal will have only a momentary effect on the system at this time and will be canceled on the next down scan by the signal produced at the output of the NOR element J10,12. Before being canceled, however, the signal A2DD–$a$ will cause the signal R2D–$a$ to go to ONE. This signal will cause the signal $\overline{980A}$–$a$+R2D–$a$ in FIG. 21 to go to ONE. This latter signal when applied to the input of PULSE SHAPER F13,13 in FIG. 12 will result in cancellation of the signal DEM. In other words, since a car has been assigned to the demand, the demand for an extra car is canceled.

With $\overline{DEM}$ now equal to ONE again, the signal F70 will go back to ONE and therefore the signal D81D–$a$ will return to ZERO. With D81D–$a$ equal to ZERO, the lower output of the MEMORY E9,17 in FIG. 16 will go to ZERO, at the completion of the down scan during the RESET interval however, the signal 80DX–$a$ will remain equal to ONE at this time. The signal $\overline{980A}$–$a$+R2D–$a$ will cause the signal AV–$a$ in FIG. 7 to go to ZERO so that the A car will lose its available car indication. With the signal 81D–$a$ equal to ONE, the signal $\overline{81DS}$–$a$ will be equal to ZERO. Now on the next down scan when the scanner reaches the seventh floor so that it has scanned past the elevator car A, the signal SF–$a$ in FIG. 7 will go to ONE to indicate that the A car is serving in the down direction. This latter signal will cause the signal SP(1)C in FIG. 8 to go to ONE indicating that the scanner has scanned past the first car serving in the down direction. Now when the scanner reaches the fifth floor, the signal DEMIN in FIG. 11 will not go to ONE indicating a demand for service because the signal SP(1)C blocks the signal DFC in FIG. 11 from going to ONE in response to the down corridor call at the fifth floor (when MDCC goes to ONE).

The down corridor call at the fifth floor will still cause the signal MDCC in FIG. 10 to go to ONE which in turn causes the signal $\overline{MUDCC(X)}$ to go to ZERO. With the latter signal equal to ZERO while $\overline{SF}$–$a$ equals ZERO on the down scan, the signal D1 in FIG. 17 goes to ONE to cause the signal $\overline{78D}$–$a$ to go to ZERO. Since as was described, the signal $\overline{81DS}$–$a$ is equal to ZERO, since the car is not to stop and become available STAV–$a$ equals ZERO and since the car is not fully loaded the signal 77–$a$ equals ZERO, the output of the NOR element E9,13 in FIG. 17 will be equal to ONE to maintain the upper output of MEMORY E10,17 equal to ZERO. This is necessary because the signal 80DX–$a$ will go to ZERO at the completion of the second down scan and an upper input to the MEMORY E10,17 is required to prevent the signal RDC–$a$, which equals ONE while the car is running and does not have a stop signal, from canceling the down direction signal 81D–$a$. As the A car begins its downward movement from the eighth floor to answer the down corridor call at the fifth floor, the down corridor call below signal $\overline{78D}$–$a$ remains equal to ZERO to keep the A car traveling in the down direction.

As soon as the elevator car A intercepts the inductor plate in the hatchway between the sixth floor and the fifth floor, the signal (5)S–$a$ goes to ONE indicating that the elevator car A is approaching the fifth floor. When the scanner then reaches the fifth floor on the next down scan so that the gate to AND DRIVER (5) is open, the signals $\overline{B}$–$a$ and $\overline{200M}$ go to ZERO simultaneously. The signal $\overline{200M}$ causes the signal $\overline{MDCC}$ to go to ZERO as on previous scans. Since the car is traveling down, the signal $\overline{2A}$–$a$ is also equal to ZERO and since it will be assumed that there is no indication for the elevator car A to bypass, the signal 77STP–$a$ is also equal to ZERO. Therefore all of the inputs to the NOR element F1,10 in FIG. 18 are equal to ZERO and the output of this signal is equal to ONE. As described in the detailed description of FIG. 18, this causes the output of the NOR element F2,51 to go to ZERO. Since while the car is passing the inductor plate associated with the fifth floor which will take many scans by the scanner, the signal 39–$a$ is equal to ONE, the stopping signal 34–$a$ will be generated. The output of the NOR element F1,10 is only equal to ONE for about a millisecond while the scanner is scanning at the fifth floor. However, the signal $34-a$ will be maintained equal to ONE for a time sufficient to initiate the stopping sequence by the reverse noninterference signal $\overline{70}-a$ and the reverse signal $\overline{34}-a$ as described in the detailed description of FIG. 18. As described in the incorporated application, this would result in cancellation of the down landing call at the fifth floor. This in turn will result in the signal $\overline{78D}-a$ in FIG. 17 returning to ONE after a couple of scans. Therefore, both of the upper inputs to the MEMORY E10,17 of FIG. 17 will be equal to ZERO. However, RDC–$a$ will be equal to ZERO at this time and 81H–$a$ will remain equal to ZERO at least until the non-interference time expires and the doors close so that the down direction signal 81D–$a$ will remain equal to ONE.

If a passenger then enters the elevator car A and registers a car call for say the first floor, the following sequence of events will occur. When the scanner reaches the first floor on the next down scan the signal $30(1)-a$ will be equal to ONE to cause the signal $\overline{300M}-a$ in FIG. 6 to go to ZERO. With this latter signal equal to ZERO, the output of the NOR element G1,20 in FIG. 16 will be equal to ONE causing the signal X1–$a$ to go to ZERO. Since the scanner is scanning below the car the signal G–$a$ and UV–$a$ are also equal to ZERO therefore the signal UB–$a$ will be equal to ONE to cause the signal 80DX–$a$ to go to ONE. It can be understood from the previous discussion of FIG. 16 that ths signal will remain equal to ONE as long as the car call for a floor below the position of the elevator car A is registered for the car. With this signal equal to ONE then the signal 81D–$a$ in FIG. 17 will remain equal to ONE and the car will continue its downward trip.

(2) Allocating calls

In the previous example, assume that the A car is still at the seventh floor traveling down to serve the down corridor call at the fifth floor but that the B and C cars are no longer available at the first floor. When the scanner reaches the sixth floor and $\overline{SF}-a$ goes to ZERO while SF–$a$ goes to ONE indicating that the scanner has scanned past the A car serving calls in the down direction, the intermediate variable F1 and F2 in FIG. 8 both remain equal to ZERO. These two signals will combine with the signal $\overline{SF}-a$ through the NOR element A3,13 to cause the signal $\overline{Z}-a(1)$ to go to ZERO indicating that the elevator car A is to be assigned to Allocated Call Counter No. 1. When the scanner passed the A car which was the first car serving in the direction of scan, the signal $\overline{SP(1)C}$ in FIG. 8 went to ZERO to release the MEMORY elements in Counter No. 1 shown in FIG. 9.

When the scanner reaches the fifth floor and the signal MDCC goes to ONE, the signal $\overline{MUDCC}$ in FIG. 10 will go to ZERO. This latter signal serves as a corridor call input to Counter No. 1 causing the signal GCC(1) in FIG. 9 to go to ONE. As was shown in the detailed description, this enters a count of ONE into Counter No. 1 and causes the signal SDO(1) to go to ZERO while the signals SSD2(1) and SSD3(1) remain equal to ZERO. If the scanner then detects another down corridor call at the fourth floor, the signal $\overline{MUDCC}$ will go to ZERO again to enter another corridor call into Counter No. 1. Again the detailed description of Counter No. 1 will show that this will result in causing the signal SSD2(1) to go to ONE. The A car which is assigned to Counter No. 1 now has its quota of calls allocated to it.

If the scanner should now encounter a car call for the elevator car A at the third floor, the signal $\overline{300M}-a$ would go to ZERO and since the signal $\overline{Z}-a(1)$ is also equal to ZERO, the car call signal CC(1) would go to ONE. Sinsce Counter No. 1 already has its quota of calls allocated to it, this would have no effect on the system at this time. However, should the scanner encounter another down corridor call at the second floor so that $\overline{MUDCC}$ goes to ZERO again, the signal SSD3(1) in FIG. 9 would go to ONE indicating that the car assigned to Counter No. 1 needs assistance in serving the calls in front of it. The signal SSD3(1) being equal to ONE will cause the signal DEMIN to go to ONE in FIG. 11 which in turn will cause the signal DEM in FIG. 12 to go to ONE indicating a demand for an extra car.

Assume that the B car becomes available at the eighth floor and that it is assigned to travel down to serve the demand. On the next down scan the B car will be the first car seen serving in the down direction by the scanner and it will therefore be assigned to Counter No. 1 while the A car will be assigned to Counter No. 2. Since all of the calls are directly in front of elevator car A, the calls at the fifth and fourth floors will still be allocated to elevator car A but now through Counter No. 2. These calls will not be allocated to the B car because with the scanner below the A car when these calls are detected the signal $\overline{SP(2)C}$ will be equal to ZERO. Since at this point the signals SSD3(2) and BLK(2) also both equal ZERO, the output of NOR element A5,13 will be equal to ONE to block the input of corridor calls to Counter No. 1. This time when the scanner reaches the second floor at which the third down corridor call in front of the elevator car A is located, the signal SSD3(2) will go to ONE. Referring to FIG. 9 as representing the circuit of Counter No. 1, with the signal SSD3(2) now equal to ONE, the output of the NOR element A5,13 returns to ZERO to unblock the input of corridor calls to Counter No. 1. Therefore, when the down corridor call at the second floor causes the signal $\overline{MUDCC}$ to go to ZERO, the count of one will be entered into Counter No. 1 thereby allocating the down corridor call at the second floor to the elevator car B.

Assume that when the elevator car A stops for the down corridor call at the fifth floor that the elevator car B passes it up. Under these conditions, on the next down scan the elevator car A will be again assigned to Counter No. 1 and the elevator car B will now be assigned to Counter No. 2. If the elevator car B notches into the fourth floor while the elevator car A is stopping for the down corridor call at the fifth floor, the down corridor call at the fourth floor will still be allocated to the elevator car A since the scanner has not yet scanned past the elevator car B serving in the down direction. Since the stopping circuits for the elevator car B are similar to those for the elevator car A and since the signals $\overline{2A}-b$ and $\overline{B}-b$ are equal to ZERO in addition to the signal $\overline{MDCC}$, it would appear that a stopping signal would be generated. However, under the conditions described the signal 77STP–$b$ will be equal to ONE to block the generation of the stopping signal for the B car.

The signal 77STP–$b$ is generated in a circuit similar to that at the top of FIG. 21. It will be recalled that when a car is initially assigned to travel in one direction to serve landing calls in that direction that the signal R2D–$b$ goes to ONE (see FIG. 20). This causes the signal $\overline{ASND}-b$ in FIG. 21 to go to ZERO. When the scanner reaches the fourth floor during the down scan it has passed the first car serving in the down direction so that the signal $\overline{SP(1)C}$ is equal to ZERO. Since at this point a quota of calls have not been allocated on this scan to the car assigned to Counter No. 1, the signal SSD2(1) equals ZERO. In addition, since the scanner is only one floor below the last car seen serving in the down direction, the signal DIST of FIG. 19 also equals ZERO. Therefore the signal $\overline{BYP}$ equals ZERO. This causes the signal 77AD–$b$ to equal ONE which in turn causes the signal 77STP–$b$ to equal ONE. Therefore, the elevator car B will pass up the down corridor call at the fourth floor which the elevator car A will be able to answer shortly thereby preventing bunching of the cars.

If the car assigned to Counter No. 1 does not have its quota of calls in front of it so that upon completion of the down scan when $\overline{\text{SET}}$ goes to ZERO SSD2(1) is still equal to ZERO, the signal C77ADV–b is generated to cause the signal $\overline{\text{ASND}}$–a to go to ONE thereby canceling the bypass signal. However, such is not the case in the example given since the signal SSD2(1) will equal ONE at the completion of the down scan due to the down corridor call at the fourth floor and the car call for the A car at the third floor. Therefore the elevator car B will pass the down corridor call at the fourth floor leaving the call to be answered by the A car. However, when the scanner detects the elevator car B approaching the second floor, the signal SSD2(1) will be equal to ONE since at that point in the scan the scanner has seen two calls in front of the A car which should be answered by the A car. Consequently, the signal $\overline{\text{BYP}}$ will be equal to ONE to cancel the 77STP–b sginal. Under these conditions then the elevator car B will stop for the down corridor call at the second floor.

(3) Coincident calls

Assume that the elevator car A is located at the eighth floor, serving down corridor calls and has car calls registered for the fifth, fourth and third floors. Assume further that the B car serving down corridor calls is located at the sixth floor and that down corridor calls are registered for the fifth, fourth and third floors respectively.

At the start of the down scan the RESET signal will cause the upper output of MEMORY G11,12 in FIG. 10 to go to ZERO. When the scanner reaches the eighth floor on the down scan, the signal B–a will go to ONE to cause the output of this MEMORY to go to ONE. This in turn will activate the PULSE SHAPER C12,31 which will apply a signal with a value of ONE to the upper input of MEMORY D8,21. Although the signal AP(1+2) periodically goes to ONE as the scanner scans down the floors, the upper output of MEMORY D8,21 is held equal to ZERO as long as an output is generated by the PULSE SHAPER. Since there are no corridor calls yet allocated to the elevator car A which is assigned to Counter No. 1, the signal CC–a remains equal to ZERO.

When the scanner reaches the fifth floor it has passed the elevator car A serving in the down direction, hence the signal $\overline{\text{SF}}$–a is equal to ZERO. Since a car call is registered at the fifth floor for the elevator car A, the signal $\overline{\text{300M}}$–a also goes to ZERO so that the output of the NOR element D7,17 goes to ONE. Therefore, even though a down corridor call is registered at the fifth floor ($\overline{\text{200M}}$ goes to ZERO) the signal BMCC2 is equal to ONE to prevent the signal MDCC from going to ONE and the signal $\overline{\text{MUDCC}}$ from going to ZERO. Although the scanner has passed the elevator car B and therefore corridor calls detected should be allocated to the elevator car B, the Counter No. 2 will not receive any indication of a down corridor call. Likewise, since the signal $\overline{\text{MDCC}}$ remains equal to ONE no stopping signal will be generated for the elevtaor car B when it reaches the fifth floor. Counter No. 1 will allocate the car call to the elevator car A and the A car will stop at the fifth floor for the car call.

Returning to the initial situation with the elevator car A at the eighth floor and the B car at the sixth floor, when the scanner reaches the fourth floor at which a down corridor call and a car call for the A car are also both registered, the signal BMCC2 in FIG. 10 will no longer be equal to ONE. This is so because it was assumed in the detailed description of this circuit that the output of PULSE SHAPER C12,31 would only persist for the length of time required for the scanner to scan past three floors. Therefore when the scanner advances to the fourth floor, the signal AP(1+2) will cause the upper output of the MEMORY D8,21 to go to ONE to block the signal BMCC2 from going to ONE. Consequently, the down corridor call will cause the signal $\overline{\text{200M}}$ to go to ZERO which in turn will cause the signal $\overline{\text{MDCC}}$ to go to ZERO. Although the car call for the elevator car A will register the second call in Counter No. 1, it can be understood from the detailed description of FIG. 9 that the signal CCN(1) will be equal to ONE at this time. Therefore, even though the signal $\overline{\text{MUDCC(X)}}$ in FIG. 10 is equal to ZERO the signal $\overline{\text{MUDCC}}$ cannot go to ZERO. Consequently, the down corridor call at the fourth floor will not be allocated to the elevator car B as it normally would.

It should be noticed that although the down corridor call at the fifth floor was also not allocated to the elevator car B as it normally would be, the elevator car B could not even stop for the down corridor call at the fifth floor since the A car was within a few floors of that floor with no stops in between and had to stop for a car call anyway. On the other hand, it will be noticed that even though the corridor call at the fourth floor is not allocated to the B car, the B car can stop for the down corridor call at the fourth floor since the signal $\overline{\text{MDCC}}$ goes to ZERO. When the scanner advances to the third floor where there is a down corridor call registered in addition to a car call for the A car, the signal CCN(1) will no longer equal ONE since the A car now has its quota of calls. Therefore, when the signal MDCC of FIG. 10 goes to ONE, the signal $\overline{\text{MUDCC}}$ will go to ZERO and the down corridor call at the third floor will be allocated to the B car.

In summary, the calls at the fifth floor and fourth floor are allocated to the A car while the down corridor call at the third floor is allocated to the B car. The B car will completely ignore the down corridor call at the fifth floor but will stop for the down corridor call at the fourth floor if it arrives at the fourth floor before the A car, even though that call has been allocated to the A car. Since the allocation of calls is made on each down scan, and since the scanning rate is very rapid compared to the rate of movement of the cars, the allocation of calls to cars is continually being reappraised to most efficiently serve the changing traffic situation.

(4) Allocation of calls to cars traveling in one direction to serve calls in the opposite direciton Assume for purposes of illustration that a down corridor call is registered at the eighth floor, that the A car has just stopped for a down corridor call at the seventh floor and that down corridor calls are also registered at the sixth, fifth and third floors. Further assume that the elevator car B is standing available at the first floor.

Figure 11:
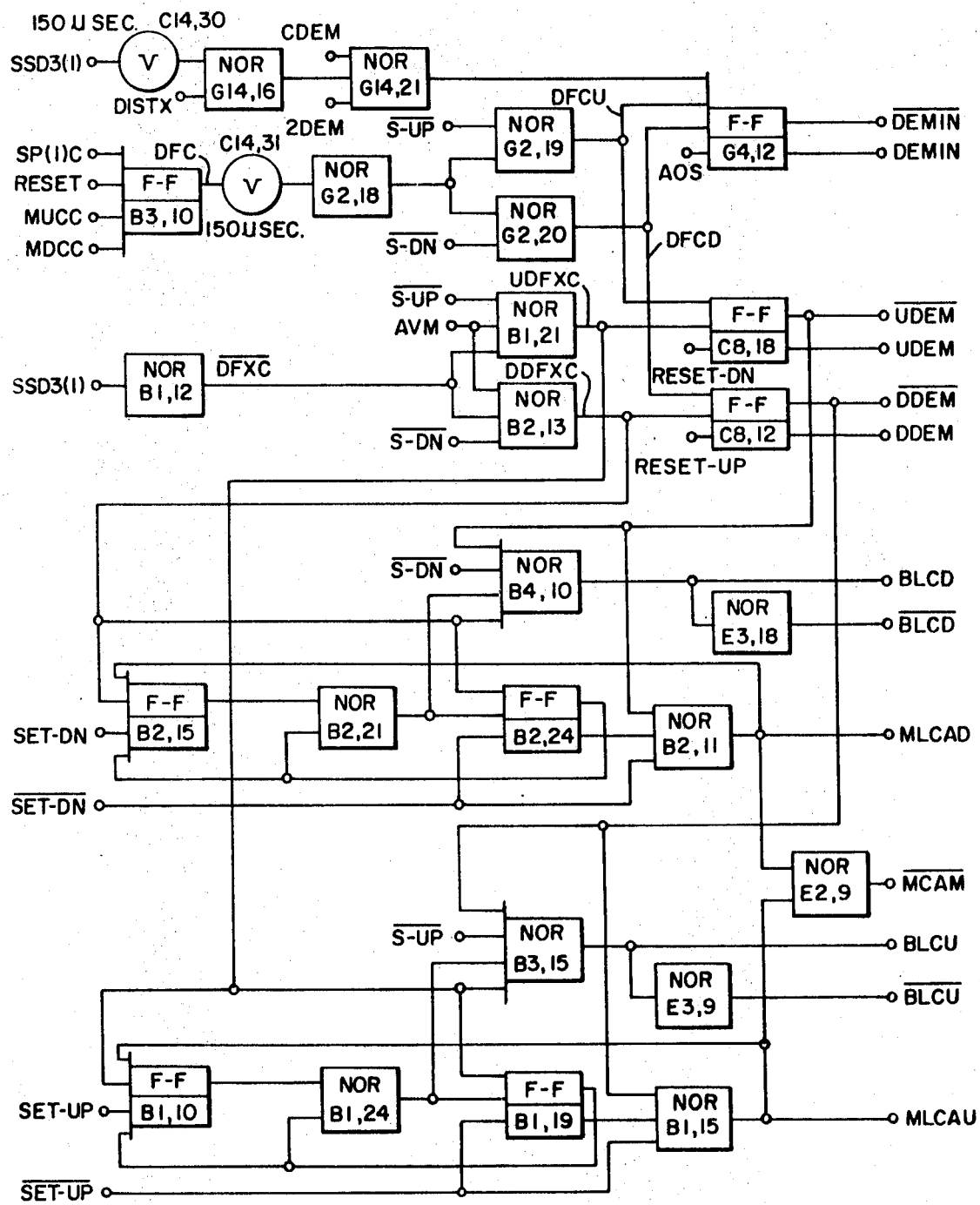

When the scanner begins a down scan and interrogates the eighth floor, the down corridor call registered there will produce the signal MDCC as previously described and since the signal SP(1)C of FIG. 8 equals ZERO indicating that the scanner has not yet passed the first car serving in the down direction, the signal DEMIN in FIG. 11 will be generated as previously described. As also previously described, this signal will cause the signal DEM in FIG. 12 to go to ONE indicating a demand for an extra car. This latter signal will cause the circuits of FIGS. 13, 14 and 15 to begin a search for an available car to serve the demand as described in detail above.

Figure 19:
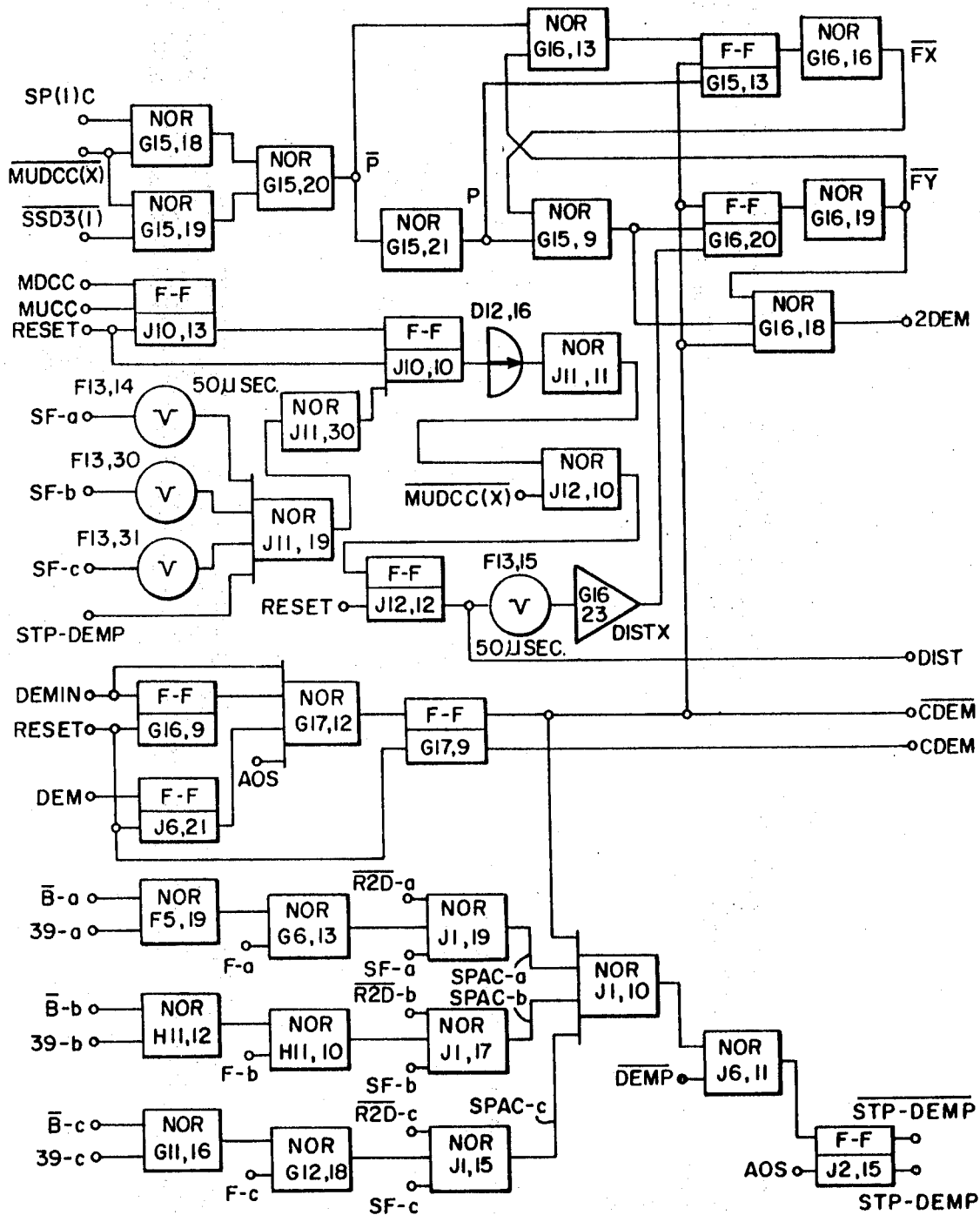

With the signal DEMIN equal to ONE, the upper output of the MEMORY G16,9 in FIG. 19 will go to ZERO. However, with th signal DEM equal to ONE the lower output of the MEMORY J6,21 in FIG. 19 will go to ONE for the remainder of the scan. This will lock up the signal $\overline{\text{CDEM}}$ at a value of ONE for the entire scan thereby preventing the generation of the signal 2DEM in FIG. 19 on this scan.

When the scanner advances to the seventh floor and sees the elevator car A serving in the down direction, it will assign the A car to Allocated Call Counter No. 1. Therefore, when the scanner advances to the sixth and fifth floors, the down corridor calls registered at these floors will be allocated to the elevator car A. A detailed description of the manner in which this is accomplished has already been described. When the scanner advances to the third floor and sees the third down corridor call in front of the elevator car A, the signal SSD3(1) in FIG. 9 will go to ONE but this will have no significant effect on the system at this time.

When the scanner reaches the first floor at which the B car is standing available, the circuits of FIG. 13 will select the B car as the last available car seen on that scan. In other words, the signal LAV–$b$ will go to ONE. Under the circumstances assumed here where the scanner sees a demand before it sees an available car, the signal Q developed by the circuit of FIG. 14 remains equal to ZERO throughout the scan as previously described. As mentioned above, the signal $\overline{\text{DEM}}$ is equal to ZERO at this point and the signal BAVM is equal to ONE since the scanner sees the B car available at the first floor. Therefore, the sequential portion of the circuit of FIG. 15 will cause the signal $\overline{\text{F50}}$ to go to ZERO. Since the scanner is scanning down and since there is no demand created at the floor at which the scanner is scanning, the signals $\overline{\text{S-DN}}$ and DEMP are also equal to ZERO so that the signal D81U–$b$ which is generated by a circuit similar to that which generates the signal D81U–$a$ in FIG. 15, will go to ONE. This signal indicates that the elevator car B has been assigned to down demands and must travel in the up direction to reach the down corridor call which created the demand. The signal D81U–$b$ will cause the signal 80UX–$b$ which is generated by a circuit similar to that shown in FIG. 16 for the A car to go to ONE. The signal D81U–$b$ will cause the signal A2DD–$b$ which is generated in a circuit similar to that shown in FIG. 20 to go to ONE. The signal 80UX–$a$ will cause the signal 81U–$b$ which is generated in a circuit similar to that shown in FIG. 17 to go to ONE. This signal it will be remembered causes the power controller to start the elevator car B traveling in the up direction.

At the completion of the down scan, the RESET signal will cause the lower output of MEMORY D9,15 in FIG. 16 to go to ZERO. However, it will be recalled that the signal 80UX–$b$ will remain equal to ONE as long as the signal CA–$b$ or DA–$b$ goes to ONE on the next down scan. It will be recalled that the signal 80UX–$b$ must remain equal to ONE to overcome the signal RDC–$b$ which is attempting to cancel the up direction for the elevator car B in order that the car may continue to travel on its assignment (see FIG. 17). With the assignment of the elevator car B to the down demand at the eighth floor, the signal A2DD–$b$ will cause the signal R2D–$b$ in FIG. 20 to go to ONE. This signal will cause the signal $\overline{\text{980A}}$–$b$+R2D–$b$ in FIG. 21 to go to ONE which in turn will produce the signal CATS in FIG. 12 to cancel the signal DEM and as previously described to prevent the generation of any subsequent DEM signals on that scan. The RESET signal however, will cause the signals CATS to return to ZERO at the completion of the down scan.

At the beginning of the next down scan, the down corridor call at the eighth floor will again cause the signal DEMIN in FIG. 11 to go to ONE when the scanner reaches the eighth floor. The signal DEMIN will then cause the signal DEMP in FIG. 12 to go to ONE, however the signal DEM will not go to ONE at this time. This will occur because with the signal A2DD–$b$ equal to ONE the output of the NOR element G8,16 in FIG. 12 will be equal to ZERO and since the scanner is also scanning down so that the signal $\overline{\text{S-DN}}$ is equal to ZERO the signal DMR2D in FIG. 12 will be equal to ONE. Since the signal DEMIN is equal to ONE while the scanner is scanning at the eighth floor, the signal $\overline{\text{CDEM}}$ in FIG. 19 will be held equal to ONE. With the signal $\overline{\text{CDEM}}$ applied to the input of the NOR element G18,12 in FIG. 12, the output of this NOR element will be equal to ZERO. Since the output of the NOR element C7,18 is also held equal to ZERO by the signal DMR2D, the signal BDEM in FIG. 12 will be equal to ONE to prevent the signal DEMP from causing the signal DEM to go to ONE.

With the signal $\overline{\text{MUDCC(X)}}$ of FIG. 10 equal to ZERO in response to the down corridor call registered at the eighth floor and with the signal SP(1)C equal to ZERO since the scanner has not yet seen a car traveling in the down direction, the output of NOR element G15,18 in FIG. 19 will be equal to ONE. This will cause the signal $\overline{\text{P}}$ to go to ZERO and the signal P to go to ONE. This will have no effect on the 2DEM circuit in FIG. 19 since as stated the signal $\overline{\text{CDEM}}$ is equal to ONE at this point. When the scanner advances to the seventh floor, the signal $\overline{\text{MUDCC(X)}}$ returns to the value of ONE to cause the signals $\overline{\text{P}}$ and P to return to a value of ONE and ZERO, respectively. When the scanner advances, the signal AOS also causes the signal DEMIN to return to ZERO. (See FIG. 11). With DEMIN now equal to ZERO and the lower output of MEMORY J6,21 in FIG. 19 equal to ZERO since DEM did not go to ONE yet on this scan, the output of the NOR element G17,12 in FIG. 19 will go to ONE to cause the signal $\overline{\text{CDEM}}$ to go to ZERO. When the scanner sees the A car serving down corridor calls at the seventh floor, the signal SP(1)C will go to ONE thereby preventing the down corridor call at the sixth and fifth floors which are again allocated to the elevator car A from causing the signal $\overline{\text{P}}$ in FIG. 19 from going to ZERO when the signal $\overline{\text{MUDCC(X)}}$ goes to ZERO.

When the scanner was scanning at the eighth floor, the down corridor call produced the signal MDCC which caused the lower output of the MEMORY J10,13 in FIG. 19 to go to ONE. It will be recalled however, that at this point in the scan, the signal CDEM was equal to ONE to cause the lower output of the NOR element J1,10 in FIG. 19 to be held equal to ZERO. Since the signal $\overline{\text{DEMP}}$ generated in the circuit of FIG. 12 was equal to ZERO at this point, the signal STP-DEMP in FIG. 19 was equal to ONE. With the signal STP-DEMP equal to ONE, the output of the NOR element J11,30 which serves as the lower input to the MEMORY J10,10 was also equal to ONE to keep the output of this MEMORY equal to ZERO despite the ONE signal at the upper input. When the scanner advances to the seventh floor, the signal DEMP returns to ONE and the signal AOS causes the signal STP-DEMP to return to a value of ZERO. With the STP-DEMP signal equal to ZERO, the lower output of MEMORY J10,10 will go to ONE to start the timer in delay element D12,16.

When the scanner advances again to the sixth floor, the signal SF–$a$ generated in FIG. 7 goes to ONE indicating that the scanner has scanned past the A car serving in the down direction. This will cause the PULSE SHAPER F13,14 to provide a pulse to the NOR element J11,19 which will cause the lower output of the MEMORY J10,10 to go to ZERO to reset the delay element D12,16. Upon the expiration of the pulse from the PULSE SHAPER the lower output of the MEMORY J10,10 will return to a value of ONE to reinitiate the timing of the delay element. Since the duration of the delay produced by the delay element was selected to correspond to the time that it took the scanner to scan past three floors when the scanner reaches the third floor the output of the delay element D12,16 will go to ONE thereby causing the output of the NOR element J11,11 to go to ZERO.

Since the down corridor call at the third floor is the third call seen by the scanner in front of the A car serving in the down direction, the signal $\overline{\text{SSD3(1)}}$ in FIG.

9 will go to ZERO. Furthermore, since a down corridor call at the third floor will also cause the signal $\overline{\text{MUDCC(X)}}$ to go to ZERO, the output of the NOR element G15,18 in the 2DEM circuit of FIG. 19 will go to ONE thereby causing the signal $\overline{P}$ to go to ZERO. This in turn causes the signal P to go to ONE which will cause the signal $\overline{FX}$ to go to ZERO. Since the signal P is equal to ONE at this poin, however, the output of the NOR element G15,9 remains equal to ZERO and therefore the second call which would normally be allocated to the B car which is assigned to run up to serve down demands does not effect the 2DEM signal at this time.

However, with the output of the NOR element J11,11 equal to ZERO and with the signal $\overline{\text{MUDCC(X)}}$ equal to ZERO, the signal DISTX goes to ONE for 50 microseconds. As will be recalled from the detailed description of the 2DEM circuit, this will cause the signal 2DEM to go to ONE. This latter signal indicates that another car should be assigned to serve down demands. Normally a car traveling up to serve down demands could handle two down calls, however this down corridor call at the third floor is so far below the first call assigned to the B car that it is desirable to assigne another car if available. It will be recalled that another demand would not have been created if the down call at the third floor had not been an appreciable number of floors below the A car which is serving in the down direction even if it was the third car call in front of the A car, however, in the example given it will be an appreciable time before the A car would reach the third floor, therefore, it is desirable to assign another car.

It will be recalled that the signal 80UX–$a$ will go to ZERO thereby causing the B car to lose its up direction indication unless the signal CA–$b$ or DA–$b$ goes to ONE during each scanning cycle. Since the B car has a demand to run for, the signal 80UX–$b$ will be generated on each down scan. Referring to FIG. 20, it will be appreciated that the signal MDCC will cause the signal SAWC to go to ONE when the scanner is at the eighth floor on the down scan. As previously described, this will prevent the signal CDD–$b$ from going to ONE at all on that scan and therefore prevent the cancellation of the signal A3DD–$b$. This means that the signal $\overline{\text{A2DD}}$–$b$ will remain equal to ZERO. It will also be recalled that the down corridor call at the eighth floor caused the signal STP-DEMP in FIG. 19 to go to ONE. This signal will cause the signal $\overline{\text{STP-DEMP}}$–$b$ in FIG. 20 to go to ZERO. With the signal $\overline{\text{S-DN}}$ also equal to ZERO, the output of the NOR element G9,18 in FIG. 16 will go to ONE to cause the signal X1–$b$ to go to ZERO. With the scanner scanning at the eighth floor, it is not scanning at the floor at which the A car is located, therefore, the signal $\overline{\text{B1}}$–$b$ will be equal to ONE and since the scanner has not yet passed the B car the signal F–$b$ will be equal to ZERO. Under these conditions, signal DA–$b$ will go to ONE to maintain the signal 80UX–$a$ equal to ONE. This will occur on every down scan as long as the elevator car B sees a down call to run up to.

With the signal 2DEM equal to ONE, the signal DEMP in FIG. 12 will go to ONE. Generation of the signal DEM will not be blocked by the signal BDEM at this time. Although the signal A2DD–$b$ remains equal to ONE to keep the output of the NOR element G7,18 in FIG. 12 equal to ZERO it will be recalled that the signal $\overline{\text{CDEM}}$ is now equal to ZERO. This latter signal will permit the output of the NOR element G18,12 to equal ONE so that the signal BDEM will be equal to ZERO. Therefore, the signal 2DEM will cause the signal DEM to go to ONE. This will again cause the circuits of FIGS. 13, 14 and 15 to search for an available car to assign to the demand.

Assume that when the scanner advances to the second floor that it finds the elevator car C at that floor available for assignment. It will be understood from the previous discussion that this car will be assigned to travel up to serve down demands as was the B car which is at the first floor. Assume that the C car is assigned to the second demand before the B car has had time to start up to the second floor so that we have the C car at the second floor and the B car at the first floor both assigned to travel up to serve down demands. It will be recalled that the B car was started in response to the down demand at the eighth floor while the C car was started in response to the down demand at the third floor. However, it is obvious that the C car is closer to the down demand at the eighth floor. Therefore, it is clearly desirable not to have the cars rigidly respond to the demand to which they were originally assigned, but to respond to the existing traffic situation instead.

It will be recalled from the detailed discussion of FIG. 18 that the signal $\overline{\text{STP-DEMP}}$–$a$, $b$, $c$, respectively must be equal to ZERO in order for a car traveling in one direction to stop for corridor calls for service in the opposite direction. The individual $\overline{\text{STP-DEMP}}$ signals such as $\overline{\text{STP-DEMP}}$–$a$ shown in FIG. 20 are generated from the common signal STP-DEMP when the car is running up as previously mentioned, is generated in the circuit in for a demand in the opposite direction. This latter signal the lower part of FIG. 19. It will be recalled that until the scanner has passed the first demand in the direction of scan to which the cars are running, the signal $\overline{\text{CDEM}}$ will be equal to ONE. This caused the output of the NOR element J1.10 to be equal to ZERO so that when the demand causes the signal $\overline{\text{DEMP}}$ to go to ZERO, the signal STP-DEMP goes to ONE.

After the scanner is past the first demand to which the cars are running, the signal $\overline{\text{CDEM}}$ goes to ZERO. It is necessary that one of the signals SPAC–$a$, $b$ or $c$ goes to ONE before another demand can cause the signal STP-DEMP to go to ONE. As explained previously, one of these latter signals will go to ONE when the associated car can no longer stop for the second demand requiring a car to travel in the opposite direction. For instance, when the elevator car C in the example given approaches the third floor on the way up, the signal 39–$c$ equals ONE while the car is adjacent the inductor plate associated with the third floor. Since the scanner has obviously not yet passed the elevator car C, the signal F–$c$ equals ZERO so that the signal G12,18 equals ONE and the signal SPAC–$c$ is equal to ZERO. It will be recalled that at this time the selector will indicate that the elevator car C is adjacent the third floor so that the signal $\overline{\text{B}}$–$c$ will go to ZERO. When the elevator car C has passed the inductor plate as it approaches the third floor, the signal 39–$c$ will return to ZERO causing the output of the NOR element G11,16 to go to ONE. Since when a car is traveling in one direction to serve calls in the opposite direction the signals $\overline{\text{R2D}}$–$c$ and SF–$c$ are equal to ZERO, the signal SPAC–$c$ will go to ONE. Therefore, since the down corridor call at the third floor will cause the signal $\overline{\text{DEMP}}$ to go to ZERO, the signal STP-DEMP will be generated so that the elevator car B which is the trailing car of the two cars traveling up to serve down corridor calls can be stopped when it approaches the third floor.

Thus, the decision as to which one of the two cars traveling up to serve down corridor calls should be stopped at the lower demand is delayed until one of the two cars is no longer in position to stop for the lower demand. On each subsequent scan then, the signal STP-DEMP will be generated each time the scanner reaches the third floor on the down scan. When the B car approaches the third floor, the signal 39–$b$ will be equal to ONE while the signals $\overline{\text{STP-DEMP}}$–$b$, $\overline{\text{A2DD}}$–$b$ and $\overline{\text{S-DN}}$ are all equal to ZERO so that the signal 34–$b$ is generated in a circuit similar to that shown for the A car in FIG. 18. Therefore, the B car will stop for the down corridor call at the third floor and the C car will continue traveling upward until it is stopped in a similar manner for the down corridor call at the eighth floor.

(5) Service to the main floor

As was discussed in the detailed description of FIG. 22, it is desirable to have a car at the lower terminal floor as much as the time as possible to receive passengers entering the building and desiring up elevator service. If no cars are located at the first floor, all of the signals (1)S–a, b and c will equal ZERO and therefore the signal MFD in FIG. 22 will go to ONE which will cause the signal 10(1)F which serves as an input to AND DRIVER (1) in FIG. 6 to go to ONE when the scanner reaches the first floor on the up scan. This in turn will cause the signal $\overline{100M}$ in FIG. 6 to go to ZERO which will make the signal MUCC in FIG. 10 equal to ONE. This latter signal which serves as an input to the MEMORY B3,10 in FIG. 11 will generate a DEMIN signal which serves as an upper input to the MEMORY B8,13 in FIG. 22. This will cause the signal DEMP to go to ONE which will generate the DEM signal. The system will then seek out an available car for assignment to serve what appears to be an up demand at the first floor in a manner which will be clear from the previous discussion. However, if there is a car serving in the down direction in the lower portion of the building with only one stop to make, the signal $\overline{NMDC}$ in FIG. 22 will go to ZERO during the SET-DN interval and will remain equal to ZERO until the completion of the up scan. Under these circumstances the signal NMDC will be equal to ONE when the scanner reaches the first floor on the up scan, so that the signal MFD cannot go to ONE.

Although an actual up corridor call at the first floor (10(1) equals ONE) can still cause the signal DEMIN to go to ONE, the signal DEM will not be able to go to ONE to assign a car to serve the up call at the first floor, because with the signal $\overline{NMDC}$ equal to ZERO and the output of the NOR element G7,9 equal to ZERO when the scanner is scanning at the first floor in the up direction, the signal BMUCD will be equal to ONE unless an available car is located at the first floor. Therefore, even in the case where there is an actual up corridor call registered at the first floor, no car will be assigned to that call if there is a car traveling down which will be available to serve that call shortly. Notice however, that if there had been an available car located at the main floor so that the signal BAVM was equal to ONE, the signal DEM would be permitted to go to ONE so that that car could serve the actual up corridor call at the first floor.

Suppose however, that there was no car serving down corridor calls in the lower third of the building with only one stop in front of it, but that there was an available car at the sixth floor. Under these circumstances the available car at the sixth floor would be assigned to the artificial demand at the first floor, through the circuits of FIGS. 13, 14 and 15 as previously described. Since the car would be assigned to travel down to serve up demands, the signal A2UD–a in FIG. 20 would be equal to ONE so that on subsequent scans the signal BDEM would be equal to ONE to prevent the assignment of another car to the first floor.

If the A car is traveling down to serve an artificial demand at the first floor, and an actual up corridor call is registered at the third floor while the A car is still above the third floor, the A car will ignore the artificial demand at the main floor and reverse direction when it arrives at the third floor. It was discussed in connection with the detailed description of FIG. 19 that the signal SPAC–a will go to ONE on the down scan when the scanner has passed the A car traveling in the down direction to serve up demands. Therefore, when the scanner reaches the third floor in the down direction and the up corridor call registered there causes the signal $\overline{100M}$ to go to ZERO, the output of the NOR element J12,13 in FIG. 22 will go to ONE to cause the signal BLMFD, blank main floor demand, to go to ONE. This signal will prevent the generation of the signal MFD at the first floor on the next up scan. However, the up corridor call at the third floor will cause the signal MUCC in FIG. 10 to go to ONE when the scanner reaches the third floor on the up scan. Since this signal serves as the lower input to the MEMORY B3,10 in FIG. 11 this will cause the signal DEMIN to go to ONE at this time. This in turn will cause the signal DEMP in FIG. 22 to go to ONE and although the signal DEM cannot go to ONE because the signal BDEM will still be equal to ONE the signal STP-DEMP in FIG. 23 will go to ONE each time the scanner reaches the third floor in the up direction. It will be recalled from the detailed description of FIG. 18 that this will generate a stopping signal for the elevator car A when it reaches the third floor traveling in the down direction. The A car will therefore stop at the third floor to answer the up corridor call registered there.

However, had there been another available car in the system (signal $\overline{AVM}$ equals ZERO), and had the scanner completed the down scan without seeing a down demand (DDEM equals ZERO) or a car traveling up to serve down corridor calls (CDEM equals ZERO) then during the SET-DN interval the output of the NOR element J11,10 in FIG. 22 would have gone to ONE to cause the signal BLMFD to go to ZERO. Therefore when the scanner interrogated the first floor on the up scan the signal MFD would have been able to go to ONE and the A car would have continued traveling down to serve the main floor, rather than serving the up corridor call at the third floor. Under these circumstances there is another car which is available and which can be assigned to the actual up demand at the third floor, therefore it is desirable to have the A car become available at the first floor.

(6) Timed-out down demands

Assume that a down corridor call is registered at the third floor, that no cars are serving in the down direction in the lower third of the building and that there are no available cars in the system. Assume also that there is a down corridor call registered at the sixth floor and no car is in position to serve either of these down corridor calls. Normally a down demand would be created at the sixth floor and a car would be assigned to serve both the down call at the sixth floor and the third floor. However, each time the scanner reaches the third floor on the down scan, the signal L3+1 generated in the circuits of FIG. 22 goes to ONE to cause the signal $\overline{L3D}$ in FIG. 23 to go to ZERO. Since there are no cars serving down corridor calls in the lower third of the building, when the signal $\overline{L3D}$ goes to ZERO, the output of the NOR element B11,13 is equal to ONE to maintain the output of the NOR element B11,19 equal to ZERO. Since there is a down corridor call registered at the third floor, the signal $\overline{200M}$ goes to ZERO so that the output of the NOR element B11,12 goes to ONE. This sets the upper output of the MEMORY B12,21 equal to ONE to trigger the delay element D11,16.

Assuming that no car enters the lower third of the building serving corridor calls in the down direction, the delay element will time-out after say 60 seconds causing the signal TDD to go to ONE. This signal triggers the PULSE SHAPER C20,25 to cause the signal $\overline{TDDP}$ to go to ZERO. Since the signal L3D is equal to ZERO except when the scanner is scanning down in the lower third of the building, the signal TDEM is equal to ONE to prevent the signal DEM from going to ONE when the down corridor call at the sixth floor generates the signal DEMIN.

When the scanner is scanning in the lower third of the building however, the signal L3D equals ONE so that TDEM is held at ZERO. Since the reverse signal $\overline{TDD}$ and the signal $\overline{L3D}$ are now both equal to ZERO when the scanner is scanning in the down direction at the third floor and since the down corridor call registered there causes the signal $\overline{MDCC}$ to go to ZERO, the signal DFCD2 in FIG. 23 goes to ONE. This signal triggers the PULSE SHAPER C12,11 through the lower output of the MEMORY C10,18 and the output of the PULSE SHAPER generates the signal DFCDX at the lower output of the MEMORY C6,18. This latter signal generates the signal DEMP which in turn causes the signal DEM to go to ONE. Therefore, the system will see the demand created by the down corridor call at the third floor rather than the demand created by the down corridor call at the sixth floor.

Assume now that the A car becomes available at the eighth floor. The circuits of FIGS. 13, 14 and 15 will assign the car to serve the down corridor call at the third floor by generating the signal D81D–a in FIG. 15. This signal will produce the signal SCD–a, start car down, in FIG. 16. With the signal SCD–a equal to ONE and the signals $\overline{TDDP}$ and $\overline{TDD}$ both equal to ZERO, the signal AL3–a in FIG. 24 will go to ONE indicating that the A car has been assigned to serve down calls in the lower third of the building. This signal AL3–a will therefore cause the signal AL3M in FIG. 23 to go to ONE to cause the signal $\overline{TDDP}$ to go to ONE so that the signal TDEM is clamped at ZERO.

Figure 24:
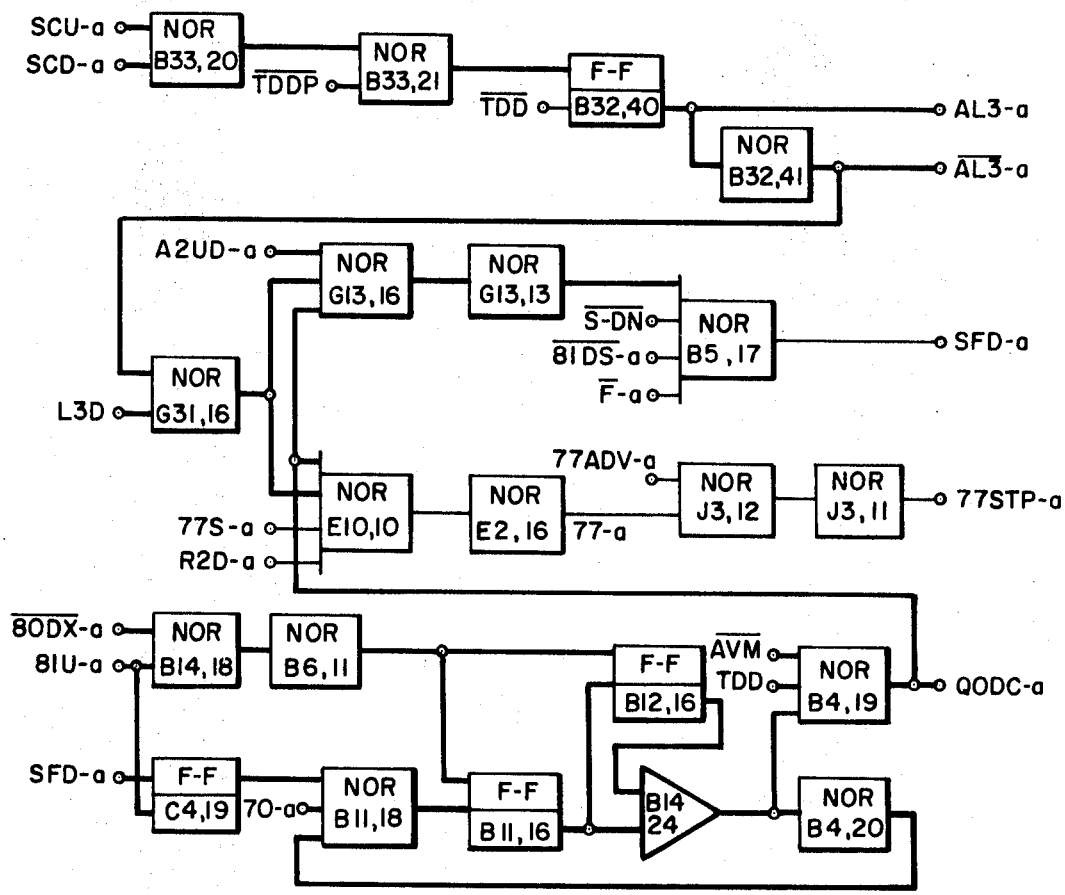

Since the reverse signal $\overline{AL3}$–a in FIG. 24 is equal to ZERO, the output of the NOR element G31,16 is equal to ONE to prevent the signal SFD–a in FIG. 24 from going to ONE even though the scanner has scanned past the A car set for down travel while the A car is in the upper portion of the building (L3D equals ZERO). Since the signal SFD–a equals ZERO, the signal SF–a in FIG. 7 cannot go to ONE and therefore the A car will not be assigned to an Allocated Call Counter through the circuits of FIG. 8 and when the scanner passes the A car the signal SP(1)C in FIG. 8 will not go to ONE.

Therefore when the scanner reaches the down corridor call at the sixth floor, this signal will cause the signal MDCC, which serves as an input to the MEMORY B3,10 in FIG. 11, to go to ONE. This in turn will generate the signal DEMIN which it can be seen from referring to FIG. 22 will cause the signal DEM to go to ONE since it will be remembered that at this time the signal TDEM is clamped at ZERO. Therefore the system will seek out another available car to assign to this down corridor call at the sixth floor.

When the scanner reaches the third floor on the down scan, and the signal L3D goes to ONE the output of the NOR element G31,16 in FIG. 24 will go to ZERO so that the signal SFD–a will now go to ONE. This in turn will cause the signal SF–a in FIG. 7 to go to ONE so that the A car will be assigned to the Allocated Call Counter No. 1 through the circuits of FIG. 8. Therefore even though the A car is physically located at the eighth floor, the system sees the car as being located just above the third floor and will allocate the down call at the third floor to the A car. Although in the building utilized in the description there are only two floors in the lower third of the building at which down calls can be registered, in installations with more floors it is possible that the quota of calls for the car assigned to the lower third of the building could be exceeded so that a demand would be created to assign another car to that portion of the building. This second demand for a car to proceed to serve down corridor calls would not be given priority and the car assigned would not be assigned specifically to the lower third of the building as was the A car in this instance.

As the A car approaches the sixth floor on the downward trip, the ouput of the NOR element G31,16 will be equal to ONE to cause the bypass signal 77STP–a to equal ONE to prevent the A car from stopping for the call at the sixth floor. Each time the scanner reaches the sixth floor on the down scan however, the signal DEM will be generated until another car becomes available which can be assigned to serve this call.

As the A car approaches the third floor, the signal L3D will go to ONE causing the output of the NOR element G31,16 to go to ZERO, the A car is recognized as serving down corridor calls and the bypass signal 77STP–a is no longer generated so that the A car may stop for the down corridor call at the third floor.

As another example, assume again that a down corridor call is registered at the sixth floor and that a down corridor call has been registered at the third floor for longer than 60 seconds. Again the timed-out down demand in the lower third of the building will be given priority. Assume now however, that the A car becomes available at the first floor. Again the A car will be assigned by the circuits of FIGS. 13, 14 and 15 to serve the demand created by the down corridor call at the third floor. However, this time through the generation of the signal D8IU–a since the car must travel in the up direction to reach the call to which it is assigned. The signal D81U–a which is generated in FIG. 15 will cause the signal A2DD–a in FIG. 20 to go to ONE indicating that the A car is assigned to serve down demands. The signal D81U–a will also cause the signal SCU–a in FIG. 16 to go to ONE to start the car in the up direction. This signal will cause the signal AL3–a in FIG. 24 to go to ONE indicating that the A car is assigned to the lower third of the building. Again the AL3–a signal cancels the TDEM signal in FIG. 23.

Therefore on the next down scan, although the signal $\overline{A2DD}$–a in FIG. 23 equals ZERO, with the signal $\overline{AL3}$–a and the signal L3D both equal to ZERO while the scanner is scanning down in the upper portion of the building, the signal BDEM will be held equal to ZERO and therefore the down corridor call at the sixth floor will be able to cause the signal DEM to go to ONE. It should be remembered that the signal DEM once generated on a scan should remain equal to ONE for the remainder of the scan while the system is looking for an available car to assign to the demand. While the A car is traveling up to serve down demands it does not prevent the generation of the DEM signal at the third floor since it is assigned to the lower third of the building and another car is required to serve the down corridor call at the sixth floor. Fifty microseconds after the DEM signal is created at the sixth floor, the output of the delay element D21,16 in FIG. 23 goes to ONE to prevent the signal BDEM from going to ONE to cancel the DEM signal when the scanner reaches the lower third of the building and the L3D signal goes to ONE since at this point the output of the NOR element G8,16 goes to ZERO. Notice that had there been no down corridor call registered at the sixth floor, the DFCDX signal generated when the scanner reached the third floor could not cause the signal DEM to go to ONE since under these conditions the signal BDEM would be equal to ONE at this point in the scan.

Assume that the B car becomes available at the fourth floor and that it is assigned to travel up to serve the down corridor call at the sixth floor. Under these conditions the signal A2DD–b will be generated in a manner similar to that in which the corresponding signal was generated for the A car. On subsequent down scans, since the B car is not assigned to the lower third of the building, the signal $\overline{AL3}$–b will be equal to ONE. The signal BDEM will be generated for the entire down scan and a DEM signal will not be generated at the sixth floor. Although the signal $\overline{CDEM}$ will go to ZERO after the scanner passes the sixth floor, there are two cars assigned to travel up to serve down demands so that the signal 2CR2 will be generated in the circuits of FIG. 12 to prevent the signal DEM from going to ONE when the signal DFCDX in FIG. 23 is generated at the third floor on the down scan. Notice that the signal DFCDX however, will generate the signal STP-DEMP at the third floor on each down scan so that a stopping signal for the A car can be generated when the floor selector for the A car notches into the third floor position. The signal STP-DEMP will be generated at the sixth floor on each down scan by the output of the NOR element J6,11 in FIG. 23 in a manner previously described in order that a stop signal may be generated for the B car at that floor.

(7) Quota of down stops

Assume that the A car is traveling in the up direction to serve a car call for the eighth floor. While the car is traveling up, the up direction signal $81U\text{-}a$ of FIG. 17 will be equal to ONE. This signal will cause the upper output of the MEMORY C4,19 and the reset signal produced by the NOR element B6,11 in the QODC-$a$ circuit of FIG. 24 to go to ONE. This will cause the lower outputs of MEMORIES B11,16 and B12,16 to be equal to ONE so that the signal QODC-$a$ is equal to ZERO. When the interference time has expired after the passenger has exited the car at the eighth floor, the signal $70\text{-}a$ in FIG. 24 will go to ZERO. The A car will therefore become available in a manner previously described.

Assume further that down corridor calls are registered at the seventh and sixth floors. The A car will be assigned to serve these down corridor calls through the circuits of FIGS. 13, 14 and 15 by the generation of the signal D81D-$a$ in FIG. 15. The signal D81D-$a$ in FIG. 15 will cause the signal SCD-$a$ in FIG. 16 to go to ONE which will in turn cause the signal 80DX-$a$ in that figure to go to ONE. The signal D81D-$a$ will also cause the signal A2DD-$a$ in FIG. 20 to go to ONE which in turn will make the signal R2D-$a$ in that figure equal to ONE. This latter signal when applied to the input of NOR F4,17 in FIG. 21 will cause the signal $\overline{980A}\text{-}a+R2D\text{-}a$ to go to ONE. This latter signal when applied to the lower input of the MEMORY G3,12 in FIG. 7 will cause the availability signal AV-$a$ to go to ZERO. The signal 80DX-$a$ will cause the signal 81D-$a$ in FIG. 17, which is the down direction signal, to go to ONE to initiate movement of the car in the down direction. The signal 81D-$a$ when applied to the upper input of the MEMORY G5,13 in FIG. 7 will cause the signal $\overline{81DS}\text{-}a$ to go to ZERO. Of course when the signal 80DX-$a$ went to ONE the signal $\overline{80DX}\text{-}a$ went to ZERO. Since at this point the signal 81U-$a$ equals ZERO, the RESET signal is removed from the counters in the QODC-$a$ circuit of FIG. 24. Since the signal D81D-$a$ only remains equal to ONE while the scanner is scanning at the seventh floor, the signal SCD-$a$ in FIG. 16 also returns to ZERO so that when the down scan is complete the RESET signal will cause the lower output of the MEMORY E9,17 in FIG. 16 to go to ZERO. It will be recalled however that at this time the signal 80DX-$a$ will remain equal to ONE.

At the start of the next down scan, since the A car is not assigned to up demands (A2UD-$a$ equals ZERO) and since it has a down direction signal $\overline{81D}\text{-}a$ equals ZERO, the signal SG-$a$ in FIG. 7 will be equal to ONE. With the signal SG-$a$ equal to ONE, the signal A2DD-$a$ in FIG. 20 will go to ZERO so that the reverse signal $\overline{A2DD}\text{-}a$ will go to ONE. Since the signal A2UD-$a$ equals ZERO when the scanner passes the A car on the down scan, the signal $\overline{F}\text{-}a$ in FIG. 7 will go to ZERO so that the signal SFD-$a$ in FIG. 24 will go to ONE. This latter signal will cause the upper input of the MEMORY C4,19 in the QODC-$a$ circuit to go to ZERO. This in turn will cause the output of the NOR element B11,18 to go to ONE to enter a count of ONE into the QODC-$a$ counter. However, since none of the upper inputs to the MEMORY E9,17 in FIG. 16 go to ONE on this down scan to regenerate a signal at the lower output of this MEMORY, during the SET-DN interval the output of the NOR element E9,10 will go to ONE to cause the signal $\overline{80DX}\text{-}a$ to go to ONE. With the signal $\overline{80DX}\text{-}a$ equal to ONE, the MEMORIES in the QODC-$a$ counter are RESET. When a car is started the non-interference signal $70\text{-}a$ will go to ONE to return the output of NOR element B11,18 to a value of ZERO. The count in the counter then at this point when the car starts in the down direction on its assignment to down corridor calls in ZERO.

Assume that when the car stops for the down corridor call at the seventh floor that a passenger enters the car and registers a car call for a lower floor. Referring to FIG. 16 it can be seen that if the car call is registered for a lower floor so that when the scanner reaches that floor and the signal 300M-$a$ goes to ZERO to cause the signal X1-$a$ to go to ZERO, that the scanner will be below the car so that the signal G-$a$ will also be equal to ZERO. Since the scanner is not scanning at the floor at which the car is located, the signal UV-$a$ will also be equal to ZERO so that the signal UB-$a$ will be equal to ONE. This signal will cause the signal $\overline{80DX}\text{-}a$ to go to ZERO again to release the RESET signal from the MEMORIES of the QODC-$a$ counter in FIG. 24. No count will be entered in the counter at this point because the signal $70\text{-}a$ will still be equal to ONE to hold the output of NOR element B11,18 at ZERO. The signal UB-$a$ will go to ONE each time the scanner reaches the floor at which the car call below the A car is registered so that the signal 80DX-$a$ will remain equal to ZERO.

When the non-interference time expires, the signal $70\text{-}a$ goes to ZERO and the output of the NOR element B11,18 will go to ONE to enter a count of ONE into the counter. Although the lower output of the MEMORY B11,16 is now equal to ZERO, the lower output of MEMORY B12,16 remains equal to ONE to hold the signal QODC-$a$ at ZERO. When the car starts again in the downward direction, the signal $70\text{-}a$ will go to ONE again. When the car stops for a down corridor call at the sixth floor, the output of the NOR element B11,18 will again go to ONE when the non-interference time expires. This will reset the lower output of the MEMORY B11,16 to a value of ONE while the lower output of the MEMORY B12,16 will go to ZERO. The signal QODC-$a$ will of course remain equal to ZERO. The elevator car A has now made one stop with the passenger on board.

Assume at this point that another down corridor call is registered at the fifth floor. When the non-interference time expires after the car has stopped for this down corridor call at the fifth floor and the signal $70\text{-}a$ again goes to ZERO to cause the output of NOR element B11,18 to go to ONE, the lower output of MEMORY B11,16 will go to ZERO. Since the lower output of the MEMORY B12,16 remains equal to ZERO, the signal QODC-$a$ will go to ONE assuming that there is an available car somewhere in the system ($\overline{AVM}$ equals ZERO) and no timed out down corridor calls (TDD equals ZERO). With the signal QODC-$a$ equal to ONE, the bypass signal 77STP-$a$ in FIG. 24 will be equal to ONE so that the A car will bypass any other down corridor calls below it. At the same time the signal QODC-$a$ will cause the signal SFD-$a$ to go to ZERO so that the A car which is being expressed to the first floor will not be considered by the Allocating Call Counters in allocating calls to cars serving in the down direction. Of course in order for QODC-$a$ to go to ONE there must be another available car in the system which can take care of the calls which are bypassed by the expressing car. It is also clear that a car which is not fully loaded should not bypass calls when the traffic is heavy as indicated by the presence of a timed out call.

I claim as my invention:

1. A transporation system including a structure having a plurality of serially distributed landings, a plurality of vehicles, mounting means for mounting said vehicles for movement relative to the structure to serve the landings, and control means for controlling the movement of the vehicles, said control means including:

means for conditioning each vehicle under predetermined conditions to be available for assignment, first direction landing call registering means operable for registering a call for service in a first direction from each of a plurality of said landings, first allocating means for allocating a predetermined number of first direction landing calls ahead of vehicles serving in the first direction to those vehicles, said allocating means being operative to allocate first direction landing calls to the closest vehicle serving in the first direction behind the landing call which does not have the predetermined number of closer calls allocated to it, demand means for generating a demand for an extra vehicle in response to the presence of a first-direction landing call not allocated to any vehicles serving in the first direction, said demand being created at the first first-direction landing call in the first direction not allocated to a vehicle serving in the first direction, assignment means for assigning an available vehicle to serve the demand for an extra vehicle in the first direction including means for assigning a vehicle to travel in the second direction to serve the demand for an extra vehicle in the first direction, and second allocating means for allocating a predetermined number of first-direction landing calls not allocated to a vehicle serving in the first direction to the assigned vehicle traveling in the second direction.

2. The system of claim 1 including stopping means responsive to the first direction landing call means and the second allocating means operative to stop the assigned vehicle traveling in the second direction at the first first-direction landing call in the first direction allocated to said assigned vehicle.

3. The system of claim 2 including means operative to periodically initiate the reallocation of first-direction landing calls to vehicles by the allocating means and wherein the stopping means is operative to stop a vehicle assigned to travel in the second direction to serve a demand for an extra vehicle in the first direction at the next landing at which a first-direction landing call is registered when upon reallocation of first-direction landing calls none are allocated to said assigned vehicle.

4. The system of claim 3 including second-direction landing call registering means operative for registering a call for service in the second direction from each of a plurality of said landings, and indicator means operative from a first to a second condition in the absence of first-direction landing calls ahead of the assigned vehicle traveling in the second direction to serve first-direction landing calls and wherein the stopping means is operative to stop said vehicle for second direction landing calls when no first-direction calls are allocated to said vehicle by the second allocating means and the indicator means is in the second condition.

5. A system of claim 4 wherein the assigning means includes means for altering the selected landing call to which an assigned vehicle specifically proceeds while said vehicle is enroute to the originally selected landing call.

6. The system of claim 1 wherein the second allocating means is operative to allocate the first predetermined number of first direction landing calls in the first direction not allocated by the first allocating means to a vehicle serving in the first direction, to the assigned vehicle traveling in the second direction to serve first direction landing calls.

7. The system of claim 6 including priority means operative from a first to a second condition under predetermined conditions for giving priority to first-direction landing calls in a designated zone of landings, and wherein said second allocating means is operative to allocate first-direction landing calls in said zone to the assigned vehicle in preference to other first direction landing calls when said priority means is in the second condition.

8. The system of claim 6 including priority means operative from a first to a second condition under predetermined conditions for giving priority to selected first-direction landing calls, and wherein said second allocating means is operative to allocate said selected first-direction landing calls to said assigned vehicle traveling in the second direction to serve first direction landing calls in preference to other unallocated first-direction landing calls when said priority means is in the second condition.

9. The system of claim 1 including additional demand means operative to generate a demand for an extra vehicle in response to the presence of a first-direction landing call not allocated by the first allocating means to a vehicle serving in the first direction and not allocated by said second allocating means to a vehicle assigned to travel in the second direction to serve first direction landing calls.

10. The system of claim 9 including means operative to cause the additional demand means to generate a demand for an extra vehicle when a designated one of the first-direction landing calls allocated to the assigned vehicle traveling in the second direction to serve first-direction landing calls is more than a predetermined number of landings ahead of the first first-direction landing call in the first direction allocated to said assigned vehicle.

11. The system of claim 10 including means operative to prevent said additional demand means from generating a demand for an extra vehicle when said designated first-direction landing call is less than a predetermined number of landings ahead of a vehicle serving in the first direction.

12. The system of claim 9 wherein the assignment means includes means operative to assign additional vehicles to travel in the second direction to serve first-direction landing calls, said system including stopping means operative to cause a vehicle assigned to travel in the second direction to serve first direction landing calls to stop at a first-direction landing call which generates a demand for a vehicle to travel in the second direction when said vehicle is preceded in the second direction by a vehicle similarly assigned for each first-direction landing call ahead of said vehicle in the second direction which creates such a demand.

13. The system of claim 1 including scanning means to rapidly and continually scan the landings successively for the presence of first direction landing calls and vehicles, and wherein the allocating means allocate calls sequentially on each scan as the presence of the first direction landing calls and vehicles are detected by the scanning means.

14. The system of claim 1 including vehicle call registering means for each of the vehicles operable for registering a call for each of a plurality of landings which may be desired by load within the vehicle and wherein the first allocating means is operable to allocate to a vehicle serving in the first direction vehicle calls requiring the associated vehicle to travel in the first direction in addition to first-direction landing calls.

15. The system of claim 1 wherein the first landing in the first direction is the main landing, said system including main landing service means operable for registering an artificial call for service in the first direction at the main landing under predetermined conditions including the absence of all vehicles from said main landing, said assignment means being operable to assign an available vehicle to travel in the second direction to serve the artificial call at the main landing and said second allocating means being operable to allocate the artificial call to the assigned vehicle.

16. A transportation system including a structure having a plurality of serially distributed landings, a plurality of vehicles, mounting means for mounting said vehicles for movement relative to the structure to serve the landings, and control means for controlling the movement of the vehicles, said control means including means for conditioning each vehicle under predetermined conditions to be available for assignment, first-direction landing call registering means operable for registering a call for service in a first direction from each of a plurality of said landings, scanning means to rapidly and continually scan the landings successively for the presence of first-direction landings calls and vehicles, allocating means responsive to the detection of first-direction landing calls and vehicles by the scanning means for allocating a predetermined number of first-direction landing calls to vehicles serving first-direction landing calls, demand means operable for generating a demand for an extra vehicle in response to the presence of a first-direction landing call not allocated to a vehicle serving first-direction landing calls, assignment means operable to assign an available vehicle to serve first-direction landing calls in response to the generation of a demand by said demand means and priority means responsive to first-direction landing calls registered for landings within a designated zone of landings and operative from a first to a second condition under predetermined conditions to generate a priority demand for service to first-direction landing calls in the designated zone, said assignment means being responsive to the operation of said priority means to the second condition to assign an available car to serve first-direction landing calls within said designated zone in preference to demands generated by the demand means.

17. The system of claim 16 wherein the allocating means includes means responsive to the assignment of a vehicle to serve first-direction landing calls when the priority means is in the second condition operative to allocate only first-direction landing calls in said designated zone to said vehicle assigned to serve first-direction landing calls in the designated zone.

18. The system of claim 17 wherein said means by which the allocating means only allocates first-direction landing calls in the designated zone to the assigned vehicle comprises adjusting means to adjust the position of said vehicle relative to the landing as detected by the scanning means during the scanning sequence.

19. The system of claim 18 wherein said designated zone includes the last predetermined number of landings in the first-direction and wherein the adjusting means includes means to cause a vehicle assigned to serve first-direction landing calls in the designated zone which must travel in the first-direction to reach such calls to appear in the scanning sequence at the last landing in the first direction before the designated zone until said vehicle enters said designated zone.

20. The system of claim 18 wherein said designated zone includes the last predetermined number of landings in the first direction and wherein the adjusting means includes means to cause the allocating means to disregard a vehicle assigned to serve first-direction landing calls in the designated zone which must travel in the second direction to reach its assigned calls until the scanning means reaches the designated zone in the scanning sequence.

21. The system of claim 16 wherein the predetermined conditions under which said priority means is operated to the second condition include the condition that a first-direction landing call in the designated zone has been registered for longer than a predetermined time interval.

22. The system of claim 21 including means responsive to the detection by the scanning means of a vehicle traveling in the first direction within the designated zone serving first-direction landing calls operative to prevent the priority means from going to the second condition.

23. A transportation system including a structure having a plurality of serially distributed landings, a plurality of vehicles, mounting means for mounting said vehicles for movement relative to the structure to serve the landings, and control means for controlling the movement of the vehicles, said control means including:

means for conditioning each vehicle under predetermined conditions to be available for assignment, first-direction landing call registering means operable for registering a call for service in a first direction from each of a plurality of said landings, allocating means operative to allocate each first-direction landing call to the closest vehicle serving in the first direction behind said call which does not have a predetermined number of closer first-direction landing calls allocated to it, demand means operative to generate a demand for an extra vehicle at the first first-direction landing call in a first direction not allocated by the allocating means to a car serving in the first direction, assignment means operative to assign an extra vehicle to serve the demand generated by the demand means, priority means operative under predetermined conditions from a first to a second condition to generate a priority for service to a selected first-direction landing calls, and modifying means responsive to the operation of the priority means to the second condition to modify the operation of the demand means to generate a demand for an extra vehicle at the selected landing rather than at the first-direction landing call in the first direction not allocated by the allocating means to a vehicle serving first-direction landing calls.

24. The system of claim 23 wherein the priority means includes a means operative under predetermined conditions from a first to a second condition to generate a priority for service to a predetermined zone of landings and wherein the modifying means includes means responsive to the operation of the priority means to the second condition to modify the operation of the demand means to generate a demand for an extra vehicle in the predetermined zone of landings rather than at the first first-direction landing call in the first direction not allocated by the allocating means to a vehicle serving first-direction landing calls.

25. The system of claim 24 wherein the modifying means includes means which cause an assigned vehicle which must travel in the first direction to reach the designated zone to appear to said allocating means to be positioned at the last landing in the first-direction before the designated zone whereby said allocating means allocates the first predetermined number of first-direction landing calls in the designated zone to said assigned vehicle.

26. The system of claim 25 including means to generate a demand for the assignment of additional vehicles to serve first direction landing calls in response to the presence of a first-direction landing call not allocated to a vehilcle serving first-direction landing calls including a vehicle assigned to serve first direction landing calls in the designated zone.

27. A transportation system including a structure having a plurality of serially distributed landings, a plurality of vehicles, mounting means for mounting said vehicles for movement relative to the structure to serve the landings, and control means for controlling the movement of the vehicles, said control means including:

call registering means operative for registering calls for service for a plurality of said landings, scanning means operative to rapidly and repetitively scan the landings for the presence of calls and vehicles, allocating means responsive to the sequence in which calls and vehicles are detected in the scanning sequence for allocating a predetermined number of calls to the selected vehicles, and adjusting means operative under predetermined conditions for adjusting the position of a vehicle in the sequence of calls and vehicles to which said allocating means is responsive.

28. The system of claim 27 including priority means operative from a first to a second condition under predetermined conditions to give priority to selected calls and assignment means operative in response to the operation of the priority means to the second condition to assign a vehicle to serve the selected calls, and wherein the adjusting means is operative to adjust the position of the assigned vehicle relative to the selected calls in the scanning sequence when the priority means is in the second condition.

29. A transportation system including a structure having a plurality of serially distributed landings including a main landing, a plurality of vehicles, means mounting said vehicles for movement relative to the structure to serve the landings, and control means for controlling the movement of the vehicles, said control means including:
  call means operative for registering a call for service for each of a plurality of landings,
  allocating means responsive to the call means for allocating a predetermined number of calls to vehicles in position to serve the calls,
  main landing service demand means operative from a first to a second condition to register a demand for service at the main landing in response to the presence of less than a predetermined number of the vehicles at the main landing,
  assignment means operative in response to the operation of the main landing service demand means to the second condition for assigning an extra vehicle to travel to the main landing, and
  modifying means operative to prevent the main landing service demand means from going to the second condition in response to the presence of a vehicle traveling toward said main landing with less than a designated number of calls for service in the direction toward the main landing allocated to it.

30. The system of claim 29 wherein the main landing service demand means is operated to the second condition when the predetermined number of vehicles present at the main landing is less than one of the vehicles, wherein the call means includes first-direction landing call registering means for registering a call for service in the first direction from each of a plurality of landings toward the main landing and vehicle call registering means for registering a call for the vehicle to travel to a landing desired by load within the vehicle and wherein said allocating means is only operative to allocate to a vehicle serving in the first-direction toward the main landing, first-direction landing calls ahead of the vehicle and vehicle calls requiring said vehicle to travel in the first direction toward said main landing.

31. A transportation system including a structure having a plurality of serially distributed landings including a main landing, a plurality of vehicles, means mounting said vehicles for movement relative to the structure to serve the landings, and control means for controlling the movement of the vehicles, said control means including:
  call means operative for registering a call for service for each of a plurality of landings,
  main landing service demand means operative from a first to a second condition to register a demand for service at the main landing in response to the presence of less than a predetermined number of the vehicles at said main landing,
  assignment means operative in response to the operation of main landing service demand means to the second condition for assigning an extra vehicle to travel to said main landing,
  and modifying means operative in response to the presence of a vehicle traveling toward said main landing serving calls for service in that direction and within a predetermined distance from the main landing to prevent the main landing service demand means from going to the second condition.

32. The system of claim 31 wherein the main landing service demand means is operated to said second condition when the predetermined number of vehicles present at the main landing is less than one of the vehicles, wherein said call means includes first-direction landing call means operative for registering a call for service in the first direction from each of a plurality of said landings toward the main landing and vehicle call means operable for registering a call for each of a plurality of said landings desired by load within said vehicle, and wherein said modifying means is only responsive to the presence of a vehicle traveling in the first direction serving first-direction landing calls and vehicle calls ahead of the vehicle in the first direction and which vehicle is within a predetermined distance measured in terms of a predetermined number of landings of said main landing.

33. The system of claim 31 including allocating means responsive to said call means and operative to allocate a predetermined number of calls to vehicles in position to serve the calls and blocking means for rendering said modifying means ineffective to prevent the main landing service demand means from going to the second condition in response to the presence of a vehicle serving calls in the direction toward the main landing and within a predetermined distance of the main landing when said allocating means has allocated more than a predetermined number of calls to said vehicle.

34. The system of claim 33 wherein said call means includes first-direction landing call registering means for registering calls for service in the first direction from each of a plurality of landings toward said main landing and vehicle call registering means for registering calls for service for a plurality of landings desired by load within the vehicle, wherein said modifying means is only responsive to a vehicle traveling in the first direction toward the main landing serving first-direction land calls and vehicle calls ahead of the vehicle and wherein said blocking means is only responsive to a vehicle traveling in the first-direction which has been allocated more than the predetermined number of first-direction landing calls and vehicle calls ahead of the vehicle.

35. A transportation system including a structure having a plurality of serially distributed landings including a main landing, a plurality of vehicles, means mounting said vehicle for movement relative to the structure to serve the landings, and control means for controlling the movement of the vehicles, said control means including:
  call means operative for registering a call for service for each of a plurality of landings,
  demand means operative from a first to a second condition in response to the registration of a call for service at said main landing,
  assignment means operative to assign an extra vehicle to serve the call at said main landing in response to the operation of said demand means to the second condition,
  and modifying means operative in response to the presence of a vehicle traveling toward the main landing serving calls in that direction and within a predetermined number of landings of the main landing to prevent said demand means from going to the second condition.

36. The system of claim 35 including allocating means responsive to said call means and operative to allocate a predetermined number of calls to vehicles in position to serve them and blocking means for rendering said modifying means ineffective to prevent the demand means from going to the second condition when the allocating means has allocated more than a predetermined number of calls requiring said vehicle approaching the main landing to continue traveling toward the main landing.

37. A transportation system including a structure having a plurality of serially distributed landings including a main landing, a plurality of vehicles, means mounting said vehicles for movement relative to the structure to serve the landings, and control means for controlling the movement of the vehicles, said control means including:
  main landing service demand means operative to register a demand for service at the main landing in response to the presence of less than a predetermined number of vehicles at said main landing,
  assignment means operative to assign an extra vehicle to travel in a first direction to serve the main landing, second-direction landing call registering means operative to register calls for service in the second direction from each of a plurality of said landings, and modifying means operative from a first to a second condition to stop the assigned vehicle at and reassign said vehicle to second-direction landing calls encountered by said vehicle while traveling in the first direction to reach the main landing.

38. The system of claim 37 wherein the main landing service demand means is operated to the second condition when the predetermined number of vehicles present at the main landing is less than one vehicle, and wherein said modifying means is only operated to said second condition at the last second-direction landing call between said assigned vehicle and the main landing.

39. A transportation system including a structure having a plurality of serially distributed landings, a plurality of vehicles, mounting means for mounting said vehicles for movement relative to the structure to serve the landings, and control means for controlling the movement of the vehicles, said control means including:

first-direction landing call registering means operative to register a call for service in the first direction from each of a plurality of landings, conditioning means for each vehicle operative from a first to a second condition to condition the associated vehicle to travel in the first direction to serve first-direction landing calls, stopping means for each vehicle operative to stop each vehicle with its conditioning means in the second condition at landings at which first-direction landing calls are registered, detecting means for each vehicle operative from a first to a second condition when a vehicle with its conditioning means in the second condition has made a predetermined number of stops with passengers onboard, and by-pass means for each vehicle for preventing the stopping means from stopping a vehicle for first-direction landing calls when the associated detecting means is in the second condition.

40. The system of claim 39 wherein each detecting means includes counter means for counting said predetermined number of stops for the associated vehicle and reset means for resetting said counting means under each of the following circumstances: (1) when the conditioning means of the associated vehicle is not in the second condition, and (2) when the detecting means for the associated vehicle indicates that no passengers are onboard.

41. The system of claim 40 including vehicle call registering means for each vehicle for registering calls for service to a plurality of the landings desired by passengers within the associated vehicle, and wherein each detecting means includes means responsive to the registration of vehicle calls in the associated vehicle for detecting the presence of passengers onboard.

42. The system of claim 39 including means operative to prevent the operation of detecting means to the second condition under predetermined conditions including the absence of an available vehicle in the system.

43. The system of claim 39 including priority means operative to a second condition under predetermined conditions including the registration of one of a selected number of first-direction landing calls for longer than a predetermined time and means responsive to the operation of the priority means to the second condition to prevent the detecting means from being operated to the second condition.

44. A transportation system including a structure having a plurality of serially distributed landings, a plurality of vehicles, mounting said vehicle for movement relative to the structure to serve the landings, and control means for controlling the movement of the vehicles, said control means including:

landing call registering means operative to register the call for service from each of a plurality of landings, stopping means for controlling the stopping of vehicles in response to registered landing calls, and modifying means responsive to the length of time that a vehicle has had a passenger onboard for modifying the response of the stopping means to the landing call means.

45. The system of claim 44 wherein the modifying means includes means responsive to the number of stops that the vehicle has made with a passenger onboard for determining the length of time that a vehicle has had a passenger onboard.

46. The system of claim 45 including:

vehicle call registering means for each vehicle for registering the calls for service to a plurality of landings desired by passengers within the associated vehicle, and wherein the modifying means is responsive to the number of stops made by the vehicle for landing calls while a vehicle call is registered for the associated vehicle for determining the length of time that the vehicle has had a passenger onboard.

47. The system of claim 44 wherein the modifying means includes means operative to modify the operation of the stopping means by causing a vehicle which has had a passenger on board for at least a predetermined interval to by-pass landing calls.

48. The system of claim 47:

wherein the stopping means includes means for allocating landing calls to vehicles in service and for bringing extra vehicles into service in response to a registered call not allocated to a car in service, and wherein said modifying means include means to remove a vehicle from consideration by the allocating means when the vehicle has had a passenger on board for at least the predetermined interval.

49. A transportation system including a structure having a plurality of serially distributed landings, a plurality of vehicles, mounting means for mounting said vehicles for movement relative to the structure to serve the landing, and control means for controlling the movement of the vehicle, said control means including:

landing call registering means operative to register a call for service from each of a plurality of landings, stopping means for controlling the stopping of vehicles in response to registered landing calls in accordance with a scheme based upon the effective relative positions of the vehicles with respect to the landings at which landing calls are registered, and adjusting means operative under predetermined conditions to adjust the effective relative position of a selected vehicle with respect to said landings, said adjusted effective position being greater than the normal slowdown distance for the vehicle, whereby the effective pattern in which the vehicles stop at landings having registered landing calls can be altered under said predetermined conditions.

50. The system of claim 49 wherein the adjusting means includes means for adjusting the relative effective position of a selected vehicle with respect to other vehicles.

51. The system of claim 49:

wherein said predetermined conditions include the selection of a landing call for priority service, and wherein said adjusting means is operative to adjust the effective relative position of the selected vehicle to within a predetermined distance of the landing at which the priority call is registered despite the actual position of the vehicle.

52. A transportation system including a structure having a plurality of serially distributed landings, a plurality of vehicles, mounting means for mounting said vehicles for movement relative to the structure to serve the landings, and control means for controlling the movement of the vehicles, said control means including:

first-direction landing call registering means operable for registering the call for service in a first direction from each of a plurality of said landings, assigning means responsive to registered first-direction landing calls and operative to assign vehicles to travel in the second direction to serve selected first-direction landing calls, reversing means operative to cause the assigned vehicles traveling in a second direction to serve first direction landing calls to stop and reverse direction at said selected first-direction landing calls, and blocking means operative to render the reversing means ineffective to cause a vehicle traveling in the second direction on assignment to serve first-direction landing calls to reverse at a particular selected landing until there is an assigned vehicle traveling in the second direction to serve first-direction landing calls beyond said particular selected landing call in the second direction for each selected landing call beyond said particular landing call in the second direction.

53. The system of claim 52 wherein said reversing means includes means operative to reverse an assigned vehicle at the next first-direction landing call that it comes to when there is no longer a selected first-direction landing call ahead of the vehicle in the second direction whereby accommodation can be made for a modification for the selected first-direction landing calls by the assigning means in response to changes in the traffic situation.

54. The system of claim 53 including:
second direction landing call registering means operable for registering a call for service in a second direction from each of a plurality of said landings,
and stopping means for stopping an assigned vehicle at the first second-direction landing call that it comes to in the absence of a first-direction landing call ahead of the car in the second direction.

55. A transportation system including a structure having a plurality of serially distributed landings, a plurality of vehicles, mounting means for mounting said vehicles for movement relative to the structure to serve the landings, and control means for controlling the movement of the vehicles, said control means including:

landing call registering means operable for registering calls for service from each of a plurality of said landings, scanning means to rapidly and continually scan the landings successively from one end of the structure to the other for detecting the presence of landing calls and vehicles, and assigning means operative to assign a vehicle to proceed specifically to a selected landing call without stopping for other landing calls intermediate the position of the vehicle at the time of assignment and the selected landing call.

56. The system of claim 55:
including a plurality of vehicles mounted for movement relative to the structure to serve the landings,
and wherein the assigning means includes means for successively assigning a plurality of vehicles to proceed to specifically selected landing calls without stopping for intermediate landing calls.

57. The system of claim 56 wherein the assigning means includes means for altering the selected landing calls to which the assigned vehicles proceed while enroute to the originally selected landing calls.

References Cited
UNITED STATES PATENTS

| | | | |
|---|---|---|---|
| 3,378,107 | 4/1968 | Madison | 187—29 |
| 3,443,668 | 5/1969 | Hall et al. | 187—29 |

ORIS L. RADER, Primary Examiner

W. E. DUNCANSON, Jr., Assistant Examiner